United States Patent
Fujii et al.

(10) Patent No.: US 9,819,487 B2
(45) Date of Patent: *Nov. 14, 2017

(54) RE-ENCRYPTION KEY GENERATOR, RE-ENCRYPTION DEVICE, ENCRYPTION DEVICE, DECRYPTION DEVICE, AND PROGRAM

(71) Applicants: KABUSHIKI KAISHA TOSHIBA, Minato-ku (JP); TOSHIBA SOLUTIONS CORPORATION, Kawasaki-shi (JP)

(72) Inventors: Yoshihiro Fujii, Tokyo (JP); Koji Okada, Tokyo (JP); Tatsuyuki Matsushita, Tokyo (JP); Ryotaro Hayashi, Hiratsuka (JP)

(73) Assignees: KABUSHIKI KAISHA TOSHIBA, Minato-ku (JP); TOSHIBA SOLUTIONS CORPORATION, Kawasaki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/615,561

(22) Filed: Feb. 6, 2015

(65) Prior Publication Data

US 2015/0180661 A1  Jun. 25, 2015

Related U.S. Application Data

(63) Continuation of application No. PCT/JP2013/071468, filed on Aug. 8, 2013.

(30) Foreign Application Priority Data

Aug. 8, 2012 (JP) .................... 2012-175903
Aug. 8, 2012 (JP) .................... 2012-176542

(51) Int. Cl.
*H04L 9/00* (2006.01)
*H04L 9/08* (2006.01)
(Continued)

(52) U.S. Cl.
CPC .............. *H04L 9/0869* (2013.01); *H04L 9/14* (2013.01); *H04L 9/30* (2013.01); *H04L 9/3073* (2013.01);
(Continued)

(58) Field of Classification Search
CPC ... H04L 2209/24; H04L 2209/76; H04L 9/08; H04L 9/0869; H04L 9/14; H04L 9/30; H04L 9/3073

See application file for complete search history.

(56) References Cited

U.S. PATENT DOCUMENTS

2008/0059787 A1* 3/2008 Hohenberger ........ H04L 9/3013
   713/153
2012/0239942 A1* 9/2012 Yan ...................... H04L 63/0421
   713/189
2013/0275752 A1* 10/2013 Zhang ..................... H04L 9/008
   713/167

FOREIGN PATENT DOCUMENTS

JP  2001202010 A  *  7/2001
JP  2009-302861 A  12/2009
(Continued)

OTHER PUBLICATIONS

Ciphertext Policy Attribute-Based Proxy Re-encryption, Song Luo, Jianbin Hu, and Zhong Chen, pp. 401-415, 2010. Springer-Verlag Berlin Heidelberg 2010.*

(Continued)

*Primary Examiner* — Gary Gracia
(74) *Attorney, Agent, or Firm* — Oblon, McClelland, Maier & Neustadt, L.L.P.

(57) ABSTRACT

A re-encryption key generator according to an embodiment generates a re-encryption key to obtain re-encrypted data that can be decrypted by a second private key of a second user device by re-encrypting ciphertext obtained by encrypting plaintext by a first public key of a first user device without decryption. The re-encryption key generator stores a first private key corresponding to the first public key. The re-encryption key generator stores a second re-encryption key generation key of the second user device that is different from a second public key corresponding to the second private key. The re-encryption key generator generates the re-encryption key based on the first private key and the second re-encryption key generation key.

9 Claims, 18 Drawing Sheets

(51) Int. Cl.
*H04L 9/30* (2006.01)
*H04L 9/14* (2006.01)
*H04L 17/02* (2006.01)

(52) U.S. Cl.
CPC ...... *H04L 2209/24* (2013.01); *H04L 2209/76* (2013.01)

(56) References Cited

FOREIGN PATENT DOCUMENTS

| JP | 2010-113181 | A |   | 5/2010 | |
| JP | 2011-55309 | A |   | 3/2011 | |
| JP | 2011-055309 | A |   | 3/2011 | |
| JP | 2012150378 | A | * | 8/2012 | |
| JP | 2012220834 | A | * | 11/2012 | |
| JP | 2013101260 | A | * | 5/2013 | |
| WO | WO 2011/045723 | A1 |   | 4/2011 | |
| WO | WO 2011045723 | A1 | * | 4/2011 | H04L 9/3073 |
| WO | WO 2012147869 | A1 | * | 11/2012 | H04L 9/3073 |

OTHER PUBLICATIONS

Office Action dated Dec. 8, 2015 in Japanese Patent Application No. 2014-529548 (with English language translation).
Ryotaro Hayashi, et al., "Unforgeability of Re-Encryption Keys against Collusion Attack in Proxy Re-Encryption" The Symposium on Cryptography and Information Security Proceeding, The Institute of Electronics, Information and Communication Engineers, Technical Committee on Information Security, Jan. 30, 2012, pp. 1-8.
International Search Report dated Oct. 8, 2013 for PCT/JP2013/071468 filed on Aug. 8, 2013 with English Translation.
Written Opinion dated Oct. 8, 2013 for PCT/JP2013/071468 filed on Aug. 8, 2013.
Hayashi, R., et al., "Unforgeability of Re-Encryption Keys against Collusion Attack in Proxy Re-Encryption", *The 29th Symposium on Cryptograph and Information Security, The Institute of Electronics,, Information and Communication Engineers*, pp. 1-8, Kanazawa, Japan, Jan. 30, 2012.
Hayashi, R., et al., "Unforgeability of Re-Encryption Keys against Collusion Attack in Proxy Re-Encryption", *IWSEC 2011*, LNCS 7038, pp. 210-229, Springer-Verlag Berlin Heidelberg 2011.
Libert, B., et al. "Unidirectional Chosen-Ciphertext Secure Proxy Re-encryption", *International Association for Cryptologic Research*, 2008, pp. 360-379.
Menezes, A., et al., "Handbook of Applied Cryptography", *CRC Press, Inc.*, Chapter 11, 1996, pp. 462-471.
Extended European Search Report dated Feb. 9, 2016 in Patent Application 13828048.2.
Giuseppe Ateniese, et al., "Improved Proxy Re-Encryption Schemes with Applications to Secure Distributed Storage" International Association for Crypto Research, vol. 20060111:153421, XP061001560, Jan. 11, 2006, pp. 1-25.
Xiaoxin Wu, et al., "A Certificateless Proxy Re-Encryption Scheme for Cloud-based Data Sharing" Proceedings of the 18th ACM Conference on Computer and Communications Security, XP55145160, Oct. 17, 2011, 3 Pages.
Qin Qiu, et al., "A Decentralized Authorization Scheme for DRM in P2P File-sharing Systems" Consumer communications and Networking Conference (CCNC), XP031865886, Jan. 9, 2011, pp. 136-140.
Singaporean Search Report and Written Opinion dated Sep. 9, 2015 in Patent Application No. 11201500786U filed Aug. 8, 2013.
Piotr K. Tysowski, et al., "Re-Encryption-Based Key Management Towards Secure and Scalable Mobile Applications in Clouds", Cryptology ePrint Archive: Report 2011/668, Dec. 9, 2011, 10 Pages.
Huijun Xiong, et al., "Towards End-to-End Secure Content Storage and Delivery with Public Cloud" Proceedings of the second ACM conference on Data and Application Security and Privacy (CODASPY'12), Feb. 7-9, 2012, 10 Pages.
Written Opinion dated Apr. 6, 2016 in Singaporean Patent Application No. 11201500786U.

* cited by examiner

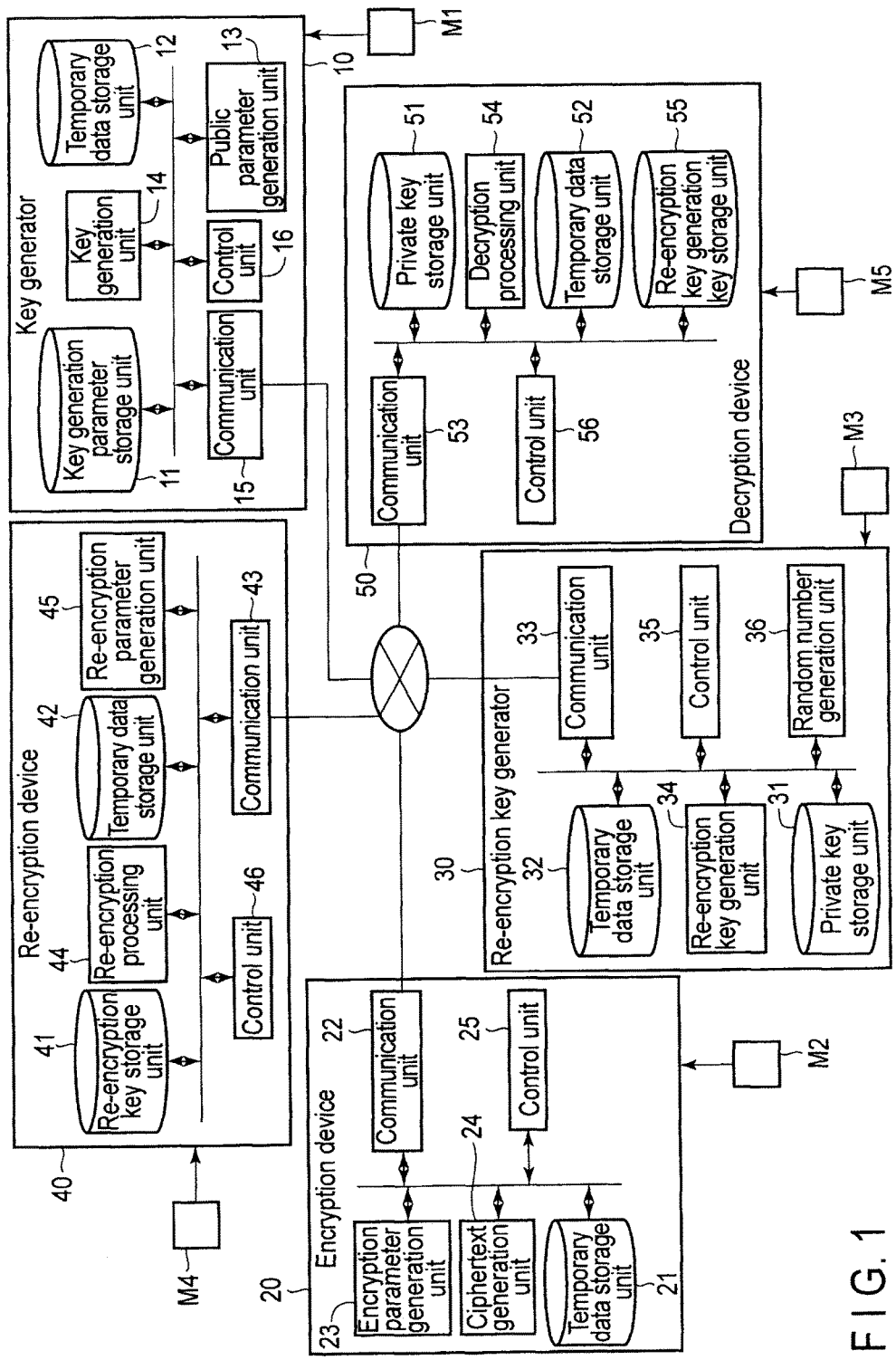
F I G. 1

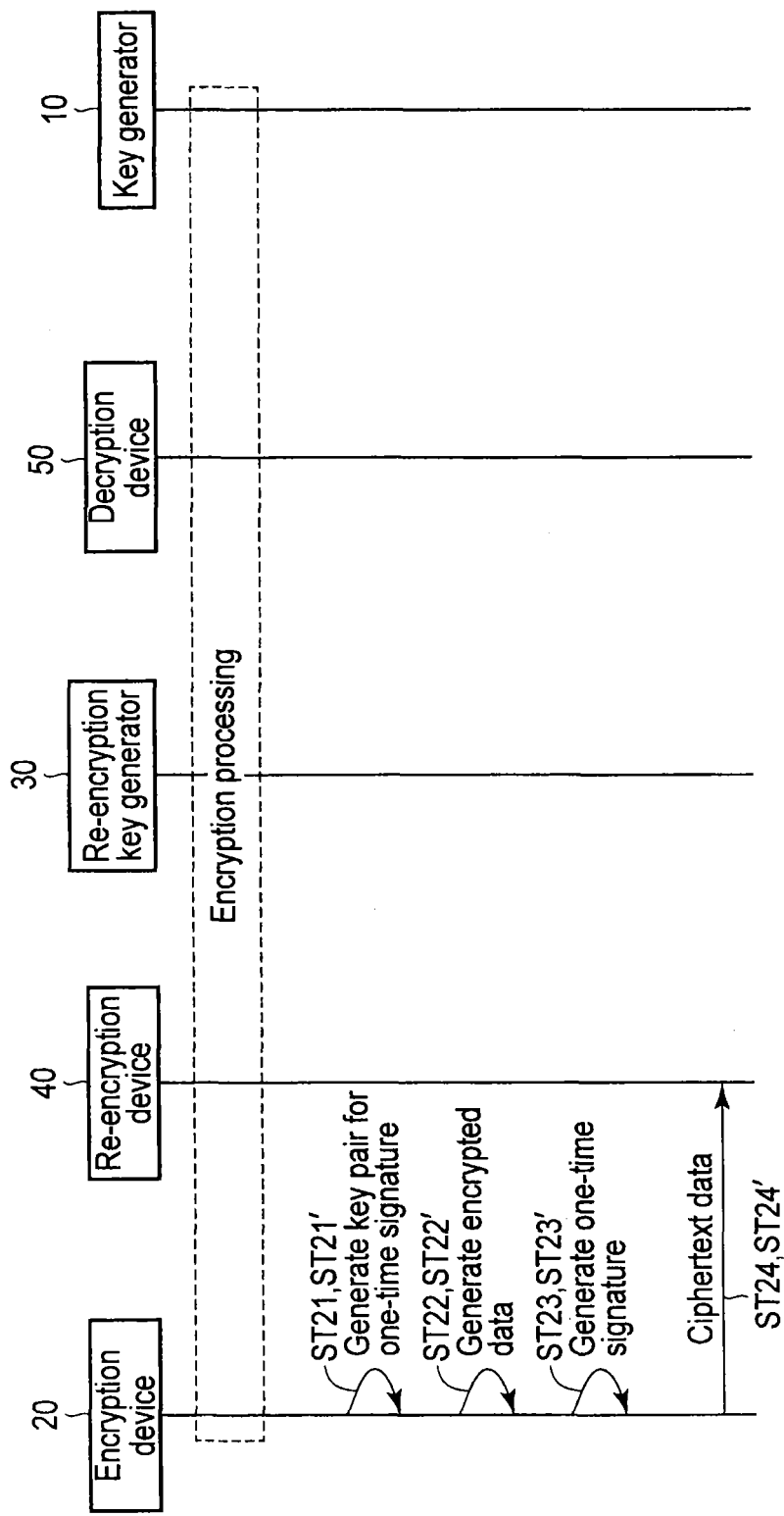
F I G. 3

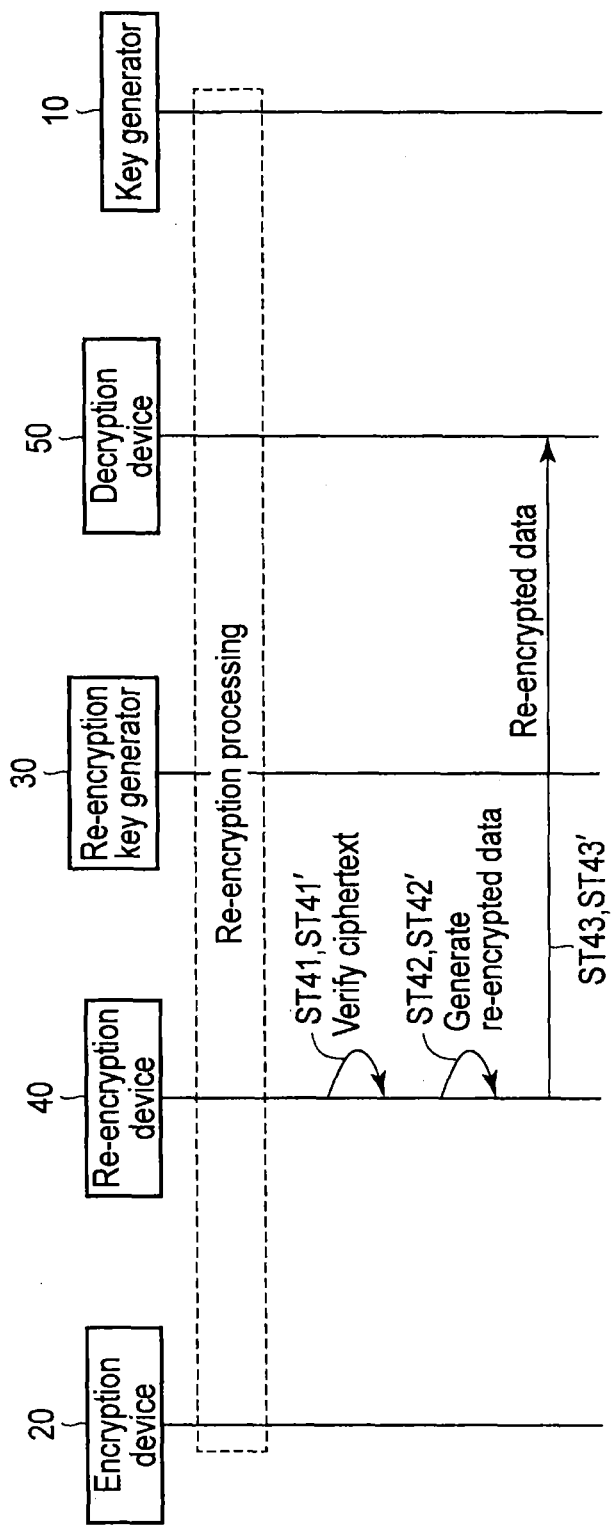
F I G. 5

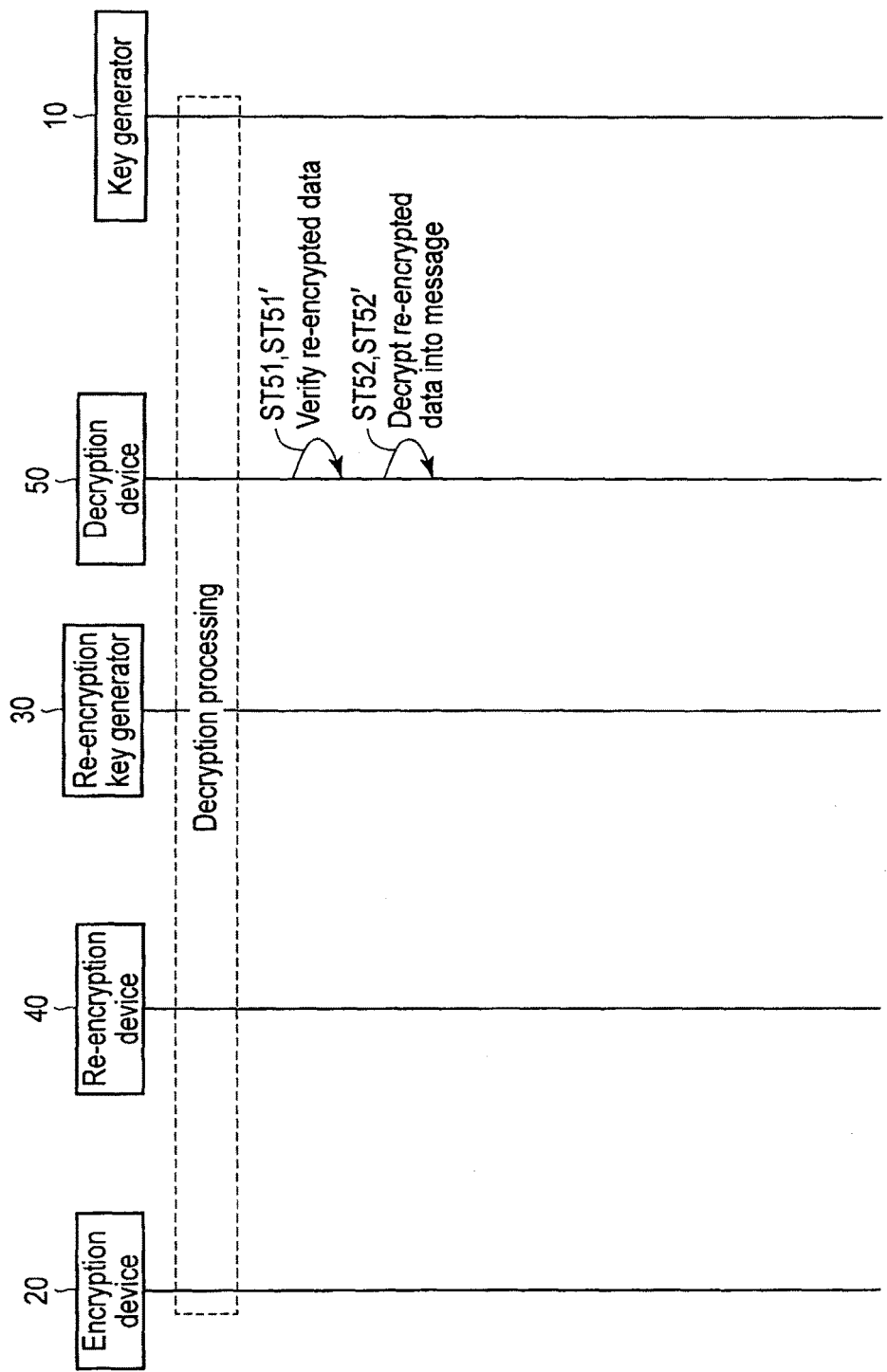
F I G. 6

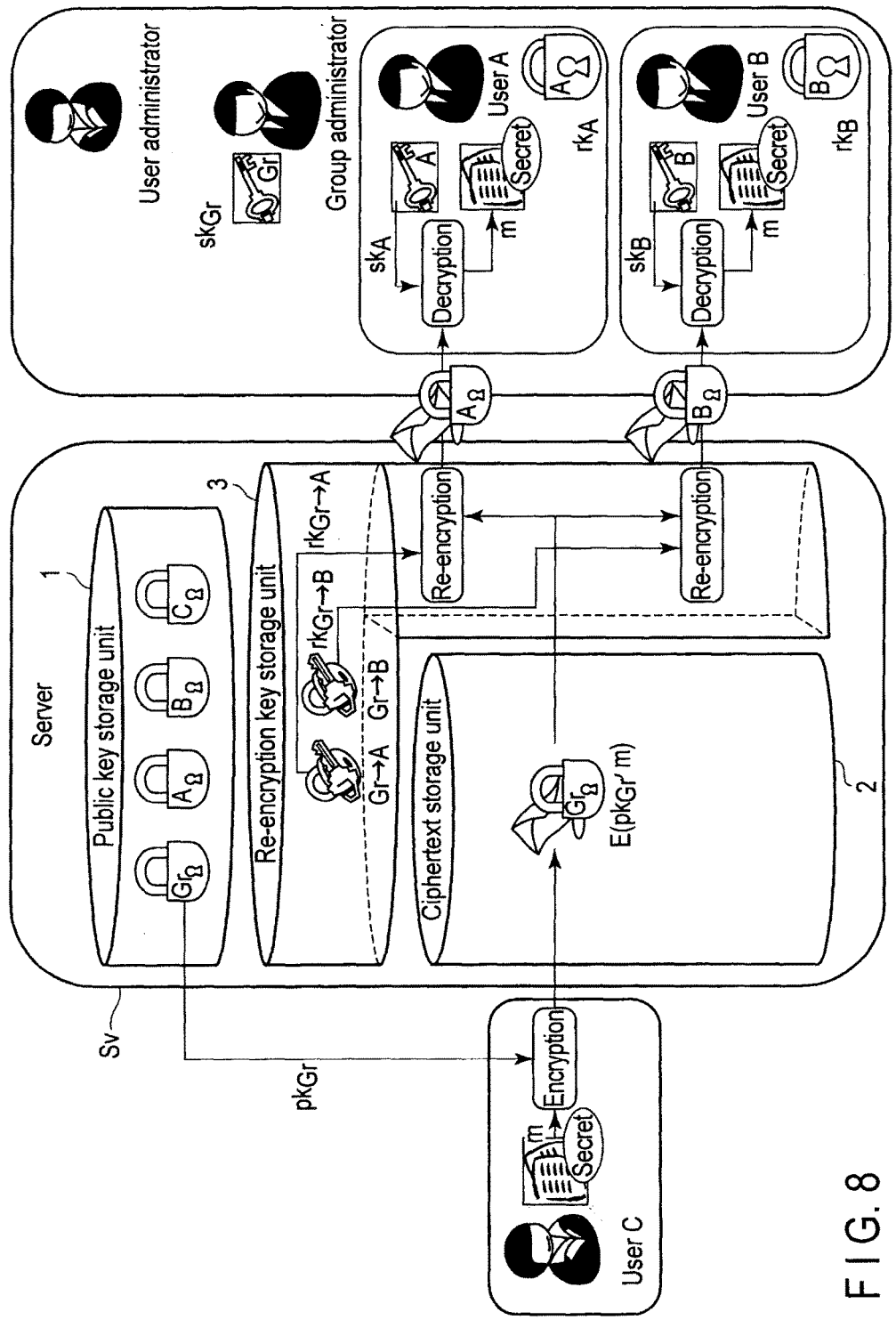
F I G. 8

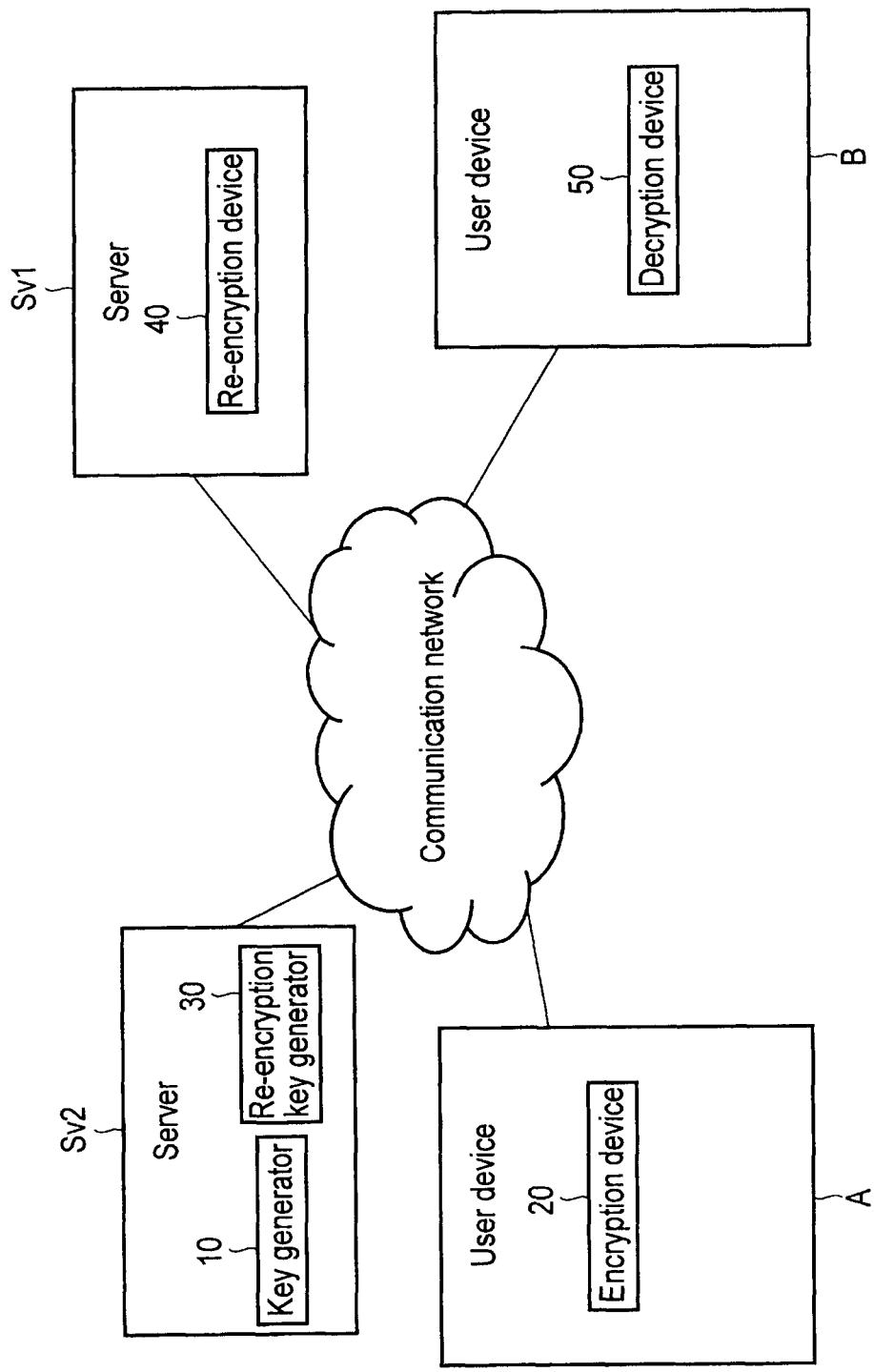
F I G. 9

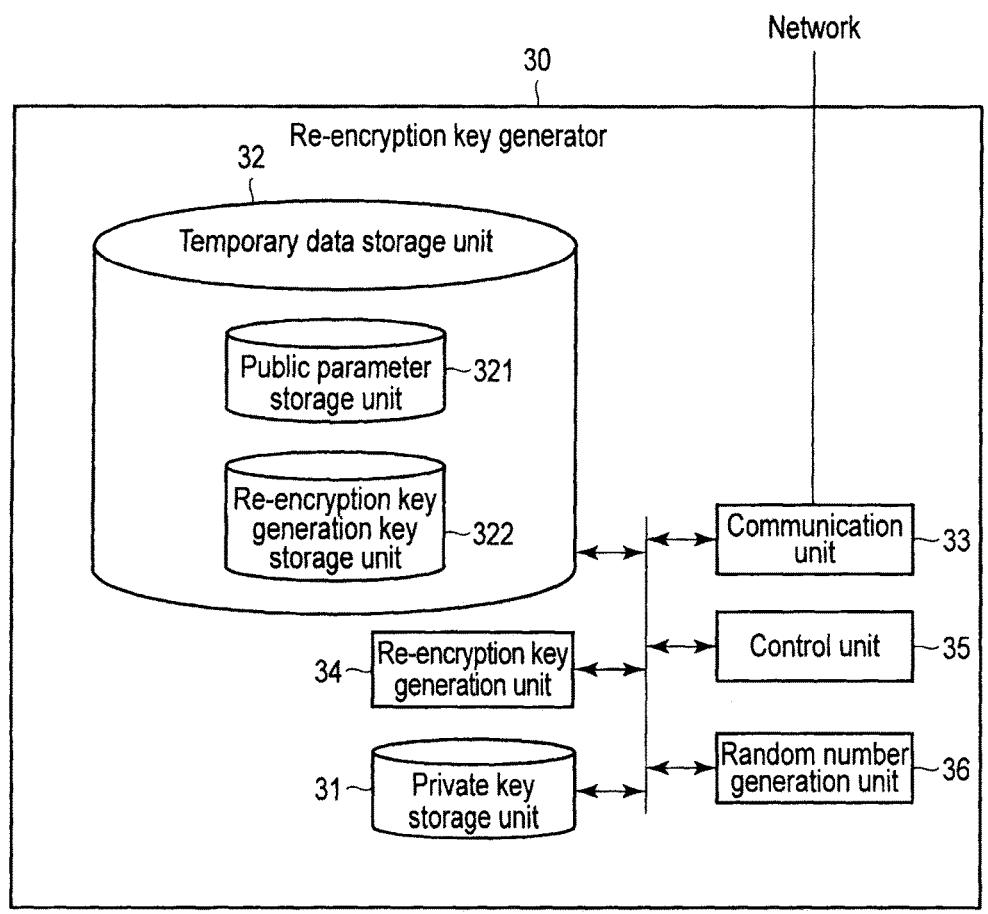
F I G. 11

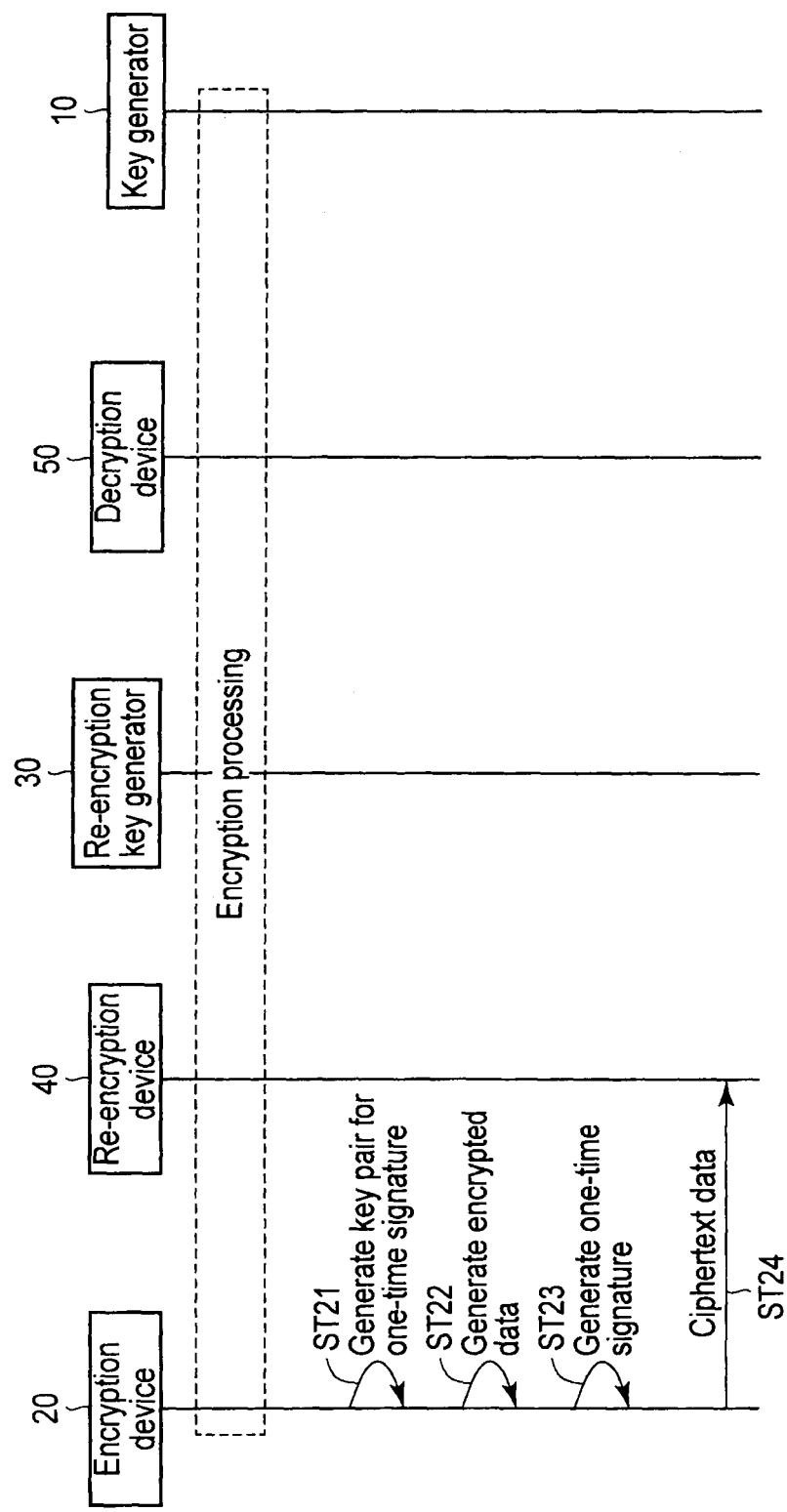
F I G. 14

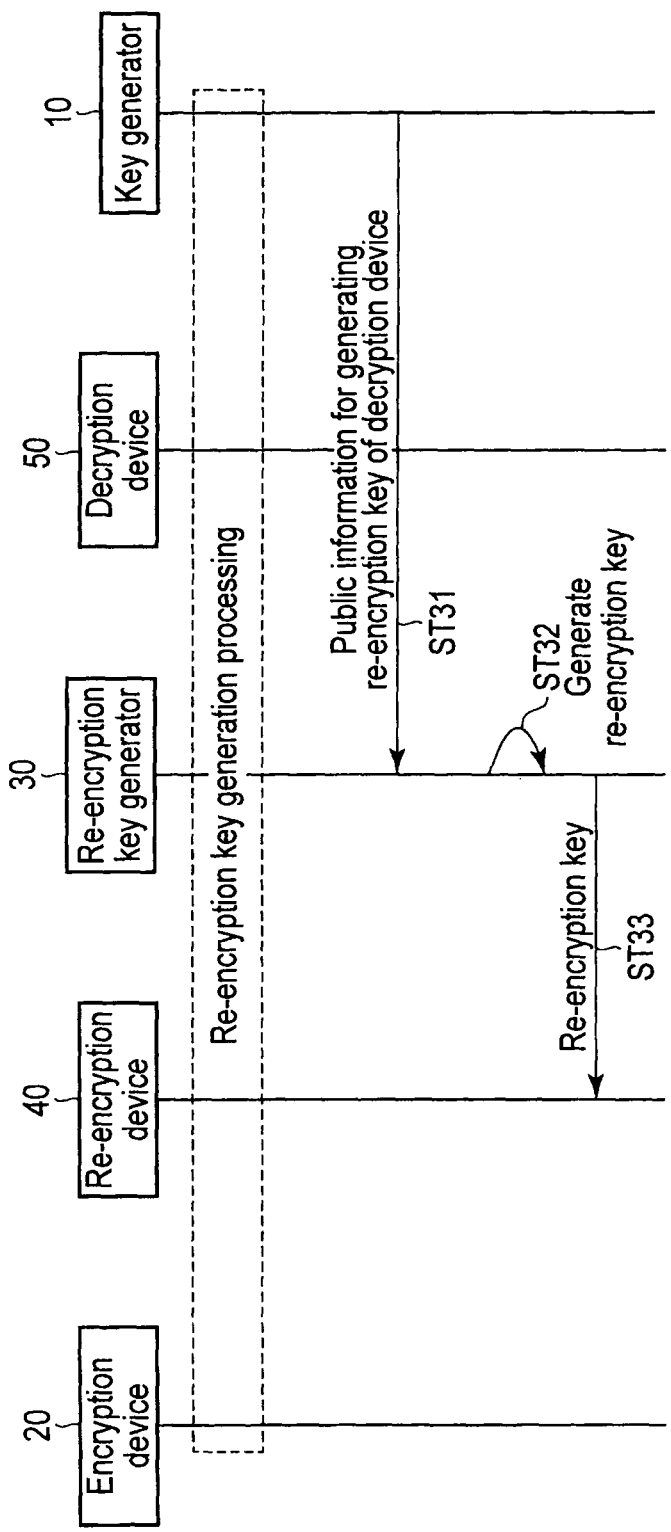
F I G. 15

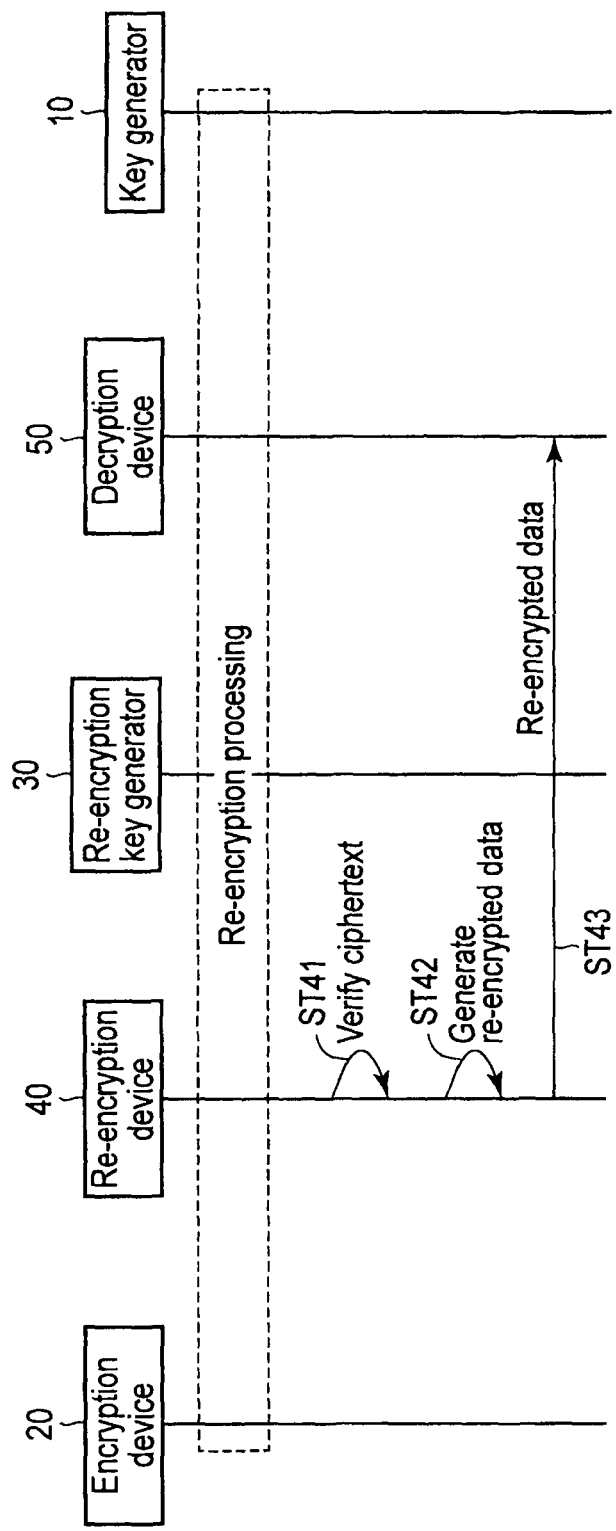
F I G. 16

RE-ENCRYPTION KEY GENERATOR, RE-ENCRYPTION DEVICE, ENCRYPTION DEVICE, DECRYPTION DEVICE, AND PROGRAM

CROSS-REFERENCE TO RELATED APPLICATIONS

This is a Continuation Application of PCT application No. PCT/JP2013/071468, filed on Aug. 8, 2013, which was published under PCT Article 21(2) in Japanese.

This application is based upon and claims the benefit of priority from Japanese Patent Application No. 2012-175903, filed on Aug. 8, 2012; and No. 2012-176542, filed on Aug. 8, 2012, the entire contents of all of which are incorporated herein by reference.

FIELD

Embodiments described herein relate generally to a re-encryption key generator, a re-encryption device, an encryption device, a decryption device, and a program.

BACKGROUND

In a file sharing system in which a file is shared among a plurality of users after a user uploads the file to a server, a method of re-encryption is known to maintain secrecy of file with respect to the server.

A conventional re-encryption scheme presents no particular problem, but if a problem should arise, a server is enabled to create re-encrypted text without the permission of each user. Therefore, from the viewpoint of realizing safe file sharing, there is room for improvements in a proxy re-encryption scheme.

BRIEF DESCRIPTION OF THE DRAWINGS

FIG. 1 is a schematic diagram showing a configuration of a re-encryption system according to a first embodiment.

FIG. 3 is a sequence diagram illustrating the operation of encryption processing in the embodiment.

FIG. 5 is a sequence diagram illustrating the operation of re-encryption processing in the embodiment.

FIG. 6 is a sequence diagram illustrating the operation of decryption processing in the embodiment.

FIG. 8 is a schematic diagram illustrating the file sharing system in the embodiment.

FIG. 9 is a diagram illustrating the configuration of a file sharing system according to the embodiment.

FIG. 11 is a schematic diagram showing the configuration of a re-encryption key generator according to the embodiment.

FIG. 14 is a sequence diagram illustrating the operation of encryption processing in the embodiment.

FIG. 15 is a sequence diagram illustrating the operation of re-encryption key generation processing in the embodiment.

FIG. 16 is a sequence diagram illustrating the operation of re-encryption processing in the embodiment.

DETAILED DESCRIPTION

In general, according to one embodiment, a re-encryption key generator generates a re-encryption key to obtain re-encrypted data that can be decrypted by a second private key of a second user device by re-encrypting ciphertext obtained by encrypting plaintext by a first public key of a first user device without decryption.

The re-encryption key generator includes a first storage module, a second storage module, and a re-encryption key generation module.

The first storage module stores a first private key corresponding to the first public key.

The second storage module stores a second re-encryption key generation key of the second user device that is different from a second public key corresponding to the second private key.

The re-encryption key generation module generates the re-encryption key based on the first private key and the second re-encryption key generation key.

Figure 12:
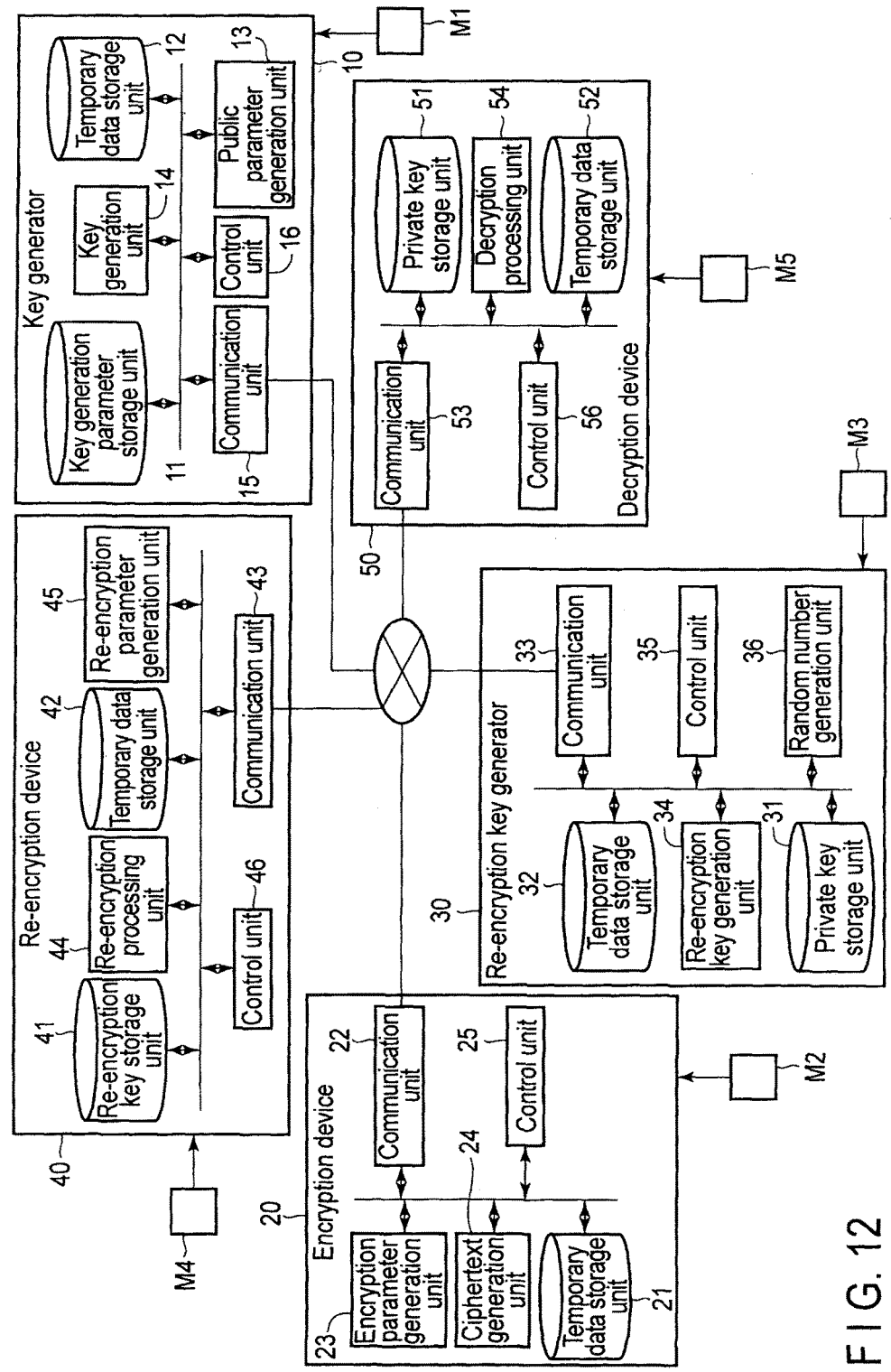
FIG. 12 is a schematic diagram showing the configuration of a re-encryption system according to a thirteenth embodiment.

Hereinafter, each embodiment will be described using the drawings. Each device shown below can be carried out by either of a hardware configuration and a combined configuration of hardware resources and software. As software of the combined configuration, as shown in FIG. 1 or 12, a program causing each computer to realize the function of each device by being installed on each computer from a network or one of non-transitory computer-readable storage media M1 to M5 in advance and executed by the processor of each computer is used.

First Embodiment

First, a proxy re-encryption scheme will be described. The basic model of the proxy re-encryption scheme includes five functions (hereinafter, also called algorithms) of key generation, encryption, decryption, re-encryption key generation, and re-encryption, shown below. The functions of key generation, encryption, and decryption are the same as functions of normal public key cryptography.

(Key generation) KeyGen($\lambda$)→(pk,sk)

The key generation algorithm KeyGen outputs a set (pk, sk) of a public key pk and a private key sk when a security parameter $\lambda$ is input.

(Encryption) Enc($pk_A$,m)→$C_A$

The encryption algorithm Enc outputs ciphertext $C_A$ addressed to a user A when a public key $pk_A$ of a user A and a message m are input.

(Decryption) $\text{Dec}(sk_A, C_A) \to m$

The decryption algorithm Dec outputs the message m when a private key $sk_A$ of the user A and the ciphertext $C_A$ addressed to the user A are input.

(Re-Encryption Key Generation)
$\text{ReKeyGen}(pk_A, sk_A, pk_B, sk_B) \to rk_{A \to B}$ The re-encryption key generation algorithm ReKeyGen outputs a re-encryption key $rk_{A \to B}$ when the public key $pk_A$ of the user A, the private key $sk_A$ of the user A, a public key $pk_B$ of a user B, and a private key $sk_B$ of the user B are input.

(Re-encryption) $\text{ReEnc}(rk_{A \to B}, C_A) \to C_B$

The re-encryption algorithm ReEnc outputs ciphertext $C_B$ addressed to the user B when the re-encryption key $rk_{A \to B}$ and the ciphertext $C_A$ addressed to the user A are input.

The above is the basic model. However, depending on the implementation method of re-encryption, a model that is different in input into the functions or a model including other functions or keys than the above can also be considered.

For example, like the re-encryption scheme shown in the present embodiment, public parameters (details will be described later) may be included for input into each function of the encryption, decryption, re-encryption key generation, and re-encryption.

For example, like the re-encryption scheme shown in the present embodiment, a non-interactive model that makes the private key $sk_B$ of the user B unnecessary for input of the re-encryption key generation algorithm ReKeyGen is considered. Also, a model into which, instead of the private key $sk_A$ of the user A, the re-encryption key $rk_{A \to B}$ addressed to the user B and a private key $sk_C$ of a user C are input is also considered.

In addition, a unidirectional model in which while re-encryption of the ciphertext $C_A \to C_B$ can be performed by the re-encryption key $rk_{A \to B}$, the inverse conversion of the ciphertext $C_B \to C_A$ cannot be performed, and a bidirectional model, in which the inverse conversion can also be performed, are known. In the bidirectional model, the re-encryption key $rk_{A \to B}$ may also be represented as $rk_{A \leftrightarrow B}$.

Further, in public key cryptography, a scheme based on ID-based encryption is also considered. In this case, function setup for master key generation increases and the master key and ID are added to the input of the key generation algorithm KeyGen. In the ID-based encryption, the public key pk is the ID itself.

In the re-encryption key generation algorithm ReKeyGen, like the re-encryption scheme shown in the present embodiment, instead of the public key $pk_B$ of the user B, the re-encryption key generation key $rk_B$ of the user B may be input. In this case, the key generation algorithm KeyGen and the re-encryption key generation algorithm ReKeyGen are represented as shown below.

(Key generation) $\text{KeyGen}(\lambda) \to (pk, sk, rk, par)$

The key generation algorithm KeyGen outputs a set (pk, sk, rk) of the public key pk, the private key sk, and the re-encryption key generation key $rk_B$ and a public parameter par when the security parameter $\lambda$ is input. In the present embodiment, this processing is called key setup processing. This also applies to embodiments and modifications described later.

(Re-Encryption Key Generation)
$\text{ReKeyGen}(sk_A, rk_B, par) \to rk_{A \to B}$ The re-encryption key generation algorithm ReKeyGen outputs the re-encryption key $rk_{A \to B}$ when the private key $sk_A$ of the user A, the re-encryption key generation key $rk_B$ of the user B, and the public parameter par are input.

Like the re-encryption scheme shown in the present embodiment, the public key $pk_A$ of the user A and the public parameter par may be added as the input of the re-encryption algorithm ReEnc. In this case, the re-encryption algorithm ReEnc is represented as shown below.

(Re-encryption) $\text{ReEnc}(rk_{A \to B}, C_A, pk_A, par) \to C_B$

The re-encryption algorithm ReEnc outputs the ciphertext $C_B$ addressed to the user B when the re-encryption key $rk_{A \to B}$, the ciphertext $C_A$ addressed to the user A, the public key $pk_A$ of the user A, and the public parameter par are input.

Next, The configuration of a file sharing system according to the present embodiment will be described using FIG. 7. The file sharing system includes a server Sv as an information processing apparatus owned by a service provider who provides a service and user apparatuses A, B, C, . . . (hereinafter, may be abbreviated as users A, B, C, . . . or may also be called a first user apparatus, a second user apparatus, . . . ) as information processing apparatuses owned by users as clients of the service. The server Sv and the user apparatuses A, B, C . . . are connected via a communication network. The communication network is, for example, a wireless LAN (Local Area Network), a cable LAN, an optical network, a telephone network, an intra-net, an Ethernet (registered trademark), the Internet, or a combination of the above networks. One unit of the server Sv may be provided or a plurality of units thereof may be provided.

FIG. 8 is a schematic diagram illustrating the file sharing system. The file sharing system includes the server Sv, the user A, the user B, the user C, a group administrator, and a user administrator. The user administrator is an entity that administers all users. The user administrator issues an ID and an initial password to enable a user to log in to the file sharing system.

As a preparation, the group administrator is assumed to have a private key $sk_{Gr}$. Also, a public key $pk_{Gr}$ of the group administrator is assumed to be stored in a public key storage unit 1 of the server Sv. Also, each user i is assumed to have a private key $sk_i$ and a re-encryption key generation key $rk_i$. That is, the user A has $sk_A$ and $rk_A$, the user B has $sk_B$ and $rk_B$, and the user C has $sk_C$ and $rk_C$. The server Sv and each user i can acquire the public parameter par and a public key $pk_i$ of each user i, but the description thereof is omitted here and a detailed description will be provided later. In addition, file of plaintext to be shared is denoted as m.

The user C encrypts the file m by the public key $pk_{Gr}$ of the group administrator stored in the public key storage unit 1 and uploads obtained ciphertext $E(pk_{Gr}, m)$ to the server Sv. Here, E(PK,M) represents ciphertext obtained by encrypting plaintext M by using the public key PK. The server Sv stores the ciphertext in a ciphertext storage unit 2.

Now, assume that the user A approves sharing of the file m. The user A transmits the re-encryption key generation key $rk_A$ of the user A to the group administrator. The group administrator generates a re-encryption key $rk_{Gr \to A}$ that re-encrypts ciphertext $E(pk_{Gr}, m)$ addressed to the group administrator into ciphertext $E(pk_A, m)$ addressed to the user A using the private key $sk_{Gr}$ of the group administrator and the re-encryption key generation key $rk_A$ of the user A. The group administrator transmits the generated re-encryption key $rk_{Gr \to A}$ to the server Sv. The server Sv stores the re-encryption key $rk_{Gr \to A}$ in a re-encryption key storage unit 3.

The user A transmits a request of re-encryption of the ciphertext $E(pk_{Gr}, m)$ to the server Sv. In response to the request received from the user A, the server Sv re-encrypts the ciphertext $E(pk_{Gr}, m)$ into re-encrypted text $E(pk_A, m)$ using the re-encryption key $rk_{Gr \to A}$ stored in the re-encryption key storage unit 3 and addressed to the user A and transmits the obtained re-encrypted text $E(pk_A,m)$ to the user A. The re-encrypted text is ciphertext obtained by re-encrypting ciphertext.

The user A decrypts the re-encrypted text $E(pk_A,m)$ downloaded from the server Sv by the private key $sk_A$ held by the user A and uses the obtained file m.

The file sharing system as described above can hinder leakage of information in the process of file sharing because the file m is not decrypted once between the encryption by the user C and the decryption by the user A.

In addition, there is no need for the user C to decide with which user to share a file when uploading ciphertext. That is, the user C only needs to encrypt the file m by the public key $pk_{Gr}$ of the group administrator and the key to be managed for encryption is only the public key $pk_{Gr}$ of the group administrator and therefore, costs for key management can be reduced.

In the present file sharing system, the server Sv does not have a decryption key $sk_{Gr}$ to decrypt the ciphertext $E(pk_{Gr}, m)$. Therefore, the server Sv cannot decrypt the ciphertext. Accordingly, threats of leakage by an invalid server Sv by decrypting ciphertext can be excluded and therefore, strict control of the server Sv can be eliminated, leading to a reduction in management costs.

In the proxy re-encryption scheme, the decryption right of ciphertext is transferred to a transfer destination by re-encrypting ciphertext addressed to a transfer source (group administrator in the above example) into ciphertext addressed to the transfer destination (user A in the above example). In the proxy re-encryption scheme, the public key of the transfer destination is included in the input of the re-encryption key generation algorithm ReKeyGen (without the private key of the transfer destination being included). Thus, to enable, for example, the user i to generate ciphertext $E(pk_A,m')$ addressed to the user A by encrypting other file m' using the public key $pk_A$ of the user A, the public key $pk_A$ of the user A is published in advance (for example, when the system is started up).

On the other hand, even if the user A does not approve the transfer of the decryption right of ciphertext to the user A, the public key $pk_A$ of the user A is already published and thus, the group administrator can generate the re-encryption key $rk_{Gr \to A}$. Therefore, there is the possibility of re-encryption (that is, the transfer of the decryption right of ciphertext to the user A) without the approval of the user A.

In the present file sharing system, by contrast, the group administrator cannot generate the re-encryption key $rk_{Gr \to A}$ without the re-encryption key generation key $rk_A$ being transmitted to the group administrator by the user A as the transfer destination. Therefore, re-encryption (that is, the transfer of the decryption right of ciphertext to the transfer destination) can be prevented when no approval of the transfer destination is received.

The above also applies when the user B shares a file.

FIG. 1 is a schematic diagram showing the configuration of a re-encryption system according to the first embodiment (the correspondence between FIG. 1 and FIG. 8 will be described later). The re-encryption system includes a key generator 10, an encryption device 20, a re-encryption key generator 30, a re-encryption device 40, and a decryption device 50. The key generator 10 generates a public parameter of the re-encryption system and a pair of public key/private key and a re-encryption key generation key for each of the devices 30, 50 based on a security parameter. Here, the re-encryption key generation key is a key that is different from the public key corresponding to the private key of each of the devices 30, 50. The term "re-encryption key generation key" may be changed to a desired name such as "re-encryption key generation data" or "re-encryption key generation permission data".

The encryption device 20 encrypts plaintext data using the public key corresponding to the private key of the re-encryption key generator 30 and the public parameter and transmits the obtained ciphertext data to the re-encryption device 40.

The re-encryption key generator 30 generates a re-encryption key based on the private key of the re-encryption key generator 30 and the re-encryption key generation key of the decryption device 50 and transmits the obtained re-encryption key to the re-encryption device 40. The re-encryption key generation key of the decryption device 50 is different from the public key corresponding to the private key of the decryption device 50. In the present embodiment, the re-encryption key is generated based on the private key of the re-encryption key generator 30 and the re-encryption key generation key of the decryption device 50, the public parameter, and a random number. However, the random number is not required for generating a re-encryption key and may be omitted. For example, in a fifth or twelfth embodiment, a re-encryption key is generated without using any random number.

The re-encryption device 40 performs verification processing of ciphertext data received from the encryption device 20 based on the public key of the re-encryption key generator 30, the public parameter, and the re-encryption key received from the re-encryption key generator 30 and also re-encrypts the ciphertext data received from the encryption device 20 without decryption and transmits the obtained re-encrypted data to the decryption device 50. However, the verification processing is not required and may be omitted.

The decryption device 50 performs verification processing of re-encrypted data received from the re-encryption device 40 based on the private key of the local device 50 and the public parameter and also obtains plaintext data by performing decryption processing of the re-encrypted data received from the re-encryption device 40. However, the verification processing is not required and may be omitted. Here, a case when one unit is provided for each of the key generator 10, the encryption device 20, the re-encryption key generator 30, the re-encryption device 40, and the decryption device 50 is taken as an example, though a plurality of units may be provided for each. The encryption device 20 may encrypt plaintext data using the public key of the encryption device 20 and the public parameter to transmit the obtained ciphertext data to the re-encryption device 40. In this case, the key generator 10 generates a public parameter, and a pair of public key/private key and a re-encryption key generation key for each of the devices 20, 50. The re-encryption key generator 30 generates a re-encryption key based on the private key of the encryption device 20, the re-encryption key generation key of the decryption device 50, the public parameter, and a random number and transmits the obtained re-encryption key to the re-encryption device 40.

The correspondence between FIG. 1 and FIG. 8 will be described. Each of the devices 10 to 50 is held by an entity that performs the relevant processing. When the user generates a set of a public key and private key and a re-encryption key generation key of the user, the relevant user holds the key generator 10. If, for example, the user administrator or the group administrator generates a set of a public key and private key and a re-encryption key generation key of a user, the user administrator or the group administrator holds the key generator 10. The user holds the encryption device 20 or the decryption device 50 or both. The group administrator holds the re-encryption key generator 30. When, for example, the user administrator or the server Sv generates a re-encryption key, the user administrator or the server Sv holds the re-encryption key generator 30. The server Sv holds the re-encryption device 40. In the file sharing system illustrated in FIG. 8, the server Sv holds the public key storage unit 1 and the user C who performs encryption acquires the public key used for encryption from the public key storage unit 1, but the present embodiment is not limited to such an example and, as will be described later, the user C may acquire the public key from the key generator 10 (that has generated the public key used for encryption). The server Sv stores the ciphertext E(pk$_{Gr}$,m) generated by the user C in the ciphertext storage unit 2, but the ciphertext storage unit 2 may be included in the re-encryption device 40 or an external storage device not included in the re-encryption device 40.

Each entity may include a portion or all of the key generator 10, the encryption device 20, the re-encryption key generator 30, the re-encryption device 40, and the decryption device 50. That is, which entity holds which device is not limited to the above example and various variations can be considered. The user administrator and the group administrator may be the same or different. A user may or may not serve also as the user administrator, the group administrator, or both. The user administrator or the group administrator may or may not serve also as a user. Each user device used by each user may be called a first user device, a second user device, . . . . Similarly, the public key, the private key, and the re-encryption key generation key of each user device may be called the first public key, the first private key, and the first re-encryption key generation key of the first user device, the second public key, the second private key, and the second re-encryption key generation key of the second user device, . . . .

Figure 10:
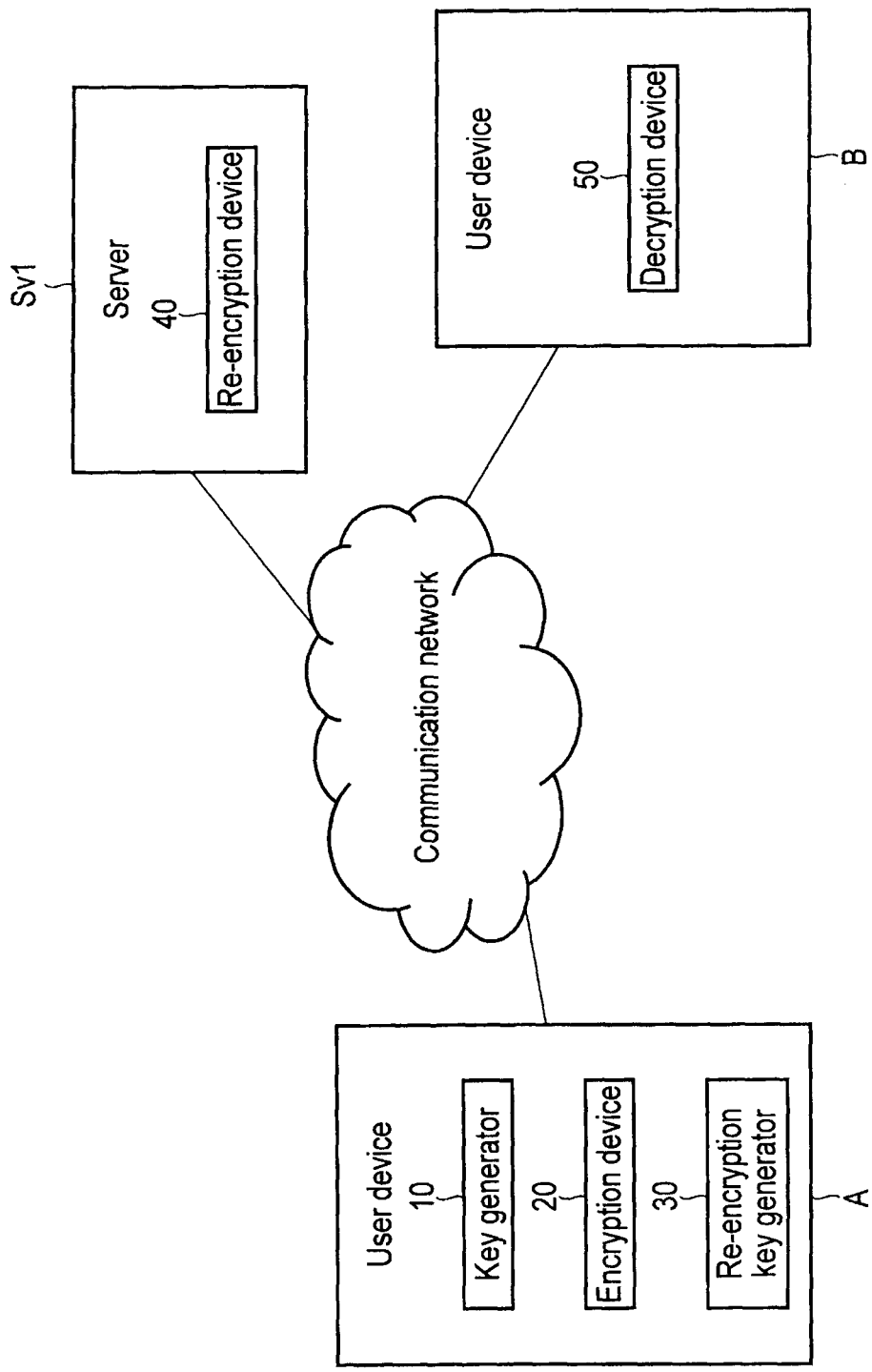
FIG. 10 is a diagram illustrating the configuration of a file sharing system according to the embodiment.

Also, as shown, for example, in each of FIGS. 9 and 10, each entity may hold each device. In FIG. 9, a server Sv2 holds the key generator 10 to generate a public parameter, a set of a public key and private key and a re-encryption key generation key of the user A, and a set of a public key and private key and a re-encryption key generation key of the user B. The server Sv2 delivers the public parameter and a set of the public key and private key and the re-encryption key generation key of the user A to the user A, the public parameter and a set of the public key and private key and the re-encryption key generation key of the user B to the user B, and the public parameter and the public key of the user A to a server Sv1. The user A holds the encryption device 20, encrypts plaintext data using the public key of the user A and the public parameter, and transmits the obtained ciphertext data to the server Sv1. The server Sv2 holds the re-encryption key generator 30, generates a re-encryption key using the private key of the user A, the re-encryption key generation key of the user B, the public parameter, and a random number, and delivers the obtained re-encryption key to the server Sv1. The server Sv1 holds the re-encryption device 40, performs verification processing of ciphertext data received from the user A based on the public key of the user A received from the server Sv2, the public parameter, and the re-encryption key, and re-encrypts the ciphertext data received from the user A without decryption to deliver the obtained re-encrypted data to the user B. The user B holds the decryption device 50, performs verification processing of re-encrypted data received from the server Sv1 based on the private key of the user B and the public parameter, and also performs decryption processing of the re-encrypted data received from the server Sv1 to obtain plaintext data. The exchange of data between each entity is not limited to an electric communication means such as cable communication, wireless communication and the like and, for example, a physical communication means that distributes or delivers by hand a storage medium in which data such as the re-encryption key generation key, re-encryption key, ciphertext data, re-encrypted data and the like is stored may also be used. Alternatively, the electric communication means and the physical communication means may be combined to exchange data between each entity.

Even if only the electric communication means is used, as will be described later, other entities than the relevant entities may be interposed. Consider a case when data (for example, the re-encryption key generation key) is transmitted from some entity (hereinafter, called the first entity) to another entity (hereinafter, called the second entity). The first entity is, for example, the user A. The second entity is, for example, the group administrator. The first entity transmits data to an entity (hereinafter, called the third entity) other than the second entity. The third entity is, for example, the server Sv1. Next, the second entity receives the relevant data from the third entity.

In FIG. 10, the user A holds the key generator 10 to generate a public parameter, a set of a public key and private key and a re-encryption key generation key of the user A, and a set of a public key and private key and a re-encryption key generation key of the user B. The user A delivers the public parameter and a set of the public key and private key and the re-encryption key generation key of the user B to the user B and the public parameter and the public key of the user A to the server Sv1. The user A holds the encryption device 20, encrypts plaintext data using the public key of the user A and the public parameter, and transmits the obtained ciphertext data to the server Sv1. The user A holds the re-encryption key generator 30, generates a re-encryption key using the private key of the user A, the re-encryption key generation key of the user B, the public parameter, and a random number, and delivers the obtained re-encryption key to the server Sv1. The server Sv1 holds the re-encryption device 40, performs verification processing of ciphertext data received from the user A based on the public key of the user A received from the user A, the public parameter, and the re-encryption key, and re-encrypts the ciphertext data received from the user A without decryption to deliver the obtained re-encrypted data to the user B. The user B holds the decryption device 50, performs verification processing of re-encrypted data received from the server Sv1 based on the private key of the user B and the public parameter, and also performs decryption processing of the re-encrypted data received from the server Sv1 to obtain plaintext data.

Subsequently, the configuration of each of the devices 10 to 50 will concretely be described.

The key generator 10 includes a key generation parameter storage unit 11, a temporary data storage unit 12, a public parameter generation unit 13, a key generation unit 14, a communication unit 15, and a control unit 16.

The key generation parameter storage unit 11 is a storage device that stores a key generation parameter.

The temporary data storage unit 12 is a storage device that stores transient data (hereinafter, also called temporary data) such as data being processed by each of the generation units 13, 14 and processing results.

The public parameter generation unit 13 generates a public parameter for key generation.

The key generation unit 14 generates a pair of a public key/private key and a re-encryption key generation key.

The communication unit 15 is a communication interface to communicate with the other devices 20 to 50 and has, for example, a function to transmit the public parameter and a pair of the public key/private key and the re-encryption key generation key of each of the devices 30, 50 in the temporary data storage unit 12 to each of the relevant devices 30, 50 under the control of the control unit 16, a function to transmit the public key of the re-encryption key generator 30 in the temporary data storage unit 12 to the encryption device 20 under the control of the control unit 16, and a function to transmit the public parameter and the public key of the re-encryption key generator 30 in the temporary data storage unit 12 to the re-encryption device 40 under the control of the control unit 16. In the description that follows, the description that transmission/reception goes through the communication unit 15 may be omitted, to avoid a redundant description. This also applies to descriptions of communication units of the other devices 20 to 50.

Figure 2:
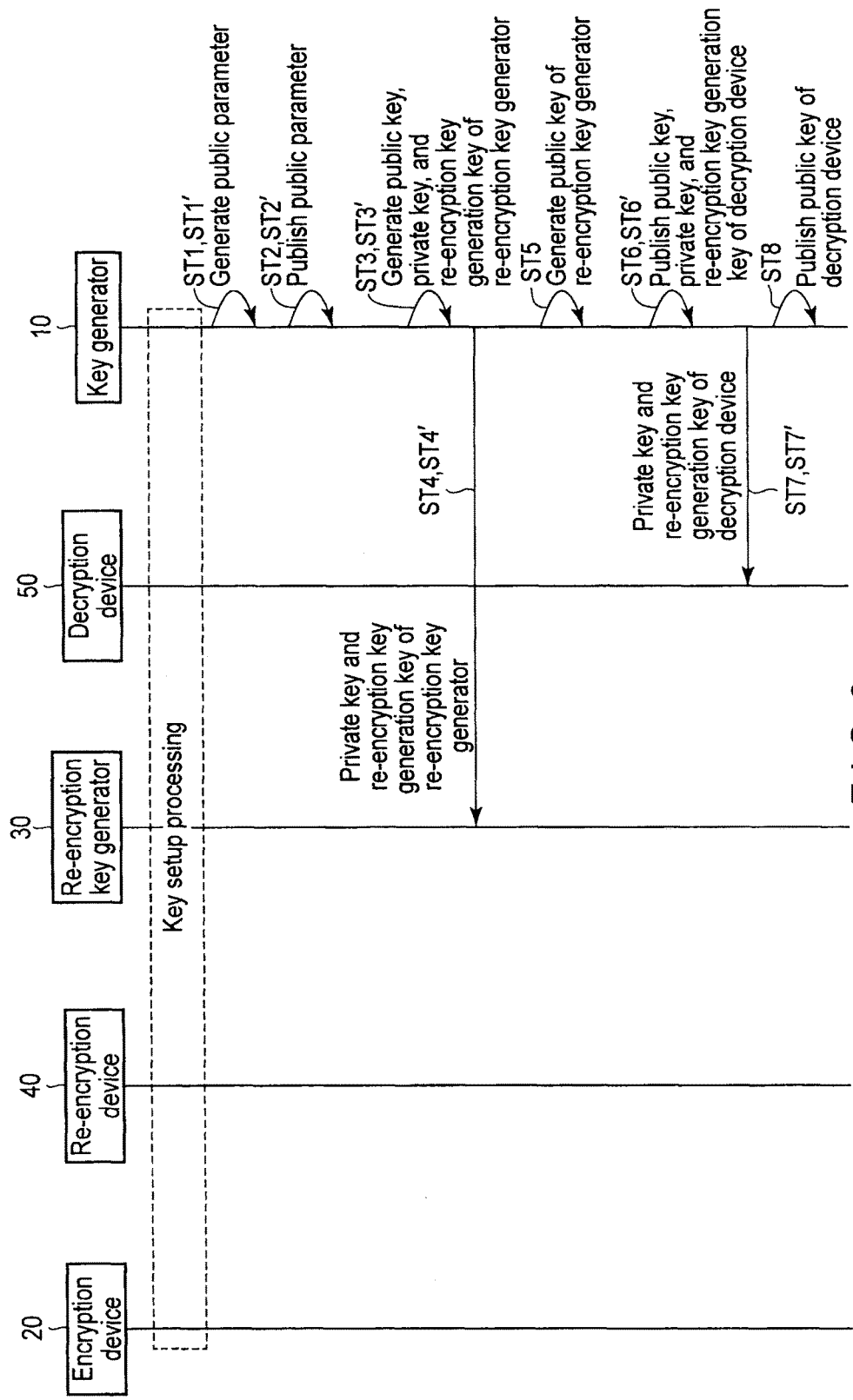
FIG. 2 is a sequence diagram illustrating an operation of key setup processing in the embodiment.

The control unit 16 has a function to control each of the units 11 to 15 such that each unit operates as shown in FIG. 2.

The encryption device 20 includes a temporary data storage unit 21, a communication unit 22, an encrypted data generation unit 23, a ciphertext generation unit 24, and a control unit 25.

The temporary data storage unit 21 is a storage device that stores a public parameter received from the key generator 10 and a public key of the re-encryption key generator 30 and also transient data such as data being processed by each of the generation devices 23, 24 and processing results.

The communication unit 22 is a communication interface to communicate with the other devices 10, 30 to 50 and has, for example, a function to acquire and write the public parameter received from the key generator 10 and the public key of the re-encryption key generator 30 into the temporary data storage unit 21 and a function to transmit ciphertext data in the temporary data storage unit 21 to the re-encryption device 40 under the control of the control unit 25.

The encryption parameter generation unit 23 has a function to generate an encryption parameter.

The ciphertext generation unit 24 has a function to generate ciphertext data by encrypting plaintext data using the public parameter read from the temporary data storage unit 21 and the public key of the re-encryption key generator 30 (first public key of the first user device) and a function to write the obtained ciphertext data into the temporary data storage unit 21.

The control unit 25 has a function to control each of the units 21 to 24 such that each unit operates as shown in FIG. 3.

The re-encryption key generator 30 includes a private key storage unit 31, a temporary data storage unit 32, a communication unit 33, a re-encryption key generation unit 34, a control unit 35, and a random number generation unit 36.

The private key storage unit 31 is a storage device that stores a private key of the re-encryption key generator 30 received from the key generator 10.

The temporary data storage unit 32 is a storage device that stores a public parameter received from the key generator 10 and a re-encryption key generation key of the decryption device 50 and also temporary data such as data being processed by the re-encryption key generation unit 34 and processing results.

The communication unit 33 is a communication interface to communicate with the other devices 10, 20, 40, 50 and has, for example, a function to acquire and write the public parameter received from the key generator 10 and the re-encryption key generation key of the decryption device 50 into the temporary data storage unit 32 and a function to transmit the re-encryption key in the temporary data storage unit 32 to the re-encryption device 40 under the control of the control unit 35.

The re-encryption key generation unit 34 has a function to generate a re-encryption key based on the private key of the re-encryption key generator 30 (first private key of the first user device) read from the private key storage unit 31, the public parameter and the re-encryption key generation key of the decryption device 50 (second re-encryption key generation key of the second user device) read from the temporary data storage unit 32, and a random number generated by the random number generation unit 36 and a function to write the re-encryption key into the temporary data storage unit 32.

Figure 4:
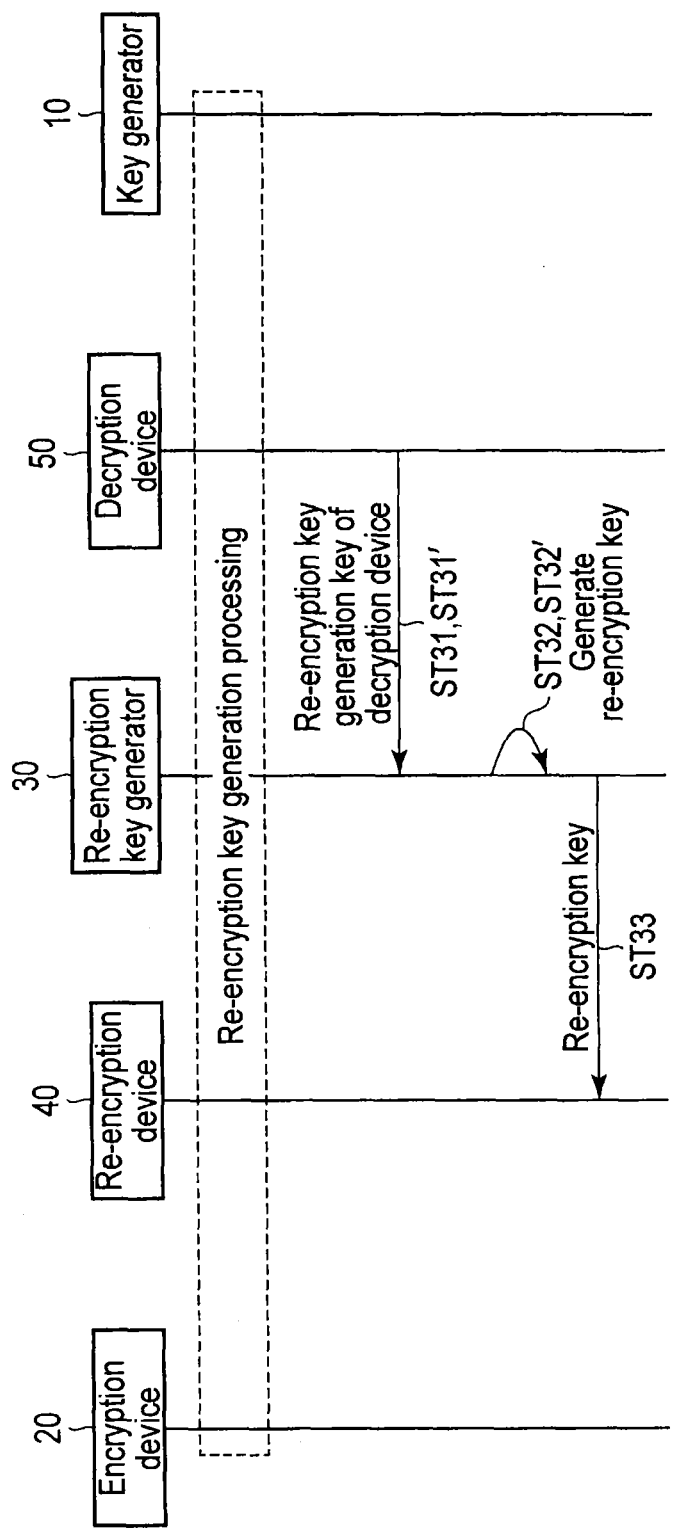
FIG. 4 is a sequence diagram illustrating the operation of re-encryption key generation processing in the embodiment.

The control unit 35 has a function to control each of the units 31 to 34, 36 such that each unit operates as shown in FIG. 4.

The random number generation unit 36 has a function to generate a random number and to send out the random number to the re-encryption key generation unit 34.

The re-encryption key generator 30 has a re-encryption key generation key storage unit (not shown) as a storage device that stores a re-encryption key generation key of the local device 30 received from the key generator 10 when the re-encryption key generation key of the local device 30 is received from the key generator 10.

The re-encryption device 40 includes a re-encryption key storage unit 41, a temporary data storage unit 42, a communication unit 43, a re-encryption processing unit 44, a re-encryption parameter generation unit 45, and a control unit 46.

The re-encryption key storage unit 41 is a storage unit that stores a re-encryption key received from the re-encryption key generator 30.

The temporary data storage unit 42 is a storage device that stores a public parameter received from the key generator 10 and a public key of the re-encryption key generator 30 and also temporary data such as data being processed by the re-encryption processing unit 44 and processing results.

The communication unit 43 is a communication interface to communicate with the other devices 10 to 30, 50 and has, for example, a function to acquire and write the public parameter received from the key generator 10 and the public key of the re-encryption key generator 30 into the temporary data storage unit 42, a function to send out ciphertext data received from the encryption device 20 to the re-encryption processing unit 44, and a function to transmit re-encrypted data in the temporary data storage unit 42 to the decryption device 50 under the control of the control unit 46.

The re-encryption processing unit 44 has a function to obtain, when ciphertext data is received from the encryption device 20, re-encrypted data by re-encrypting the ciphertext data without decryption using the re-encryption key read from the re-encryption key storage unit 41 and the public parameter and the public key of the re-encryption key generator 30 read from the temporary data storage unit 42 and a function to write the obtained re-encrypted data into the temporary data storage unit 42.

The control unit 46 has a function to control each of the units 41 to 45 such that each unit operates as shown in FIG. 5.

The decryption device 50 includes a private key storage unit 51, a temporary data storage unit 52, a communication unit 53, a decryption processing unit 54, a re-encryption key generation key storage unit 55, and a control unit 56.

The private key storage unit 51 is a storage device that stores a private key of the local device 50 received from the key generator 10.

The temporary data storage unit 52 is a storage device that stores a public parameter received from the key generator 10 and temporary data such as data being processed by the decryption processing unit 54 and processing results.

The communication unit 53 is a communication interface to communicate with the other devices 10 to 40 and has, for example, a function to acquire and write the private key of the local device 50 received from the key generator 10 into the private key storage unit 51, a function to acquire and write the public parameter received from the key generator 10 into the temporary data storage unit 52, and a function to send out re-encrypted data received from the re-encryption device 40 to the decryption processing unit 54.

The decryption processing unit 54 has a function to obtain plaintext data when re-encrypted data is received from the re-encryption device 40 by performing decryption processing of the re-encrypted data using the private key of the decryption device 50 (second private key of the second user device) read from the private key storage unit 51 and the public parameter read from the temporary data storage unit 52 and a function to write the obtained plaintext data into the temporary data storage unit 52.

The re-encryption key generation key storage unit 55 is a storage device that stores a re-encryption key generation key of the local device 50 received from the key generator 10.

The control unit 56 has a function to control each of the units 51 to 55 such that each unit operates as shown in FIG. 6.

In the present embodiment, for example, the public parameter is stored in the temporary data storage unit of each of the devices 10 to 50. However, the present embodiment is not limited to such an example and the public parameter may be stored in a storage unit (separate from the temporary data storage unit) of each of the devices 10 to 50. Thus, of data stored in the temporary data storage unit of each of the devices 10 to 50, data that does not have to be handled as transient data may be stored in a storage unit (separately from the temporary data storage unit). When the public parameter includes a plurality of elements, each of the devices 20 to 50 may acquire, of each element of the public parameter, only elements needed for each piece of processing described later. The above also apply to embodiments and modifications described later.

Next, the operation of the re-encryption system configured as described above will be described using the sequence diagrams of FIGS. 2 to 6.

The following operation takes a case in which processing is performed in a procedure of (1) key setup processing, (2) encryption processing, (3) re-encryption key generation processing, (4) re-encryption processing, and (5) decryption processing as an example. However, in the following operation, processing is not necessarily performed following the above procedure. For example, processing of re-encryption key generation may be performed before the encryption processing. Also, ciphertext data may be decrypted without the re-encryption processing being performed.

(1) The key setup processing is performed by the key generator 10 as shown in FIG. 2 and each of steps ST1 to ST12 below.

First, the public parameter generation unit 13 of the key generator 10 generates a public parameter $$\text{par}=\{\lambda, p, \mathbb{G}, \mathbb{G}_T, g, g_1, g_2, g_3, g_4, g_5, u, v, \text{Sig}(\hat{G}, \hat{S}, \hat{V})\}$$

based on a security parameter $\lambda$ stored in the key generation parameter storage unit 11 in advance or acquires the public parameter from outside (ST1).

More specifically, the public parameter generation unit 13 selects bilinear map groups $(G, G_T)$ satisfying the order $p>2\lambda$ based on the security parameter $\lambda$ stored in the key generation parameter storage unit 11 in advance. In this case, p is an integer. p may be a prime number or a composite number. The public parameter generation unit 13 randomly selects elements g, $g_1$, $g_2$, u, v of G from G. The public parameter generation unit 13 randomly selects $\pi$ from $Z_p^*$ and calculates $g_3=g^\pi$, $g_4=g_1^\pi$, and $g_5=g_2^\pi$. $Z_p^*$ is a set $(=(Z/pZ)^*)$ of integers mutually prime to $Z_p$ and p and may also be called a multiplicative group $Z_p^*$ for p. $Z_p$ is a set $(=(Z/pZ))$ of integers equal to 0 or greater and less than p. $g_3$ is a value based on a random number $\pi$ and a system fixed value g. $g_4$ is a value based on the random number $\pi$ and a system fixed value $g_1$. $g_5$ is a value based on the random number $\pi$ and a system fixed value $g_2$. Further, the public parameter generation unit 13 generates a one-time signature algorithm Sig $(\hat{G}, \hat{S}, \hat{V})$.

$\hat{G}$ in the one-time signature algorithm Sig $(\hat{G}, \hat{S}, \hat{V})$ (hereinafter, Sig $(\hat{G}, \hat{S}, \hat{V})$ is also called Sig) means a function to generate a pair (ssk, svk) of a signature key and a verification key (both are one-time keys), $\hat{S}$ means a function to generate a signature $\sigma$ for a message M, and $\hat{V}$ means a function to validate the signature $\sigma$.

For more information about the one-time signature, see A. Menezes, P. van Oorschot, S. Vanstone, "Handbook of Applied Cryptography", CRC Press, (1996) pp. 462-471, (1996).

The bilinear map (denoted by e) is a map yielding $e: G \times G \rightarrow G_T$ and satisfies the following three properties:

1. $e(g^a, h^b) = e(g,h)^{ab}$ holds for any $(g,h) \in G \times G$ and $a, b \in Z$, where Z is a set of integers.
2. $e(g,h)$ is computable for any $(g,h) \in G \times G$.
3. $e(g,h) \neq 1_{G_T}$ always holds if $g, h \neq 1_G$, where $1_G$ is the unit element of G and $1_{G_T}$ is the unit element of $G_T$.

The bilinear map group (denoted by $G, G_T$) is a group of the order p for which a bilinear map $e: G \times G \rightarrow G_T$ exists. The above definition also means that if $g_1 = g^\alpha$ and $g_2 = g^\beta$ for elements g, $g_1$, $g_2$ of G, the following equation holds ($\alpha$ is the exponent relating to elements g, $g_1$ of G and $\beta$ is the exponent relating to elements g, $g_2$ of G). The "exponent relating to elements g, $g_1$ of G" is an exponent that defines the relationship between elements g, $g_1$ of G and represents a value $\alpha$ such that the element obtained by the $\alpha$-th power of g and $g_1$ are equal in G. Similarly, the "exponent relating to elements g, $g_2$ of G" is an exponent that defines the relationship between elements g, $g_2$ of G and represents a value $\beta$ such that the element obtained by the $\beta$-th power of g and $g_2$ are equal in G. As will be described later, G may also be expressed as a multiplicative group and in such a case, if, for example, elements of G are points on an elliptic curve, the exponent may be changed to a scalar, the $\alpha$-th power to $\alpha$ times, and the $\beta$-th power to $\beta$ times.

$$e(g_1 g_2, g) = e(g, g_1 g_2) = e(g, g^\alpha \cdot g^\beta) = e(g, g^{\alpha+\beta}) = e(g,g)^{\alpha+\beta} = e(g,g)^\alpha \cdot e(g,g)^\beta$$

Incidentally, a plurality of elements g, $g_1$, $g_2$ of G is a plurality of preset system fixed values. The plurality of system fixed values is not limited to three elements of the bilinear map group G and a plurality of elements such as two or four or more elements of G can also be used when appropriate. The term "system fixed value" is interchangeable with "fixed value", "element", and "system parameter".

In this specification, notation assuming that both G and $G_T$ are multiplicative groups is adopted, but the embodiments are not limited to such notation and each of G, $G_T$ can be represented by a notation assuming that each is an additive group. That is, for example, G may be represented as an additive group and $G_T$ as a multiplicative group. For example, elements of G may be points on an elliptic curve and elements of $G_T$ may be elements on a finite field. As the bilinear map, a map that yields e:$G_1 \times G_2 \to G_T$ for bilinear map groups $G_1$, $G_2$, $G_T$ ($G_1$ and $G_2$ are different groups) may also be used. In this case, each element of G in each piece of processing described later may be rewritten as element $G_1$ or element $G_2$, where appropriate. The above also apply to embodiments and modifications described later.

Subsequently, the public parameter generation unit 13 writes the generated public parameter par into the temporary data storage unit 12. The key generator 10 publishes the public parameters par=($\lambda$,p,G,$G_T$,g,$g_1$,$g_2$,$g_3$,$g_4$,$g_5$,u,v,Sig) in the temporary data storage unit 12 (ST2). If a public parameter is published before step ST1 is executed, step ST1 and step ST2 may be skipped by writing the public parameter into the temporary data storage unit 12.

If the identification information of the re-encryption key generator 30 is i, the key generation unit 14 randomly selects elements $x_i$, $y_i$, $z_i$ of $Z_p^*$ from $Z_p$ and sets a private key $sk_i=(x_i,y_i,z_i)$ of the re-encryption key generator 30. Then, the key generation unit 14 generates a public key $pk_i=(X_i,Y_{1i},Y_{2i},Z_i,Z_{1i})$ of the re-encryption key generator 30 using the private key $sk_i$ and the public parameter par.

$$X_i=g^{x_i},\ Y_{1i}=g_1^{y_i},\ Y_{2i}=g_2^{y_i},$$

$$Z_i=g^{z_i},\ Z_{1i}=g_1^{z_i}$$

When verification processing using a formula (a2') described later is not performed, data $Y_{2i}$ may be omitted. That is, the public key $pk_i$ only needs to include data $X_i$, $Y_{1i}$, $Z_i$, $Z_{1i}$.

Further, the key generation unit 14 generates a re-encryption key generation key $rk_i=(X_{3i},Y_{5i})$ using the private key $sk_i$ and the public parameter par (ST3).

$$X_{3i}=g_3^{x_i},\ Y_{5i}=g_5^{y_i}$$

Subsequently, the key generation unit 14 writes a pair of the generated public key/private key and the re-encryption key generation key into the temporary data storage unit 12. The communication unit 15 transmits the private key $sk_i$ and the re-encryption key generation key $rk_i$ in the temporary data storage unit 12 to the re-encryption key generator 30 under the control of the control unit 16 (ST4). The key generator 10 publishes the public key $pk_i$ of the re-encryption key generator 30 in the temporary data storage unit 12 (ST5).

Similarly, if the identification information of the decryption device 50 is j, the key generation unit 14 randomly selects elements $x_j$, $y_j$, $z_j$ of $Z_p^*$ from $Z_p^*$ and sets a private key $sk_j=(x_j,y_j,z_j)$ of the decryption device 50. Then, the key generation unit 14 generates a public key $pk_j=(X_j,Y_{1j},Y_{2j},Z_j,Z_{1j})$ of the decryption device 50 using the private key $sk_j$ and the public parameter par.

$$X_j=g^{x_j},\ Y_{1j}=g_1^{y_j},\ Y_{2j}=g_2^{y_j},$$

$$Z_j=g^{z_j},\ Z_{1j}=g_1^{z_j}$$

If, similarly as described above, the verification processing using a formula (a2') described later is not performed, data $Y_{2j}$ may be omitted. That is, the public key $pk_j$ only needs to include data $X_j$, $Y_{1j}$, $Z_j$, $Z_{1j}$.

Further, the key generation unit 14 generates a re-encryption key generation key $rk_j=(X_{3j},Y_{5j})$ using the private key $sk_j$ and the public parameter par (ST6).

$$X_{3j}=g_3^{x_j},\ Y_{5j}=g_5^{y_j}$$

Subsequently, the key generation unit 14 writes a pair of the generated public key/private key and the re-encryption key generation key into the temporary data storage unit 12. The communication unit 15 transmits the private key $sk_j$ and the re-encryption key generation key $rk_j$ in the temporary data storage unit 12 to the decryption device 50 under the control of the control unit 16 (ST7). The key generator 10 publishes the public key $pk_j$ of the decryption device 50 in the temporary data storage unit 12 (ST8). If desired, processing similar to steps ST6 to ST8 may be performed on a private key $sk_h$, a public key $pk_h$, and a re-encryption key generation key $rk_h$ of the encryption device 20 to transmit the private key $sk_h$ and the re-encryption key generation key $rk_h$ to the encryption device 20 and to publish the public key $pk_h$. The key generator 10 may transmit only the private key (without transmitting the re-encryption key generation key) to the encryption device 20, the re-encryption key generator 30, or the decryption device 50. The key generator 10 may also transmit only a portion or all of public keys generated in key setup processing to the encryption device 20, the re-encryption key generator 30, or the decryption device 50. The above also apply to embodiments and modifications described later.

With the above processing, the key setup processing is completed. Hereinafter, each of the devices 20, 30, 40, 50 can acquire and use the public parameter or public key published in steps ST2, ST5, ST8 when appropriate.

(2) The encryption processing is performed by the encryption device 20 as shown in FIG. 3 and each of steps ST21 to ST24 below. The encryption device 20 is assumed to have a public key $pk_i$ of the re-encryption key generator 30 stored in the temporary data storage unit 21, but if the encryption device 20 has not yet acquired the public key $pk_i$ of the re-encryption key generator 30, the encryption device 20 may acquire the public key $pk_i$ of the re-encryption key generator 30 from, for example, the key generator 10 before step ST 22 described below. Similarly, the encryption device 20 is assumed to have the public parameter par stored in the temporary data storage unit 21, but if the encryption device 20 has not yet acquired the public parameter par, the encryption device 20 may acquire the public parameter par from, for example, the key generator 10 before step ST 21 described below.

The encryption parameter generation unit 23 of the encryption device 20 generates a key pair (ssk,svk)=$\hat{G}(\lambda)$ of a signature key ssk and a verification key svk in a one-time signature using the security parameter $\lambda$ and a key pair generation function $\hat{G}$ in the public parameter par (ST21) and sets the verification key svk to encrypted data $C_1$ ($C_1$=svk).

The encryption parameter generation unit 23 also generates and sends out a random number r$\in Z_p^*$ to the ciphertext generation unit 24.

The ciphertext generation unit 24 generates encrypted data $C_{2X}$, $C_{2Y}$, $C_{2Z}$, $C_{2Z1}$, $C_3$, $C_4$ below from a message m$\in G_T$ as plaintext data using the random number r, the public key $pk_i$ of the re-encryption key generator 30, and the public parameter par (ST22).

$$C_{2X}=X_i^r,\ C_{2Y}=Y_{1i}^r,\ C_{2Z}=Z_i^r,\ C_{2Z1}=Z_{1i}^r,$$

$$C_3 = e(g_4 g_5, g)^r \cdot m,\ C_4 = (u^{svk} \cdot v)^r$$

After step ST22 is completed, the ciphertext generation unit 24 generates a one-time signature σ as shown in the following formula for the encrypted data $C_3$, $C_4$ based on a signature generation function $\hat{S}$ of the public parameter par and the signature key ssk generated in step ST21 (ST23).

$$\sigma = \hat{S}(ssk, (C_3, C_4))$$

The first argument of the function $\hat{S}$ is the signature key and the second argument is data to be signed.

The function $\hat{S}$ accepts the signature key and data to be signed as input and outputs a signature.

Thereafter, the ciphertext generation unit 24 generates ciphertext data $C_i = (C_1, C_{2X}, C_{2Y}, C_{2Z}, C_{2Z1}, C_3, C_4, \sigma)$ including all the above encrypted data $C_1$ to $C_4$ and the one-time signature σ and writes the obtained ciphertext data into the temporary data storage unit 21.

If the verification processing in step ST41 described later is omitted, the ciphertext data $C_i = (C_1, C_{2X}, C_{2Y}, C_{2Z}, C_{2Z1}, C_3, C_4, \sigma)$ may be set as $C_i = (C_{2X}, C_{2Y}, C_{2Z}, C_{2Z1}, C_3)$ by omitting verification data $(C_1, C_4, \sigma)$ that is not used for decryption. In this case, processing to generate the verification data $(C_1, C_4, \sigma)$ is also omitted. In the present embodiment, as described above (or will be described below), verification may be omitted or generation of verification data may be omitted and this also applies to embodiments and modifications described below.

In any case, the communication unit 22 transmits the ciphertext data $C_i$ in the temporary data storage unit 21 to the re-encryption device 40 under the control of the control unit 25 (ST24).

With the above processing, the encryption processing is completed.

(3) The re-encryption key generation processing is performed by the re-encryption key generator 30 as shown in FIG. 4 and each of steps ST31 to ST33 below. The re-encryption key generator 30 is assumed to have the public parameter par stored in the temporary data storage unit 32, but if the re-encryption key generator 30 has not yet acquired the public parameter par, the re-encryption key generator 30 may acquire the public parameter par from, for example, the key generator 10 before step ST 32 described below.

Now, assume that the decryption device 50 (in the example of FIG. 8, for example, the user A) approves that ciphertext addressed to the re-encryption key generator 30 (in the example of FIG. 8, the group administrator) is re-encrypted into ciphertext addressed to the decryption device 50 (in the example of FIG. 8, for example, the user A) (that is, the transfer of decryption right of the ciphertext to the user A). The decryption device 50 transmits the re-encryption key generation key $rk_j$ of the decryption device 50 to the re-encryption key generator 30. The communication unit 33 of the re-encryption key generator 30 acquires and writes the re-encryption key generation key $rk_j$ of the decryption device 50 into the temporary data storage unit 32 under the control of the control unit 35 (ST31). In step ST31, the key generator 10 (instead of the decryption device 50) may transmit the re-encryption key generation key $rk_j$ to the re-encryption key generator 30. This also applies to embodiments and modifications described later.

Regarding the temporary data storage unit 32, as shown in FIG. 11, the re-encryption key generator 30 may hold a public parameter storage unit 321 and a re-encryption key generation key storage unit 322 in the temporary data storage unit 32 to store the public parameter par in the public parameter storage unit 321 and the re-encryption key generation key $rk_j$ of the decryption device 50 in the re-encryption key generation key storage unit 322. The public parameter storage unit 321 that stores the public parameter par may be outside the temporary data storage unit 32. Also, the re-encryption key generation key storage unit 322 that stores the re-encryption key generation key $rk_j$ may be outside the temporary data storage unit 32. The above also apply to embodiments and modifications described later. In step ST4 described above, the communication unit 33 receives the private key $sk_i$ of the re-encryption key generator 30 from the key generator 10 and writes the private key $sk_i$ into the private key storage unit 31.

The random number generation unit 36 generates and sends out a random number $\theta \in Z_p^*$ to the re-encryption key generation unit 34.

The re-encryption key generation unit 34 generates a re-encryption key $R_{ij}$ as shown in the following formulas using the random number θ, the private key $sk_i$ of the re-encryption key generator 30 in the private key storage unit 31, the re-encryption key generation key $rk_j$ of the decryption device 50 in the temporary data storage unit 32, and the public parameter par (ST32).

$$R_{ij} = (R_{ij1}, R_{ij2}, R_{ij3})$$

$$R_{ij1} = (X_{3j} \cdot g_3^\theta)^{1/x_i} = g^{\frac{\pi(x_j+\theta)}{x_i}},$$

$$R_{ij2} = (X_{5j} \cdot g_3^\theta)^{1/y_i} = g^{\frac{\pi(\beta y_j+\theta)}{y_i}},$$

$$R_{ij3} = (X_{3j} \cdot Y_{5j} \cdot g_3^\theta)^{1/z_i} = g^{\frac{\pi(x_j+\beta y_j+\theta)}{z_i}}.$$

In the above formulas, $g_2$ is rewritten and denoted by $g^\beta$.

Thereafter, the re-encryption key generation unit 34 writes the generated re-encryption key $R_{ij}$ into the temporary data storage unit 32. The communication unit 33 transmits the re-encryption key $R_{ij}$ in the temporary data storage unit 32 to the re-encryption device 40 under the control of the control unit 35 (ST33).

With the above processing, the re-encryption key generation processing is completed.

(4) The re-encryption processing is performed by the re-encryption device 40 as shown in FIG. 5 and each of steps ST41 to ST43 below. The re-encryption device 40 is assumed to have a public key $pk_i$ of the re-encryption key generator 30 stored in the temporary data storage unit 42, but if the re-encryption device 40 has not yet acquired the public key $pk_i$ of the re-encryption key generator 30, the re-encryption device 40 may acquire the public key $pk_i$ of the re-encryption key generator 30 from, for example, the re-encryption key generator 30 before step ST 41 described below. Similarly, the re-encryption device 40 is assumed to have the public parameter par stored in the temporary data storage unit 42, but if the re-encryption device 40 has not yet acquired the public parameter par, the re-encryption device 40 may acquire the public parameter par from, for example, the key generator 10 before step ST 41 described below.

The communication unit 43 of the re-encryption device 40 writes the ciphertext data $C_i$ transmitted in step ST24 and the re-encryption key $R_{ij}$ transmitted in step ST33 into the temporary data storage unit 42.

The re-encryption processing unit 44 verifies the ciphertext data $C_i$ in the temporary data storage unit 42 using the public parameter par and the public key $pk_i$ of the re-encryption key generator 30 based on the following verification formula (ST41).

$$e(C_{2X}, u^{C_1} \cdot v) = e(X_i, C_4),$$

$$e(C_{2Y}, u^{C_1} \cdot v) = e(Y_{1i}, C_4),$$

$$e(C_{2Z}, u^{C_1} \cdot v) = e(Z_i, C_4),$$

$$e(C_{2Z1}, u^{C_1} \cdot v) = e(Z_{1i}, C_4),$$

$$\hat{V}(C_1, \sigma, (C_3, C_4)) = 1. \quad (a1)$$

The first argument of the function $\hat{V}$ is a verification key, the second argument is a signature, and the third argument is data to be signed.

The function $\hat{V}$ verifies the signature for the data to be verified using the verification key and outputs "1" when the signature is determined to be valid and any value other than "1" (for example, "0") when the signature is determined not to be valid.

Therefore, the fifth verification formula in the formula (a1) shows that the one-time signature σ is valid by verifying the signature σ for the encrypted data $C_3$, $C_4$ as data to be signed by using the encrypted data $C_1$ as the verification key.

The verification is successful if the five verification formulas in the formula (a1) all hold and fails if any one of the five formulas does not hold.

If the verification is successful (or the verification processing in step ST41 is skipped), the re-encryption parameter generation unit 45 generates and sends out three random numbers s,t,k∈$Z_p^*$ to the re-encryption processing unit 44.

The re-encryption processing unit 44 generates, as shown in the following formulas, re-encrypted data $C_{2X}'$, $C_{2X}''$, $C_{2Y}'$, $C_{2Y}''$, $C_{2Z}'$, $C_{2Z}''$, $C_{2Z1}'$, $C_{2Z1}''$, $C_{5X}$, $C_{5Y}$, $C_{5Z}$ using these random numbers s, t, k, the ciphertext data $C_i$ stored in the temporary data storage unit 42, the re-encryption key $R_{ij}$, the public key $pk_i$ of the re-encryption key generator 30, and the public parameter par (ST42).

$$C_{2X}' = X_i^s, \ C_{2X}'' = C_{2X}^s = X_i^{rs}, \ C_{2Y}' = Y_{1i}^t, \ C_{2Y}'' = C_{2Y}^t = Y_{1i}^{rt},$$

$$C_{2Z}' = Z_i^k, \ C_{2X}'' = C_{2Z}^k = Z_i^{rk}, \ C_{2Z1}' = Z_{1i}^k, \ C_{2Z1}'' = C_{2Z1}^k = Z_{1i}^{rk},$$

$$C_{5X} = R_{ij1}^{\frac{1}{s}}, \ C_{5Y} = R_{ij2}^{\frac{1}{t}}, \ C_{5Z} = R_{ij3}^{\frac{1}{k}}$$

After step ST42 is completed, the re-encryption processing unit 44 generates re-encrypted data $C_j = (C_1, C_{2X}', C_{2X}'', C_{2Y}', C_{2Y}'', C_{2Z}', C_{2Z}'', C_{2Z1}', C_{2Z1}'', C_{5X}, C_{5Y}, C_{5Z}, C_3, C_4, \sigma)$ by replacing the encrypted data $C_{2X}$, $C_{2Y}$, $C_{2Z}$, $C_{2Z1}$ in the ciphertext data $C_i$ with all the above re-encrypted data $C_{2X}'$ to $C_{5Z}$ and writes the obtained re-encrypted data $C_j$ into the temporary data storage unit 42. If verification processing in step ST51 in decryption processing described later is omitted, the re-encrypted data $C_j = (C_1, C_{2X}', C_{2X}'', C_{2Y}', C_{2Y}'', C_{2Z}', C_{2Z}'', C_{2Z1}', C_{2Z1}'', C_{5X}, C_{5Y}, C_{5Z}, C_3, C_4, \sigma)$ may be set as $C_j = (C_{2X}'', C_{2Y}'', C_{2Z}'', C_{2Z1}'', C_{5X}, C_{5Y}, C_{5Z}, C_3)$ by omitting verification data $(C_1, C_{2X}', C_{2Y}', C_{2Z}', C_{2Z1}', C_4, \sigma)$ not used for decryption. In this case, processing to generate the verification data $(C_{2X}', C_{2Y}', C_{2Z}', C_{2Z1}')$ is also omitted.

In any case, the communication unit 43 transmits the re-encrypted data $C_j$ in the temporary data storage unit 42 to the decryption device 50 under the control of the control unit 46 (ST43).

With the above processing, the re-encryption processing is completed.

Incidentally, the re-encryption processing unit 44 may perform the re-encrypted data generation processing in step ST42 by omitting the verification processing in step ST41. When verification data $(C_1, C_4, \sigma)$ is not contained in the ciphertext data $C_1$, the re-encryption processing unit 44 performs the re-encrypted data generation processing in step ST42 by omitting the verification processing in step ST41.

(5) The decryption processing is performed by the decryption device 50 as shown in FIG. 6 and each of steps ST51 and ST52 below. The decryption device 50 is assumed to have the public parameter par stored in the temporary data storage unit 52, but if the decryption device 50 has not yet acquired the public parameter par, the decryption device 50 may acquire the public parameter par from, for example, the key generator 10 before step ST 51 described below.

The communication unit 53 of the decryption device 50 receives the re-encrypted data $C_j$ transmitted in step ST43 and writes the re-encrypted data $C_j$ into the temporary data storage unit 52.

The decryption processing unit 54 verifies the re-encrypted data $C_j$ in the temporary data storage unit 52 using the private key $sk_j$ of the local device 50 in the private key storage unit 51 and the public parameter par in the temporary data storage unit 52 based on the following verification formulas (ST51).

$$e(C''_{2X}, u^{C_1} \cdot v) = e(C'_{2X}, C_4),$$

$$e(C''_{2Y}, u^{C_1} \cdot v) = e(C'_{2Y}, C_4),$$

$$e(C''_{2Z}, u^{C_1} \cdot v) = e(C'_{2Z}, C_4),$$

$$e(C''_{2Z1}, u^{C_1} \cdot v) = e(C'_{2Z1}, C_4),$$

$$e(C_{5Z}, C'_{2Z}) = e(C_{5X}, C'_{2X}) \cdot e(g_2, g_3)^{y_j},$$

$$e(C_{5Z}, C'_{2Z1}) = e(C_{5Y}, C'_{2Y}) \cdot e(g, g_4)^{y_j},$$

$$\hat{V}(C_1, \sigma, (C_3, C_4)) = 1. \quad (a2)$$

Instead of the fifth verification formula in the formula (a2), the following verification formula may be used.

$$e(C_{5Z}, C'_{2Z}) = e(C_{5X}, C'_{2X}) \cdot e(g_5, g)^{y_j}.$$

Also, instead of the fifth verification formula in the formula (a2), the following verification formula may be used.

$$e(C_{5Z}, C'_{2Z}) = e(C_{5X}, C'_{2X}) \cdot e(Y_{2j}, g_3). \quad (a2)$$

In this case, the decryption processing unit 54 conducts verification using the public key $pk_j$ of the local device 50.

Also, instead of the sixth verification formula in the formula (a2), the following verification formula may be used.

$$e(C_{5Z}, C'_{2Z1}) = e(C_{5Y}, C'_{2Y}) \cdot e(g_3, g_1)^{y_j}.$$

Also, instead of the sixth verification formula in the formula (a2), the following verification formula may be used.

$$e(C_{5Z}, C'_{2Z1}) = e(C_{5Y}, C'_{2Y}) \cdot e(X_j, g_4).$$

In this case, the decryption processing unit 54 conducts verification using the public key $pk_j$ of the local device 50.

The verification is successful if the seven verification formulas in the formula (a2) all hold and fails if any one of the seven formulas does not hold.

If the verification is successful (or the verification processing in step ST51 is skipped), the decryption processing unit 54 decrypts the re-encrypted data $C_j$ as shown in the following formula using the private key $sk_j$ of the local device 50 in the private key storage unit 51 and the public parameter par in the temporary data storage unit 52 to obtain the message m (ST52).

$$m = C_3 \bigg/ \left\{ \left( \frac{e(C_{5Z}, C''_{2Z})}{e(C_{5X}, C''_{2X})} \right)^{\frac{1}{y_j}} \cdot \left( \frac{e(C_{5Z}, C''_{2Z1})}{e(C_{5Y}, C''_{2Y})} \right)^{\frac{1}{x_j}} \right\}$$

That the decryption result of the above formula produces m can be checked by the following calculation.

In the following calculation, $g_1$ is rewritten and denotd by $g^\alpha$ and $g_2$ is rewritten and denoted by $g^\beta$.

$$C_3 \bigg/ \left\{ \left( \frac{e(C_{5Z}, C''_{2Z})}{e(C_{5X}, C''_{2X})} \right)^{\frac{1}{y_j}} \cdot \left( \frac{e(C_{5Z}, C''_{2Z1})}{e(C_{5Y}, C''_{2Y})} \right)^{\frac{1}{x_j}} \right\} =$$

$$C_3 \bigg/ \left\{ \left( \frac{e(g^{\pi(x_j+\beta y_j+\theta)/z_jk}, g^{z_irk})}{e(g^{\pi(x_j+\theta)/x_js}, g^{x_irs})} \right)^{\frac{1}{y_j}} \cdot \left( \frac{e(g^{\pi(x_j+\beta y_j+\theta)/z_jk}, g^{\alpha z_irk})}{e(g^{\pi(\beta y_j+\theta)/y_it}, g^{\alpha y_irt})} \right)^{\frac{1}{x_j}} \right\} =$$

$$C_3 \bigg/ \left\{ \left( \frac{e(g^{\pi(x_j+\beta y_j+\theta)}, g^r)}{e(g^{\pi(x_j+\theta)}, g^r)} \right)^{\frac{1}{y_j}} \cdot \left( \frac{e(g^{\pi(x_j+\beta y_j+\theta)}, g^{\alpha r})}{e(g^{\pi(\beta y_j+\theta)}, g^{\alpha r})} \right)^{\frac{1}{x_j}} \right\} =$$

$$m \cdot \frac{e(g_4 g_5, g)^r}{(e(g, g)^{\pi\beta r} \cdot e(g, g)^{\pi\alpha r})} = m.$$

With the above processing, the decryption processing is completed.

Incidentally, the decryption processing unit 54 may perform the decryption processing in step ST52 by omitting the verification processing in step ST51. Also if the re-encrypted data $C_j$ does not contain the verification data ($C_1, C_{2X}', C_{2Y}', C_{2Z}', C_{2Z1}', C_4, \sigma$), the decryption processing unit 54 performs the decryption processing in step ST52 by omitting the verification processing in step ST51. The above m may be a key, instead of a message itself. For example, a shared key key in shared key cryptography may be set as m=key to replace m with key. In this case, ciphertext obtained by encrypting a message using the shared key may be added to the ciphertext data or re-encrypted data. These also apply to embodiments and modifications described later.

In the present embodiment, the order of processing may be changed when appropriate. For example, the order of the decryption processing and the ciphertext verification processing may be changed. Similarly, the order of the re-encryption key generation processing may be changed to before the encryption processing.

According to the present embodiment, as described above, due to the configuration of generating the re-encryption key $R_{ij}$ based on the re-encryption key generation key $rk_j$, the re-encryption key will not be generated without permission of the user of the decryption device 50 (second user device). In other words, a re-encryption key cannot be generated if the transfer destination (in the example of FIG. 8, for example, the user A) does not notify the transfer source (in the example of FIG. 8, the group administrator) of a re-encryption key generation key. Thus, re-encryption (that is, the transfer of decryption right of ciphertext to the relevant transfer destination) can be prevented when there is no approval of the transfer destination and therefore, safe file sharing can be realized.

Also according to the present embodiment, due to the configuration of generating the re-encryption key $R_{ij}$ based on a random number θ, even if a server and a user collude with each other, the decryption right can be prevented from being re-transferred without permission of the transfer source. Accordingly, there is no need to demand extreme reliability from the server and a file sharing system the user can safely use can be provided.

To supplement the above description, there has been a problem that, if the server operator, the user B, and the user E collude, a third party can calculate a normal re-encryption key ($R_{AE}$) to re-encrypt ciphertext for the user A into ciphertext for the user E by using a re-encryption key ($R_{AB}$) to re-encrypt the ciphertext for the user A into ciphertext for the user B, a private key ($sk_B$) of the user B, and a private key ($sk_E$) of the user E without permission of the user A as the transfer source (that is, the decryption right is re-transferred without permission of the transfer source).

According to the present embodiment, however, due to the configuration of generating the re-encryption key $R_{ij}$ based on the random number θ, even if the server operator, the user B, and the user E collude, the decryption right can be prevented from being re-transferred without permission of the transfer source.

First Modification

In the first embodiment, an example in which ciphertext data is generated by the encryption device 20, the ciphertext data is re-encrypted by the re-encryption device 40 to generate re-encrypted data, and the re-encrypted data is decrypted by the decryption device 50 is cited, but the first embodiment may be changed to a form in which the ciphertext data is decrypted without being re-encrypted. In this case, only the key setup processing, encryption processing, and decryption processing need to be performed. The key setup processing in the present modification is the same as the key setup processing in the first embodiment. Hereinafter, the encryption processing and the decryption processing in the present modification will be described.

The difference between the encryption processing in the present modification and the encryption processing in the first embodiment is only in the last step. To provide a description by making use of the above symbols, the identification information of the decryption device 50 is assumed to be i for the sake of convenience. In this case, the communication unit 22 of the encryption device 20 transmits the ciphertext data $C_i$ in the temporary data storage unit 21 to the decryption device 50 under the control of the control unit 25 (ST24').

The decryption device 50 verifies the ciphertext data $C_i$ generated by the encryption device 20 using the public parameter par and the private key $sk_i$ of the local device 50 based on the following verification formulas (ST51').

$$e(C_{2X'}u^{C_1} \cdot v) = e(g, C_4)^{x_i},$$

$$e(C_{2Y'}u^{C_1} \cdot v) = e(g_1, C_4)^{y_i},$$

$$e(C_{2Z'}u^{C_1} \cdot v) = e(g, C_4)^{z_i},$$

$$e(C_{2Z1'}u^{C_1} \cdot v) = e(g_1, C_4)^{z_i},$$

$$\hat{V}(C_1, \sigma, (C_3, C_4)) = 1. \tag{a3}$$

Incidentally, the decryption device 50 may verify the ciphertext data $C_i$ generated by the encryption device 20 using the public parameter par and the public key $pk_i$ of the local device 50 in the same manner as in step ST41.

The verification is successful if the five verification formulas in the formula (a3) all hold and fails if any one of the five formulas does not hold.

If the verification is successful (or the verification processing in step ST51' is skipped), the decryption device 50 decrypts the ciphertext data $C_i$ as shown in the following formula using the private key $sk_i$ of the local device 50 and the public parameter par to obtain the message m (ST52').

$$m = C_3 \Big/ e(g_4 g_5, C_{2X})^{\frac{1}{x_i}}$$

The above formula may calculate with $$m = C_3 \Big/ e\big((g_4 g_5)^{\frac{1}{x_i}}, C_{2X}\big) \text{ using } (g_4 g_5)^{\frac{1}{x_i}}$$

calculated in advance.

Accordingly, calculation processing loads for decryption can be reduced. This also applies to embodiments and modifications described later.

That the decryption result of the above formula produces m can be checked by the following calculation.

$$m \cdot e(g_4 g_5, g)^r \Big/ e(g_4 g_5, C_{2X})^{\frac{1}{x_i}} =$$

$$m \cdot e(g_4 g_5, g)^r \Big/ e(g_4 g_5, g^{x_i r})^{\frac{1}{x_i}} = m \cdot e(g_4 g_5, g)^r / e(g_4 g_5, g)^r = m.$$

Second Modification

In addition to the first modification, as will be described below, the first embodiment may also be changed to a form in which the ciphertext data is decrypted without being re-encrypted. Also in this case, only the key setup processing, encryption processing, and decryption processing need to be performed. The key setup processing and the decryption processing in the present modification are the same as the key setup processing and the decryption processing in the first embodiment respectively. Hereinafter, the encryption processing and the decryption processing in the present modification will be described. In the present modification, the identification information of the decryption device 50 is assumed to be j.

Like in step ST21, the encryption parameter generation unit 23 of the encryption device 20 generates (ssk, svk) (ST21') and sets the verification key svk to the encrypted data $C_1$ ($C_1$=svk).

The encryption parameter generation unit 23 also generates and sends out five random numbers $r,s,t,k,\theta \in Z_p^*$ to the ciphertext generation unit 24.

The ciphertext generation unit 24 generates encrypted data $C_{2X}'$, $C_{2X}''$, $C_{2Y}'$, $C_{2Y}''$, $C_{2Z}'$, $C_{2Z}''$, $C_{2Z1}'$, $C_{2Z1}''$, $C_{5X}$, $C_{5Y}$, $C_{5Z}$, $C_3$, $C_4$ below from a message $m \in G_T$ as plaintext data using these random numbers $r,s,t,k,\theta$, the public key $pk_j$ of the decryption device 50, and the public parameter par (ST22').

$$C_{2X}' = Y_{2j}^s, C_{2X}'' = Y_{2j}^{rs}, C_{2Y}' = X_j^t, C_{2Y}'' = X_j^{rt},$$

$$C_{2Z}' = Y_{2j}^k, C_{2Z}'' = Y_{2j}^{rk}, C_{2Z1}' = X_j^k, C_{2Z1}'' = X_j^{rk},$$

-continued $$C_3 = e(g_4 g_5, g)^r \cdot m, C_4 = (u^{svk} \cdot v)^r,$$

$$C_{5X} = (g_4 \cdot g_3^\theta)^{\frac{1}{s}}, C_{5Y} = g_3^{\frac{\theta+1}{t}}, C_{5Z} = (g_4 \cdot g_3^{\theta+1})^{\frac{1}{k}}$$

After step ST22' is completed, like in step ST23, the ciphertext generation unit 24 generates a one-time signature σ (ST23').

Thereafter, the ciphertext generation unit 24 generates ciphertext data $C_j$=($C_1$,$C_{2X}'$,$C_{2X}''$,$C_{2Y}'$,$C_{2Y}''$,$C_{2Z}'$,$C_{2Z}''$,$C_{2Z1}'$,$C_{2Z1}''$,$C_2'''$,$C_{5X}$,$C_{5Y}$,$C_{5Z}$,$C_3$,$C_4$,σ) including all the above encrypted data $C_1$ to $C_4$ and the one-time signature σ and writes the obtained ciphertext data into the temporary data storage unit 21.

The communication unit 22 transmits the ciphertext data $C_j$ in the temporary data storage unit 21 to the decryption device 50 under the control of the control unit 25 (ST24').

The decryption device 50 verifies the ciphertext data $C_j$ generated by the encryption device 20 in the same manner as in step ST51 (ST51'). If the verification is successful (or the verification processing in step ST51' is skipped), the decryption device 50 decrypts the ciphertext data $C_j$ as shown in the following formula using the private key $sk_j$ of the local device 50 and the public parameter par to obtain the message m (ST52').

$$m = C_3 \Big/ \left\{ \left( \frac{e(C_{5Z}, C_{2Z}'')}{e(C_{5X}, C_{2X}'')} \right)^{\frac{1}{y_j}} \cdot \left( \frac{e(C_{5Z}, C_{2Z1}'')}{e(C_{5Y}, C_{2Y}'')} \right)^{\frac{1}{x_j}} \right\}$$

That the decryption result of the above formula produces m can be checked by the following calculation.

In the following calculation, $g_1$ is rewritten and denoted by $g^\alpha$ and $g_2$ is rewritten and denoted by $g^\beta$.

$$C_3 \Big/ \left\{ \left( \frac{e(C_{5Z}, C_{2Z}'')}{e(C_{5X}, C_{2X}'')} \right)^{\frac{1}{y_j}} \cdot \left( \frac{e(C_{5Z}, C_{2Z1}'')}{e(C_{5Y}, C_{2Y}'')} \right)^{\frac{1}{x_j}} \right\} =$$

$$C_3 \Big/ \left\{ \left( \frac{e(g^{\pi(1+\alpha+\theta)/k}, g^{\beta y_j rk})}{e(g^{\pi(\alpha+\theta)/s}, g^{\beta y_j rs})} \right)^{\frac{1}{y_j}} \cdot \left( \frac{e(g^{\pi(1+\alpha+\theta)/k}, g^{x_j rk})}{e(g^{\pi(\theta+1)/t}, g^{x_j rt})} \right)^{\frac{1}{x_j}} \right\} =$$

$$C_3 \Big/ \left\{ \left( \frac{e(g^{\pi(1+\alpha+\theta)}, g^{\beta r})}{e(g^{\pi(\alpha+\theta)}, g^{\beta r})} \right) \cdot \left( \frac{e(g^{\pi(1+\alpha+\theta)}, g^r)}{e(g^{\pi(\theta+1)}, g^r)} \right) \right\} =$$

$$m \cdot e(g_4 g_5, g)^r / (e(g, g)^{\pi \beta r} \cdot e(g, g)^{\pi \alpha r}) = m.$$

Third Modification

In the first embodiment, an example in which the public parameter includes three elements g, $g_1$, $g_2$ of system fixed values is described, but the first embodiment is not limited to such an example and the element $g_2$ may not be generated and the element $g_2$ may not be included in the public parameter. In this case, $g_2$=g may be set to replace $g_2$ with g in the first embodiment. This also applies to embodiments and modifications described later.

Fourth Modification

In the first embodiment, an example in which the public parameter includes three elements g, $g_1$, $g_2$ of system fixed values is described, but the first embodiment is not limited to such an example and four or more elements of system fixed values may be included. If, for example, four elements g, $g_1$, $g_2$, $g_6$ are included in the public parameter, $g_2=g_2g_6$ may be set to replace $g_2$ with $g_2g_6$ in the first embodiment. If, for example, five elements g, $g_1$, $g_2$, $g_6$, $g_7$ are included in the public parameter, $g_1=g_1g_6$ and $g_2=g_2g_7$ may be set to replace $g_1$ with $g_1g_6$ and $g_2$ with $g_2g_7$ in the first embodiment. This also applies to embodiments and modifications described later.

Fifth Modification

In the first embodiment, an example in which one set of ($g_3$, $g_4$, $g_5$) is included in the public parameter is described, but the first embodiment is not limited to such an example and a plurality of sets of ($g_3$, $g_4$, $g_5$) may be included in the public parameter. This also applies to embodiments and modifications described later.

Hereinafter, key setup processing, encryption processing, re-encryption key generation processing, re-encryption processing, and decryption processing in the present modification will be described and portions common to the first embodiment may or may not be described by using the same reference signs.

(1) Key Setup Processing

The public parameter generation unit 13 of the key generator 10 randomly selects $\pi 1, \pi 2, \ldots, \pi N$ from $Z_p^*$ and calculates $A_1, A_2, \ldots, A_N$ shown in the following formula.

$$A_n=(\text{tag}_n,g_{3,n},g_{4,n},g_{5,n})(n=1,2,\ldots,N)$$

$$g_{3,n}=g^{\pi_n},\ g_{4,n}=g_1^{\pi_n},\ g_{5,n}=G_2^{\pi_n}$$

N is a natural number. $\text{tag}_n$ (n=1, 2, . . . , N) is the identification information of $A_n$. $\text{tag}_n$ may be a numeric value or a character string. Alternatively, an element itself (other than tag) may be used as $\text{tag}_n$. In this case, there is no need to add $\text{tag}_n$ as an element of $A_n$ and processing to generate $\text{tag}_n$ does not need to be performed.

The public parameter generation unit 13 generates a public parameter $$\text{par}=\{\lambda,p,\mathbb{G},\mathbb{G}_T,g,g_1,g_2,\{A_1,A_2,\ldots,A_N\},u,v,\text{Sig}(\hat{G},\hat{S},\hat{V})\}$$

based on a security parameter λ stored in the key parameter storage unit 11 in advance or acquires the public parameter from outside (ST1').

The key generator 10 publishes the public parameter par=(λ,p,G,$G_T$,g,$g_1$,$g_2$,$A_1$,$A_2$,...,$A_N$,u,v,Sig) in the temporary data storage unit 12 (ST2').

If the identification information of the re-encryption key generator 30 is assumed to be i, the key generation unit 14 generates a private key $x_i, y_i, z_i \in Z_p^*$ of the re-encryption key generator 30 and generates a public key $pk_i=(X_i,Y_{1i},Y_{2i},Z_i,Z_{1i})$ of the re-encryption key generator 30 using the private key $sk_i=(x_i,y_i,z_i)$ and the public parameter par.

$$X_i=g^{x_i},\ Y_{1i}=g_1^{y_i},\ Y_{2i}=g_2^{y_i},$$

$$Z_i=g^{z_i},\ Z_{1i}=g_1^{z_i}$$

When verification processing using a formula (a7') described later is not performed, data $Y_{2i}$ may be omitted. That is, the public key $pk_i$ only needs to include data $X_i$, $Y_{1i}$, $Z_i$, $Z_{1i}$.

Further, the key generation unit 14 generates re-encryption key generation keys $rk_i,1, rk_i,2, \ldots, rk_i,N$ shown by the following formula using the private key $sk_i$ and the public parameter par (ST3').

$$rk_{i,n}=(X_{3i,n},Y_{5i,n})(n=1,2,\ldots,N)$$

$$X_{3i,n}=g_{3,n}^{x_i},\ Y_{5i,n}=g_{5,n}^{y_i}$$

The communication unit 15 transmits the private key $sk_i$ and the re-encryption key generation keys $rk_i,1, rk_i,2, \ldots, rk_i,N$ in the temporary data storage unit 12 to the re-encryption key generator 30 under the control of the control unit 16 (ST4'). Incidentally, the communication unit 15 may transmit, instead of $rk_i,1, rk_i,2, \ldots, rk_i,N$, $(\text{tag}_1,rk_i,1), (\text{tag}_2,rk_i,2), \ldots, (\text{tag}_N,rk_i,N)$ to the re-encryption key generator 30.

Similarly, if the identification information of the decryption device 50 is assumed to be j, the key generation unit 14 generates a private key $sk_j=(x_j,y_j,z_j)$ of the decryption device 50 and generates a public key $pk_j=(X_j,Y_{1j},Y_{2j},Z_j,Z_{1j})$ of the decryption device 50 using the private key $sk_j$.

$$X_j=g^{x_j},\ Y_{1j}=g_1^{y_j},\ Y_{2j}=g_2^{y_j},$$

$$Z_j=g^{z_j},\ Z_{1j}=g_1^{z_j}$$

If, similarly as described above, the verification processing using a formula (a7') described later is not performed, data $Y_{2j}$ may be omitted. That is, the public key $pk_j$ only needs to include data $X_j$, $Y_{1j}$, $Z_j$, $Z_{1j}$.

Further, the key generation unit 14 generates re-encryption key generation keys $rk_j,1, rk_j,2, \ldots, rk_j,N$ shown by the following formula using the private key $sk_j$ and the public parameter par (ST6').

$$rk_{j,n}=(X_{3j,n},Y_{5j,n})(n=1,2,\ldots,N)$$

$$X_{3j,n}=g_{3,n}^{x_j},\ Y_{5j,n}=g_{5,n}^{y_j}$$

The communication unit 15 transmits the private key $sk_j$ and the re-encryption key generation keys $rk_j,1, rk_j,2, \ldots, rk_j,N$ in the temporary data storage unit 12 to the decryption device 50 under the control of the control unit 16 (ST7'). Instead of $rk_j,1, rk_j,2, \ldots, rk_j,N$, the communication unit 15 may transmit, $(\text{tag}_1,rk_j,1), (\text{tag}_2,rk_j,2), \ldots, (\text{tag}_N,rk_j,N)$ to the decryption device 50.

(2) Encryption Processing

Like in step ST21 in the first embodiment, the encryption parameter generation unit 23 of the encryption device 20 generates a key pair (ssk, svk) of the signature key ssk and the verification key svk in the one-time signature (ST21') and sets the verification key svk to the encrypted data $C_1$ ($C_1$=svk).

The ciphertext generation unit 24 generates one element from $A_1, A_2, \ldots, A_N$ as elements of the public parameter par. It is assumed below that $A_n$ is selected.

The ciphertext generation unit 24 generates encrypted data $C_{2X}, C_{2Y}, C_{2Z}, C_{2Z1}, C_3, C_4$ below from a message $m \in G_T$ as plaintext data using the random number r, the public key $pk_i$ of the re-encryption key generator 30, and the public parameter par (ST22').

$$C_{2X}=X_i^r,\ C_{2Y}=Y_{1i}^r,\ C_{2Z}=Z_i^r,\ C_{2Z1}=Z_{1i}^r,$$

$$C_3=e(g_{4,n},g_{5,n},g)^r\cdot m,\ C_4=(u^{svk}\cdot V)^r$$

After step ST22 is completed, the ciphertext generation unit 24 generates a one-time signature σ as shown in the following formula for the identification information $\text{tag}_n$ of $A_n$ and the encrypted data $C_3$, $C_4$ based on a signature generation function $\hat{S}$ of the public parameter par and the signature key ssk generated in step ST21' (ST23').

$$\sigma=\hat{S}(ssk,(\text{tag}_n,C_3,C_4))$$

Incidentally, the ciphertext generation unit 24 may generate the one-time signature σ for the encrypted data $C_3$, $C_4$ as data to be signed without including the identification information $tag_n$ of $A_n$. This also applies to embodiments and modifications described later.

Thereafter, the ciphertext generation unit 24 generates ciphertext data $C_i=(C_1,C_{2X},C_{2Y},C_{2Z},C_{2Z1},C_3,C_4,\sigma,\ tag_n)$ including all the above encrypted data $C_1$ to $C_4$, the one-time signature σ, and the identification information $tag_n$ of $A_n$.

If the verification processing in step ST41' and step ST51' described later is omitted, the ciphertext data $C_i=(C_1,C_{2X},C_{2Y},C_{2Z},C_{2Z1},C_3,C_4,\sigma)$ may be set as $C_i=(C_{2X},C_{2X},C_{2Y},C_{2Z},C_{2Z1},C_3)$ by omitting verification data $(C_1,C_4,\sigma,tag_n)$ that is not used for decryption. In this case, processing to generate the verification data $(C_1,C_4,\sigma)$ is also omitted. However, if decryption processing in a sixth modification described later is performed, the ciphertext generation unit 24 adds the identification information $tag_n$ of $A_n$ to the ciphertext data $C_i$.

In any case, the communication unit 22 transmits the ciphertext data $C_i$ in the temporary data storage unit 21 to the re-encryption device 40 under the control of the control unit 25 (ST24').

(3) Re-Encryption Key Generation Processing

Assume that the decryption device 50 (in the example of FIG. 8, for example, the user A) approves that ciphertext addressed to the re-encryption key generator 30 (in the example of FIG. 8, the group administrator) and encrypted by using $A_n$ as an element of the public parameter par is re-encrypted into ciphertext addressed to the decryption device 50 (in the example of FIG. 8, for example, the user A) (that is, the transfer of decryption right of the ciphertext encrypted by using $A_n$ to the user A). The decryption device 50 transmits the identification information $tag_n$ of $A_n$ and a re-encryption key generation key $rk_j$,n of the decryption device 50 to the re-encryption key generator 30. The communication unit 33 of the re-encryption key generator 30 acquires and writes the identification information $tag_n$ of $A_n$ and the re-encryption key generation key $rk_j$,n of the decryption device 50 into the temporary data storage unit 32 under the control of the control unit 35 (ST31').

The re-encryption key generation unit 34 generates a re-encryption key $R_{ij}$,n as shown in the following formulas using the random number θ, the private key $sk_i$ of the re-encryption key generator 30 in the private key storage unit 31, the identification information $tag_n$ of $A_n$ and the re-encryption key generation key $rk_j$,n of the decryption device 50 in the temporary data storage unit 32, and the public parameter par (ST32').

$$R_{ij,n} = (R_{ij1,n}, R_{ij2,n}, R_{ij3,n})$$

$$R_{ij1,n} = (X_{3j,n} \cdot g_{3,n}^\theta)^{1/x_i} = g^{\frac{\pi_n(x_j+\theta)}{x_i}},$$

$$R_{ij2,n} = (Y_{5j,n} \cdot g_{3,n}^\theta)^{1/y_i} = g^{\frac{\pi_n(\beta y_j+\theta)}{y_i}},$$

$$R_{ij3,n} = (X_{3j,n} \cdot Y_{5j,n} \cdot g_{3,n}^\theta)^{1/z_i} = g^{\frac{\pi_n(x_j+\beta y_j+\theta)}{z_i}}.$$

In the above formulas, $g_2$ is rewritten and denoted by $g^\beta$.

(4) Re-Encryption Processing

The re-encryption processing unit 44 verifies the ciphertext data $C_i$ in the temporary data storage unit 42 using the public parameter par and the public key $pk_i$ of the re-encryption key generator 30 based on the following verification formula (ST41').

$$e(C_{2X},u^{C_1}\cdot v)=e(X_i,C_4),$$

$$e(C_{2Y},u^{C_1}\cdot v)=e(Y_{1i},C_4),$$

$$e(C_{2Z},u^{C_1}\cdot v)=e(Z_i,C_4),$$

$$e(C_{2Z1},u^{C_1}\cdot v)=e(Z_{1i},C_4),$$

$$\hat{V}(C_1,\sigma,(tag_n,C_3,C_4))=1. \tag{a4}$$

If the identification information $tag_n$ of $A_n$ is not included as data to be signed by the one-time signature σ, the fifth verification formula in the formula (a4) conducts verification of the one-time signature σ by restricting data to be signed to the encrypted data $C_3$, $C_4$. This also applies to verification processing of the one-time signature σ described later.

The verification is successful if the five verification formulas in the formula (a4) all hold and fails if any one of the five formulas does not hold.

If the verification is successful (or the verification processing in step ST41' is skipped), the re-encryption parameter generation unit 45 generates and sends out three random numbers $s,t,k \in Z_p^*$ to the re-encryption processing unit 44.

The re-encryption processing unit 44 generates, as shown in the following formulas, re-encrypted data $C_{2X}{}'$, $C_{2X}{}''$, $C_{2Y}{}'$, $C_{2Y}{}''$, $C_{2Z}{}'$, $C_{2Z}{}''$, $C_{2Z1}{}'$, $C_{2Z1}{}''$, $C_{5X}$, $C_{5Y}$, $C_{5Z}$ using these random numbers s, t, k, the ciphertext data $C_i$ stored in the temporary data storage unit 42, the re-encryption key $R_{ij}$,n, the public key $pk_i$ of the re-encryption key generator 30, and the public parameter par (ST42').

$$C'_{2X} = X_i^s,\ C''_{2X} = C^s_{2X} = X_i^{rs},\ C'_{2Y} = Y_{1i}^t,\ C''_{2Y} = C^t_{2Y} = Y_{1i}^{rt},$$

$$C'_{2Z} = Z_i^k,\ C''_{2X} = C^k_{2Z} = Z_i^{rk},\ C'_{2Z1} = Z_{1i}^k,\ C''_{2Z1} = C^k_{2Z1} = Z_{1i}^{rk},$$

$$C_{5X} = R_{ij1,n}^{\frac{1}{s}},\ C_{5Y} = R_{ij2,n}^{\frac{1}{t}},\ C_{5Z} = R_{ij3,n}^{\frac{1}{k}}$$

Incidentally, the re-encryption processing unit 44 may select the re-encryption key $R_{ij}$,n to be used in step ST42' based on the identification information $tag_n$ of $A_n$ contained in the ciphertext data $C_i$ transmitted in step ST24'.

After step ST42' is completed, the re-encryption processing unit 44 replaces encrypted data $C_{2X}, C_{2Y}, C_{2Z}, C_{2Z1}$ in the ciphertext data $C_i$ with all the above re-encrypted data $C_{2X}{}'$ to $C_{5Z}$ and further adds the identification information $tag_n$ of $A_n$ contained in the ciphertext data $C_i$ transmitted in step ST24' to the re-encrypted data $C_j$. That is, $C_j=(C_1,C_{2X}{}',C_{2X}{}'',C_{2Y}{}',C_{2Y}{}'',C_{2Z}{}',C_{2Z}{}'',C_{2Z1}{}',C_{2Z1}{}'',C_{5X},C_{5Y},C_{5Z},C_3,\ C_4,\sigma,tag_n)$ is obtained. The re-encryption processing unit 44 writes the obtained re-encrypted data $C_j$ into the temporary data storage unit 42.

If verification processing in step ST51' in decryption processing described later is omitted, the re-encrypted data $C_j=(C_1,C_{2X}{}',C_{2X}{}'',C_{2Y}{}',C_{2Y}{}'',C_{2Z}{}',C_{2Z}{}'',C_{2Z1}{}',C_{2Z1}{}'',C_{5X},C_{5Y},C_{5Z},C_3,\ C_4,\sigma,tag_n)$ may be set as $C_j=(C_{2X}{}'',C_{2Y}{}'',C_{2Z}{}'',C_{2Z1}{}'',C_{5X},C_{5Y},C_{5Z},C_3)$ by omitting verification data $(C_1,C_{2X}{}',C_{2Y}{}',C_{2Z}{}',C_{2Z1}{}',C_4,\sigma,\ tag_n)$ that is not used for decryption. In this case, processing to generate the verification data $(C_{2X}{}',C_{2Y}{}',C_{2Z}{}',C_{2Z1}{}')$ is also omitted.

In any case, the communication unit 43 transmits the re-encrypted data $C_j$ in the temporary data storage unit 42 to the decryption device 50 under the control of the control unit 46 (ST43').

(5) Decryption Processing

The decryption processing unit 54 of the decryption device 50 verifies the re-encrypted data $C_j$ in the temporary data storage unit 52 using the private key $sk_j$ of the local device 50 in the private key storage unit 51 and the public parameter par in the temporary data storage unit 52 based on the following verification formulas (ST51').

$$e(C''_{2X}, u^{C1} \cdot v) = e(C'_{2X}, C_4),$$

$$e(C''_{2Y}, u^{C1} \cdot v) = e(C'_{2Y}, C_4),$$

$$e(C''_{2Z}, u^{C1} \cdot v) = e(C'_{2Z}, C_4),$$

$$e(C''_{2Z1}, u^{C1} \cdot v) = e(C'_{2Z1}, C_4),$$

$$e(C_{5Z}, C'_{2Z}) = e(C_{5X}, C'_{2X}) \cdot e(g_2, g_3, n)^{yj},$$

$$e(C_{5Z}, C'_{2Z1}) = e(C_{5Y}, C'_{2Y}) \cdot e(g, g_4, n)^{xj},$$

$$\hat{V}(C_1, \sigma, (tag_n, C_3, C_4)) = 1. \quad (a7)$$

Instead of the fifth verification formula in the formula (a7), the following verification formula may be used.

$$e(C_{5Z}, C'_{2Z}) = e(C_{5X}, C'_{2X}) \cdot e(g_{5,n}, g)^{yj}$$

Also, instead of the fifth verification formula in the formula (a7), the following verification formula may be used.

$$e(C_{5Z}, C'_{2Z}) = e(C_{5X}, C'_{2X}) \cdot e(Y_j, g_{3,n}) \quad (a7')$$

In this case, the decryption processing unit 54 conducts verification using the public key $pk_j$ of the local device 50.

Also, instead of the sixth verification formula in the formula (a7), the following verification formula may be used.

$$e(C_{5Z}, C'_{2Z1}) = e(C_{5Y}, C'_{2Y}) \cdot e(g_{3,n}, g_1))^{xj}$$

Also, instead of the sixth verification formula in the formula (a7), the following verification formula may be used.

$$e(C_{5Z}, C'_{2Z1}) = e(C_{5Y}, C'_{2Y}) \cdot e(X_j, g_{4,n})$$

In this case, the decryption processing unit 54 conducts verification using the public key $pk_j$ of the local device 50.

The decryption processing unit 54 of the decryption device 50 may select, based on the identification information $tag_n$ of $A_n$ contained in the re-encrypted data $C_j$ transmitted in step ST43', $A_n$ to be used in step ST51' from $A_1$, $A_2$, ..., $A_N$ as elements of the public parameter par.

The decryption device 50 decrypts the ciphertext data $C_j$ as shown in the following formula using the private key $sk_j$ of the local device 50 and the public parameter par to obtain the message m (ST52').

$$m = C_3 \Big/ \left\{ \left( \frac{e(C_{5Z}, C''_{2Z})}{e(C_{5X}, C''_{2X})} \right)^{\frac{1}{y_j}} \cdot \left( \frac{e(C_{5Z}, C''_{2Z1})}{e(C_{5Y}, C''_{2Y})} \right)^{\frac{1}{x_j}} \right\}$$

That the decryption result of the above formula produces m can be checked by the following calculation.

In the following calculation, $g_1$ is rewritten and denoted by $g^\alpha$ and $g_2$ is rewritten and denoted by $g^\beta$.

$$C_3 \Big/ \left\{ \left( \frac{e(C_{5Z}, C''_{2Z})}{e(C_{5X}, C''_{2X})} \right)^{\frac{1}{y_j}} \cdot \left( \frac{e(C_{5Z}, C''_{2Z1})}{e(C_{5Y}, C''_{2Y})} \right)^{\frac{1}{x_j}} \right\} =$$

$$C_3 \Big/ \left\{ \left( \frac{e(g^{\pi n(x_j + \beta y_j + \theta)/z_j k}, g^{z_j r k})}{e(g^{\pi n(x_j + \theta)/x_j s}, g^{x_j r s})} \right)^{\frac{1}{y_j}} \cdot \left( \frac{e(g^{\pi n(x_j + \beta y_j + \theta)/z_j k}, g^{\alpha z_j r k})}{e(g^{\pi n(\beta y_j + \theta)/y_j t}, g^{\alpha y_j r t})} \right)^{\frac{1}{x_j}} \right\} =$$

$$C_3 \Big/ \left\{ \left( \frac{e(g^{\pi n(x_j + \beta y_j + \theta)}, g^r)}{e(g^{\pi n(x_j + \theta)}, g^r)} \right)^{\frac{1}{y_j}} \cdot \left( \frac{e(g^{\pi n(x_j + \beta y_j + \theta)}, g^{\alpha r})}{e(g^{\pi n(\beta y_j + \theta)}, g^{\alpha r})} \right)^{\frac{1}{x_j}} \right\} =$$

$$m \cdot e(g_4 g_5, n, g)^r / (e(g, g)^{\pi n \beta r} \cdot e(g, g)^{\pi n \alpha r}) = m.$$

Sixth Modification

In the fifth modification, an example in which ciphertext data is generated by the encryption device 20, the ciphertext data is re-encrypted by the re-encryption device 40 to generate re-encrypted data, and the re-encrypted data is decrypted by the decryption device 50 is cited, but the first embodiment may also be changed to a form in which the ciphertext data is decrypted without being re-encrypted. In this case, only the key setup processing, encryption processing, and decryption processing need to be performed. The key setup processing in the present modification is the same as the key setup processing in the fifth modification. Hereinafter, the encryption processing and the decryption processing in the present modification will be described.

The difference between the encryption processing in the present modification and the encryption processing in the fifth modification is only in the last step. To provide a description by making use of the above symbols, the identification information of the decryption device 50 is assumed to be i for the sake of convenience. In this case, the communication unit 22 of the encryption device 20 transmits the ciphertext data $C_i$ in the temporary data storage unit 21 to the decryption device 50 under the control of the control unit 25 (ST24').

The decryption device 50 verifies, like in step ST51' in the first modification, the ciphertext data $C_j$ generated by the encryption device 20 (ST51').

If the verification is successful (or the verification processing in step ST51' is skipped), the decryption device 50 decrypts the ciphertext data $C_i$ as shown in the following formula using the private key $sk_i$ of the local device 50 and the public parameter par to obtain the message m (ST52').

$$m = C_3 \Big/ e(g_4 g_5, n, C_{2X})^{\frac{1}{x_i}}$$

That the decryption result of the above formula produces m can be checked by the following calculation.

$$m \cdot e(g_{4,n} g_{5,n}, g)^r \Big/ e(g_{4,n} g_{5,n}, C_{2X})^{\frac{1}{x_i}} =$$

$$m \cdot e(g_{4,n} g_{5,n}, g)^r \Big/ e(g_{4,n} g_{5,n}, g^{x_i r})^{\frac{1}{x_i}} =$$

$$m \cdot e(g_{4,n} g_{5,n}, g)^r / e(g_{4,n} g_{5,n}, g)^r = m.$$

The decryption processing unit 54 of the decryption device 50 may select, based on the identification information $tag_n$ of $A_n$ contained in the ciphertext data $C_i$ transmitted in step ST24', $A_n$ to be used in step ST52' from $A_1$, $A_2$, ..., $A_N$ as elements of the public parameter par.

Seventh Modification

In addition to the sixth modification, as will be described below, the first embodiment may also be changed to a form in which the ciphertext data is decrypted without being re-encrypted. Also in this case, only the key setup processing, encryption processing, and decryption processing need to be performed. The key setup processing and the decryption processing in the present modification are the same as the key setup processing and the decryption processing in the fifth modification respectively. Hereinafter, the encryption processing and the decryption processing in the present modification will be described. In the present modification, the identification information of the decryption device 50 is assumed to be j.

Like in step ST21 in the first embodiment, the encryption parameter generation unit 23 of the encryption device 20 generates (ssk, svk) (ST21') and sets the verification key svk to the encrypted data $C_1$ ($C_1$=svk).

The ciphertext generation unit 24 generates one element from $A_1, A_2, \ldots, A_N$ as elements of the public parameter par. It is assumed below that $A_n$ is selected.

The encryption parameter generation unit 23 also generates and sends out five random numbers $r,s,t,k,\theta \in Z_p^*$ to the ciphertext generation unit 24.

The ciphertext generation unit 24 generates encrypted data $C_{2X}'$, $C_{2X}''$, $C_{2Y}'$, $C_{2Y}''$, $C_{2Z}'$, $C_{2Z}''$, $C_{2Z1}'$, $C_{2Z1}''$, $C_{5X}$, $C_{5Y}$, $C_{5Z}$, $C_3$, $C_4$ below from a message $m \in G_T$ as plaintext data using these random numbers $r,s,t,k,\theta$, the public key $pk_j$ of the decryption device 50, and the public parameter (ST22').

$$C_{2X}' = Y_{2j}^s, \; C_{2X}'' = Y_{2j}^{rs}, \; C_{2Y}' = X_j^t, \; C_{2Y}'' = X_j^{rt},$$

$$C_{2Z}' = Y_{2j}^k, \; C_{2Z}'' = Y_{2j}^{rk}, \; C_{2Z1}' = X_j^k, \; C_{2Z1}'' = X_j^{rk},$$

$$C_3 = e(g_{4,n} g_{5,n}, g)^r \cdot m, \; C_4 = (u^{svk} \cdot v)^r,$$

$$C_{5X} = (g_{4,n} \cdot g_{3,n}^\theta)^{\frac{1}{s}}, \; C_{5Y} = g_{3,n}^{\frac{\theta+1}{n}}, \; C_{5Z} = (g_{4,n} \cdot g_{3,n}^{\theta+1})^{\frac{1}{k}}$$

After step ST22' is completed, like in step ST23 in the fifth modification, the ciphertext generation unit 24 generates a one-time signature σ (ST23').

Thereafter, the ciphertext generation unit 24 generates ciphertext data $C_j=(C_1, C_{2X}', C_{2X}'', C_{2Y}', C_{2Y}'', C_{2Z}', C_{2Z}'', C_{2Z1}', C_{2Z1}'', C_{5X}, C_{5Y}, C_{5Z}, C_3, C_4, \sigma, \text{tag}_n)$ including all the above encrypted data $C_1$ to $C_4$ and the one-time signature σ and writes the obtained ciphertext data into the temporary data storage unit 21.

The communication unit 22 transmits the ciphertext data $C_j$ in the temporary data storage unit 21 to the decryption device 50 under the control of the control unit 25 (ST24').

The decryption device 50 verifies the ciphertext data $C_j$ generated by the encryption device 20 in the same manner as in step ST51' in the fifth modification (ST51').

The decryption processing unit 54 of the decryption device 50 may select, based on the identification information $\text{tag}_n$ of $A_n$ contained in the ciphertext data $C_j$ transmitted in step ST24', $A_n$ to be used in step ST51' from $A_1, A_2, \ldots, A_N$ as elements of the public parameter par.

If the verification is successful (or the verification processing in step ST51' is skipped), the decryption device 50 decrypts the ciphertext data $C_j$ as shown in the following formula using the private key $sk_j$ of the local device 50 and the public parameter par to obtain the message m (ST52').

$$m = C_3 \Big/ \left\{ \left(\frac{e(C_{5Z}, C_{2Z}'')}{e(C_{5X}, C_{2X}'')}\right)^{\frac{1}{y_j}} \cdot \left(\frac{e(C_{5Z}, C_{2Z1}'')}{e(C_{5Y}, C_{2Y}'')}\right)^{\frac{1}{x_j}} \right\}$$

That the decryption result of the above formula produces m can be checked by the following calculation.

In the following calculation, $g_1$ is rewritten and denoted by $g^\alpha$ and $g_2$ is rewritten and denoted by $g^\beta$.

$$C_3 \Big/ \left\{ \left(\frac{e(C_{5Z}, C_{2Z}'')}{e(C_{5X}, C_{2X}'')}\right)^{\frac{1}{y_j}} \cdot \left(\frac{e(C_{5Z}, C_{2Z1}'')}{e(C_{5Y}, C_{2Y}'')}\right)^{\frac{1}{x_j}} \right\}$$

$$= C_3 \Big/ \left\{ \left(\frac{e(g^{\pi_n(1+\alpha+\theta)/k}, g^{\beta y_j rk})}{e(g^{\pi_n(\alpha+\theta)/s}, g^{\beta y_j rs})}\right)^{\frac{1}{y_j}} \cdot \left(\frac{e(g^{\pi_n(1+\alpha+\theta)/k}, g^{\beta x_j rk})}{e(g^{\pi_n(\theta+1)/t}, g^{x_j rt})}\right)^{\frac{1}{x_j}} \right\}$$

$$= C_3 \Big/ \left\{ \left(\frac{e(g^{\pi_n(1+\alpha+\theta)}, g^{\beta r})}{e(g^{\pi_n(\alpha+\theta)}, g^{\beta r})}\right) \cdot \left(\frac{e(g^{\pi_n(1+\alpha+\theta)}, g^r)}{e(g^{\pi_n(\theta+1)}, g^r)}\right) \right\}$$

$$= m \cdot e(g_4, n g_5, n, g)^r / (e(g,g)^{\pi_n \beta r} \cdot e(g,g)^{\pi_n \alpha r}) = m.$$

Second Embodiment

In the present embodiment, an example of updating a re-encryption key in the first embodiment at certain intervals will be described. A time parameter L is used as a parameter representing a period. The time parameter is used in, of key setup processing, encryption processing, re-encryption key generation processing, re-encryption processing, and decryption processing, the encryption processing, the re-encryption key generation processing, and the re-encryption processing. The time parameter is used such that if, for example, encryption processing is performed in a certain period $t_1$, the encryption processing described later is performed by setting $L=t_1$ and if encryption processing is performed in the next period $t_2$, the encryption processing described later is performed by setting $L=t_2$. That is, encryption processing, re-encryption key generation processing, and re-encryption processing are performed by periodically changing the time parameter. Hereinafter, key setup processing, encryption processing, re-encryption key generation processing, re-encryption processing, and decryption processing in the present embodiment will be described. Portions common to the aforementioned first embodiment may or may not be described by using the same reference signs.

(1) Key Setup Processing

A public parameter generation unit 13 of a key generator 10 generates a public parameter par in the same manner as in the first embodiment or acquires the parameter from outside (ST1). If the identification information of a re-encryption key generator 30 is i, a key generation unit 14 randomly selects elements $x_i, y_i, z_i, w_i$ of $Z_p^*$ from $Z_p^*$ and sets a private key $sk_i=(x_i, y_i, z_i, w_i)$ of the re-encryption key generator 30. Then, the key generation unit 14 generates a public key $pk_i=(X_i, Y_{1i}, Y_{2i}, Z_i, Z_{1i}, W_i)$ of the re-encryption key generator 30 using the private key $sk_i$ and the public parameter par.

$$X_i = g^{x_i}, \; Y_{1i} = g_1^{y_i}, \; Y_{2i} = g_2^{y_i},$$

$$Z_i = g^{z_i}, \; Z_{1i} = g_1^{z_i}, \; W_i = g^{w_i}$$

When verification processing using a formula (a6') described later is not performed, data $Y_{2i}$ may be omitted. That is, the public key $pk_i$ only needs to include $X_i, Y_{1i}, Z_i, Z_{1i}, W_i$.

Further, the key generation unit 14 generates a re-encryption key generation key $rk_i=(X_{3i},Y_{5i})$ using the private key $sk_i$ and the public parameter par (ST3).

$$X_{3i}=g_3{}^{xi},\ Y_{5i}=g_5{}^{yi}$$

Similarly, if the identification information of a decryption device 50 is j, the key generation unit 14 randomly selects elements $x_j$, $y_j$, $z_j$, $w_j$ of $Z_p{}^*$ from $Z_p{}^*$ and sets a private key $sk_j=(x_j,y_j,z_j,w_j)$ of the decryption device 50. Then, the key generation unit 14 generates a public key $pk_j=(X_j,Y_{1j},Y_{2j},Z_j,Z_{1j},W_j)$ of the decryption device 50 using the private key $sk_j$ and the public parameter par.

$$X_j=g^{xj},\ Y_{1j}=g_1{}^{yj},\ Y_{2j}=g_2{}^{yj},$$

$$Z_j=g^{zj},\ Z_{1j}=g_1{}^{zj},\ W_j=g^{wj}$$

If, similarly as described above, the verification processing using a formula (a6') described later is not performed, data $Y_{2j}$ may be omitted. That is, the public key $pk_j$ only needs to include $X_j$, $Y_{1j}$, $Z_j$, $Z_{1j}$, $W_j$.

Further, the key generation unit 14 generates a re-encryption key generation key $rk_j=(X_{3j},Y5j)$ using the private key $sk_j$ and the public parameter par (ST6).

$$X_{3j}=g_3{}^{xj},\ Y_{5j}=g_5{}^{yj}$$

(2) Encryption Processing

Like in step ST21 in the first embodiment, an encryption parameter generation unit 23 of an encryption device 20 generates (ssk, svk) (ST21) and sets the verification key svk to the encrypted data $C_1$ ($C_1$=svk).

The encryption parameter generation unit 23 also generates and sends out a random number $r \in Z_p{}^*$ to a ciphertext generation unit 24.

The ciphertext generation unit 24 generates encrypted data $C_{2X}$, $C_{2Y}$, $C_{2Z}$, $C_{2Z1}$, $C_{2F}$, $C_3$, $C_4$ below from a message $m \in G_T$ as plaintext data using the random number r, the public key $pk_i$ of the re-encryption key generator 30, the public parameter par, and the time parameter L (ST22).

$$C_{2X}=X_i{}^r,\ C_{2Y}=Y_{1i}{}^r,\ C_{2Z}=Z_i{}^r,\ C_{2Z1}=Z_{1i}{}^r,$$

$$C_{2F}=F_i(L)^r,\ C_3=e(g_4g_5,g)^r \cdot m,\ C_4=(u^{svk} \cdot v)^r$$

The function Fi (L) is defined as shown below.

$$F_i(L)=g^L \cdot W_i=g^{L+wi}(L \in \mathbb{Z}_p{}^*)$$

As a method of acquiring the time parameter by the encryption device 20 (or the re-encryption key generator 30 described later), for example, the following method may be used. Some entity (for example, a server Sv in FIG. 8, a server separate from the server Sv, a user administrator, a group administrator, an administrator separate from the user administrator and the group administrator, a user A, a user B, a user B, or a user separate from the users A to C) holds a time parameter generation device (not shown) that generates a time parameter and the time parameter generation device notifies the encryption device 20 (or the re-encryption key generator 30) of a time parameter. Alternatively, a function in which the input is a time and the output is a time parameter may be defined to generate a time parameter using the time and the function. In this case, the encryption device 20 (or the re-encryption key generator 30) may use an output value of the function using, as input, information based on the time when encryption processing (re-encryption key generation processing) is performed (for example, a value obtained by converting the date when encryption processing (re-encryption key generation processing) is performed into a number) as a time parameter L, which obviates the need to acquire a time parameter from another device. Alternatively, the key generator 10, the encryption device 20, the re-encryption key generator 30, a re-encryption device 40, or the decryption device 50 may generate a time parameter to notify devices other than the relevant device (that has generated the time parameter) of the time parameter. The re-encryption key generator 30 acquires, as will be described later, a re-encryption key generation key of the decryption device 50 from the decryption device 50 and when acquiring the re-encryption key generation key, may also acquire a time parameter from the decryption device 50. In this case, the decryption device 50 may acquire a time parameter from one of the above methods. This also applies to embodiments and modifications described later.

The time parameter does not necessarily have to be a parameter related to a time such as a time or date and may be, for example, a number obtained by converting a character string or a numerical value such as a random number. Similarly, the input into the above function may be a number obtained by converting a character string or a numerical value such as a random number. Thus, the value of a time parameter may be unrelated to time. This also applies to embodiments and modifications described later.

After step ST22 is completed, the ciphertext generation unit 24 generates a one-time signature σ as shown in the following formula for the time parameter L and the encrypted data $C_3$, $C_4$ based on a signature generation function $\hat{S}$ of the public parameter par and the signature key ssk generated in step ST21 (ST23).

$$\sigma = \hat{S}(ssk,(L,C_3,C_4))$$

Incidentally, the ciphertext generation unit 24 may generate the one-time signature σ for the encrypted data $C_3$, $C_4$ as data to be signed without including the time parameter L. This also applies to embodiments and modifications described later.

Thereafter, the ciphertext generation unit 24 generates ciphertext data $C_i=(L,C_1,C_{2X},C_{2Y},C_{2Z},C_{2Z1},C_{2F},C_3,C_4,\sigma)$ including the time parameter L, all the above encrypted data $C_1$ to $C_4$, and the one-time signature σ and writes the obtained ciphertext data into a temporary data storage unit 21.

A communication unit 22 transmits the ciphertext data $C_i$ in the temporary data storage unit 21 to the re-encryption device 40 under the control of a control unit 25 (ST24).

(3) Re-Encryption Key Generation Processing

Now, assume that the decryption device 50 (in the example of FIG. 8, for example, the user A) approves that ciphertext addressed to the re-encryption key generator 30 (in the example of FIG. 8, the group administrator) and generated by using L as the time parameter value is re-encrypted into ciphertext addressed to the decryption device 50 (in the example of FIG. 8, for example, the user A) (that is, the transfer of decryption right of the ciphertext to the user A). The decryption device 50 transmits the re-encryption key generation key $rk_j$ of the decryption device 50 to the re-encryption key generator 30. A communication unit 33 of the re-encryption key generator 30 acquires and writes the re-encryption key generation key $rk_j$ of the decryption device 50 into a temporary data storage unit 32 under the control of a control unit 35 (ST31).

A random number generation unit 36 generates and sends out three random numbers $\theta, \delta x, \delta y \in Z_p{}^*$ to a re-encryption key generation unit 34.

The re-encryption key generation unit 34 generates a re-encryption key $R_{ijL}$ as shown in the following formulas using the random numbers θ, δx, δy, the private key $sk_i$ of the re-encryption key generator 30 in a private key storage unit 31, the re-encryption key generation key $rk_j$ of the decryption device 50 in the temporary data storage unit 32, the public parameter par, and the time parameter L (ST32).

$$R_{ijL} = (R_{ijL1}, R_{ijL2}, R_{ijL3}, R_{ijL4}, R_{ijL5})$$

$$R_{ijL1} = (X_{3j} \cdot g_3^\theta)^{1/x_i} \cdot g^{(L+w_i)\delta_x} = g^{\frac{\pi(x_j+\theta)}{x_i}} + (L+w_i)\delta_x,$$

$$R_{ijL2} = (Y_{5j} \cdot g_3^\theta)^{1/y_i} \cdot g^{(L+w_i)\delta_y} = g^{\frac{\pi(\beta y_j+\theta)}{y_i}} + (L+w_i)\delta_y,$$

$$R_{ijL3} = (X_{3j} \cdot Y_{5j} \cdot g_3^\theta)^{1/z_i} = g^{\frac{\pi(x_j+\beta y_j+\theta)}{z_i}},$$

$$R_{ijL4} = g^{x_i \delta_x}, R_{ijL5} = g_1^{y_i \delta_y} = g^{\alpha y_i \delta_y}$$

In the above formulas, $g_1$ is rewritten and denoted by $g^\alpha$ and $g_2$ is rewritten and denoted by $g^\beta$.

(4) Re-Encryption Processing

A re-encryption processing unit 44 of the re-encryption device 40 verifies the ciphertext data $C_i$ in a temporary data storage unit 42 using the public parameter par, the time parameter L contained in the ciphertext data $C_i$ in the temporary data storage unit 42, and the public key $pk_i$ of the re-encryption key generator 30 based on the following verification formula (ST41).

$$e(C_{2X}, u^{C1} \cdot v) = e(X_i, C_4),$$

$$e(C_{2Y}, u^{C1} \cdot v) = e(Y_i, C_4),$$

$$e(C_{2Z}, u^{C1} \cdot v) = e(Z_i, C_4),$$

$$e(C_{2Z1}, u^{C1} \cdot v) = e(Z_{1i}, C_4),$$

$$e(C_{2F}, u^{C1} \cdot v) = e(F_i(L), C_4),$$

$$\hat{V}(C_1, \sigma, (L, C_3, C_4)) = 1. \quad (a5)$$

If the time parameter L is not included as data to be signed by the one-time signature σ, the sixth verification formula in the formula (a5) conducts verification of the one-time signature σ by restricting data to be signed to the encrypted data $C_3$, $C_4$. This also applies to verification processing of the one-time signature σ described later.

The verification is successful if the six verification formulas in the formula (a5) all hold and fails if any one of the six formulas does not hold.

If the verification is successful (or the verification processing in step ST41 is skipped), a re-encryption parameter generation unit 45 generates and sends out four random numbers $s, t, k, h \in Z_p^*$ to the re-encryption processing unit 44.

The re-encryption processing unit 44 generates, as shown in the following formulas, re-encrypted data $C_{2X}'$, $C_{2X}''$, $C_{2Y}'$, $C_{2Y}''$, $C_{2Z}'$, $C_{2Z}''$, $C_{2Z1}'$, $C_{2Z1}''$, $C_{2F}'$, $C_{2F}''$, $C_{5X}$, $C_{5Y}$, $C_{5Z}$, $C_{5FX}$, $C_{5FY}$ using these random numbers s, t, k, h, the ciphertext data $C_i$ stored in the temporary data storage unit 42, the re-encryption key $R_{ijL}$, the public key $pk_i$ of the re-encryption key generator 30, and the public parameter par (ST42).

$$C_{2X}' = X_i^s, C_{2X}'' = C_{2X}^s = X_i^{rs}, C_{2Y}' = Y_{1i}^t, C_{2Y}'' = C_{2Y}^t = Y_{1i}^{rt},$$

$$C_{2Z}' = Z_i^k, C_{2Z}'' = C_{2Z}^k = Z_i^{rk}, C_{2Z1}' = Z_{1i}^k, C_{2Z1}'' = C_{2Z1}^k = Z_{1i}^{rk},$$

$$C_{2F}' = F_i(L)^h, C_{2F}'' = C_{2F}^h = F_i(L)^{rh},$$

$$C_{5X} = R_{ijL1}^{\frac{1}{s}}, C_{5Y} = R_{ijL2}^{\frac{1}{t}}, C_{5Z} = R_{ijL3}^{\frac{1}{k}}, C_{5FX} = R_{ijL4}^{\frac{1}{h}}, C_{5FY} = R_{ijL5}^{\frac{1}{h}}$$

After step ST42 is completed, the re-encryption processing unit 44 generates re-encrypted data $C_j = (L, C_1, C_{2X}', C_{2X}'', C_{2Y}', C_{2Y}'', C_{2Z}', C_{2Z}'', C_{2Z1}', C_{2Z1}'', C_{2F}', C_{2F}'', C_{5X}, C_{5Y}, C_{5Z}, C_{5FX}, C_{5FY}, C_3, C_4, \sigma)$ by replacing the encrypted data $C_{2X}$, $C_{2Y}$, $C_{2Z}$, $C_{2Z1}$, $C_{2F}$ in the ciphertext data $C_i$ with all the above re-encrypted data $C_{2X}'$ to $C_{5FY}$ and writes the obtained ciphertext data $C_j$ into the temporary data storage unit 42.

A communication unit 43 transmits the re-encrypted data $C_j$ in the temporary data storage unit 42 to the decryption device 50 under the control of a control unit 46 (ST43).

(5) Decryption Processing

A decryption processing unit 54 of the decryption device 50 verifies the re-encrypted data $C_j$ in a temporary data storage unit 52 using the private key $sk_j$ of the local device 50 in a private key storage unit 51 and the public parameter par in the temporary data storage unit 52 based on the following verification formulas (ST51).

$$e(C_{2X}'', u^{C1} \cdot v) = e(C_{2X}', C_4),$$

$$e(C_{2Y}'', u^{C1} \cdot v) = e(C_{2Y}', C_4),$$

$$e(C_{2Z}'', u^{C1} \cdot v) = e(C_{2Z}', C_4),$$

$$e(C_{2Z1}'', u^{C1} \cdot v) = e(C_{2Z1}', C_4),$$

$$e(C_{2F}'', u^{C1} \cdot v) = e(C_{2F}', C_4),$$

$$e(C_{5Z}, C_{2Z}') \cdot e(C_{5FX}, C_{2F}') = e(C_{5X}, C_{2X}') \cdot e(g_2, g_3)^{y_j},$$

$$e(C_{5Z}, C_{2Z1}') \cdot e(C_{5FY}, C_{2F}') = e(C_{5Y}, C_{2Y}') \cdot e(g, g_4)^{x_j},$$

$$\hat{V}(C_1, \sigma, (L, C_3, C_4)) = 1. \quad (a6)$$

Instead of the sixth verification formula in the formula (a6), the following verification formula may be used.

$$e(C_{5Z}, C_{2Z}') \cdot e(C_{5FX}, C_{2F}') = e(C_{5X}, C_{2X}') \cdot e(g_5, g)^{y_j}$$

Also, instead of the sixth verification formula in the formula (a6), the following verification formula may be used.

$$e(C_{5Z}, C_{2Z}') \cdot e(C_{5FX}, C_{2F}') = e(C_{5X}, C_{2X}') \cdot e(Y_{2j}, g_3). \quad (a6')$$

In this case, the decryption processing unit 54 conducts verification using the public key $pk_j$ of the local device 50.

Also, instead of the seventh verification formula in the formula (a6), the following verification formula may be used.

$$e(C_{5Z}, C_{2Z1}') \cdot e(C_{5FY}, C_{2F}') = e(C_{5Y}, C_{2Y}') \cdot e(g_3, g_1)^{x_j}.$$

Also, instead of the seventh verification formula in the formula (a6), the following verification formula may be used.

$$e(C_{5Z}, C_{2Z1}') \cdot e(C_{5FY}, C_{2F}') = e(C_{5Y}, C_{2Y}') \cdot e(X_j, g_4).$$

In this case, the decryption processing unit 54 conducts verification using the public key $pk_j$ of the local device 50.

The verification is successful if the eight verification formulas in the formula (a6) all hold and fails if any one of the eight formulas does not hold.

If the verification is successful (or the verification processing in step ST51 is skipped), the decryption processing unit 54 decrypts the re-encrypted data $C_j$ as shown in the following formula using the private key $sk_j$ of the local device 50 in the private key storage unit 51 and the public parameter par in the temporary data storage unit 52 to obtain the message m (ST52).

$$m = C_3 \Big/ \left\{ \left( \frac{e(C_{5Z}, C''_{2Z}) \cdot e(C_{5FX}, C''_{2F})}{e(C_{5X}, C''_{2X})} \right)^{\frac{1}{y_j}} \cdot \left( \frac{e(C_{5Z}, C''_{2Z1}) \cdot e(C_{5FY}, C''_{2F})}{e(C_{5Y}, C''_{2Y})} \right)^{\frac{1}{x_j}} \right\}$$

That the decryption result of the above formula produces m can be checked by the following calculation.

In the following calculation, $g_1$ is rewritten and denoted by $g^\alpha$ and $g_2$ is rewritten and denoted by $g^\beta$.

$$C_3 \Big/ \left\{ \left( \frac{e(C_{5Z}, C''_{2Z}) \cdot e(C_{5FX}, C''_{2F})}{e(C_{5X}, C''_{2X})} \right)^{\frac{1}{y_j}} \cdot \left( \frac{e(C_{5Z}, C''_{2Z1}) \cdot e(C_{5FY}, C''_{2F})}{e(C_{5Y}, C''_{2Y})} \right)^{\frac{1}{x_j}} \right\}$$

$$= C_3 \Big/ \left\{ \left( \frac{e\left(g^{\frac{\pi(x_j + \beta y_j + \theta)}{z_j k}}, g^{z_i r k}\right) \cdot e\left(g^{\frac{x_i \delta_x}{h}}, g^{(L+w_i) r h}\right)}{e\left(g^{\frac{(\pi(x_j+\theta)/x_j)+(L+w_i)\delta_x}{s}}, g^{x_i r s}\right)} \right)^{\frac{1}{y_j}} \right.$$

$$\left. \left( \frac{e\left(g^{\frac{\pi(x_j+\beta y_j+\theta)}{z_j k}}, g^{\alpha z_i r k}\right) \cdot e\left(g^{\frac{\alpha y_i \delta_y}{h}}, g^{(L+w_i) r h}\right)}{e\left(g^{\frac{(\pi(\beta y_j+\theta)/y_j)+(L+w_i)\delta_y}{s}}, g^{\alpha y_i r s}\right)} \right)^{\frac{1}{x_j}} \right\}$$

$$= C_3 \Big/ \left\{ \left( \frac{e\left(g^{\pi(x_j+\beta y_j+\theta)}, g^r\right) \cdot e\left(g^{x_i \delta_x}, g^{(L+w_i) r}\right)}{e\left(g^{\pi(x_j+\theta)+(L+w_i) x_i \delta_x}, g^r\right)} \right)^{\frac{1}{y_j}} \right.$$

$$\left. \left( \frac{e\left(g^{\pi(x_j+\beta y_j+\theta)}, g^{\alpha r}\right) \cdot e\left(g^{\alpha y_i \delta_y}, g^{(L+w_i) r}\right)}{e\left(g^{\pi(\beta y_j+\theta)+(L+w_i) y_i \delta_y}, g^{\alpha r}\right)} \right)^{\frac{1}{x_j}} \right\}$$

$$= m \cdot e(g_4 g_5, g)^r / (e(g, g)^{\pi \beta r} \cdot e(g, g)^{\pi \alpha r}) = m.$$

In the present embodiment, the order of processing may be changed when appropriate. For example, the order of the decryption processing and the ciphertext verification processing may be changed. Similarly, the order of the re-encryption key generation processing may be changed to before the encryption processing.

According to the present embodiment, as described above, due to the configuration of generating the re-encryption key $R_{ijL}$ based on the random numbers θ, δx, δy, the re-encryption key generation key $rk_j$, and the time parameter L, in addition to the effects of the first embodiment, whether to transfer the decryption right can be decided in each period so that finer access control can be exercised. Accordingly, even if the decryption right of ciphertext for the transfer source (in the example of FIG. 8, the group administrator) is once transferred to the transfer destination (in the example of FIG. 8, for example, the user A) in a certain period, it is possible not to grant the decryption right of the ciphertext for the transfer source to the relevant transfer destination, that is, the decryption right of the transfer destination (of the ciphertext for the relevant transfer source) can be invalidated in the next period and therefore, a file sharing system whose convenience is further improved can be provided.

Eighth Modification

In the second embodiment, an example in which ciphertext data is generated by the encryption device 20, the ciphertext data is re-encrypted by the re-encryption device 40 to generate re-encrypted data, and the re-encrypted data is decrypted by the decryption device 50 is cited, but the second embodiment may be changed to a form in which ciphertext data is decrypted without being re-encrypted. In this case, only the key setup processing, encryption processing, and decryption processing need to be performed. The key setup processing in the present modification is the same as the key setup processing in the second embodiment. Hereinafter, the encryption processing and the decryption processing in the present modification will be described.

The difference between the encryption processing in the present modification and the encryption processing in the second embodiment is in the last step only. To provide a description by making use of the above symbols, the identification information of the decryption device 50 is assumed to be i for the sake of convenience. In this case, the communication unit 22 of the encryption device 20 transmits the ciphertext data $C_i$ in the temporary data storage unit 21 to the decryption device 50 under the control of the control unit 25 (ST24').

The decryption device 50 verifies the ciphertext data $C_i$ generated by the encryption device 20 using the public parameter par and the private key $sk_i$ of the local device 50 based on the following verification formulas (ST51').

$$e(C_{2X}, u^{C_1} \cdot v) = e(g, C_4)^{x_i},$$

$$e(C_{2Y}, u^{C_1} \cdot v) = e(g_1, C_4)^{y_i},$$

$$e(C_{2Z}, u^{C_1} \cdot v) = e(g, C_4)^{z_i},$$

$$e(C_{2Z1}, u^{C_1} \cdot v) = e(g_1, C_4)^{z_i},$$

$$e(C_{2F}, u^{C_1} \cdot v) = e(g, C_4)^{L+w_i},$$

$$\hat{V}(C_1, \sigma, (L, C_3, C_4)) = 1.$$

Incidentally, the decryption device 50 may verify the ciphertext data $C_i$ generated by the encryption device 20 using the public parameter par and the public key $pk_i$ of the local device 50 in the same manner as in step ST41.

The verification is successful if the six verification formulas shown above all hold and fails if any one of the six formulas does not hold.

If the verification is successful (or the verification processing in step ST51' is skipped), the decryption device 50 decrypts the ciphertext data $C_i$ as shown in the following formula using the private key $sk_i$ of the local device 50 and the public parameter par to obtain the message m (ST52').

$$m = C_3 \Big/ e(g_4 g_5, C_{2X})^{\frac{1}{x_i}}$$

That the decryption result of the above formula produces m can be checked by the following calculation.

$$m \cdot e(g_4 g_5, g)^r \Big/ e(g_4 g_5, C_{2X})^{\frac{1}{x_i}}$$

$$= m \cdot e(g_4 g_5, g)^r \Big/ e(g_4 g_5, g^{x_i r})^{\frac{1}{x_i}}$$

$$= m \cdot e(g_4 g_5, g)^r / e(g_4 g_5, g)^r = m.$$

Ninth Modification

In addition to the eighth modification, as will be described below, the second embodiment may also be changed to a form in which the ciphertext data is decrypted without being re-encrypted. Also in this case, only the key setup processing, encryption processing, and decryption processing need to be performed. The key setup processing and the decryption processing in the present modification are the same as the key setup processing and the decryption processing in the second embodiment respectively. Hereinafter, the encryption processing and the decryption processing in the present modification will be described. In the present modification, the identification information of the decryption device 50 is assumed to be j.

Like in step ST21 in the first embodiment, the encryption parameter generation unit 23 of the encryption device 20 generates (ssk, svk) (ST21') and sets the verification key svk to the encrypted data $C_1$ ($C_1$=svk).

The encryption parameter generation unit 23 also generates and sends out eight random numbers r,s,t,k,h, θ,δx, δy∈$Z_p^*$ to the ciphertext generation unit 24.

The ciphertext generation unit 24 generates encrypted data $C_{2X}'$, $C_{2X}''$, $C_{2Y}'$, $C_{2Y}''$, $C_{2Z}'$, $C_{2Z}''$, $C_{2Z1}'$, $C_{2Z1}''$, $C_{2F}'$, $C_{2F}''$, $C_{5X}$, $C_{5Y}$, $C_{5Z}$, $C_{5FX}$, $C_{5FY}$, $C_3$, $C_4$ below from a message m∈$G_T$ as plaintext data using these random numbers r, s, t, k, h, θ, δx, δy, the public key $pk_j$ of the decryption device 50, the public parameter, and the time parameter L (ST22').

$$C_{2X}' = Y_{2j}^s,\ C_{2X}'' = Y_{2j}^{rs},\ C_{2Y}' = X_j^t,\ C_{2Y}'' = X_j^{rt},$$

$$C_{2Z}' = Y_{2j}^k,\ C_{2Z}'' = Y_{2j}^{rk},\ C_{2Z1}' = X_j^k,\ C_{2Z1}'' = X_j^{rk},$$

$$C_{2F}' = F_j(L)^h \cdot C_{2F}'' = F_j(L)^{rh},$$

$$C_3 = e(g_4 g_5, g)^r \cdot m,\ C_4 = (u^{svk} \cdot v)^r,$$

$$C_{5X} = (g_4 \cdot g_3^\theta \cdot F_j(L)^{\delta y})^{\frac{1}{s}} = g^{\frac{\pi(\alpha+\theta)+(L+w_j)\delta y}{s}},$$

$$C_{5Y} = (g_3^{1+\theta} \cdot F_j(L)^{\delta x})^{\frac{1}{t}} = g^{\frac{\pi(1+\theta)+(L+w_j)\delta x}{t}},$$

$$C_{5Z} = (g_4 \cdot g_3^{1+\theta})^{\frac{1}{k}} = g^{\frac{\pi(\alpha+1+\theta)}{k}},$$

$$C_{5FX} = (Y_{2j})^{\frac{\delta y}{h}},\ C_{5FY} = (X_j)^{\frac{\delta x}{h}}$$

After step ST22' is completed, like in step ST23, the ciphertext generation unit 24 generates a one-time signature σ.

Thereafter, the ciphertext generation unit 24 generates ciphertext data $C_j$=(L, $C_1$, $C_{2X}'$, $C_{2X}''$, $C_{2Y}'$, $C_{2Y}''$, $C_{2Z}'$, $C_{2Z}''$, $C_{2Z1}'$, $C_{2Z1}''$, $C_{2F}'$, $C_{2F}''$, $C_{5X}$, $C_{5Y}$, $C_{5Z}$, $C_{5FX}$, $C_{5FY}$, $C_3$, $C_4$, σ) including the time parameter L, all the above encrypted data $C_1$ to $C_4$ and, the one-time signature σ and writes the obtained ciphertext data into the temporary data storage unit 21.

The communication unit 22 transmits the ciphertext data $C_j$ in the temporary data storage unit 21 to the decryption device 50 under the control of the control unit 25 (ST24').

The decryption device 50 verifies the ciphertext data $C_j$ generated by the encryption device 20 in the same manner as in step ST51 (ST51'). If the verification is successful (or the verification processing in step ST51' is skipped), the decryption device 50 decrypts the ciphertext data $C_j$ as shown in the following formula using the private key $sk_j$ and the public parameter par to obtain the message m (ST52').

$$m = C_3 \Big/ \left\{ \left( \frac{e(C_{5Z}, C_{2Z}'') \cdot e(C_{5FX}, C_{2F}'')}{e(C_{5X}, C_{2X}'')} \right)^{\frac{1}{y_j}} \cdot \left( \frac{e(C_{5Z}, C_{2Z1}'') \cdot e(C_{5FY}, C_{2F}'')}{e(C_{5Y}, C_{2Y}'')} \right)^{\frac{1}{x_j}} \right\}$$

That the decryption result of the above formula produces m can be checked by the following calculation.

In the following calculation, $g_1$ is rewritten and denoted by $g^\alpha$ and $g_2$ is rewritten and denoted by $g^\beta$.

$$C_3 \Big/ \left\{ \left( \frac{e(C_{5Z}, C_{2Z}'') \cdot e(C_{5FX}, C_{2F}'')}{e(C_{5X}, C_{2X}'')} \right)^{\frac{1}{y_j}} \cdot \left( \frac{e(C_{5Z}, C_{2Z1}'') \cdot e(C_{5FY}, C_{2F}'')}{e(C_{5Y}, C_{2Y}'')} \right)^{\frac{1}{x_j}} \right\}$$

$$= C_3 \Big/ \left\{ \left( \frac{e\!\left(g^{\frac{\pi(\alpha+1+\theta)}{k}}, g^{\beta y_j rk}\right) \cdot e\!\left(g^{\frac{\beta y_i \delta y}{h}}, g^{(L+w_j)rh}\right)}{e\!\left(g^{\frac{\pi(\alpha+\theta)-(L+w_j)\delta y}{s}}, g^{\beta y_j rs}\right)} \right)^{\frac{1}{y_j}} \cdot \right.$$

$$\left. \left( \frac{e\!\left(g^{\frac{\pi(\alpha+1+\theta)}{k}}, g^{x_j rk}\right) \cdot e\!\left(g^{\frac{x_j \delta x}{h}}, g^{(L+w_j)rh}\right)}{e\!\left(g^{\frac{\pi(1+\theta)+(L+w_j)\delta x}{t}}, g^{x_j rt}\right)} \right)^{\frac{1}{x_j}} \right\}$$

$$= C_3 \Big/ \left\{ \left( \frac{e(g^{\pi(\alpha+1+\theta)}, g^{\beta r}) \cdot e(g^{\beta \delta y}, g^{(L+w_j)r})}{e(g^{\pi(\alpha+\theta)+(L+w_j)\delta y}, g^{\beta r})} \right) \cdot \right.$$

$$\left. \left( \frac{e(g^{\pi(\alpha+1+\theta)}, g^r) \cdot e(g^{\delta x}, g^{(L+w_j)r})}{e(g^{\pi(1+\theta)+(L+w_j)\delta x}, g^r)} \right) \right\}$$

$$= m \cdot e(g_4 g_5, g)^r / (e(g, g)^{\pi \beta r} \cdot e(g, g)^{\pi \alpha r}) = m.$$

Third Embodiment

In the present embodiment, an example of omitting the encryption function shown in the second modification in the first embodiment will be described. Hereinafter, key setup processing, encryption processing, re-encryption key generation processing, re-encryption processing, and decryption processing in the present embodiment will be described. Portions common to the aforementioned first embodiment may or may not be described by using the same reference signs.

(1) Key Setup Processing

First, a public parameter generation unit 13 of a key generator 10 generates a public parameter par={λ,p, $\mathbb{G}$, $\mathbb{G}_T$,g,$g_1$,$g_2$,$g_3$,$g_4$,u,v,Sig} based on a security parameter λ stored in a key generation parameter storage unit 11 in advance or acquires the public parameter from outside (ST1).

Here, $g_3=g^\pi$ and $g_4=g_1^\pi$.

If the identification information of a re-encryption key generator 30 is i, a key generation unit 14 randomly selects elements $x_i$, $y_i$, $z_i$ of $Z_p^*$ from $Z_p^*$ and sets a private key $sk_i=(x_i,y_i,z_i)$ of the re-encryption key generator 30. Then, the key generation unit 14 generates a public key $pk_i=(X_i,Y_{1i},Z_i,Z_{1i})$ of the re-encryption key generator 30 using the private key $sk_i$ and the public parameter par.

$X_i=g^{x_i},\ Y_{1i}=g_1^{y_i},\ Z_i=g^{z_i},\ Z_{1i}=g_1^{z_i}$

Further, the key generation unit 14 generates a re-encryption key generation key $rk_i=(X_{3i},Y_{2i})$ using the private key $sk_i$ and the public parameter par (ST3).

$X_{3i}=g_3^{x_i}, Y_{2i}=g_2^{y_i}$

Similarly, if the identification information of a decryption device 50 is j, the key generation unit 14 randomly selects elements $x_j$, $y_j$, $z_j$ of $Z_p^*$ from $Z_p^*$ and sets a private key $sk_j=(x_j,y_j,z_j)$ of the decryption device 50. Then, the key generation unit 14 generates a public key $pk_j=(X_j,Y_{1j},Z_j,Z_{1j})$ of the decryption device 50 using the private key $sk_j$ and the public parameter par.

$X_j=g^{x_j}, Y_{1j}=g_1^{y_j}, Z_j=g^{z_j}, Z_{1j}=g_1^{z_j}$

Further, the key generation unit 14 generates a re-encryption key generation key $rk_j=(X_{3j},Y_{2j})$ using the private key $sk_j$ and the public parameter par (ST6).

$X_{3j}=g_3^{x_j}, Y_{2j}=g_2^{y_j}$ (2) Encryption Processing

Like in step ST21 in the first embodiment, an encryption parameter generation unit 23 of an encryption device 20 generates (ssk, svk) (ST21) and sets the verification key svk to the encrypted data $C_1$ ($C_1$=svk).

The encryption parameter generation unit 23 also generates and sends out a random number $r \in Z_p^*$ to a ciphertext generation unit 24.

The ciphertext generation unit 24 generates encrypted data $C_{2X}$, $C_{2Y}$, $C_{2Z}$, $C_{2Z1}$, $C_3$, $C_4$ below from a message $m \in G_T$ as plaintext data using the random number r, the public key $pk_i$ of the re-encryption key generator 30, and the public parameter par (ST22).

$C_{2X}=X_i^r, C_{2Y}=Y_{1i}^r, C_{2Z}=Z_i^r, C_{2Z1}=Z_{1i}^r,$ $C_3=e(g_4g_2,g)^r \cdot m, C_4=(u^{svk} \cdot v)^r$ After step ST22 is completed, like in step ST23 in the first embodiment, the ciphertext generation unit 24 generates a one-time signature σ for the encrypted data $C_3$, $C_4$ based on a signature generation function $\hat{S}$ of the public parameter par and the signature key ssk generated in step ST21 (ST23).

Thereafter, the ciphertext generation unit 24 generates ciphertext data $C_i=(C_1,C_{2X},C_{2Y},C_{2Z},C_{2Z1},C_3,C_4,\sigma)$ including all the above encrypted data $C_1$ to $C_4$ and the one-time signature σ and writes the obtained ciphertext data into a temporary data storage unit 21.

A communication unit 22 transmits the ciphertext data $C_i$ in the temporary data storage unit 21 to a re-encryption device 40 under the control of a control unit 25 (ST24).

(3) Re-Encryption Key Generation Processing

Now, assume that the decryption device 50 (in the example of FIG. 8, for example, the user A) approves that ciphertext addressed to the re-encryption key generator 30 (in the example of FIG. 8, the group administrator) is re-encrypted into ciphertext addressed to the decryption device 50 (in the example of FIG. 8, for example, the user A) (that is, the transfer of decryption right of the ciphertext to the user A). The decryption device 50 transmits the re-encryption key generation key $rk_j$ of the decryption device 50 to the re-encryption key generator 30. A communication unit 33 of the re-encryption key generator 30 acquires and writes the re-encryption key generation key $rk_j$ of the decryption device 50 into a temporary data storage unit 32 under the control of a control unit 35 (ST31).

A random number generation unit 36 generates and sends out a random number $\theta \in Z_p^*$ to a re-encryption key generation unit 34.

The re-encryption key generation unit 34 generates a re-encryption key $R_{ij}$ as shown in the following formulas using the random number θ, the private key $sk_i$ of the re-encryption key generator 30 in a private key storage unit 31, the re-encryption key generation key $rk_j$ of the decryption device 50 in the temporary data storage unit 32, and the public parameter par (ST32).

$R_{ij}=(R_{ij1},R_{ij2},R_{ij3})$ $R_{ij1}=(X_{3j} \cdot g^\theta)^{1/x_i}=g^{\frac{\pi x_j+\theta}{x_i}},$ $R_{ij2}=(Y_{2j} \cdot g^\theta)^{1/y_i}=g^{\frac{\beta y_j+\theta}{y_i}},$ $R_{ij3}=(X_{3j} \cdot Y_{2j} \cdot g^\theta)^{1/z_i}=g^{\frac{\pi x_j+\beta y_j+\theta}{z_i}}.$ In the above formulas, $g_2$ is rewritten and denoted by $g^\beta$.

(4) Re-Encryption Processing

A re-encryption processing unit 44 of the re-encryption device 40 verifies the ciphertext data $C_i$ in a temporary data storage unit 42 using the public parameter par and the public key $pk_i$ of the re-encryption key generator 30 based on the following verification formula (ST41).

$e(C_{2X},u^{C_1} \cdot v)=e(X_i,C_4),$ $e(C_{2Y},u^{C_1} \cdot v)=e(Y_{1i},C_4),$ $e(C_{2Z},u^{C_1} \cdot v)=e(Z_i,C_4),$ $e(C_{2Z1},u^{C_1} \cdot v)=e(Z_{1i},C_4),$ $\hat{V}(C_1,\sigma,(C_3,C_4))=1.$ The verification is successful if the five verification formulas shown above all hold and fails if any one of the five formulas does not hold.

If the verification is successful (or the verification processing in step ST41 is skipped), a re-encryption parameter generation unit 45 generates and sends out three random numbers s,t,k$\in Z_p^*$ to the re-encryption processing unit 44.

The re-encryption processing unit 44 generates, as shown in the following formulas, re-encrypted data $C_{2X}'$, $C_{2X}''$, $C_{2Y}'$, $C_{2Y}''$, $C_{2Z}'$, $C_{2Z}''$, $C_{2Z1}'$, $C_{2Z1}''$, $C_{5X}$, $C_{5Y}$, $C_{5Z}$ using these random numbers s, t, k, the ciphertext data $C_i$ stored in the temporary data storage unit 42, the re-encryption key $R_{ij}$, the public key $pk_i$ of the re-encryption key generator 30, and the public parameter par (ST42).

$C_{2X}' = X_i^s, C_{2X}'' = C_{2X}^s = X_i^{rs}, C_{2Y}' = Y_{1i}^t, C_{2Y}'' = C_{2Y}^t = Y_{1i}^{rt},$ $C_{2Z}' = Z_i^k, C_{2Z}'' = C_{2Z}^k = Z_i^{rk}, C_{2Z1}' = Z_{1i}^k, C_{2Z1}'' = C_{2Z1}^k = Z_{1i}^{rk},$ $C_{5X} = R_{ij1}^{\frac{1}{s}}, C_{5Y} = R_{ij2}^{\frac{1}{t}}, C_{5Z} = R_{ij3}^{\frac{1}{k}}$ After step ST42 is completed, the re-encryption processing unit 44 generates re-encrypted data $C_j=(C_1,C_{2X}',C_{2X}'',C_{2Y}',C_{2Y}'',C_{2Z}',C_{2Z}'',C_{2Z1}',C_{2Z1}'',C_{5X},C_{5Y},C_{5Z},C_3,C_4,\sigma)$ by replacing the encrypted data $C_{2X}$, $C_{2Y}$, $C_{2Z}$, $C_{2Z1}$ in the ciphertext data $C_i$ with all the above re-encrypted data $C_{2X}'$ to $C_{5Z}$ and writes the obtained re-encrypted data $C_j$ into the temporary data storage unit 42.

A communication unit 43 transmits the re-encrypted data $C_j$ in the temporary data storage unit 42 to the decryption device 50 under the control of a control unit 46 (ST43).

(5) Decryption Processing

A decryption processing unit 54 of the decryption device 50 verifies the re-encrypted data $C_j$ in a temporary data storage unit 52 using the private key $sk_j$ of the local device 50 in a private key storage unit 51 and the public parameter par in the temporary data storage unit 52 based on the following verification formulas (ST51).

$$e(C''_{2X}, u^{C_1 \cdot v}) = e(C'_{2X}, C_4),$$

$$e(C''_{2Y}, u^{C_1 \cdot v}) = e(C'_{2Y}, C_4),$$

$$e(C''_{2Z}, u^{C_1 \cdot v}) = e(C'_{2Z}, C_4),$$

$$e(C''_{2Z1}, u^{C_1 \cdot v}) = e(C'_{2Z1}, C_4),$$

$$e(C_{5Z}, C'_{2Z}) = e(C_{5X}, C'_{2X}) \cdot e(g_2, g)^{y_j},$$

$$e(C_{5Z}, C'_{2Z1}) = e(C_{5Y}, C'_{2Y}) \cdot e(g, g_4)^{y_j},$$

$$\hat{V}(C_1, \sigma, (C_3, C_4)) = 1. \qquad (b1)$$

Instead of the sixth verification formula in the formula (b1), the following verification formula may be used.

$$e(C_{5Z}, C'_{2Z1}) = e(C_{5Y}, C'_{2Y}) \cdot e(X_p, g_4).$$

In this case, the decryption processing unit 54 conducts verification using the public key $pk_j$ of the local device 50.

The verification is successful if the seven verification formulas in the formula (b1) all hold and fails if any one of the seven formulas does not hold.

If the verification is successful (or the verification processing in step ST51 is skipped), the decryption processing unit 54 decrypts the re-encrypted data $C_j$ as shown in the following formula using the private key $sk_j$ of the local device 50 in the private key storage unit 51 and the public parameter par in the temporary data storage unit 52 to obtain the message m (ST52).

$$m = C_3 \bigg/ \left\{ \left( \frac{e(C_{5Z}, C''_{2Z})}{e(C_{5X}, C''_{2X})} \right)^{\frac{1}{y_j}} \cdot \left( \frac{e(C_{5Z}, C''_{2Z1})}{e(C_{5Y}, C''_{2Y})} \right)^{\frac{1}{x_j}} \right\}$$

That the decryption result of the above formula produces m can be checked by the following calculation.

In the following calculation, $g_1$ is rewritten and denoted by $g^\alpha$ and $g_2$ is rewritten and denoted by $g^\beta$.

$$C_3 \bigg/ \left\{ \left( \frac{e(C_{5Z}, C''_{2Z})}{e(C_{5X}, C''_{2X})} \right)^{\frac{1}{y_j}} \cdot \left( \frac{e(C_{5Z}, C''_{2Z1})}{e(C_{5Y}, C''_{2Y})} \right)^{\frac{1}{x_j}} \right\}$$

$$= C_3 \bigg/ \left\{ \left( \frac{e(g^{(\pi x_j + \beta y_j + \theta)/z_j k}, g^{z_j r k})}{e(g^{(\pi x_j + \theta)/x_j s}, g^{x_j r s})} \right)^{\frac{1}{y_j}} \cdot \left( \frac{e(g^{(\pi x_j + \beta y_j + \theta)/z_j k}, g^{\alpha z_j r k})}{e(g^{(\beta y_j + \theta)/y_j t}, g^{\alpha y_j r t})} \right)^{\frac{1}{x_j}} \right\}$$

$$= C_3 \bigg/ \left\{ \left( \frac{e(g^{\pi x_j + \beta y_j + \theta}, g^T)}{e(g^{\pi x_j + \theta}, g^r)} \right)^{\frac{1}{y_j}} \cdot \left( \frac{e(g^{\pi x_j + \beta y_j + \theta}, g^{\alpha r})}{e(g^{\beta y_j + \theta}, g^{\alpha r})} \right)^{\frac{1}{x_j}} \right\}$$

$$= m \cdot e(g_4 g_2, g)^r / (e(g, g)^{\beta r} \cdot e(g, g)^{\pi \alpha r}) = m.$$

According to the present embodiment, as described above, due to the configuration of generating the re-encryption key $R_{ij}$ based on the random number $\theta$ and the re-encryption key generation key $rk_j$, effects similar to those in the first embodiment can be obtained.

Also according to the present embodiment, due to the configuration of omitting $g_5$ in the first embodiment, the data size of the public parameter and public key can be reduced when compared with the embodiment shown in the first embodiment. Also according to the present embodiment, the amount of computations needed for key setup processing can be reduced when compared with the embodiment shown in the first embodiment.

Tenth Modification

In the third embodiment, an example in which ciphertext data is generated by the encryption device 20, the ciphertext data is re-encrypted by the re-encryption device 40 to generate re-encrypted data, and the re-encrypted data is decrypted by the decryption device 50 is cited, but the third embodiment may be changed to a form in which the ciphertext data is decrypted without being re-encrypted. In this case, only the key setup processing, encryption processing, and decryption processing need to be performed. The key setup processing in the present modification is the same as the key setup processing in the third embodiment. Hereinafter, the encryption processing and the decryption processing in the present modification will be described.

The difference between the encryption processing in the present modification and the encryption processing in the third embodiment is in the last step only. To provide a description by making use of the above symbols, the identification information of the decryption device 50 is assumed to be i for the sake of convenience. In this case, the communication unit 22 of the encryption device 20 transmits the ciphertext data $C_i$ in the temporary data storage unit 21 to the decryption device 50 under the control of the control unit 25 (ST24').

The decryption device 50 verifies the ciphertext data $C_i$ generated by the encryption device 20 using the public parameter par and the private key $sk_i$ of the local device 50 based on the following verification formulas (ST51').

$$e(C_{2X}, u^{C_1 \cdot v}) = e(g, C_4)^{x_i},$$

$$e(C_{2Y}, u^{C_1 \cdot v}) = e(g_1, C_4)^{y_i},$$

$$e(C_{2Z}, u^{C_1 \cdot v}) = e(g, C_4)^{z_i},$$

$$e(C_{2Z1}, u^{C_1 \cdot v}) = e(g_1, C_4)^{z_i},$$

$$\hat{V}(C_1, \sigma, (C_3, C_4)) = 1. \qquad (b2)$$

Incidentally, the decryption device 50 may verify the ciphertext data $C_i$ generated by the encryption device 20 using the public parameter par and the public key $pk_i$ of the local device 50 in the same manner as in step ST41.

The verification is successful if the five verification formulas in the formula (b2) all hold and fails if any one of the five formulas does not hold.

If the verification is successful (or the verification processing in step ST51' is skipped), the decryption device 50 decrypts the ciphertext data $C_i$ as shown in the following formula using the private key $sk_i$ of the local device 50 and the public parameter par to obtain the message m (ST52').

$$m = C_3 \bigg/ e(g_4 g_2, C_{2X})^{\frac{1}{x_i}}$$

That the decryption result of the above formula produces m can be checked by the following calculation.

$$m \cdot e(g_4 g_2, g)^r \bigg/ e(g_4 g_2, C_{2X})^{\frac{1}{x_i}}$$

$$= m \cdot e(g_4 g_2, g)^r \Big/ e(g_4 g_2, g^{x_i r})^{\frac{1}{x_i}}$$

$$= m \cdot e(g_4 g_2, g)^r / e(g_4 g_2, g)^r = m.$$

Fourth Embodiment

In the present embodiment, an example of updating a re-encryption key in the third embodiment at certain intervals will be described. Hereinafter, key setup processing, encryption processing, re-encryption key generation processing, re-encryption processing, and decryption processing in the present embodiment will be described. Portions common to the aforementioned first embodiment or second embodiment may or may not be described by using the same reference signs.

(1) Key Setup Processing

A public parameter generation unit 13 of a key generator 10 generates a public parameter par in the same manner as in the third embodiment or acquires the parameter from outside (ST1). If the identification information of a re-encryption key generator 30 is i, a key generation unit 14 randomly selects elements $x_i$, $y_i$, $z_i$, $w_i$ of $Z_p^*$ from $Z_p^*$ and sets a private key $sk_i=(x_i,y_i,z_i,w_i)$ of the re-encryption key generator 30. Then, the key generation unit 14 generates a public key $pk_i=(X_i,Y_{1i},Z_i,Z_{1i},W_i)$ of the re-encryption key generator 30 using the private key $sk_i$ and the public parameter par.

$$X_i=g^{x_i}, Y_{1i}=g_1^{y_i}, Z_i=g^{z_i},$$

$$Z_i=g^{z_i}, W_i=g^{w_i}$$

Further, the key generation unit 14 generates a re-encryption key generation key $rk_i=(X_{3i},Y_{2i})$ using the private key $sk_i$ and the public parameter par (ST3).

$$X_{3i}=g_3^{x_i}, Y_{2i}=g_2^{y_i}$$

Similarly, if the identification information of a decryption device 50 is j, the key generation unit 14 randomly selects elements $x_j$, $y_j$, $z_j$, $w_j$ of $Z_p^*$ from $Z_p^*$ and sets a private key $sk_j=(x_j,y_j,z_j,w_j)$ of the decryption device 50. Then, the key generation unit 14 generates a public key $pk_j=(X_j,Y_{1j},Z_j,Z_{1j},W_j)$ of the decryption device 50 using the private key $sk_j$ and the public parameter par.

$$X_j=g^{x_j}, Y_{1j}=g_1^{y_j}, Z_j=g^{z_j},$$

$$Z_{1j}=g_1^{z_j}, W_j=g^{w_j}$$

Further, the key generation unit 14 generates a re-encryption key generation key $rk_j=(X_{3j},Y_{2j})$ using the private key $sk_j$ and the public parameter par (ST6).

$$X_{3j}=g_3^{x_j}, Y_{2j}=g_2^{y_j}$$

(2) Encryption Processing

Like in step ST21 in the first embodiment, an encryption parameter generation unit 23 of an encryption device 20 generates (ssk, svk) (ST21) and sets the verification key svk to the encrypted data $C_1$ ($C_1$=svk).

The encryption parameter generation unit 23 also generates and sends out a random number $r \in Z_p^*$ to a ciphertext generation unit 24.

The ciphertext generation unit 24 generates encrypted data $C_{2X}$, $C_{2Y}$, $C_{2Z}$, $C_{2Z1}$, $C_{2F}$, $C_3$, $C_4$ below from a message $m \in G_T$ as plaintext data using the random number r, the public key $pk_i$ of the re-encryption key generator 30, the public parameter par, and a time parameter L (ST22).

$$C_{2X}=X_i^r, C_{2Y}=Y_{1i}^r, C_{2Z}=Z_i^r, C_{2Z1}=Z_{1i}^r,$$

$$C_{2F}=F_i(L)^r, C_3=e(g_4 g_2,g)^r \cdot m, C_4=(u^{svk} \cdot v)^r$$

The function Fi (L) is defined as shown below.

$$F_i(L)=g^L \cdot W_i = g^{L+w_i}(L \in \mathbb{Z}_p^*)$$

After step ST22 is completed, the ciphertext generation unit 24 generates a one-time signature σ as shown in the following formula for the time parameter L and the encrypted data $C_3$, $C_4$ based on a signature generation function Ŝ of the public parameter par and the signature key ssk generated in step ST21 (ST23).

$$\sigma=\hat{S}(ssk,(L,C_3,C_4))$$

Thereafter, the ciphertext generation unit 24 generates ciphertext data $C_i=(L,C_1,C_{2X},C_{2Y},C_{2Z},C_{2Z1},C_{2F},C_3, C_4,\sigma)$ including the time parameter L, all the above encrypted data $C_1$ to $C_4$, and the one-time signature σ and writes the obtained ciphertext data into a temporary data storage unit 21.

A communication unit 22 transmits the ciphertext data $C_i$ in the temporary data storage unit 21 to a re-encryption device 40 under the control of a control unit 25 (ST24).

(3) Re-Encryption Key Generation Processing

Now, assume that the decryption device 50 (in the example of FIG. 8, for example, the user A) approves that ciphertext addressed to the re-encryption key generator 30 (in the example of FIG. 8, the group administrator) and generated by using L as the time parameter value is re-encrypted into ciphertext addressed to the decryption device 50 (in the example of FIG. 8, for example, the user A) (that is, the transfer of decryption right of the ciphertext to the user A). The decryption device 50 transmits the re-encryption key generation key $rk_j$ of the decryption device 50 to the re-encryption key generator 30. A communication unit 33 of the re-encryption key generator 30 acquires and writes the re-encryption key generation key $rk_j$ of the decryption device 50 into a temporary data storage unit 32 under the control of a control unit 35 (ST31).

A random number generation unit 36 generates and sends out three random numbers $\theta, \delta x, \delta y \in Z_p^*$ to a re-encryption key generation unit 34.

The re-encryption key generation unit 34 generates a re-encryption key $R_{ijL}$ as shown in the following formulas using the random numbers θ, δx, δy, the private key $sk_i$ of the re-encryption key generator 30 in a private key storage unit 31, the re-encryption key generation key $rk_j$ of the decryption device 50 in the temporary data storage unit 32, the public parameter par, and the time parameter L (ST32).

$$R_{ijL} = (R_{ijL1}, R_{ijL2}, R_{ijL3}, R_{ijL4}, R_{ijL5})$$

$$R_{ijL1} = (X_{3j} \cdot g^\theta)^{1/x_i} \cdot g^{(L+w_i)\delta x} = g^{\frac{\pi x_j + \theta}{x_i} + (L+w_i)\delta x},$$

$$R_{ijL2} = (Y_{2j} \cdot g^\theta)^{1/y_i} \cdot g^{(L+w_i)\delta y} = g^{\frac{\beta y_j + \theta}{y_i} + (L+w_i)\delta y},$$

$$R_{ijL3} = (X_{3j} \cdot Y_{2j} \cdot g^\theta)^{1/z_i} = g^{\frac{\pi x_j + \beta y_j + \theta}{z_i}}$$

$$R_{ijL4} = g^{x_i \delta x}, R_{ijL5} = g_1^{y_i \delta y} = g^{\alpha y_i \delta y}$$

In the above formulas, $g_1$ is rewritten and denoted by $g^\alpha$ and $g_2$ is rewritten and denoted by $g^\beta$.

(4) Re-Encryption Processing

A re-encryption processing unit 44 of the re-encryption device 40 verifies the ciphertext data $C_i$ in a temporary data storage unit 42 using the public parameter par, the time parameter L contained in the ciphertext data $C_i$ in the temporary data storage unit 42, and the public key $pk_i$ of the re-encryption key generator 30 based on the following verification formulas (ST41).

$$e(C_{2X}, u^{C_1} \cdot v) = e(X_i, C_4),$$

$$e(C_{2Y}, u^{C_1} \cdot v) = e(Y_i, C_4),$$

$$e(C_{2Z}, u^{C_1} \cdot v) = e(Z_i, C_4),$$

$$e(C_{2Z1}, u^{C_1} \cdot v) = e(Z_{1i}, C_4),$$

$$e(C_{2F}, u^{C_1} \cdot v) = e(F_i(L), C_4),$$

$$\hat{V}(C_1, \sigma, (L, C_3, C_4)) = 1.$$

The verification is successful if the six verification formulas shown above all hold and fails if any one of the six formulas does not hold.

If the verification is successful (or the verification processing in step ST41 is skipped), a re-encryption parameter generation unit 45 generates and sends out four random numbers $s, t, k, h \in Z_p^*$ to the re-encryption processing unit 44.

The re-encryption processing unit 44 generates, as shown in the following formulas, re-encrypted data $C_{2X}'$, $C_{2X}''$, $C_{2Y}'$, $C_{2Y}''$, $C_{2Z}'$, $C_{2Z}''$, $C_{2Z1}'$, $C_{2Z1}''$, $C_{2F}'$, $C_{2F}''$, $C_{5X}$, $C_{5Y}$, $C_{5Z}$, $C_{5FX}$, $C_{5FY}$ using these random numbers $s, t, k, h$, the ciphertext data $C_i$ stored in the temporary data storage unit 42, the re-encryption key $R_{ijL}$, the public key $pk_i$ of the re-encryption key generator 30, and the public parameter par (ST42).

$$C_{2X}' = X_i^s, C_{2X}'' = C_{2X}^s = X_i^{rs}, C_{2Y}' = Y_i^t, C_{2Y}'' = C_{2Y}^t = Y_{1i}^{rt},$$

$$C_{2Z}' = Z_i^k, C_{2Z}'' = C_{2Z}^k = Z_i^{rk}, C_{2Z1}' = Z_{1i}^k, C_{2Z1}'' = C_{2Z1}^k = Z_{1i}^{rk},$$

$$C_{2F}' = F_i(L)^h, C_{2F}'' = C_{2F}^h = F_i(L)^{rh}, C_{5X} = R_{ijL1}^{\frac{s}{h}},$$

$$C_{5Y} = R_{ijL2}^{\frac{1}{h}}, C_{5Z} = R_{ijL3}^{\frac{1}{k}}, C_{5FX} = R_{ijL4}^{\frac{1}{h}}, C_{5FY} = R_{ijL5}^{\frac{1}{h}}$$

After step ST42 is completed, the re-encryption processing unit 44 generates re-encrypted data $C_j = (L, C_1, C_{2X}', C_{2X}'', C_{2Y}', C_{2Y}'', C_{2Z}', C_{2Z}'', C_{2Z1}', C_{2Z1}'', C_{2F}', C_{2F}'', C_{5X}, C_{5Y}, C_{5Z}, C_{5FX}, C_{5FY}, C_3, C_4, \sigma)$ by replacing the encrypted data $C_{2X}$, $C_{2Y}$, $C_{2Z}$, $C_{2Z1}$, $C_{2F}$ in the ciphertext data $C_i$ with all the above re-encrypted data $C_{2X}'$ to $C_{5FY}$ and writes the obtained ciphertext data into the temporary data storage unit 42.

A communication unit 43 transmits the re-encrypted data $C_j$ in the temporary data storage unit 42 to the decryption device 50 under the control of a control unit 46 (ST43).

(5) Decryption Processing

A decryption processing unit 54 of the decryption device 50 verifies the re-encrypted data $C_j$ in a temporary data storage unit 52 using the private key $sk_j$ of the local device 50 in a private key storage unit 51 and the public parameter par in the temporary data storage unit 52 based on the following verification formulas (ST51).

$$e(C_{2X}'', u^{C_1} \cdot v) = e(C_{2X}', C_4),$$

$$e(C_{2Y}'', u^{C_1} \cdot v) = e(C_{2Y}', C_4),$$

$$e(C_{2Z}'', u^{C_1} \cdot v) = e(C_{2Z}', C_4),$$

$$e(C_{2Z1}'', u^{C_1} \cdot v) = e(C_{2Z1}', C_4),$$

$$e(C_{2F}'', u^{C_1} \cdot v) = e(C_{2F}', C_4),$$

$$e(C_{5Z}, C_{2Z}') \cdot e(C_{5FX}, C_{2F}') = e(C_{5X}, C_{2X}') \cdot e(g_2, g)^{y_j},$$

$$e(C_{5Z}, C_{2Z1}') \cdot e(C_{5FY}, C_{2F}') = e(C_{5Y}, C_{2Y}') \cdot e(g, g_4)^{x_j},$$

$$\hat{V}(C_1, \sigma, (L, C_3, C_4)) = 1. \quad (b3)$$

Instead of the seventh verification formula in the formula (b3), the following verification formula may be used.

$$e(C_{5Z}, C_{2Z1}') \cdot e(C_{5FY}, C_{2F}') = e(C_{5Y}, C_{2Y}') \cdot e(X_j, g_4).$$

In this case, the decryption processing unit 54 conducts verification using the public key $pk_j$ of the local device 50.

The verification is successful if the eight verification formulas in the formula (b3) all hold and fails if any one of the eight formulas does not hold.

If the verification is successful (or the verification processing in step ST51 is skipped), the decryption processing unit 54 decrypts the re-encrypted data $C_j$ as shown in the following formula using the private key $sk_j$ of the local device 50 in the private key storage unit 51 and the public parameter par in the temporary data storage unit 52 to obtain the message m (ST52).

$$m = C_3 \Big/ \left\{ \left( \frac{e(C_{5Z}, C_{2Z}'') \cdot e(C_{5FX}, C_{2F}'')}{e(C_{5X}, C_{2X}'')} \right)^{\frac{1}{y_j}} \cdot \left( \frac{e(C_{5Z}, C_{2Z1}'') \cdot e(C_{5FY}, C_{2F}'')}{e(C_{5Y}, C_{2Y}'')} \right)^{\frac{1}{x_j}} \right\}$$

That the decryption result of the above formula produces m can be checked by the following calculation.

In the following calculation, $g_1$ is rewritten and denoted by $g^\alpha$ and $g_2$ is rewritten and denoted by $g^\beta$.

$$C_3 \Big/ \left\{ \left( \frac{e(C_{5Z}, C_{2Z}'') \cdot e(C_{5FX}, C_{2F}'')}{e(C_{5X}, C_{2X}'')} \right)^{\frac{1}{y_j}} \cdot \left( \frac{e(C_{5Z}, C_{2Z1}'') \cdot e(C_{5FY}, C_{2F}'')}{e(C_{5Y}, C_{2Y}'')} \right)^{\frac{1}{x_j}} \right\}$$

$$= C_3 \Big/ \left\{ \left( \frac{e\left(g^{\frac{\pi x_j + \beta y_j + \theta}{z_j k}}, g^{z_j rk}\right) \cdot e\left(g^{\frac{z_j \delta_x}{h}}, g^{(L+w_i)rh}\right)}{e\left(g^{\frac{((\pi x_j + \theta)/x_j) + (L+w_i)\delta_x}{s}}, g^{x_j rs}\right)} \right)^{\frac{1}{y_j}} \cdot \right.$$

$$\left. \left( \frac{e\left(g^{\frac{\pi x_j + \beta y_j + \theta}{z_j k}}, g^{\alpha z_j rk}\right) \cdot e\left(g^{\frac{\alpha y_j b_y}{h}}, g^{(L+w_i)rh}\right)}{e\left(g^{\frac{((\beta y_j + \theta)/y_j) + (L+w_i)\delta_y}{t}}, g^{\alpha y_j rt}\right)} \right)^{\frac{1}{x_j}} \right\}$$

$$= C_3 \Big/ \left\{ \left( \frac{e(g^{\pi x_j + \beta y_j + \theta}, g^r) \cdot e(g^{x_j \delta_x}, g^{(L+w_i)r})}{e(g^{\pi x_j + \theta + (L+w_i)x_j \delta_x}, g^r)} \right)^{\frac{1}{y_j}} \cdot \right.$$

$$\left. \left( \frac{e(g^{\pi x_j + \beta y_j + \theta}, g^{\alpha r}) \cdot e(g^{\alpha y_j \delta_y}, g^{(L+w_i)r})}{e(g^{\beta y_j + \theta + (L+w_i)y_j \delta_y}, g^{\alpha r})} \right)^{\frac{1}{x_j}} \right\}$$

$$= m \cdot e(g_4 g_2, g)^r / (e(g, g)^{\beta r} \cdot e(g, g)^{\pi \alpha r}) = m.$$

According to the present embodiment, as described above, due to the configuration of generating the re-encryption key $R_{ijL}$ based on the random numbers $\theta$, $\delta_x$, $\delta_y$, the re-encryption key generation key $rk_j$, and the time parameter L, in addition to the effects of the third embodiment, whether to transfer the decryption right can be decided in each period so that finer access control can be exercised. Accordingly, even if the decryption right of ciphertext for the transfer source (in the example of FIG. 8, the group administrator) is once transferred to the transfer destination (in the example of FIG. 8, for example, the user A) in a certain period, it is possible not to grant the decryption right of the ciphertext for the transfer source to the relevant transfer destination, that is, the decryption right of the transfer destination (of the ciphertext for the relevant transfer source) can be invalidated in the next period and therefore, a file sharing system the convenience of which is further improved can be provided.

Also according to the present embodiment, as described above, due to the configuration of omitting $g_5$ in the second embodiment, the data size of the public parameter and public key can be reduced when compared with the embodiment shown in the second embodiment. Also according to the present embodiment, the amount of computations needed for key setup processing can be reduced when compared with the embodiment shown in the second embodiment.

Eleventh Modification

In the fourth embodiment, an example in which ciphertext data is generated by the encryption device 20, the ciphertext data is re-encrypted by the re-encryption device 40 to generate re-encrypted data, and the re-encrypted data is decrypted by the decryption device 50 is cited, but the fourth embodiment may be changed to a form in which the ciphertext data is decrypted without being re-encrypted. In this case, only the key setup processing, encryption processing, and decryption processing need to be performed. The key setup processing in the present modification is the same as the key setup processing in the fourth embodiment. Hereinafter, the encryption processing and the decryption processing in the present modification will be described.

The difference between the encryption processing in the present modification and the encryption processing in the fourth embodiment is only in the last step. To provide a description by making use of the above symbols, the identification information of the decryption device 50 is assumed to be i for the sake of convenience. In this case, the communication unit 22 of the encryption device 20 transmits the ciphertext data $C_i$ in the temporary data storage unit 21 to the decryption device 50 under the control of the control unit 25 (ST24').

The decryption device 50 verifies the ciphertext data $C_i$ generated by the encryption device 20 using the public parameter par and the private key $sk_i$ of the local device 50 based on the following verification formulas (ST51').

$$e(C_{2X}, u^{C_1} \cdot v) = e(g, C_4)^{x_i},$$

$$e(C_{2Y}, u^{C_1} \cdot v) = e(g_1, C_4)^{y_i},$$

$$e(C_{2Z}, u^{C_1} \cdot v) = e(g, C_4)^{z_i},$$

$$e(C_{2Z1}, u^{C_1} \cdot v) = e(g_1, C_4)^{z_i},$$

$$e(C_{2F}, u^{C_1} \cdot v) = e(g, C_4)^{L+w_i},$$

$$\hat{V}(C_1, \sigma, (L, C_3, C_4)) = 1.$$

Incidentally, the decryption device 50 may verify the ciphertext data $C_i$ generated by the encryption device 20 using the public parameter par and the public key $pk_i$ of the local device 50 in the same manner as in step ST41.

The verification is successful if the six verification formulas shown above all hold and fails if any one of the six formulas does not hold.

If the verification is successful (or the verification processing in step ST51' is skipped), the decryption device 50 decrypts the ciphertext data $C_i$ as shown in the following formula using the private key $sk_i$ of the local device 50 and the public parameter par to obtain the message m (ST52').

$$m = C_3 \Big/ e(g_4 g_2, C_{2X})^{\frac{1}{x_i}}$$

That the decryption result of the above formula produces m can be checked by the following calculation.

$$m \cdot e(g_4 g_2, g)^r \Big/ e(g_4 g_2, C_{2X})^{\frac{1}{x_i}}$$
$$= m \cdot e(g_4 g_2, g)^r \Big/ e(g_4 g_2, g^{x_i r})^{\frac{1}{x_i}}$$
$$= m \cdot e(g_4 g_2, g)^r / e(g_4 g_2, g)^r = m.$$

Fifth Embodiment

In the present embodiment, an example in which the server and users are honest entities and there is no possibility of collusion of a plurality of entities in the first embodiment will be described. Hereinafter, key setup processing, encryption processing, re-encryption key generation processing, re-encryption processing, and decryption processing in the present embodiment will be described. Portions common to the aforementioned first embodiment may or may not be described by using the same reference signs.

(1) Key Setup Processing

First, a public parameter generation unit 13 of a key generator 10 generates a public parameter based on a security parameter λ stored in a key parameter storage unit 11 in advance or acquires the parameter from outside (ST1).

$$\text{par} = \{\lambda, p, \mathbb{G}, \mathbb{G}_T, g, g_1, u, v, \text{Sig}\}$$

If the identification information of a re-encryption key generator 30 is i, a key generation unit 14 randomly selects an element $x_i$ of $Z_p^*$ from $Z_p^*$ and sets a private key $sk_i = x_i$ of the re-encryption key generator 30. Then, the key generation unit 14 generates a public key $pk_i = X_i$ of the re-encryption key generator 30 using the private key $sk_i$ and the public parameter par.

$$X_i = g^{x_i}$$

Further, the key generation unit 14 generates a re-encryption key generation key $rk_i = X_{1i}$ using the private key $sk_i$ and the public parameter par (ST3).

$$X_{1i} = g_1^{x_i}$$

Similarly, if the identification information of a decryption device 50 is assumed to be j, the key generation unit 14 randomly selects an element $x_j$ of $Z_p^*$ from $Z_p^*$ and sets a private key $sk_j = x_j$ of the decryption device 50. Then, the key generation unit 14 generates a public key $pk_j = X_j$ of the decryption device 50 using the private key $sk_j$ and the public parameter par.

$$X_j = g^{x_j}$$

Further, the key generation unit 14 generates a re-encryption key generation key $rk_j = X_{1j}$ using the private key $sk_j$ and the public parameter par (ST6).

$$X_{1j} = g_1^{x_j}$$

(2) Encryption Processing

Like in step ST21 in the first embodiment, an encryption parameter generation unit 23 of an encryption device 20 generates (ssk, svk) (ST21) and sets the verification key svk to the encrypted data $C_1$ ($C_1$=svk).

The encryption parameter generation unit 23 also generates and sends out a random number r∈$Z_p^*$ to a ciphertext generation unit 24.

The ciphertext generation unit 24 generates encrypted data $C_2$, $C_3$, $C_4$ below from a message m∈$G_T$ as plaintext data using the random number r, the public key $pk_i$ of the re-encryption key generator 30, and the public parameter par (ST22).

$$C_2 = X_i^r,\ C_3 = e(g_1, g)^r \cdot m,\ C_4 = (u^{svk} \cdot v)^r$$

After step ST22 is completed, like in step ST23 in the first embodiment, the ciphertext generation unit 24 generates a one-time signature σ for the encrypted data $C_3$, $C_4$ based on a signature generation function $\hat{S}$ of the public parameter par and the signature key ssk generated in step ST21 (ST23).

Thereafter, the ciphertext generation unit 24 generates ciphertext data $C_i$=($C_1$,$C_2$,$C_3$,$C_4$,σ) including all the above encrypted data $C_1$ to $C_4$ and the one-time signature σ and writes the obtained ciphertext data into a temporary data storage unit 21.

A communication unit 22 transmits the ciphertext data $C_i$ in the temporary data storage unit 21 to a re-encryption device 40 under the control of a control unit 25 (ST24).

(3) Re-Encryption Key Generation Processing

Now, assume that the decryption device 50 (in the example of FIG. 8, for example, the user A) approves that ciphertext addressed to the re-encryption key generator 30 (in the example of FIG. 8, the group administrator) is re-encrypted into ciphertext addressed to the decryption device 50 (in the example of FIG. 8, for example, the user A) (that is, the transfer of decryption right of the ciphertext to the user A). The decryption device 50 transmits the re-encryption key generation key $rk_j$ of the decryption device 50 to the re-encryption key generator 30. A communication unit 33 of the re-encryption key generator 30 acquires and writes the re-encryption key generation key $rk_j$ of the decryption device 50 into a temporary data storage unit 32 under the control of a control unit 35 (ST31).

Because there is no need to generate a random number for the generation of a re-encryption key in the present embodiment, a random number generation unit 36 of the re-encryption key generator 30 is not needed.

A re-encryption key generation unit 34 generates a re-encryption key $R_{ij}$ as shown in the following formulas using the private key $sk_i$ of the re-encryption key generator 30 in a private key storage unit 31, the re-encryption key generation key $rk_j$ of the decryption device 50 in the temporary data storage unit 32, and the public parameter par (ST32).

$$R_{ij} = X_{1j}^{1/x_i} = g_1^{\frac{x_j}{x_i}}$$

(4) Re-Encryption Processing

A re-encryption processing unit 44 of the re-encryption device 40 verifies the ciphertext data $C_i$ in a temporary data storage unit 42 using the public parameter par and the public key $pk_i$ of the re-encryption key generator 30 based on the following verification formulas (ST41)

$$e(C_2, u^{C_1} \cdot v) = e(X_i, C_4)$$

$$\hat{V}(C_1, \sigma, (C_3, C_4)) = 1.$$

The verification is successful if both verification formulas shown above hold and fails if any one of the two formulas does not hold.

If the verification is successful (or the verification processing in step ST41 is skipped), a re-encryption parameter generation unit 45 generates and sends out a random number t∈$Z_p^*$ to the re-encryption processing unit 44.

The re-encryption processing unit 44 generates, as shown in the following formulas, re-encrypted data $C_2'$, $C_2''$, $C_2'''$ using the random number t, the ciphertext data $C_i$ stored in the temporary data storage unit 42, the re-encryption key $R_{ij}$, the public key $pk_i$ of the re-encryption key generator 30, and the public parameter par (ST42).

$$C_2' = X_i^t,\ C_2'' = R_{ij}^{1/t} = g_1^{\frac{x_j}{tx_i}},\ C_2''' = C_2 = X_i^{rt}$$

After step ST42 is completed, the re-encryption processing unit 44 generates re-encrypted data $C_j$=($C_1$,$C_2'$,$C_2''$,$C_2'''$,$C_3$,$C_4$,σ) by replacing the encrypted data $C_2$ in the ciphertext data $C_i$ with all the above re-encrypted data $C_2'$ to $C_2'''$ and writes the obtained re-encrypted data $C_j$ into the temporary data storage unit 42.

A communication unit 43 transmits the re-encrypted data $C_j$ in the temporary data storage unit 42 to the decryption device 50 under the control of a control unit 46 (ST43).

(5) Decryption Processing

A decryption processing unit 54 of the decryption device 50 verifies the re-encrypted data $C_j$ in a temporary data storage unit 52 using the private key $sk_j$ of the local device 50 in a private key storage unit 51 and the public parameter par in the temporary data storage unit 52 based on the following verification formulas (ST51).

$$e(C_2', C_2'') = e(g, g_1)^{x_j},$$

$$e(C_2''', u^{C_1} \cdot v) = e(C_2', C_4),$$

$$\hat{V}(C_1, \sigma, (C_3, C_4)) = 1. \quad (c1)$$

Instead of the first verification formula in the formula (c1), the following verification formula may be used.

$$e(C_2', C_2'') = e(X_j, g_1)$$

In this case, the decryption processing unit 54 conducts verification using the public key $pk_j$ of the local device 50.

The verification is successful if the three verification formulas in the formula (c1) all hold and fails if any one of the three formulas does not hold.

If the verification is successful (or the verification processing in step ST51 is skipped), the decryption processing unit 54 decrypts the re-encrypted data $C_j$ as shown in the following formula using the private key $sk_j$ of the local device 50 in the private key storage unit 51 and the public parameter par in the temporary data storage unit 52 to obtain the message m (ST52).

$$m = C_3 / e(C_2'', C_2''')^{1/x_j}$$

That the decryption result of the above formula produces m can be checked by the following calculation.

$$C_3 \Big/ e(C_2'', C_2''')^{1/x_j} = C_3 \Big/ e\left(g_1^{\frac{x_j}{x_i}}, g^{x_i r t}\right)^{1/x_j}$$

$$= m \cdot e(g_1, g)^r \Big/ e(g_1^{x_j}, g^r)^{1/x_j} = m.$$

According to the present embodiment, as described above, due to the configuration of generating the re-encryption key $R_{ij}$ based on the re-encryption key generation key $rk_j$, the re-encryption key cannot be generated if the transfer destination (in the example of FIG. 8, for example, the user A) does not notify the transfer source (in the example of FIG. 8, the group administrator) of the re-encryption key generation key and therefore, re-encryption (that is, the transfer of ciphertext to the relevant transfer destination) without approval of the transfer destination can be prevented.

Also according to the present embodiment, as described above, due to the configuration of omitting $g_2$ to $g_5$ in the first embodiment, the data size of the public parameter, public key, re-encryption key generation key, re-encryption key, private key, ciphertext data, and re-encrypted data can be reduced when compared with the embodiment shown in the first embodiment. Also according to the present embodiment, the amount of computations needed for key setup processing, encryption processing, re-encryption key generation processing, re-encryption processing, and decryption processing can be reduced when compared with the embodiment shown in the first embodiment.

Twelfth Modification

In the fifth embodiment, an example in which ciphertext data is generated by the encryption device 20, the ciphertext data is re-encrypted by the re-encryption device 40 to generate re-encrypted data, and the re-encrypted data is decrypted by the decryption device 50 is cited, but the fifth embodiment may be changed to a form in which the ciphertext data is decrypted without being re-encrypted. In this case, only the key setup processing, encryption processing, and decryption processing need to be performed. The key setup processing in the present modification is the same as the key setup processing in the fifth embodiment. Hereinafter, the encryption processing and the decryption processing in the present modification will be described.

The difference between the encryption processing in the present modification and the encryption processing in the fifth embodiment is only in the last step. To provide a description by making use of the above symbols, the identification information of the decryption device 50 is assumed to be i for the sake of convenience. In this case, the communication unit 22 of the encryption device 20 transmits the ciphertext data $C_i$ in the temporary data storage unit 21 to the decryption device 50 under the control of the control unit 25 (ST24').

The decryption device 50 verifies the ciphertext data $C_i$ generated by the encryption device 20 using the public parameter par and the private key $sk_i$ of the local device 50 based on the following verification formulas (ST51').

$$e(C_2, u^{C_1} \cdot v) = e(g, C_4)^{x_i}$$

$$\hat{V}(C_1, \sigma, (C_3, C_4)) = 1. \quad (c2)$$

Incidentally, the decryption device 50 may verify the ciphertext data $C_i$ generated by the encryption device 20 using the public parameter par and the public key $pk_i$ of the local device 50 in the same manner as in step ST41.

The verification is successful if both verification formulas in the formula (c2) hold and fails if any one of the two formulas does not hold.

If the verification is successful (or the verification processing in step ST51' is skipped), the decryption device 50 decrypts the ciphertext data $C_i$ as shown in the following formula using the private key $sk_i$ of the local device 50 and the public parameter par to obtain the message m (ST52').

$$m = C_3 / e(C_2, g_1)^{1/x_i}$$

That the decryption result of the above formula produces m can be checked by the following calculation.

$$C_3 \Big/ e(g_1, C_2)^{\frac{1}{x_i}}$$

$$= m \cdot e(g_1, g)^r \Big/ e(g_1, g^{x_i r})^{\frac{1}{x_i}}$$

$$= m \cdot e(g_1, g)^r / e(g_1, g)^r = m.$$

Thirteenth Modification

In addition to the twelfth modification, as will be described below, the fifth embodiment may also be changed to a form in which the ciphertext data is decrypted without being re-encrypted. Also in this case, only the key setup processing, encryption processing, and decryption processing need to be performed. The key setup processing and the decryption processing in the present modification are the same as the key setup processing and the decryption processing in the fifth embodiment respectively. Hereinafter, the encryption processing and the decryption processing in the present modification will be described. In the present modification, the identification information of the decryption device 50 is assumed to be j.

Like in step ST21 in the first embodiment, the encryption parameter generation unit 23 of the encryption device 20 generates (ssk, svk) (ST21') and sets the verification key svk to the encrypted data $C_1$ ($C_1$=svk).

The encryption parameter generation unit 23 also generates and sends out two random numbers $r, t \in Z_p^*$ to the ciphertext generation unit 24.

The ciphertext generation unit 24 generates encrypted data $C_2'$, $C_2''$, $C_2'''$, $C_3$, $C_4$ below from a message $m \in G_T$ as plaintext data using the random numbers r, t, the public key $pk_j$ of the decryption device 50, and the public parameter (ST22').

$$C_2' = X_j^t, \ C_2'' = g_1^{1/t}, \ C_2''' = X_j^{rt},$$

$$C_3 = e(g_1, g)^r \cdot m, \ C_4 = (u^{svk} \cdot v)^r$$

After step ST22' is completed, the ciphertext generation unit 24 generates a one-time signature σ in the same manner as in step ST23 (ST23').

Thereafter, the ciphertext generation unit 24 generates ciphertext data $C_j = (C_1, C_2', C_2'', C_2''', C_3, C_4, \sigma)$ including all the above encrypted data $C_1$ to $C_4$ and the one-time signature σ and writes the obtained ciphertext data into the temporary data storage unit 21.

The communication unit 22 transmits the ciphertext data $C_j$ in the temporary data storage unit 21 to the decryption device 50 under the control of the control unit 25 (ST24').

The decryption device 50 verifies the ciphertext data $C_j$ generated by the encryption device 20 in the same manner as in step ST51 in the fifth embodiment (ST51').

If the verification is successful (or the verification processing in step ST51' is skipped), the decryption device 50 decrypts the ciphertext data $C_j$ as shown in the following formula using the private key $sk_j$ of the local device 50 and the public parameter par to obtain the message m (ST52').

$$m = C_3/e(C''_2, C'''_2)^{1/x_j}$$

That the decryption result of the above formula produces m can be checked by the following calculation.

$$C_3 / e(C''_2, C'''_2)^{1/x_j} = C_3 / e(g_1^{1/t}, g^{x_j r t})^{1/x_j}$$
$$= m \cdot e(g_1, g)^r / e(g_1, g^r) = m.$$

Sixth Embodiment

In the present embodiment, an example of updating a re-encryption key in the fifth embodiment at certain intervals will be described. Hereinafter, key setup processing, encryption processing, re-encryption key generation processing, re-encryption processing, and decryption processing in the present embodiment will be described. Portions common to the aforementioned first embodiment or second embodiment may or may not be described by using the same reference signs.

(1) Key setup processing

A public parameter generation unit 13 of a key generator 10 generates a public parameter par in the same manner as in the fifth embodiment or acquires the parameter from outside (ST1). If the identification information of a re-encryption key generator 30 is i, a key generation unit 14 randomly selects elements $x_i$, $y_i$ of $Z_p^*$ from $Z_p^*$ and sets a private key $sk_i = (x_i, y_i)$ of the re-encryption key generator 30. Then, the key generation unit 14 generates a public key $pk_i = (X_i, Y_i)$ of the re-encryption key generator 30 using the private key $sk_i$ and the public parameter par.

$$X_i = g^{x_i}, Y_i = g^{y_i}$$

Further, the key generation unit 14 generates a re-encryption key generation key $rk_i = X_{1i}$ using the private key $sk_i$ and the public parameter par (ST3).

$$X_{1i} = g_1^{x_i}$$

Similarly, if the identification information of a decryption device 50 is assumed to be j, the key generation unit 14 randomly selects elements $x_j$, $y_j$ of $Z_p^*$ from $Z_p^*$ and sets a private key $sk_j = (x_j, y_j)$ of the decryption device 50. Then, the key generation unit 14 generates a public key $pk_j = (X_j, Y_j)$ of the decryption device 50 using the private key $sk_j$ and the public parameter par.

$$X_j = g^{x_j}, Y_j = g^{y_j}$$

Further, the key generation unit 14 generates a re-encryption key generation key $rk_j = X_{1j}$ using the private key $sk_j$ and the public parameter par (ST6).

$$X_{1j} = g_1^{x_j}$$

(2) Encryption Processing

Like in step ST21 in the first embodiment, an encryption parameter generation unit 23 of an encryption device 20 generates (ssk, svk) (ST21) and sets the verification key svk to the encrypted data $C_0$ ($C_0 = svk$).

The encryption parameter generation unit 23 also generates and sends out a random number $s \in Z_p^*$ to a ciphertext generation unit 24.

The ciphertext generation unit 24 generates encrypted data $C_1, C_2, C_3, C_4$ below from a message $m \in G_T$ as plaintext data using the random number s, the public key $pk_i$ of the re-encryption key generator 30, the public parameter par, and a time parameter L (ST22).

$$C_1 = X_i^s, C_2 = F_i(L)^s,$$

$$C_3 = e(g_1, g)^s \cdot m, C_4 = (u^{svk} \cdot v)^s$$

The function $F_i(L)$ is defined as shown below.

$$F_i(L) = g^L \cdot Y_i = g^{L+y_i} (L \in \mathbb{Z}_p^*)$$

After step ST22 is completed, the ciphertext generation unit 24 generates a one-time signature σ for the time parameter L and the encrypted data $C_3, C_4$ based on a signature generation function $\hat{S}$ of the public parameter par and the signature key ssk generated in step ST21 (ST23).

$$\sigma = \hat{S}(ssk, (L, C_3, C_4))$$

Thereafter, the ciphertext generation unit 24 generates ciphertext data $C_i = (L, C_0, C_1, C_2, C_3, C_4, \sigma)$ including the time parameter L, all the above encrypted data $C_0$ to $C_4$ and the one-time signature σ and writes the obtained ciphertext data into a temporary data storage unit 21.

A communication unit 22 transmits the ciphertext data $C_i$ in the temporary data storage unit 21 to a re-encryption device 40 under the control of a control unit 25 (ST24).

(3) Re-Encryption Key Generation Processing

Now, assume that the decryption device 50 (in the example of FIG. 8, for example, the user A) approves that ciphertext addressed to the re-encryption key generator 30 (in the example of FIG. 8, the group administrator) and generated by using L as the time parameter value is re-encrypted into ciphertext addressed to the decryption device 50 (in the example of FIG. 8, for example, the user A) (that is, the transfer of decryption right of the ciphertext to the user A). The decryption device 50 transmits the re-encryption key generation key $rk_j$ of the decryption device 50 to the re-encryption key generator 30. A communication unit 33 of the re-encryption key generator 30 acquires and writes the re-encryption key generation key $rk_j$ of the decryption device 50 into a temporary data storage unit 32 under the control of a control unit 35 (ST31).

A random number generation unit 36 generates and sends out a random number $r \in Z_p^*$ to a re-encryption key generation unit 34.

The re-encryption key generation unit 34 generates a re-encryption key $R_{ijL}$ as shown in the following formulas using the random number r, the private key $sk_i$ of the re-encryption key generator 30 in a private key storage unit 31, the re-encryption key generation key $rk_j$ of the decryption device 50 in the temporary data storage unit 32, the public parameter par, and the time parameter L (ST32).

$$R_{ijL} = (A_{ijL}, B_{ijL})$$

$$A_{ijL} = X_{1j}^{1/x_i} \cdot (g^{L+y_i})^r, B_{ijL} = g^{x_i r}$$

(4) Re-Encryption Processing

A re-encryption processing unit 44 of the re-encryption device 40 verifies the ciphertext data $C_i$ in a temporary data storage unit 42 using the public parameter par, the time parameter L contained in the ciphertext data $C_i$ in the temporary data storage unit 42, and the public key $pk_i$ of the re-encryption key generator 30 based on the following verification formulas (ST41).

$$e(X_i,C_4)=e(C_1,u^{C_0}\cdot v),$$

$$e(X_i,C_2)=e(C_1,F_i(L)),$$

$$\hat{V}(C_0,\sigma,(L,C_3,C_4))=1.$$

The verification is successful if the three verification formulas shown above all hold and fails if any one of the three formulas does not hold.

If the verification is successful (or the verification processing in step ST41 is skipped), a re-encryption parameter generation unit 45 generates and sends out two random numbers $t_1, t_2 \in Z_p^*$ to the re-encryption processing unit 44.

The re-encryption processing unit 44 generates, as shown in the following formulas, re-encrypted data $C_1', C_1'', C_1''', C_2', C_2'', C_2'''$ using the random numbers $t_1, t_2$, the ciphertext data $C_i$ stored in the temporary data storage unit 42, the re-encryption key $R_{ijL}$, the public key $pk_i$ of the re-encryption key generator 30, and the public parameter par (ST42).

$$C'_1=X_i^{t_1},\ C''_1=(A_{ijL})^{1/t_1},\ C'''_1=C_1^{t_1}=X_i^{st_1},$$

$$C'_2=F_i(L)^{t_2},\ C''_2=B_{ijL}^{1/t_2},\ C'''_2=C_2^{t_2}=F_i(L)^{st_2}$$

After step ST42 is completed, the re-encryption processing unit 44 generates re-encrypted data $C_j=(L,C_0,C_1',C_1'',C_1''',C_2',C_2'',C_2''',C_3,C_4,\sigma)$ by replacing the encrypted data $C_1, C_2$ in the ciphertext data $C_i$ with all the above re-encrypted data $C_1'$ to $C_2'''$ and writes the obtained ciphertext data into the temporary data storage unit 42.

A communication unit 43 transmits the re-encrypted data $C_j$ in the temporary data storage unit 42 to the decryption device 50 under the control of a control unit 46 (ST43).

(5) Decryption Processing

A decryption processing unit 54 of the decryption device 50 verifies the re-encrypted data $C_j$ in a temporary data storage unit 52 using the private key $sk_j$ of the local device 50 in a private key storage unit 51 and the public parameter par in the temporary data storage unit 52 based on the following verification formulas (ST51).

$$e(C'''_1,u^{C_0}\cdot v)=e(C'_1,C_4),$$

$$e(C'''_2,u^{C_0}\cdot v)=e(C'_2,C_4),$$

$$e(C'_1,C''_1)=e(g,g_1)^{x_j}\cdot e(C'_2,C''_2),$$

$$\hat{V}(C_0,\sigma,(L,C_3,C_4))=1. \qquad (c3)$$

Instead of the third verification formula in the formula (c3), the following verification formula may be used.

$$e(C'_1,C''_1)=e(X_j,g_1)\cdot e(C'_2,C''_2),$$

In this case, the decryption processing unit 54 conducts verification using the public key $pk_j$ of the local device 50.

The verification is successful if the four verification formulas in the formula (c3) all hold and fails if any one of the four formulas does not hold.

If the verification is successful (or the verification processing in step ST51 is skipped), the decryption processing unit 54 decrypts the re-encrypted data $C_j$ as shown in the following formula using the private key $sk_j$ of the local device 50 in the private key storage unit 51 and the public parameter par in the temporary data storage unit 52 to obtain the message m (ST52).

$$m=C_3\cdot (e(C''_2,C'''_2)/e(C''_1,C'''_1))^{1/x_j}.$$

That the decryption result of the above formula produces m can be checked by the following calculation.

$$C_3\cdot\left\{e(g^{x_ir/t_2},F_i(L)^{st_2})\Big/e\left(\left(g_1^{x_j/x_i}\cdot F_i(L)^r\right)^{1/t_1},g^{sx_it_1}\right)\right\}^{1/x_j}$$

$$=C_3\cdot\left\{e(g^{x_ir},F_i(L)^s)\Big/e\left(g_1^{x_j/x_i}\cdot F_i(L)^r,g^{sx_i}\right)\right\}^{1/x_j}$$

$$=C_3\cdot\left\{e(g^{x_ir},F_i(L)^s)\Big/e\left(g_1^{x_j}\cdot F_i(L)^{x_ir},g^s\right)\right\}^{1/x_j}$$

$$=m\cdot e(g_1,g)^s\cdot\left\{1\Big/e(g_1^{x_j},g^s)\right\}^{1/x_j}=m.$$

According to the present embodiment, as described above, due to the configuration of generating the re-encryption key $R_{ijL}$ based on the random number r, the re-encryption key generation key $rk_j$, and the time parameter L, in addition to the effects of the fifth embodiment, whether to transfer the decryption right can be decided in each period so that finer access control can be exercised. Accordingly, even if the decryption right of ciphertext for the transfer source (in the example of FIG. 8, the group administrator) is once transferred to the transfer destination (in the example of FIG. 8, for example, the user A) in a certain period, it is possible not to grant the decryption right of the ciphertext for the transfer source to the relevant transfer destination, that is, the decryption right of the transfer destination (of the ciphertext for the relevant transfer source) can be invalidated in the next period and therefore, a file sharing system whose convenience is further improved can be provided.

Also according to the present embodiment, as described above, due to the configuration of omitting $g_2$ to $g_5$ in the second embodiment, the data size of the public parameter, public key, re-encryption key generation key, re-encryption key, private key, ciphertext data, and re-encrypted data can be reduced when compared with the embodiment shown in the second embodiment. Also according to the present embodiment, the amount of computations needed for key setup processing, encryption processing, re-encryption key generation processing, re-encryption processing, and decryption processing can be reduced when compared with the embodiment shown in the second embodiment.

Fourteenth Modification

In the sixth embodiment, an example in which ciphertext data is generated by the encryption device 20, the ciphertext data is re-encrypted by the re-encryption device 40 to generate re-encrypted data, and the re-encrypted data is decrypted by the decryption device 50 is cited, but the sixth embodiment may be changed to a form in which the ciphertext data is decrypted without being re-encrypted. In this case, only the key setup processing, encryption processing, and decryption processing need to be performed. The key setup processing in the present modification is the same as the key setup processing in the sixth embodiment. Hereinafter, the encryption processing and the decryption processing in the present modification will be described.

The difference between the encryption processing in the present modification and the encryption processing in the sixth embodiment is only in the last step. To provide a description by making use of the above symbols, the identification information of the decryption device 50 is assumed to be i for the sake of convenience. In this case, the communication unit 22 of the encryption device 20 transmits the ciphertext data $C_i$ in the temporary data storage unit 21 to the decryption device 50 under the control of the control unit 25 (ST24').

The decryption device 50 verifies the ciphertext data $C_i$ generated by the encryption device 20 using the public parameter par and the private key $sk_i$ of the local device 50 based on the following verification formulas (ST51').

$$e(g, C_4)^{x_i} = e(C_1, u^{C_0} \cdot v),$$

$$e(g, C_2)^{x_i} = e(C_1, g)^{L+y_i},$$

$$\hat{V}(C_0, \sigma, (L, C_3, C_4)) = 1. \quad \text{(c4)}$$

Incidentally, the decryption device 50 may verify the ciphertext data $C_i$ generated by the encryption device 20 using the public parameter par and the public key $pk_i$ of the local device 50 in the same manner as in step ST41.

The verification is successful if the three verification formulas in the formula (c4) all hold and fails if any one of the three formulas does not hold.

If the verification is successful (or the verification processing in step ST51' is skipped), the decryption device 50 decrypts the ciphertext data $C_i$ as shown in the following formula using the private key $sk_i$ of the local device 50 and the public parameter par to obtain the message m (ST52').

$$m = C_3 \bigg/ e(C_1, g_1)^{\frac{1}{x_i}}$$

That the decryption result of the above formula produces m can be checked by the following calculation.

$$C_3 \bigg/ e(C_1, g_1)^{\frac{1}{x_i}}$$
$$= m \cdot e(g_1, g)^s \bigg/ e(g^{x_i s}, g_1)^{\frac{1}{x_i}}$$
$$= m \cdot e(g_1, g)^s / e(g, g_1)^s$$

Fifteenth Modification

In addition to the fourteenth modification, as will be described below, the sixth embodiment may also be changed to a form in which the ciphertext data is decrypted without being re-encrypted. Also in this case, only the key setup processing, encryption processing, and decryption processing need to be performed. The key setup processing and the decryption processing in the present modification are the same as the key setup processing and the decryption processing in the sixth embodiment respectively. Hereinafter, the encryption processing and the decryption processing in the present modification will be described. In the present modification, the identification information of the decryption device 50 is assumed to be j.

Like in step ST21 in the first embodiment, the encryption parameter generation unit 23 of the encryption device 20 generates (ssk, svk) (ST21') and sets the verification key svk to the encrypted data $C_0$ ($C_0$=svk).

The encryption parameter generation unit 23 also generates and sends out two random numbers $t_1, t_2 \in Z_p^*$ to the ciphertext generation unit 24.

The ciphertext generation unit 24 generates encrypted data $C_1', C_1'', C_1''', C_2', C_2'', C_2''', C_3, C_4$ below from a message $m \in G_T$ as plaintext data using the random numbers $t_1, t_2$, the public key $pk_j$ of the decryption device 50, the public parameter, and the time parameter L (ST22').

$$C'_1 = X_j^{t_1}, \quad C''_1 = (F_j(L) \cdot g_1)^{1/t_1}, \quad C'''_1 = X_j^{st_1},$$

$$C'_2 = F_j(L)^{t_2}, \quad C''_2 = X_j^{1/t_2}, \quad C'''_2 = F_j(L)^{st_2},$$

$$C_3 = e(g_1, g)^s \cdot m, \quad C_4 = (u^{svk} \cdot v)^s$$

After step ST22' is completed, the ciphertext generation unit 24 generates a one-time signature σ in the same manner as in step ST23.

Thereafter, the ciphertext generation unit 24 generates ciphertext data $C_j=(L, C_0, C_1', C_1'', C_1''', C_2', C_2'', C_2''', C_3, C_4, \sigma)$ including the time parameter L, all the above encrypted data $C_0$ to $C_4$ and the one-time signature σ and writes the obtained ciphertext data into the temporary data storage unit 21.

The communication unit 22 transmits the ciphertext data $C_j$ in the temporary data storage unit 21 to the decryption device 50 under the control of the control unit 25 (ST24').

The decryption device 50 verifies the ciphertext data $C_j$ generated by the encryption device 20 in the same manner as in step ST51 (ST51'). If the verification is successful (or the verification processing in step ST51' is skipped), the decryption device 50 decrypts the ciphertext data $C_j$ as shown in the following formula using the private key $sk_j$ and the public parameter par to obtain the message m (ST52').

$$m = C_3 \cdot (e(C''_2, C'''_2)/e(C''_1, C'''_1))^{1/x_j}.$$

That the decryption result of the above formula produces m can be checked by the following calculation.

$$C_3 \cdot \{e(C''_2, C'''_2)e(C''_1, C'''_1)\}^{1/x_j}$$
$$= C_3 \cdot \{e(g^{x_j/t_2}, F_j(L)^{st_2})e((F_j(L) \cdot g_1)^{1/t_1}, g^{sx_j t_1})\}^{1/x_j}$$
$$= C_3 \cdot \{e(g^{x_j}, F_j(L)^s)e(F_j(L) \cdot g_1, g^{sx_j})\}^{1/x_j}$$
$$= m \cdot e(g_1, g)^s \cdot (1/e(g_1, g^{sx_j}))^{1/x_j} = m.$$

Seventh Embodiment

In the present embodiment, an example of omitting a one-time signature in the first embodiment will be described. Hereinafter, key setup processing, encryption processing, re-encryption key generation processing, re-encryption processing, and decryption processing in the present embodiment will be described. Portions common to the aforementioned first embodiment may or may not be described by using the same reference signs.

(1) Key Setup Processing

First, a public parameter generation unit 13 of a key generator 10 generates a public parameter $$\text{par}=\{\lambda, p, \mathbb{G}, \mathbb{G}_T, g, g_1, g_2, g_3, g_4, g_5, u, v, H\}$$

based on a security parameter λ stored in a key parameter storage unit 11 in advance or acquires the parameter from outside (ST1).

Here, $g_3$ is rewritten and denoted by $g^\pi$, $g_4$ is rewritten and denoted by $g_1^\pi$, and $g_5$ is rewritten and denoted by $g_2^\pi$. H is a hash function defined by the following formula.

$$H: \mathbb{G}^4 \times \mathbb{G}_T \to \mathbb{Z}_p^*$$

If the identification information of a re-encryption key generator 30 is i, a key generation unit 14 randomly selects elements $x_i, y_i, z_i$ of $Z_p^*$ from $Z_p^*$ and sets a private key $sk_i=(x_i, y_i, z_i)$ of the re-encryption key generator 30. Then, the key generation unit 14 generates a public key $pk_i=(X_i, Y_{1i},$ $Y_{2i}, Z_i, Z_{1i}$) of the re-encryption key generator 30 using the private key $sk_i$ and the public parameter par.

$$X_i = g^{x_i}, Y_{1i} = g_1^{y_i}, Y_{2i} = g_2^{y_i},$$

$$Z_i = g^{z_i}, Z_{1i} = g_1^{z_i}$$

If verification processing using a formula (d3) described later is not performed, data $Y_{2i}$ may be omitted. That is, the public key $pk_i$ only needs to include data $X_i, Y_{1i}, Z_i, Z_{1i}$.

Further, the key generation unit 14 generates a re-encryption key generation key $rk_i = (X_{3i}, Y_{5i})$ using the private key $sk_i$ and the public parameter par (ST3).

$$X_{3i} = g_3^{x_i}, Y_{5i} = g_5^{y_i}$$

Similarly, if the identification information of a decryption device 50 is assumed to be j, the key generation unit 14 randomly selects elements $x_j, y_j, z_j$ of $Z_p^*$ from $Z_p^*$ and sets a private key $sk_j = (x_j, y_j, z_j)$ of the decryption device 50. Then, the key generation unit 14 generates a public key $pk_j = (X_j, Y_{1j}, Y_{2j}, Z_j, Z_{1j})$ of the decryption device 50 using the private key $sk_j$ and the public parameter par.

$$X_j = g^{x_j}, Y_{1j} = g_1^{y_j}, Y_{2j} = g_2^{y_j},$$

$$Z_j = g^{z_j}, Z_{1j} = g_1^{z_j}$$

If, similarly as described above, the verification processing using a formula (d3) described later is not performed, data $Y_{2j}$ may be omitted. That is, the public key $pk_j$ only needs to include data $X_j, Y_{1j}, Z_j, Z_{1j}$.

Further, the key generation unit 14 generates a re-encryption key generation key $rk_j = (X_{3j}, Y_{5j})$ using the private key $sk_j$ and the public parameter par (ST6).

$$X_{3j} = g_3^{x_j}, Y_{5j} = g_5^{y_j}$$

(2) Encryption Processing

No one-time signature is used in the present embodiment and therefore, processing corresponding to step ST21 and step ST23 in the first embodiment is not performed.

An encryption parameter generation unit 23 of an encryption device 20 generates and sends out a random number $r \in Z_p^*$ to a ciphertext generation unit 24.

The ciphertext generation unit 24 generates encrypted data $C_{2X}, C_{2Y}, C_{2Z}, C_{2Z1}, C_3, C_4$ below from a message $m \in G_T$ as plaintext data using the random number r, the public key $pk_i$ of the re-encryption key generator 30, and the public parameter par (ST22).

$$C_{2X} = X_i^r, C_{2Y} = Y_{1i}^r, C_{2Z} = Z_i^r, C_{2Z1} = Z_{1i}^r,$$

$$C_3 = e(g_4, g_5, g)^r \cdot m,$$

$$C_4 = (u^{H(C_{2X}, C_{2Y}, C_{2Z}, C_{2Z1}, C_3)} \cdot v)^r$$

After step ST22 is completed, the ciphertext generation unit 24 generates ciphertext data $C_i = (C_{2X}, C_{2Y}, C_{2Z}, C_{2Z1}, C_3, C_4)$ including all the above encrypted data $C_{2X}$ to $C_4$ and writes the obtained ciphertext data into a temporary data storage unit 21.

A communication unit 22 transmits the ciphertext data $C_i$ in the temporary data storage unit 21 to a re-encryption device 40 under the control of a control unit 25 (ST24).

(3) Re-Encryption Key Generation Processing

Now, assume that the decryption device 50 (in the example of FIG. 8, for example, the user A) approves that ciphertext addressed to the re-encryption key generator 30 (in the example of FIG. 8, the group administrator) is re-encrypted into ciphertext addressed to the decryption device 50 (in the example of FIG. 8, for example, the user A) (that is, the transfer of decryption right of the ciphertext to the user A). The decryption device 50 transmits the re-encryption key generation key $rk_j$ of the decryption device 50 to the re-encryption key generator 30. A communication unit 33 of the re-encryption key generator 30 acquires and writes the re-encryption key generation key $rk_j$ of the decryption device 50 into a temporary data storage unit 32 under the control of a control unit 35 (ST31).

A random number generation unit 36 generates and sends out a random number $\theta \in Z_p^*$ to a re-encryption key generation unit 34.

The re-encryption key generation unit 34 generates a re-encryption key $R_{ij}$ as shown in the following formulas using the random number $\theta$, the private key $sk_i$ of the re-encryption key generator 30 in a private key storage unit 31, the re-encryption key generation key $rk_j$ of the decryption device 50 in the temporary data storage unit 32, and the public parameter par (ST32).

$$R_{ij} = (R_{ij1}, R_{ij2}, R_{ij3})$$

$$R_{ij1} = (X_{3j} \cdot g_3^\theta)^{1/x_i} = g^{\frac{\pi(x_j + \theta)}{x_i}},$$

$$R_{ij2} = (Y_{5j} \cdot g_3^\theta)^{1/y_i} = g^{\frac{\pi(\beta y_j + \theta)}{y_i}},$$

$$R_{ij3} = (X_{3j} \cdot Y_{5j} \cdot g_3^\theta)^{1/z_i} = g^{\frac{\pi(x_j + \beta y_j + \theta)}{z_i}}.$$

In the above formulas, $g_2$ is rewritten and denoted by $g^\beta$.

(4) Re-Encryption Processing

A re-encryption processing unit 44 of the re-encryption device 40 verifies the ciphertext data $C_i$ in a temporary data storage unit 42 using the public parameter par and the public key $pk_i$ of the re-encryption key generator 30 based on the following verification formulas (ST41).

$$e(C_{2X}, u^{H(C_{2X}, C_{2Y}, C_{2Z}, C_{2Z1}, C_3)} \cdot v) = e(X_i, C_4),$$

$$e(C_{2Y}, u^{H(C_{2X}, C_{2Y}, C_{2Z}, C_{2Z1}, C_3)} \cdot v) = e(Y_{1i}, C_4),$$

$$e(C_{2Z}, u^{H(C_{2X}, C_{2Y}, C_{2Z}, C_{2Z1}, C_3)} \cdot v) = e(Z_i, C_4),$$

$$e(C_{2Z1}, u^{H(C_{2X}, C_{2Y}, C_{2Z}, C_{2Z1}, C_3)} \cdot v) = e(Z_{1i}, C_4).$$

The verification is successful if the four verification formulas shown above all hold and fails if any one of the four formulas does not hold.

If the verification is successful (or the verification processing in step ST41 is skipped), a re-encryption parameter generation unit 45 generates and sends out three random numbers $s, t, k \in Z_p^*$ to the re-encryption processing unit 44.

The re-encryption processing unit 44 generates, as shown in the following formulas, re-encrypted data $C_{2X}', C_{2X}'', C_{2Y}', C_{2Y}'', C_{2Z}', C_{2Z}'', C_{2Z1}', C_{2Z1}'', C_{5X}, C_{5Y}, C_{5Z}$ using these random numbers s,t,k, the ciphertext data $C_i$ stored in the temporary data storage unit 42, the re-encryption key $R_{ij}$, the public key $pk_i$ of the re-encryption key generator 30, and the public parameter par (ST42).

$$C_{2X}' = X_i^s, C_{2X}'' = C_{2X}^s = X_i^{rs}, C_{2Y}' = Y_{1i}^t, C_{2Y}'' = C_{2Y}^t = Y_{1i}^{rt},$$

$$C_{2Z}' = Z_i^k, C_{2Z}'' = Z_i^{rk}, C_{2Z1}' = Z_{1i}^k, C_{2Z1}'' = C_{2Z1}^k = Z_{1i}^{rk},$$

$$C_{5X} = R_{ij1}^{\frac{1}{s}}, C_{5Y} = R_{ij2}^{\frac{1}{t}}, C_{5Z} = R_{ij3}^{\frac{1}{k}}$$

After step ST42 is completed, the re-encryption processing unit 44 generates re-encrypted data $C_j = (C_{2X}', C_{2X}'', C_{2Y}',$ $C_{2Y}''$, $C_{2Z}'$, $C_{2Z}''$, $C_{2Z1}'$, $C_{2Z1}''$, $C_{2X}$, $C_{2Y}$, $C_{2Z}$, $C_{2Z1}$, $C_3$, $C_4$, $C_{5X}$, $C_{5Y}$, $C_{5Z}$, i) by adding all the above re-encrypted data $C_{2X}'$ to $C_{5Z}$ and the identification information i of the re-encryption key generator 30 to the ciphertext data $C_i$ and writes the obtained re-encrypted data $C_j$ into the temporary data storage unit 42.

A communication unit 43 transmits the re-encrypted data $C_j$ in the temporary data storage unit 42 to the decryption device 50 under the control of a control unit 46 (ST43).

(5) Decryption Processing

A decryption processing unit 54 of the decryption device 50 verifies the re-encrypted data $C_j$ in a temporary data storage unit 52 using the private key $sk_j$ of the local device 50 in a private key storage unit 51, the public parameter par in the temporary data storage unit 52, and the public key $pk_i$ of the re-encryption key generator 30 identified by the identification information i of the re-encryption key generator 30 contained in the re-encrypted data $C_j$ in the temporary data storage unit 52 based on the following verification formulas (ST51).

$$e(C_{2X}'', u^{H(C_{2X}, C_{2Y}, C_{2Z}, C_{2Z1}, C_3)} \cdot v) = e(C_{2X}', C_4),$$

$$e(C_{2Y}'', u^{H(C_{2X}, C_{2Y}, C_{2Z}, C_{2Z1}, C_3)} \cdot v) = e(C_{2Y}', C_4),$$

$$e(C_{2Z}'', u^{H(C_{2X}, C_{2Y}, C_{2Z}, C_{2Z1}, C_3)} \cdot v) = e(C_{2Z}', C_4),$$

$$e(C_{2Z1}'', u^{H(C_{2X}, C_{2Y}, C_{2Z}, C_{2Z1}, C_3)} \cdot v) = e(C_{2Z1}', C_4),$$

$$e(C_{5Z}, C_{2Z}') = e(C_{5X}, C_{2X}') \cdot e(g_2, g_3)^{y_j},$$

$$e(C_{5Z}, C_{2Z1}') = e(C_{5Y}, C_{2Y}') \cdot e(g, g_4)^{x_j},$$

$$e(C_{2X}, u^{H(C_{2X}, C_{2Y}, C_{2Z}, C_{2Z1}, C_3)} \cdot v) = e(X_i, C_4),$$

$$e(C_{2Y}, u^{H(C_{2X}, C_{2Y}, C_{2Z}, C_{2Z1}, C_3)} \cdot v) = e(Y_{1i}, C_4),$$

$$e(C_{2Z}, u^{H(C_{2X}, C_{2Y}, C_{2Z}, C_{2Z1}, C_3)} \cdot v) = e(Z_i, C_4),$$

$$e(C_{2Z1}, u^{H(C_{2X}, C_{2Y}, C_{2Z}, C_{2Z1}, C_3)} \cdot v) = e(Z_{1i}, C_4). \quad (d1)$$

Instead of the fifth verification formula in the formula (d1), the following verification formula may be used.

$$e(C_{5Z}, C_{2Z}') = e(C_{5X}, C_{2X}') \cdot e(g_5, g)^{y_j}. \quad (d2)$$

Also, instead of the fifth verification formula in the formula (d1), the following verification formula may be used.

$$e(C_{5Z}, C_{2Z}') = e(C_{5X}, C_{2X}') \cdot e(Y_{2j}, g^3). \quad (d3)$$

In this case, the decryption processing unit 54 conducts verification using the public key $pk_j$ of the local device 50.

Also, instead of the sixth verification formula in the formula (d1), the following verification formula may be used.

$$e(C_{5Z}, C_{2Z1}') = e(C_{5Y}, C_{2Y}') \cdot e(g_3, g_1)^{y_j}. \quad (d4)$$

Also, instead of the sixth verification formula in the formula (d1), the following verification formula may be used.

$$e(C_{5Z}, C_{2Z1}') = e(C_{5Y}, C_{2Y}') \cdot e(X_j, g_4). \quad (d5)$$

In this case, the decryption processing unit 54 conducts verification using the public key $pk_j$ of the local device 50.

The verification is successful if the 10 verification formulas in the formula (d1) all hold and fails if any one of the 10 formulas does not hold.

If the verification is successful (or the verification processing in step ST51 is skipped), the decryption processing unit 54 decrypts the re-encrypted data $C_j$ as shown in the following formula using the private key $sk_j$ of the local device 50 in the private key storage unit 51 and the public parameter par in the temporary data storage unit 52 to obtain the message m (ST52).

$$m = C_3 \Big/ \left\{ \left( \frac{e(C_{5Z}, C_{2Z}'')}{e(C_{5X}, C_{2X}'')} \right)^{\frac{1}{y_j}} \cdot \left( \frac{e(C_{5Z}, C_{2Z1}'')}{e(C_{5Y}, C_{2Y}'')} \right)^{\frac{1}{x_j}} \right\}$$

That the decryption result of the above formula produces m can be checked by the following calculation.

In the following calculation, $g_1$ is rewritten and denoted by $g^{\alpha}$ and $g_2$ is rewritten and denoted by $g^{\beta}$.

$$C_3 \Big/ \left\{ \left( \frac{e(C_{5Z}, C_{2Z}'')}{e(C_{5X}, C_{2X}'')} \right)^{\frac{1}{y_j}} \cdot \left( \frac{e(C_{5Z}, C_{2Z1}'')}{e(C_{5Y}, C_{2Y}'')} \right)^{\frac{1}{x_j}} \right\}$$

$$= C_3 \left\{ \left( \frac{e(g^{(\pi x_j + \beta y_j + \theta)/z_j k}, g^{z_j r k})}{e(g^{(\pi x_j + \theta)/x_j s}, g^{x_j r s})} \right)^{\frac{1}{y_j}} \cdot \left( \frac{e(g^{(\pi x_j + \beta y_j + \theta)/z_j k}, g^{\alpha z_j r k})}{e(g^{(\beta y_j + \theta)/y_j t}, g^{\alpha y_j r t})} \right)^{\frac{1}{x_j}} \right\}$$

$$= C_3 \left\{ \left( \frac{e(g^{\pi x_j + \beta y_j + \theta}, g^r)}{e(g^{\pi x_j + \theta}, g^r)} \right)^{\frac{1}{y_j}} \cdot \left( \frac{e(g^{\pi x_j + \beta y_j + \theta}, g^{\alpha r})}{e(g^{\beta y_j + \theta}, g^{\alpha r})} \right)^{\frac{1}{x_j}} \right\}$$

$$= m \cdot e(g_4 g_2, g)^r / (e(e, g)^{\beta r} \cdot e(g, g)^{\pi \alpha r}) = m$$

According to the present embodiment, as described above, due to the configuration of generating the re-encryption key $R_{ij}$ based on the random number $\theta$ and the re-encryption key generation key $rk_j$, effects similar to those in the first embodiment can be obtained.

Also according to the present embodiment, as described above, due to the configuration of omitting the one-time signature $\sigma$ in the first embodiment, the data size of ciphertext data and re-encrypted data can be reduced when compared with the embodiment shown in the first embodiment. Also according to the present embodiment, the amount of computations needed for encryption processing and re-encryption processing can be reduced when compared with the embodiment shown in the first embodiment.

Sixteenth Modification

In the seventh embodiment, an example in which ciphertext data is generated by the encryption device 20, the ciphertext data is re-encrypted by the re-encryption device 40 to generate re-encrypted data, and the re-encrypted data is decrypted by the decryption device 50 is cited, but the seventh embodiment may be changed to a form in which the ciphertext data is decrypted without being re-encrypted. In this case, only the key setup processing, encryption processing, and decryption processing need to be performed. The key setup processing in the present modification is the same as the key setup processing in the seventh embodiment. Hereinafter, the encryption processing and the decryption processing in the present modification will be described.

The difference between the encryption processing in the present modification and the encryption processing in the seventh embodiment is only in the last step. To provide a description by making use of the above symbols, the identification information of the decryption device 50 is assumed to be i for the sake of convenience. In this case, the communication unit 22 of the encryption device 20 transmits the ciphertext data $C_i$ in the temporary data storage unit 21 to the decryption device 50 under the control of the control unit 25 (ST24').

The decryption device 50 verifies the ciphertext data $C_i$ generated by the encryption device 20 using the public parameter par and the private key $sk_i$ of the local device 50 based on the following verification formulas (ST51').

$$e(C_{2X},u^{H(C_{2X},C_{2Y},C_{2Z},C_{2Z1},C_3)}\cdot v)=e(g,C_4)^{x_i},$$

$$e(C_{2Y},u^{H(C_{2X},C_{2Y},C_{2Z},C_{2Z1},C_3)}\cdot v)=e(g_1,C_4)^{y_i},$$

$$e(C_{2Z},u^{H(C_{2X},C_{2Y},C_{2Z},C_{2Z1},C_3)}\cdot v)=e(g,C_4)^{z_i},$$

$$e(C_{2Z1},u^{H(C_{2X},C_{2Y},C_{2Z},C_{2Z1},C_3)}\cdot v)=e(g_1,C_4)^{z_i}. \quad (d6)$$

Incidentally, the decryption device 50 may verify the ciphertext data $C_i$ generated by the encryption device 20 using the public parameter par and the public key $pk_i$ of the local device 50 in the same manner as in step ST41.

The verification is successful if the four verification formulas in the formula (d6) all hold and fails if any one of the four formulas does not hold.

If the verification is successful (or the verification processing in step ST51' is skipped), the decryption device 50 decrypts the ciphertext data $C_i$ as shown in the following formula using the private key $sk_i$ of the local device 50 and the public parameter par to obtain the message m (ST52').

$$m = C_3 \Big/ e(g_4g_5, C_{2X})^{\frac{1}{x_i}}$$

That the decryption result of the above formula produces m can be checked by the following calculation.

$$m \cdot e(g_4g_5, g)^r \Big/ e(g_4g_5, C_{2X})^{\frac{1}{x_i}}$$

$$m \cdot e(g_4g_5, g)^r \Big/ e(g_4g_5, g^{x_i r})^{\frac{1}{x_i}}$$

$$m \cdot e(g_4g_5, g)^r / e(g_4g_5, g)^r = m.$$

Seventeenth Modification

In addition to the sixteenth modification, as will be described below, the seventh embodiment may also be changed to a form in which the ciphertext data is decrypted without being re-encrypted. Also in this case, only the key setup processing, encryption processing, and decryption processing need to be performed. The key setup processing and the decryption processing in the present modification are the same as the key setup processing and the decryption processing in the seventh embodiment respectively. Hereinafter, the encryption processing and the decryption processing in the present modification will be described. In the present modification, the identification information of the decryption device 50 is assumed to be j.

No one-time signature is used in the present embodiment either and therefore, processing corresponding to step ST21 and step ST23 in the first embodiment is not performed. The encryption parameter generation unit 23 of the encryption device 20 generates and sends out five random numbers $r,s,t,k,\theta \in Z_p^*$ to the ciphertext generation unit 24.

The ciphertext generation unit 24 generates encrypted data $C_{2X}'$, $C_{2X}''$, $C_{2Y}'$, $C_{2Y}''$, $C_{2Z}'$, $C_{2Z}''$, $C_{2Z1}'$, $C_{2Z1}''$, $C_{2X}$, $C_{2Y}$, $C_{2Z}$, $C_{2Z1}$, $C_3$, $C_4$, $C_{5X}$, $C_{5Y}$, $C_{5Z}$ below from a message $m \in G_T$ as plaintext data using the random numbers $r,s,t,k,\theta$, the public key $pk_j$ of the decryption device 50, and the public parameter (ST22').

$$C_{2X}' = Y_{2j}^s, \quad C_{2X}'' = Y_{2j}^{rs}, \quad C_{2Y}' = X_j^t, \quad C_{2Y}'' = X_j^{rt},$$

$$C_{2Z}' = Y_{2j}^k, \quad C_{2Z}'' = Y_{2j}^{rk}, \quad C_{2Z1}' = X_j^k, \quad C_{2Z1}'' = X_j^{rk},$$

$$C_{2X} = X_j^r, \quad C_{2Y} = Y_{1j}^r, \quad C_{2Z} = Z_j^r, \quad C_{2Z1} = Z_{1j}^r,$$

$$C_3 = e(g_4g_5, g)^r \cdot m, \quad C_4 = (u^{H(C_{2X},C_{2Y},C_{2Z},C_{2Z1},C_3)} \cdot v)^r,$$

$$C_{5X} = (g_4 \cdot g_3^\theta)^{\frac{1}{s}}, \quad C_{5Y} = g_3^{\frac{\theta+1}{t}}, \quad C_{5Z} = (g_4 \cdot g_3^{\theta+1})^{\frac{1}{k}}$$

After step ST22' is completed, the ciphertext generation unit 24 generates ciphertext data $C_j=(C_{2X}',C_{2X}'',C_{2Y}',C_{2Y}'',C_{2Z}',C_{2Z}'',C_{2Z1}',C_{2Z1}'',C_{2X},C_{2Y},C_{2Z},C_{2Z1},C_3,C_4,C_{5X},C_{5Y},C_{5Z},j)$ including all the above encrypted data $C_{2X}'$ to $C_{5Z}$ and the identification information j of the decryption device 50 and writes the obtained ciphertext data into the temporary data storage unit 21.

The communication unit 22 transmits the ciphertext data $C_j$ in the temporary data storage unit 21 to the decryption device 50 under the control of the control unit 25 (ST24').

The decryption processing unit 54 of the decryption device 50 verifies the re-encrypted data $C_j$ in the temporary data storage unit 52 using the private key $sk_j$ of the local device 50 in the private key storage unit 51 and the public parameter par in the temporary data storage unit 52 based on the following verification formulas (formula (d7)) (ST51').

In step ST51', as will be described later, the decryption processing unit 54 may use the public key $pk_j$ of the decryption device 50 identified by the identification information j of the re-encryption key degeneration device 30 contained in the re-encrypted data $C_j$ in the temporary data storage unit 52. This also applies to embodiments and modifications described later.

$$e(C_{2X}'',u^{H(C_{2X},C_{2Y},C_{2Z},C_{2Z1},C_3)}\cdot v)=e(C_{2X}',C_4),$$

$$e(C_{2Y}'',u^{H(C_{2X},C_{2Y},C_{2Z},C_{2Z1},C_3)}\cdot v)=e(C_{2Y}',C_4),$$

$$e(C_{2Z}'',u^{H(C_{2X},C_{2Y},C_{2Z},C_{2Z1},C_3)}\cdot v)=e(C_{2Z}',C_4),$$

$$e(C_{2Z1}'',u^{H(C_{2X},C_{2Y},C_{2Z},C_{2Z1},C_3)}\cdot v)=e(C_{2Z1}',C_4),$$

$$e(C_{5Z},C_{2Z}')=e(C_{5X},C_{2X}')\cdot e(g_2,g_3)^{y_j},$$

$$e(C_{5Z},C_{2Z1}')=e(C_{5Y},C_{2Y}')\cdot e(g,g_4)^{x_j},$$

$$e(C_{2X},u^{H(C_{2X},C_{2Y},C_{2Z},C_{2Z1},C_3)}\cdot v)=e(g,C_4)^{x_j},$$

$$e(C_{2Y},u^{H(C_{2X},C_{2Y},C_{2Z},C_{2Z1},C_3)}\cdot v)=e(g_1,C_4)^{y_j},$$

$$e(C_{2Z},u^{H(C_{2X},C_{2Y},C_{2Z},C_{2Z1},C_3)}\cdot v)=e(g,C_4)^{z_j},$$

$$e(C_{2Z1},u^{H(C_{2X},C_{2Y},C_{2Z},C_{2Z1},C_3)}\cdot v)=e(g_1,C_4)^{z_j}. \quad (d7)$$

Instead of the fifth verification formula in the formula (d7), the verification formula shown in the above-mentioned formula (d2) or formula (d3) may be used. Also, instead of the sixth verification formula in the formula (d7), the verification formula shown in the above-mentioned formula (d4) or formula (d5) may be used. Also, instead of the seventh to tenth verification formulas in the formula (d7), the following verification formulas may be used.

$$e(C_{2X}, u^{H(C_{2X},C_{2Y},C_{2Z},C_{2Z1},C_3)} \cdot v) = e(X_j, C_4),$$

$$e(C_{2Y}, u^{H(C_{2X},C_{2Y},C_{2Z},C_{2Z1},C_3)} \cdot v) = e(Y_{1j}, C_4),$$

$$e(C_{2Z}, u^{H(C_{2X},C_{2Y},C_{2Z},C_{2Z1},C_3)} \cdot v) = e(Z_j, C_4),$$

$$e(C_{2Z1}, u^{H(C_{2X},C_{2Y},C_{2Z},C_{2Z1},C_3)} \cdot v) = e(Z_{1j}, C_4).$$

The verification is successful if the 10 verification formulas in the formula (d7) all hold and fails if any one of the 10 formulas does not hold.

If the verification is successful (or the verification processing in step ST51' is skipped), the decryption processing unit 54 decrypts the re-encrypted data $C_j$ as shown in the following formula using the private key $sk_j$ of the local device 50 in the private key storage unit 51 and the public parameter par in the temporary data storage unit 52 to obtain the message m (ST52').

$$m = C_3 \Big/ \left\{ \left( \frac{e(C_{5Z}, C''_{2Z})}{e(C_{5X}, C''_{2X})} \right)^{\frac{1}{y_j}} \cdot \left( \frac{e(C_{5Z}, C''_{2Z1})}{e(C_{5Y}, C''_{2Y})} \right)^{\frac{1}{x_j}} \right\}$$

That the decryption result of the above formula produces m can be checked by the following calculation. In the following calculation, $g_1$ is rewritten and denoted by $g^\alpha$ and $g_2$ is rewritten and denoted by $g^\beta$.

$$= C_3 \Big/ \left\{ \left( \frac{e(C_{5Z}, C''_{2Z})}{e(C_{5X}, C''_{2X})} \right)^{\frac{1}{y_j}} \cdot \left( \frac{e(C_{5Z}, C''_{2Z1})}{e(C_{5Y}, C''_{2Y})} \right)^{\frac{1}{x_j}} \right\}$$

$$= C_3 \Big/ \left\{ \left( \frac{e(g^{\pi(1+\alpha+\theta)}, g^{\beta y_j rk})}{e(g^{\pi(\alpha+\theta)/s}, g^{\beta y_j rs})} \right)^{\frac{1}{y_j}} \cdot \left( \frac{e(g^{\pi(1+\alpha+\theta)/k}, g^{x_j rk})}{e(g^{\pi(\theta+1)/t}, g^{x_j rt})} \right)^{\frac{1}{x_j}} \right\}$$

$$= C_3 \Big/ \left\{ \left( \frac{e(g^{\pi(1+\alpha+\theta)}, g^{\beta r})}{e(g^{\pi(\alpha+\theta)}, g^{\beta r})} \right) \cdot \left( \frac{e(g^{\pi(1+\alpha+\theta)}, g^r)}{e(g^{\pi(\theta+1)}, g^r)} \right) \right\}$$

$$= m \cdot e(g_4 g_5, g)^r / (e(g, g)^{\pi \beta r} \cdot (g, g)^{\pi \alpha r}) = m$$

Eighth Embodiment

In the present embodiment, an example of updating a re-encryption key in the seventh embodiment at certain intervals will be described. Hereinafter, key setup processing, encryption processing, re-encryption key generation processing, re-encryption processing, and decryption processing in the present embodiment will be described. Portions common to the aforementioned first embodiment or second embodiment may or may not be described by using the same reference signs.

(1) Key Setup Processing

A public parameter generation unit 13 of a key generator 10 generates a public parameter par in the same manner as in the seventh embodiment or acquires the parameter from outside (ST1). H is a hash function defined by the following formula.

$$H: \mathbb{Z}_p^* \times \mathbb{G}^5 \times \mathbb{G}_T \to \mathbb{Z}_p^*$$

If the identification information of a re-encryption key generator 30 is i, a key generation unit 14 randomly selects elements $x_i, y_i, z_i, w_i$ of $Z_p^*$ from $Z_p^*$ and sets a private key $sk_i=(x_i,y_i,z_i,w_i)$ of the re-encryption key generator 30. Then, the key generation unit 14 generates a public key $pk_i=(X_i, Y_{1i},Y_{2i},Z_i,Z_{1i},W_i)$ of the re-encryption key generator 30 using the private key $sk_i$ and the public parameter par.

$$X_i = g^{x_i}, Y_{1i} = g_1^{y_i}, Y_{2i} = g_2^{y_i},$$

$$Z_i = g^{z_i}, Z_{1i} = g_1^{z_i}, W_i = g^{w_i}$$

If verification processing using a formula (d10) described later is not performed, data $Y_{2i}$ may be omitted. That is, the public key $pk_i$ only needs to include data $X_i, Y_{1i}, Z_i, Z_{1i}, W_i$.

Further, the key generation unit 14 generates a re-encryption key generation key $rk_i=(X_{3i},Y_{s1})$ using the private key $sk_i$ and the public parameter par (ST3).

$$X_{3i} = g_3^{x_i}, Y_{5i} = g_5^{y_i}$$

Similarly, if the identification information of a decryption device 50 is assumed to be j, the key generation unit 14 randomly selects elements $x_j, y_j, z_j, w_j$ of $Z_p^*$ from $Z_p^*$ and sets a private key $sk_j=(x_j,y_j,z_j,w_j)$ of the decryption device 50. Then, the key generation unit 14 generates a public key $pk_j=(X_j,Y_{1j},Y_{2j},Z_j,Z_{1j},W_j)$ of the decryption device 50 using the private key $sk_i$ and the public parameter par.

$$X_j = g^{x_j}, Y_{1j} = g_1^{y_j}, Y_{2j} = g_2^{y_j},$$

$$Z_j = g^{z_j}, Z_{1j} = g_1^{z_j}, W_j = g^{w_j}$$

If, similarly as described above, the verification processing using a formula (d10) described later is not performed, data $Y_{2j}$ may be omitted. That is, the public key $pk_j$ only needs to include data $X_j, Y_{1j}, Z_j, Z_{1j}, W_j$.

Further, the key generation unit 14 generates a re-encryption key generation key $rk_j=(X_{3j},Y_{5j})$ using the private key $sk_i$ and the public parameter par (ST6).

$$X_{3j} = g_3^{x_j}, Y_{5j} = g_5^{y_j}$$

(2) Encryption Processing

No one-time signature is used in the present embodiment and therefore, processing corresponding to step ST21 and step ST23 in the first embodiment is not performed.

An encryption parameter generation unit 23 of an encryption device 20 generates and sends out a random number $r \in Z_p^*$ to a ciphertext generation unit 24.

The ciphertext generation unit 24 generates encrypted data $C_{2X}, C_{2Y}, C_{2Z}, C_{2Z1}, C_{2F}, C_3, C_4$ below from a message $m \in G_T$ as plaintext data using the random number r, the public key $pk_i$ of the re-encryption key generator 30, the public parameter par, and a time parameter L (ST22).

$$C_{2X} = X_i^r, C_{2Y} = Y_{1i}^r, C_{2Z} = Z_i^r, C_{2Z1} = Z_{1i}^r, C_{2F} = F_i(L)^r,$$

$$C_3 = e(g_4 g_5, g)^r \cdot m, C_4 = (u^{H(L,C_{2X},C_{2Y},C_{2Z},C_{2Z1},C_{2F},C_3)} \cdot v)^r$$

Incidentally, the ciphertext generation unit 24 may not include the time parameter L as input into the hash function H. That is, instead of $H(L,C_{2X},C_{2Y},C_{2Z},C_{2Z1},C_{2F},C_3)$ $H(C_{2X}, C_{2Y},C_{2Z},C_{2Z1},C_{2F},C_3)$ may be calculated. This also applies to embodiments and modifications described later.

The function $F_i(L)$ is defined as shown below.

$$F_i(L) = g^L \cdot W_i = g^{L+w_i} (L \in \mathbb{Z}_p^*)$$

After step ST22 is completed, the ciphertext generation unit 24 generates ciphertext data $C_i=(L,C_{2X},C_{2Y},C_{2Z},C_{2Z1}, C_{2F},C_3,C_4)$ including the time parameter L and all the above encrypted data $C_{2X}$ to $C_4$ and writes the obtained ciphertext data into a temporary data storage unit 21.

A communication unit 22 transmits the ciphertext data $C_i$ in the temporary data storage unit 21 to a re-encryption device 40 under the control of a control unit 25 (ST24).

(3) Re-Encryption Key Generation Processing

Now, assume that the decryption device 50 (in the example of FIG. 8, for example, the user A) approves that ciphertext addressed to the re-encryption key generator 30 (in the example of FIG. 8, the group administrator) and generated by using L as the time parameter value is re-encrypted into ciphertext addressed to the decryption device 50 (in the example of FIG. 8, for example, the user A) (that is, the transfer of decryption right of the ciphertext to the user A). The decryption device 50 transmits the re-encryption key generation key $rk_j$ of the decryption device 50 to the re-encryption key generator 30. A communication unit 33 of the re-encryption key generator 30 acquires and writes the re-encryption key generation key $rk_j$ of the decryption device 50 into a temporary data storage unit 32 under the control of a control unit 35 (ST31).

A random number generation unit 36 generates and sends out three random numbers $\theta, \delta_x, \delta_y \in Z_p$ to a re-encryption key generation unit 34.

The re-encryption key generation unit 34 generates a re-encryption key $R_{ijL}$ as shown in the following formulas using the random numbers $\theta, \delta_x, \delta_y$, the private key $sk_i$ of the re-encryption key generator 30 in a private key storage unit 31, the re-encryption key generation key $rk_j$ of the decryption device 50 in the temporary data storage unit 32, the public parameter par, and the time parameter L (ST32).

$$R_{ijL} = (R_{ijL1}, R_{ijL2}, R_{ijL3}, R_{ijL4}, R_{ijL5})$$

$$R_{ijL1} = (X_{3j} \cdot g_3^\theta)^{1/x_i} \cdot g^{(L+w_i)\delta_x} = g^{\frac{\pi(x_j+\theta)}{x_i}+(L+w_i)\delta_x},$$

$$R_{ijL2} = (Y_{5j} \cdot g_3^\theta)^{1/y_i} \cdot g^{(L+w_i)\delta_y} = g^{\frac{\pi(\beta y_j+\theta)}{y_i}+(L+w_i)\delta_y},$$

$$R_{ijL3} = (X_{3j} \cdot Y_{5j} \cdot g_3^\theta)^{1/z_i} = g^{\frac{\pi(x_j+\beta y_j+\theta)}{z_i}},$$

$$R_{ijL4} = g^{x_i \delta_x}, R_{ijL5} = g^{\frac{y_i \delta_y}{1}} = g^{\alpha y_i \delta_y}$$

In the above formulas, $g_1$ is rewritten and denoted by $g^\alpha$ and $g_2$ is rewritten and denoted by $g^\beta$.

(4) Re-Encryption Processing

A re-encryption processing unit 44 of the re-encryption device 40 verifies the ciphertext data $C_i$ in a temporary data storage unit 42 using the public parameter par, the time parameter L contained in the ciphertext data $C_i$ in the temporary data storage unit 42, and the public key $pk_i$ of the re-encryption key generator 30 based on the following verification formulas (ST41).

$$e(C_{2X}, u^{H(L,C_{2X},C_{2Y},C_{2Z},C_{2Z1},C_{2F},C_3)} \cdot v) = e(X_i, C_4),$$

$$e(C_{2Y}, u^{H(L,C_{2X},C_{2Y},C_{2Z},C_{2Z1},C_{2F},C_3)} \cdot v) = e(Y_i, C_4),$$

$$e(C_{2Z}, u^{H(L,C_{2X},C_{2Y},C_{2Z},C_{2Z1},C_{2F},C_3)} \cdot v) = e(Z_i, C_4),$$

$$e(C_{2Z1}, u^{H(L,C_{2X},C_{2Y},C_{2Z},C_{2Z1},C_{2F},C_3)} \cdot v) = e(Z_{1i}, C_4),$$

$$e(C_{2F}, u^{H(L,C_{2X},C_{2Y},C_{2Z},C_{2Z1},C_{2F},C_3)} \cdot v) = e(F_i(L), C_4).$$

If the time parameter L is not contained as input into the hash function H, instead of $H(L, C_{2X}, C_{2Y}, C_{2Z}, C_{2Z1}, C_{2F}, C_3)$ $H(C_{2X}, C_{2Y}, C_{2Z}, C_{2Z1}, C_{2F}, C_3)$ is calculated for the verification. This also applies to verification processing of ciphertext data or re-encrypted data described below.

The verification is successful if the five verification formulas shown above all hold and fails if any one of the five formulas does not hold.

If the verification is successful (or the verification processing in step ST41 is skipped), a re-encryption parameter generation unit 45 generates and sends out four random numbers $s, t, k, h \in Z_p^*$ to the re-encryption processing unit 44.

The re-encryption processing unit 44 generates, as shown in the following formulas, re-encrypted data $C_{2X}', C_{2X}'', C_{2Y}'', C_{2Z}', C_{2Z}'', C_{2Z1}', C_{2Z1}'', C_{2F}', C_{2F}'', C_{5X}, C_{5Y}, C_{5Z}, C_{5FX}, C_{5FY}$ using these random numbers $s, t, k, h$, the ciphertext data $C_i$ stored in the temporary data storage unit 42, the re-encryption key $R_{ijL}$, the public key $pk_i$ of the re-encryption key generator 30, and the public parameter par (ST42).

$$C_{2X}' = X_i^s, C_{2X}'' = C_{2X}^s = X_i^{rs}, C_{2Y}' = Y_{1i}^t, C_{2Y}'' = C_{2Y}^t = Y_{1i}^{rt},$$

$$C_{2Z}' = Z_i^k, C_{2Z}'' = C_{2Z}^k = Z_i^{rk}, C_{2Z1}' = Z_{1i}^k, C_{2Z1}'' = C_{2Z1}^k = Z_{1i}^{rk},$$

$$C_{2F}' = F_i(L)^h, C_{2F}'' = C_{2F}^h = F_i(L)^{rh},$$

$$C_{5X} = R_{ijL1}^{\frac{1}{s}}, C_{5Y} = R_{ijL2}^{\frac{1}{t}}, C_{5Z} = R_{ijL3}^{\frac{1}{k}},$$

$$C_{5FX} = R_{ijL4}^{\frac{1}{h}}, C_{5FY} = R_{ijL5}^{\frac{1}{h}}$$

After step ST42 is completed, the re-encryption processing unit 44 generates re-encrypted data $C_j = (L, C_{2X}', C_{2X}'', C_{2Y}', C_{2Y}'', C_{2Z}', C_{2Z}'', C_{2Z1}', C_{2Z1}'', C_{2F}', C_{2F}'', C_{2X}, C_{2Y}, C_{2Z}, C_{2Z1}, C_{2F}, C_3, C_4, C_{5X}, C_{5Y}, C_{5Z}, C_{5FX}, C_{5FY}, i)$ by adding all the above re-encrypted data $C_{2X}'$ to $C_{5FY}$ and the identification information i of the re-encryption key generator 30 to the ciphertext data $C_1$ and writes the obtained ciphertext data into the temporary data storage unit 42.

A communication unit 43 transmits the re-encrypted data $C_j$ in the temporary data storage unit 42 to the decryption device 50 under the control of a control unit 46 (ST43).

(5) Decryption Processing

A decryption processing unit 54 of the decryption device 50 verifies the re-encrypted data $C_j$ in a temporary data storage unit 52 using the private key $sk_j$ of the local device 50 in a private key storage unit 51, the public parameter par in the temporary data storage unit 52, and the public key $pk_i$ of the re-encryption key generator 30 identified by the identification information i of the re-encryption key generator 30 contained in the re-encrypted data $C_j$ in the temporary data storage unit 52 based on the following verification formulas (ST51).

$$e(C''_{2X}, u^{H(L,C_{2X},C_{2Y},C_{2Z},C_{2Z1},C_{2F},C_3)} \cdot v) = e(C'_{2X}, C_4),$$

$$e(C''_{2Y}, u^{H(L,C_{2X},C_{2Y},C_{2Z},C_{2Z1},C_{2F},C_3)} \cdot v) = e(C'_{2Y}, C_4),$$

$$e(C''_{2Z}, u^{H(L,C_{2X},C_{2Y},C_{2Z},C_{2Z1},C_{2F},C_3)} \cdot v) = e(C'_{2Z}, C_4),$$

$$e(C''_{2Z1}, u^{H(L,C_{2X},C_{2Y},C_{2Z},C_{2Z1},C_{2F},C_3)} \cdot v) = e(C'_{2Z1}, C_4),$$

$$e(C''_{2F}, u^{H(L,C_{2X},C_{2Y},C_{2Z},C_{2Z1},C_{2F},C_3)} \cdot v) = e(C'_{2F}, C_4),$$

$$e(C_{5Z}, C'_{2Z}) \cdot e(C_{5FX}, C'_{2F}) = e(C_{5X}, C'_{2X}) \cdot e(g_2, g_3)^{yj},$$

$$e(C_{5Z}, C'_{2Z1}) \cdot e(C_{5FY}, C'_{2F}) = e(C_{5Y}, C'_{2Y}) \cdot e(g, g_4)^{xj},$$

$$e(C_{2X}, u^{H(L,C_{2X},C_{2Y},C_{2Z},C_{2Z1},C_{2F},C_3)} \cdot v) = e(X_i, C_4),$$

$$e(C_{2Y}, u^{H(L,C_{2X},C_{2Y},C_{2Z},C_{2Z1},C_{2F},C_3)} \cdot v) = e(Y_{1i}, C_4),$$

$$e(C_{2Z}, u^{H(L,C_{2X},C_{2Y},C_{2Z},C_{2Z1},C_{2F},C_3)} \cdot v) = e(Z_i, C_4),$$

$$e(C_{2Z1}, u^{H(L,C_{2X},C_{2Y},C_{2Z},C_{2Z1},C_{2F},C_3)} \cdot v) = e(Z_{1i}, C_4),$$

$$e(C_{2F}, u^{H(L,C_{2X},C_{2Y},C_{2Z},C_{2Z1},C_{2F},C_3)} \cdot v) = e(F_i(L), C_4). \quad (d8)$$

Instead of the sixth verification formula in the formula (d8), the following verification formula may be used.

$$e(C_{5Z}, C'_{2Z}) \cdot e(C_{5FX}, C'_{2F}) = e(C_{5X}, C'_{2X}) \cdot e(g_5, g)^{yj}. \quad (d9)$$

Also, instead of the sixth verification formula in the formula (d8), the following verification formula may be used.

$$e(C_{5Z}, C''_{2Z}) \cdot e(C_{5FX}, C''_{2F}) = e(C_{5X}, C'_{2X}) \cdot e(Y_{2j}, g_3). \tag{d10}$$

In this case, the decryption processing unit 54 conducts verification using the public key $pk_j$ of the local device 50.

Instead of the seventh verification formula in the formula (d8), the verification formula (d11) or (d12) may be used.

$$e(C_{5Z}, C''_{2Z1}) \cdot e(C_{5FY}, C''_{2F}) = e(C_{5Y}, C'_{2Y}) \cdot e(g_3, g_1)^{y_j}. \tag{d11}$$

$$e(C_{5Z}, C''_{2Z1}) \cdot e(C_{5FY}, C''_{2F}) = e(C_{5Y}, C'_{2Y}) \cdot e(X_j, g_4). \tag{d12}$$

In this case, the decryption processing unit 54 conducts verification using the public key $pk_j$ of the local device 50.

The verification is successful if the 12 verification formulas in the formula (d8) all hold and fails if any one of the 12 formulas does not hold.

If the verification is successful (or the verification processing in step ST51 is skipped), the decryption processing unit 54 decrypts the re-encrypted data $C_j$ as shown in the following formula using the private key $sk_j$ of the local device 50 in the private key storage unit 51 and the public parameter par in the temporary data storage unit 52 to obtain the message m (ST52).

$$m = C_3 \bigg/ \left\{ \left( \frac{e(C_{5Z}, C''_{2Z}) \cdot e(C_{5FX}, C''_{2F})}{e(C_{5X}, C''_{2X})} \right)^{\frac{1}{y_j}} \cdot \left( \frac{e(C_{5Z}, C''_{2Z1}) \cdot e(C_{5FY}, C''_{2F})}{e(C_{FY}, C''_{2Y})} \right)^{\frac{1}{x_j}} \right\}$$

That the decryption result of the above formula produces m can be checked by the following calculation.

In the following calculation, $g_1$ is rewritten and denoted by $g^\alpha$ and $g_2$ is rewritten and denoted by $g^\beta$.

$$C_3 \bigg/ \left\{ \left( \frac{e(C_{5Z}, C''_{2Z}) \cdot e(C_{5FX}, C''_{2F})}{e(C_{5X}, C''_{2X})} \right)^{\frac{1}{y_j}} \cdot \left( \frac{e(C_{5Z}, C''_{2Z1}) \cdot e(C_{5FY}, C''_{2F})}{e(C_{5Y}, C''_{2Y})} \right)^{\frac{1}{x_j}} \right\}$$

$$= C_3 \bigg/ \left\{ \left( \frac{e\left(g^{\frac{\pi(x_j+\beta y_j+\theta)}{z_j k}}, g^{z_j r k}\right) \cdot e\left(g^{\frac{x_j \delta_x}{h}}, g^{(L+w_i) r h}\right)}{e\left(g^{\frac{(\pi(x_j+\theta)/x_j) + (L+w_i)\delta_x}{s}}, g^{x_j r s}\right)} \right)^{\frac{1}{y_j}} \right. \cdot$$

$$\left( \frac{e\left(g^{\frac{\pi(x_j+\beta y_j+\theta)}{z_j k}}, g^{\alpha z_j r k}\right) \cdot e\left(g^{\frac{\alpha y_j \delta_y}{h}}, g^{(L+w_i) r h}\right)}{e\left(g^{\frac{(\pi(\beta y_j+\theta)/y_j) + (L+w_i)\delta_y}{t}}, g^{\alpha y_j r t}\right)} \right)^{\frac{1}{x_j}} \right\}$$

$$= C_3 \bigg/ \left\{ \left( \frac{e\left(g^{\pi(x_j+\beta y_j+\theta)}, g^r\right) \cdot e\left(g^{x_j \delta_x}, g^{(L+w_i) r}\right)}{e\left(g^{\pi(x_j+\theta)+(L+w_i)x_j \delta_x}, g^r\right)} \right)^{\frac{1}{y_j}} \right. \cdot$$

$$\left( \frac{e\left(g^{\pi(x_j+\beta y_j+\theta)}, g^{\alpha r}\right) \cdot e\left(g^{\alpha y_i \delta_y}, g^{(L+w_i) r}\right)}{e\left(g^{\pi(\beta y_j+\theta)+(L+w_i)x_j \delta_y}, g^{\alpha r}\right)} \right)^{\frac{1}{x_j}} \right\}$$

$$= m \cdot e(g_4 g_5, g)^r / (e(g, g)^{\pi \beta r} \cdot e(g, g)^{\pi \alpha r}) = m.$$

According to the present embodiment, as described above, due to the configuration of generating the re-encryption key $R_{ijL}$ based on the random numbers $\theta$, $\delta_x$, $\delta_y$, the re-encryption key generation key $rk_j$, and the time parameter L, in addition to the effects of the seventh embodiment, whether to transfer the decryption right can be decided in each period so that finer access control can be exercised. Accordingly, even if the decryption right of ciphertext for the transfer source (in the example of FIG. 8, the group administrator) is once transferred to the transfer destination (in the example of FIG. 8, for example, the user A) in a certain period, it is possible not to grant the decryption right of the ciphertext for the transfer source to the relevant transfer destination, that is, the decryption right of the transfer destination (of the ciphertext for the relevant transfer source) can be invalidated in the next period and therefore, a file sharing system whose convenience is further improved can be provided.

Also according to the present embodiment, as described above, due to the configuration of omitting the one-time signature σ in the second embodiment, the data size of ciphertext data and re-encrypted data can be reduced when compared with the embodiment shown in the second embodiment. Also according to the present embodiment, the amount of computations needed for encryption processing and re-encryption processing can be reduced when compared with the embodiment shown in the second embodiment.

Eighteenth Modification

In the eighth embodiment, an example in which ciphertext data is generated by the encryption device 20, the ciphertext data is re-encrypted by the re-encryption device 40 to generate re-encrypted data, and the re-encrypted data is decrypted by the decryption device 50 is cited, but the eighth embodiment may be changed to a form in which the ciphertext data is decrypted without being re-encrypted. In this case, only the key setup processing, encryption processing, and decryption processing need to be performed. The key setup processing in the present modification is the same as the key setup processing in the eighth embodiment. Hereinafter, the encryption processing and the decryption processing in the present modification will be described.

The difference between the encryption processing in the present modification and the encryption processing in the eighth embodiment is only in the last step. To provide a description by making use of the above symbols, the identification information of the decryption device 50 is assumed to be i for the sake of convenience. In this case, the communication unit 22 of the encryption device 20 transmits the ciphertext data $C_i$ in the temporary data storage unit 21 to the decryption device 50 under the control of the control unit 25 (ST24').

The decryption device 50 verifies the ciphertext data $C_i$ generated by the encryption device 20 using the public parameter par and the private key $sk_i$ of the local device 50 based on the following verification formulas (ST51').

$$e(C_{2X}, u^{H(L, C_{2X}, C_{2Y}, C_{2Z}, C_{2Z1}, C_{2F}, C_3)} \cdot v) = e(g, C_4)^{x_i},$$

$$e(C_{2Y}, u^{H(L, C_{2X}, C_{2Y}, C_{2Z}, C_{2Z1}, C_{2F}, C_3)} \cdot v) = e(g_1, C_4)^{y_i},$$

$$e(C_{2Z}, u^{H(L, C_{2X}, C_{2Y}, C_{2Z}, C_{2Z1}, C_{2F}, C_3)} \cdot v) = e(g, C_4)^{z_i},$$

$$e(C_{2Z1}, u^{H(L, C_{2X}, C_{2Y}, C_{2Z}, C_{2Z1}, C_{2F}, C_3)} \cdot v) = e(g_1, C_4)^{z_i},$$

$$e(C_{2F}, u^{H(L, C_{2X}, C_{2Y}, C_{2Z}, C_{2Z1}, C_{2F}, C_3)} \cdot v) = e(g, C_4)^{L+w_i}. \tag{d13}$$

Incidentally, the decryption device 50 may verify the ciphertext data $C_i$ generated by the encryption device 20 using the public parameter par and the public key $pk_i$ of the local device 50 in the same manner as in step ST41.

The verification is successful if the five verification formulas in the formula (d13) all hold and fails if any one of the five formulas does not hold.

If the verification is successful (or the verification processing in step ST51' is skipped), the decryption device 50 decrypts the ciphertext data $C_i$ as shown in the following formula using the private key $sk_j$ of the local device 50 and the public parameter par to obtain the message m (ST52').

$$m = C_3 \Big/ e(g_4 g_5, C_{2X})^{\frac{1}{x_i}}$$

That the decryption result of the above formula produces m can be checked by the following calculation.

$$m \cdot e(g_4 g_5, g)^r \Big/ e(g_4 g_5, C_{2X})^{\frac{1}{x_i}}$$
$$= m \cdot e(g_4 g_5, g)^r \Big/ e(g_4 g_5, g^{x_i r})^{\frac{1}{x_i}}$$
$$= m \cdot e(g_4 g_5, g)^r / e(g_4 g_5, g)^r = m.$$

Nineteenth Modification

In addition to the eighteenth modification, as will be described below, the eighth embodiment may also be changed to a form in which the ciphertext data is decrypted without being re-encrypted. Also in this case, only the key setup processing, encryption processing, and decryption processing need to be performed. The key setup processing and the decryption processing in the present modification are the same as the key setup processing and the decryption processing in the eighth embodiment respectively. Hereinafter, the encryption processing and the decryption processing in the present modification will be described. In the present modification, the identification information of the decryption device 50 is assumed to be j.

No one-time signature is used in the present embodiment either and therefore, processing corresponding to step ST21 and step ST23 in the first embodiment is not performed. The encryption parameter generation unit 23 of the encryption device 20 generates and sends out eight random numbers $r,s,t,k,h,\theta,\delta_x,\delta_y \in Z_p^*$ to the ciphertext generation unit 24.

The ciphertext generation unit 24 generates encrypted data $C'_{2X}, C''_{2X}, C'_{2Y}, C''_{2Y}, C'_{2Z}, C''_{2Z}, C'_{2Z1}, C''_{2Z1}, C'_{2F}, C''_{2F}, C_{2X}, C_{2Y}, C_{2Z}, C_{2Z1}, C_{2F}, C_3, C_4, C_{5X}, C_{5Y}, C_{5Z}, C_{5FX}, C_{5FY}$ below from a message $m \in G_T$ as plaintext data using the random numbers $r,s,t,k,h,\theta,\delta_x,\delta_y$, the public key $pk_j$ of the decryption device 50, the public parameter, and the time parameter L (ST22').

$$C'_{2X} = Y_{2j}^s,\ C''_{2X} = Y_{2j}^{rs},\ C'_{2Y} = X_j^t,\ C''_{2Y} = X_j^{rt},$$

$$C'_{2Z} = Y_{2j}^k,\ C''_{2Z} = Y_{2j}^{rk},\ C'_{2Z1} = X_j^k,\ C''_{2Z1} = X_j^{rk},$$

$$C'_{2F} = F_j(L)^h,\ C''_{2F} = F_j(L)^{rh},$$

$$C_{2X} = X_j^r,\ C_{2Y} = Y_{1j}^r,\ C_{2Z} = Z_j^r,\ C_{2Z1} = Z_{1j}^r,\ C_{2F} = F_j(L)^r,$$

$$C_3 = e(g_4 g_5, g)^r \cdot m,\ C_4 = (u^{H(L, C_{2X}, C_{2Y}, C_{2Z}, C_{2Z1}, C_{2F}, C_3)} \cdot v)^r,$$

$$C_{5X} = (g_4 \cdot g_3^\theta \cdot F_j(L)^{\delta_y})^{\frac{1}{s}} = g^{\frac{\pi(\alpha+\theta)+(L+w_j)\delta_y}{s}},$$

$$C_{5Y} = (g_3^{1+\theta} \cdot F_j(L)^{\delta_x})^{\frac{1}{t}} = g^{\frac{\pi(1+\theta)+(L+w_j)\delta_x}{t}},$$

$$C_{5Z} = (g_4 \cdot g_3^{1+\theta})^{\frac{1}{k}} = g^{\frac{\pi(\alpha+1+\theta)}{k}},$$

$$C_{5FX} = (Y_{2j})^{\frac{\delta_y}{h}},\ C_{5FY} = (X_j)^{\frac{\delta_x}{h}}$$

After step ST22' is completed, the ciphertext generation unit 24 generates ciphertext data $C_j=(L, C'_{2X}, C''_{2X}, C'_{2Y}, C''_{2Y}, C'_{2Z}, C''_{2Z}, C'_{2Z1}, C''_{2Z1}, C'_{2F}, C''_{2F}, C_{2X}, C_{2Y}, C_{2Z}, C_{2Z1}, C_{2F}, C_3, C_4, C_{5X}, C_{5Y}, C_{5Z}, C_{5FX}, C_{5FY}, j)$ including the time parameter L, all the above encrypted data $C_{2X}'$ to $C_{5FY}$ and the identification information j of the decryption device 50 and writes the obtained ciphertext data into the temporary data storage unit 21.

The communication unit 22 transmits the ciphertext data $C_j$ in the temporary data storage unit 21 to the decryption device 50 under the control of the control unit 25 (ST24').

The decryption processing unit 54 of the decryption device 50 verifies the re-encrypted data $C_j$ in the temporary data storage unit 52 using the private key $sk_j$ of the local device 50 in the private key storage unit 51 and the public parameter par in the temporary data storage unit 52 based on the following verification formulas (ST51').

$$e(C''_{2X}, u^{H(C_{2X},C_{2Y},C_{2Z},C_{2Z1},C_{2F},C_3)} \cdot v) = e(C'_{2X}, C_4),$$

$$e(C''_{2Y}, u^{H(C_{2X},C_{2Y},C_{2Z},C_{2Z1},C_{2F},C_3)} \cdot v) = e(C'_{2Y}, C_4),$$

$$e(C''_{2Z}, u^{H(C_{2X},C_{2Y},C_{2Z},C_{2Z1},C_{2F},C_3)} \cdot v) = e(C'_{2Z}, C_4),$$

$$e(C''_{2Z1}, u^{H(C_{2X},C_{2Y},C_{2Z},C_{2Z1},C_{2F},C_3)} \cdot v) = e(C'_{2Z1}, C_4),$$

$$e(C''_{2F}, u^{H(C_{2X},C_{2Y},C_{2Z},C_{2Z1},C_{2F},C_3)} \cdot v) = e(C'_{2F}, C_4),$$

$$e(C_{5Z}, C'_{2Z}) \cdot e(C_{5FX}, C'_{2F}) = e(C_{5X}, C'_{2X}) \cdot e(g_2, g_3)^{y_j},$$

$$e(C_{5Z}, C'_{2Z1}) \cdot e(C_{5FY}, C'_{2F}) = e(C_{5Y}, C'_{2Y}) \cdot e(g, g_4)^{x_j},$$

$$e(C_{2X}, u^{H(C_{2X},C_{2Y},C_{2Z},C_{2Z1},C_{2F},C_3)} \cdot v) = e(g, C_4)^{x_j},$$

$$e(C_{2Y}, u^{H(C_{2X},C_{2Y},C_{2Z},C_{2Z1},C_{2F},C_3)} \cdot v) = e(g_1, C_4)^{y_j},$$

$$e(C_{2Z}, u^{H(C_{2X},C_{2Y},C_{2Z},C_{2Z1},C_{2F},C_3)} \cdot v) = e(g, C_4)^{z_j},$$

$$e(C_{2Z1}, u^{H(C_{2X},C_{2Y},C_{2Z},C_{2Z1},C_{2F},C_3)} \cdot v) = e(g_1, C_4)^{z_j},$$

$$e(C_{2F}, u^{H(C_{2X},C_{2Y},C_{2Z},C_{2Z1},C_{2F},C_3)} \cdot v) = e(g, C_4)^{L+w_j}. \quad \text{(d14)}$$

Instead of the sixth verification formula in the formula (d14), the verification formula shown in the formula (d9) or (d10) may be used. Also, instead of the seventh verification formula in the formula (d14), the verification formula shown in the formula (d11) or (d12) may be used. Also, instead of the eighth to twelfth verification formulas in the formula (d14), the following verification formulas shown below may be used.

$$e(C_{2X}, u^{H(C_{2X},C_{2Y},C_{2Z},C_{2Z1},C_{2F},C_3)} \cdot v) = e(X_j, C_4),$$

$$e(C_{2Y}, u^{H(C_{2X},C_{2Y},C_{2Z},C_{2Z1},C_{2F},C_3)} \cdot v) = e(Y_{1j}, C_4),$$

$$e(C_{2Z}, u^{H(C_{2X},C_{2Y},C_{2Z},C_{2Z1},C_{2F},C_3)} \cdot v) = e(Z_j, C_4),$$

$$e(C_{2Z1}, u^{H(C_{2X},C_{2Y},C_{2Z},C_{2Z1},C_{2F},C_3)} \cdot v) = e(Z_{1j}, C_4),$$

$$e(C_{2F}, u^{H(C_{2X},C_{2Y},C_{2Z},C_{2Z1},C_{2F},C_3)} \cdot v) = e(F_j(L), C_4).$$

The verification is successful if the 12 verification formulas in the formula (d14) all hold and fails if any one of the 12 formulas does not hold.

If the verification is successful (or the verification processing in step ST51' is skipped), the decryption processing unit 54 decrypts the re-encrypted data $C_j$ as shown in the following formula using the private key $sk_j$ of the local device 50 in the private key storage unit 51 and the public parameter par in the temporary data storage unit 52 to obtain the message m (ST52').

$$m = C_3 \bigg/ \left\{ \begin{array}{l} \left( \dfrac{e(C_{5Z}, C''_{2Z}) \cdot e(C_{5FX}, C''_{2F})}{e(C_{5X}, C''_{2X})} \right)^{\frac{1}{y_j}} \cdot \\ \left( \dfrac{e(C_{5Z}, C''_{2Z1}) \cdot e(C_{5FY}, C''_{2F})}{e(C_{5Y}, C''_{2Y})} \right)^{\frac{1}{x_j}} \end{array} \right\}$$

That the decryption result of the above formula produces m can be checked by the following calculation.

In the following calculation, $g_1$ is rewritten and denoted by $g^\alpha$ and $g_2$ is rewritten and denoted by $g^\beta$.

$$C_3 \bigg/ \left\{ \left( \dfrac{e(C_{5Z}, C''_{2Z}) \cdot e(C_{5FX}, C''_{2F})}{e(C_{5X}, C''_{2X})} \right)^{\frac{1}{y_j}} \cdot \left( \dfrac{e(C_{5Z}, C''_{2Z1}) \cdot e(C_{5FY}, C''_{2F})}{e(C_{5Y}, C''_{2Y})} \right)^{\frac{1}{x_j}} \right\}$$

$$= C_3 \bigg/ \left\{ \left( \dfrac{e\!\left(g^{\frac{\pi(\alpha+1+\theta)}{k}}, g^{\beta y_j r k}\right) \cdot e\!\left(g^{\frac{\beta y_j \delta_y}{h}}, g^{(L+w_j)rh}\right)}{e\!\left(g^{\frac{\pi(\alpha+\theta)+(L+w_j)\delta_y}{s}}, g^{\beta y_j rs}\right)} \right)^{\frac{1}{y_j}} \cdot \right.$$

$$\left( \dfrac{e\!\left(g^{\frac{\pi(\alpha+1+\theta)}{k}}, g^{x_j r k}\right) \cdot e\!\left(g^{\frac{x_j \delta_x}{h}}, g^{(L+w_j)rh}\right)}{e\!\left(g^{\frac{\pi(1+\theta)+(L+w_j)\delta_x}{t}}, g^{x_j rt}\right)} \right)^{\frac{1}{x_j}} \right\}$$

$$= C_3 \bigg/ \left\{ \left( \dfrac{e(g^{\pi(\alpha+1+\theta)}, g^{\beta r}) \cdot e(g^{\beta \delta_y}, g^{(L+w_j)r})}{e(g^{\pi(\alpha+\theta)+(L+w_j)\delta_y}, g^{\beta r})} \right) \cdot \right.$$

$$\left. \left( \dfrac{e(g^{\pi(\alpha+1+\theta)}, g^r) \cdot e(g^{\delta_x}, g^{(L+w_j)r})}{e(g^{\pi(1+\theta)+(L+w_j)\delta_x}, g^r)} \right) \right\}$$

$$= m \cdot e(g_4 g_5, g)^r / (e(g, g)^{\pi \beta r} \cdot e(g, g)^{\pi \alpha r}) = m.$$

Ninth Embodiment

In the present embodiment, an example of omitting a one-time signature in the third embodiment will be described. Hereinafter, key setup processing, encryption processing, re-encryption key generation processing, re-encryption processing, and decryption processing in the present embodiment will be described. Portions common to the aforementioned first embodiment may or may not be described by using the same reference signs.

(1) Key Setup Processing

First, a public parameter generation unit 13 of a key generator 10 generates a public parameter $$\text{par} = \{\lambda, p, \mathbb{G}, \mathbb{G}_T, g, g_1, g_2, g_3, g_4, u, v, H\}$$

based on a security parameter $\lambda$ stored in a key parameter storage unit 11 in advance or acquires the parameter from outside (ST1). Here, $g_3 = g^\pi$ and $g_4 = g_1^\pi$ are set. H is a hash function defined by the following formula.

$$H: \mathbb{G}^4 \times \mathbb{G}_T \to \mathbb{Z}_p^*$$

If the identification information of a re-encryption key generator 30 is i, a key generation unit 14 randomly selects elements $x_i$, $y_i$, $z_i$ of $Z_p^*$ from $Z_p^*$ and sets a private key $sk_i = (x_i, y_i, z_i)$ of the re-encryption key generator 30. Then, the key generation unit 14 generates a public key $pk_i = (X_i, Y_{1i}, Z_i, Z_{1i})$ of the re-encryption key generator 30 using the private key $sk_i$ and the public parameter par.

$$X_i = g^{x_i}, \ Y_{1i} = g_1^{y_i}, \ Z_i = g^{z_i}, \ Z_{1i} = g_1^{z_i}$$

Further, the key generation unit 14 generates a re-encryption key generation key $rk_i = (X_{3i}, Y_{2i})$ using the private key $sk_i$ and the public parameter par (ST3).

$$X_{3i} = g_3^{x_i}, \ Y_{2i} = g_2^{y_i}$$

Similarly, if the identification information of a decryption device 50 is assumed to be j, the key generation unit 14 randomly selects elements $x_j$, $y_j$, $z_j$ of $Z_p^*$ from $Z_p^*$ and sets a private key $sk_j = (x_j, y_j, z_j)$ of the decryption device 50. Then, the key generation unit 14 generates a public key $pk_j = (X_j, Y_{1j}, Z_j, Z_{1j})$ of the decryption device 50 using the private key $sk_i$ and the public parameter par.

$$X_j = g^{x_j}, \ Y_{1j} = g_1^{y_j}, \ Z_j = g^{z_j}, \ Z_{1j} = g_1^{z_j},$$

Further, the key generation unit 14 generates a re-encryption key generation key $rk_j = (X_{3j}, Y_{2j})$ using the private key $sk_i$ and the public parameter par (ST6).

$$X_{3j} = g_3^{x_j}, \ Y_{2j} = g_2^{y_j}$$

(2) Encryption Processing

No one-time signature is used in the present embodiment and therefore, processing corresponding to step ST21 and step ST23 in the first embodiment is not performed.

An encryption parameter generation unit 23 of an encryption device 20 generates and sends out a random number $r \in Z_p^*$ to a ciphertext generation unit 24.

The ciphertext generation unit 24 generates encrypted data $C_{2X}$, $C_{2Y}$, $C_{2Z}$, $C_{2Z1}$, $C_3$, $C_4$ below from a message $m \in G_T$ as plaintext data using the random number r, the public key $pk_i$ of the re-encryption key generator 30, and the public parameter par (ST22).

$$C_{2X} = X_i^r, \ C_{2Y} = Y_{1i}^r, \ C_{2Z} = Z_i^r, \ C_{2Z1} = Z_{1i}^r,$$

$$C_3 = e(g_4 g_2, g)^r \cdot m, \ C_4 = (u^{H(C_{2X}, C_{2Y}, C_{2Z}, C_{2Z1}, C_3)} \cdot v)^r$$

After step ST22 is completed, the ciphertext generation unit 24 generates ciphertext data $C_i = (C_{2X}, C_{2Y}, C_{2Z}, C_{2Z1}, C_3, C_4)$ including all the above encrypted data $C_{2X}$ to $C_4$ and writes the obtained ciphertext data into a temporary data storage unit 21.

A communication unit 22 transmits the ciphertext data $C_i$ in the temporary data storage unit 21 to a re-encryption device 40 under the control of a control unit 25 (ST24).

(3) Re-Encryption Key Generation Processing

Now, assume that the decryption device 50 (in the example of FIG. 8, for example, the user A) approves that ciphertext addressed to the re-encryption key generator 30 (in the example of FIG. 8, the group administrator) is re-encrypted into ciphertext addressed to the decryption device 50 (in the example of FIG. 8, for example, the user A) (that is, the transfer of decryption right of the ciphertext to the user A). The decryption device 50 transmits the re-encryption key generation key $rk_j$ of the decryption device 50 to the re-encryption key generator 30. A communication unit 33 of the re-encryption key generator 30 acquires and writes the re-encryption key generation key $rk_j$ of the decryption device 50 into a temporary data storage unit 32 under the control of a control unit 35 (ST31).

A random number generation unit 36 generates and sends out a random number $\theta \in Z_p^*$ to a re-encryption key generation unit 34.

The re-encryption key generation unit 34 generates a re-encryption key $R_{ij}$ as shown in the following formulas using the random number θ, the private key $sk_i$ of the re-encryption key generator 30 in a private key storage unit 31, the re-encryption key generation key $rk_j$ of the decryption device 50 in the temporary data storage unit 32, and the public parameter par (ST32).

$$R_{ij} = (R_{ij1}, R_{ij2}, R_{ij3})$$

$$R_{ij1} = (X_{3j} \cdot g^\theta)^{1/x_i} = g^{\frac{\pi x_j + \theta}{x_i}},$$

$$R_{ij2} = (Y_{2j} \cdot g^\theta)^{1/y_i} = g^{\frac{\beta y_j + \theta}{y_i}},$$

$$R_{ij3} = (X_{3j} \cdot Y_{2j} \cdot g^\theta)^{1/z_i} = g^{\frac{\pi x_j + \beta y_j + \theta}{z_i}}.$$

In the above formulas, $g_2$ is rewritten and denoted by $g^\beta$.

(4) Re-Encryption Processing

A re-encryption processing unit 44 of the re-encryption device 40 verifies the ciphertext data $C_i$ in a temporary data storage unit 42 using the public parameter par and the public key $pk_i$ of the re-encryption key generator 30 based on the following verification formulas (ST41).

$$e(C_{2X}, u^{H(C_{2X},C_{2Y},C_{2Z},C_{2Z1},C_3)} \cdot v) = e(X_i, C_4),$$

$$e(C_{2Y}, u^{H(C_{2X},C_{2Y},C_{2Z},C_{2Z1},C_3)} \cdot v) = e(Y_{1i}, C_4),$$

$$e(C_{2Z}, u^{H(C_{2X},C_{2Y},C_{2Z},C_{2Z1},C_3)} \cdot v) = e(Z_i, C_4),$$

$$e(C_{2Z1}, u^{H(C_{2X},C_{2Y},C_{2Z},C_{2Z1},C_3)} \cdot v) = e(Z_{1i}, C_4).$$

The verification is successful if the four verification formulas shown above all hold and fails if any one of the four formulas does not hold.

If the verification is successful (or the verification processing in step ST41 is skipped), a re-encryption parameter generation unit 45 generates and sends out three random numbers $s,t,k \in Z_p^*$ to the re-encryption processing unit 44.

The re-encryption processing unit 44 generates, as shown in the following formulas, re-encrypted data $C_{2X}'$, $C_{2X}''$, $C_{2Y}'$, $C_{2Y}''$, $C_{2Z}'$, $C_{2Z}''$, $C_{2Z1}'$, $C_{2Z1}''$, $C_{5X}$, $C_{5Y}$, $C_{5Z}$ using these random numbers s,t,k, the ciphertext data $C_i$ stored in the temporary data storage unit 42, the re-encryption key $R_{ij}$, the public key $pk_i$ of the re-encryption key generator 30, and the public parameter par (ST42).

$$C_{2X}' = X_i^s, C_{2X}'' = C_{2X}^s = X_i^{rs}, C_{2Y}' = Y_{1i}^t, C_{2Y}'' = C_{2Y}^t = Y_{1i}^{rt},$$

$$C_{2Z}' = Z_i^k, C_{2Z}'' = C_{2Z}^k = Z_i^{rk}, C_{2Z1}' = Z_{1i}^k, C_{2Z1}'' = C_{2Z1}^k = Z_{1i}^{rk},$$

$$C_{5X} = R_{ij1}^{\frac{1}{s}}, C_{5Y} = R_{ij2}^{\frac{1}{t}}, C_{5Z} = R_{ij3}^{\frac{1}{k}}$$

After step ST42 is completed, the re-encryption processing unit 44 generates re-encrypted data $C_j = (C_{2X}', C_{2X}'', C_{2Y}', C_{2Y}'', C_{2Z}', C_{2Z}'', C_{2Z1}', C_{2Z1}'', C_{2X}', C_{2Y}, C_{2Z}, C_{2Z1}, C_3, C_4, C_{5X}, C_{5Y}, C_{5Z}, i)$ by adding all the above re-encrypted data $C_{2X}'$ to $C_{5Z}$ and the identification information i of the re-encryption key generator 30 to the ciphertext data $C_i$ and writes the obtained re-encrypted data $C_j$ into the temporary data storage unit 42.

A communication unit 43 transmits the re-encrypted data $C_j$ in the temporary data storage unit 42 to the decryption device 50 under the control of a control unit 46 (ST43).

(5) Decryption Processing

A decryption processing unit 54 of the decryption device 50 verifies the re-encrypted data $C_j$ in a temporary data storage unit 52 using the private key $sk_j$ of the local device 50 in a private key storage unit 51, the public parameter par in the temporary data storage unit 52, and the public key $pk_i$ of the re-encryption key generator 30 identified by the identification information i of the re-encryption key generator 30 contained in the re-encrypted data $C_j$ in the temporary data storage unit 52 based on the following verification formulas (ST51).

$$e(C_{2X}'', u^{H(C_{2X},C_{2Y},C_{2Z},C_{2Z1},C_3)} \cdot v) = e(C_{2X}', C_4),$$

$$e(C_{2Y}'', u^{H(C_{2X},C_{2Y},C_{2Z},C_{2Z1},C_3)} \cdot v) = e(C_{2Y}', C_4),$$

$$e(C_{2Z}'', u^{H(C_{2X},C_{2Y},C_{2Z},C_{2Z1},C_3)} \cdot v) = e(C_{2Z}', C_4),$$

$$e(C_{2Z1}'', u^{H(C_{2X},C_{2Y},C_{2Z},C_{2Z1},C_3)} \cdot v) = e(C_{2Z1}', C_4),$$

$$e(C_{5Z}, C_{2Z}') = e(C_{5X}, C_{2X}') \cdot e(g_2, g_3)^{y_j},$$

$$e(C_{5Z}, C_{2Z1}') = e(C_{5Y}, C_{2Y}') \cdot e(g, g_4)^{y_j},$$

$$e(C_{2X}, u^{H(C_{2X},C_{2Y},C_{2Z},C_{2Z1},C_3)} \cdot v) = e(X_i, C_4),$$

$$e(C_{2Y}, u^{H(C_{2X},C_{2Y},C_{2Z},C_{2Z1},C_3)} \cdot v) = e(Y_{1i}, C_4),$$

$$e(C_{2Z}, u^{H(C_{2X},C_{2Y},C_{2Z},C_{2Z1},C_3)} \cdot v) = e(Z_i, C_4),$$

$$e(C_{2Z1}, u^{H(C_{2X},C_{2Y},C_{2Z},C_{2Z1},C_3)} \cdot v) = e(Z_{1i}, C_4). \quad (e1)$$

Instead of the sixth verification formula in the formula (e1), the following verification formula may be used.

$$e(C_{5Z}, C_{2Z1}') = e(C_{5Y}, C_{2Y}') \cdot e(X_j, g_4).$$

In this case, the decryption processing unit 54 conducts verification using the public key $pk_j$ of the local device 50.

The verification is successful if the 10 verification formulas in the formula (e1) all hold and fails if any one of the 10 formulas does not hold.

If the verification is successful (or the verification processing in step ST51 is skipped), the decryption processing unit 54 decrypts the re-encrypted data $C_j$ as shown in the following formula using the private key $sk_j$ of the local device 50 in the private key storage unit 51 and the public parameter par in the temporary data storage unit 52 to obtain the message m (ST52).

$$m = C_3 \left/ \left\{ \left( \frac{e(C_{5Z}, C_{2Z}'')}{e(C_{5X}, C_{2X}'')} \right)^{\frac{1}{y_j}} \cdot \left( \frac{e(C_{5Z}, C_{2Z1}'')}{e(C_{5Y}, C_{2Y}'')} \right)^{\frac{1}{x_j}} \right\} \right.$$

That the decryption result of the above formula produces m can be checked by the following calculation.

In the following calculation, $g_1$ is rewritten and denoted by $g^\alpha$ and $g_2$ is rewritten and denoted by $g^\beta$.

$$C_3 \left/ \left\{ \left( \frac{e(C_{5Z}, C_{2Z}'')}{e(C_{5X}, C_{2X}'')} \right)^{\frac{1}{y_j}} \cdot \left( \frac{e(C_{5Z}, C_{2Z1}'')}{e(C_{5Y}, C_{2Y}'')} \right)^{\frac{1}{x_j}} \right\} \right.$$

$$= C_3 \left/ \left\{ \left( \frac{e(g^{(\pi x_j + \beta y_j + \theta)/z_i k}, g^{z_i rk})}{e(g^{(\pi x_j + \theta)/x_i rs}, g^{x_i rs})} \right)^{\frac{1}{y_j}} \cdot \left( \frac{e(g^{(\pi x_j + \beta y_j + \theta)/z_i k}, g^{\alpha z_i rk})}{e(g^{(\beta y_j + \theta)/y_i t}, g^{\alpha y_i rt})} \right)^{\frac{1}{x_j}} \right\} \right.$$

-continued $$= C_3 \left\{ \left( \frac{e(g^{(\pi x_j + \beta y_j + \theta)}, g^r)}{e(g^{\pi x_j + \theta}, g^r)} \right)^{\frac{1}{y_j}} \cdot \left( \frac{e(g^{\pi x_j + \beta y_j + \theta}, g^{\alpha r})}{e(g^{\beta y_j + \theta}, g^{\alpha r})} \right)^{\frac{1}{x_j}} \right\}$$

$$= m \cdot e(g_4 g_5, g)^r / (e(g, g)^{\beta r} \cdot e(g, g)^{\pi \alpha r}) = m.$$

According to the present embodiment, as described above, due to the configuration of generating the re-encryption key $R_{ij}$ based on the random number θ and the re-encryption key generation key $rk_j$, effects similar to those in the third embodiment can be obtained.

Also according to the present embodiment, as described above, due to the configuration of omitting the one-time signature σ in the third embodiment, the data size of ciphertext data and re-encrypted data can be reduced when compared with the embodiment shown in the third embodiment. Also according to the present embodiment, the amount of computations needed for encryption processing and re-encryption processing can be reduced when compared with the embodiment shown in the third embodiment.

Twentieth Modification

In the ninth embodiment, an example in which ciphertext data is generated by the encryption device 20, the ciphertext data is re-encrypted by the re-encryption device 40 to generate re-encrypted data, and the re-encrypted data is decrypted by the decryption device 50 is cited, but the ninth embodiment may be changed to a form in which the ciphertext data is decrypted without being re-encrypted. In this case, only the key setup processing, encryption processing, and decryption processing need to be performed. The key setup processing in the present modification is the same as the key setup processing in the ninth embodiment. Hereinafter, the encryption processing and the decryption processing in the present modification will be described.

The difference between the encryption processing in the present modification and the encryption processing in the ninth embodiment is only in the last step. To provide a description by making use of the above symbols, the identification information of the decryption device 50 is assumed to be i for the sake of convenience. In this case, the communication unit 22 of the encryption device 20 transmits the ciphertext data $C_i$ in the temporary data storage unit 21 to the decryption device 50 under the control of the control unit 25 (ST24').

The decryption device 50 verifies the ciphertext data $C_i$ generated by the encryption device 20 using the public parameter par and the private key $sk_i$ of the local device 50 based on the following verification formulas (ST51').

$$e(C_{2X}, u^{H(C_{2X}, C_{2Y}, C_{2Z}, C_{2Z1}, C_3)} \cdot v) = e(g, C_4)^{x_i},$$

$$e(C_{2Y}, u^{H(C_{2X}, C_{2Y}, C_{2Z}, C_{2Z1}, C_3)} \cdot v) = e(g_1, C_4)^{y_i},$$

$$e(C_{2Z}, u^{H(C_{2X}, C_{2Y}, C_{2Z}, C_{2Z1}, C_3)} \cdot v) = e(g, C_4)^{z_i},$$

$$e(C_{2Z1}, u^{H(C_{2X}, C_{2Y}, C_{2Z}, C_{2Z1}, C_3)} \cdot v) = e(g_1, C_4)^{z_i}. \quad (e2)$$

Incidentally, the decryption device 50 may verify the ciphertext data $C_i$ generated by the encryption device 20 using the public parameter par and the public key $pk_i$ of the local device 50 in the same manner as in step ST41.

The verification is successful if the four verification formulas in the formula (e2) all hold and fails if any one of the four formulas does not hold.

If the verification is successful (or the verification processing in step ST51' is skipped), the decryption device 50 decrypts the ciphertext data $C_i$ as shown in the following formula using the private key $sk_i$ of the local device 50 and the public parameter par to obtain the message m (ST52').

$$m = C_3 \Big/ e(g_4 g_2, C_{2X})^{\frac{1}{x_i}}$$

That the decryption result of the above formula produces m can be checked by the following calculation.

$$m \cdot e(g_4 g_2, g)^r \Big/ e(g_4 g_2, C_{2X})^{\frac{1}{x_i}}$$

$$= m \cdot e(g_4 g_2, g)^r \Big/ e(g_4 g_2, g^{x_i r})^{\frac{1}{x_i}}$$

$$= m \cdot e(g_4 g_2, g)^r / e(g_4 g_2, g)^r = m.$$

Tenth Embodiment

In the present embodiment, an example of updating a re-encryption key in the ninth embodiment at certain intervals will be described. Hereinafter, key setup processing, encryption processing, re-encryption key generation processing, re-encryption processing, and decryption processing in the present embodiment will be described. Portions common to the aforementioned first embodiment or second embodiment may or may not be described by using the same reference signs.

(1) Key Setup Processing

A public parameter generation unit 13 of a key generator 10 generates a public parameter par in the same manner as in the ninth embodiment or acquires the parameter from outside (ST1). H is a hash function defined by the following formula.

$$H: \mathbb{Z}_p^* \times \mathbb{G}^5 \times \mathbb{G}_T \to \mathbb{Z}_p^*$$

If the identification information of a re-encryption key generator 30 is i, a key generation unit 14 randomly selects elements $x_i, y_i, z_i, w_i$ of $Z_p^*$ from $Z_p^*$ and sets a private key $sk_i = (x_i, y_i, z_i, w_i)$ of the re-encryption key generator 30. Then, the key generation unit 14 generates a public key $pk_i = (X_i, Y_{1i}, Z_i, Z_{1i}, W_i)$ of the re-encryption key generator 30 using the private key $sk_i$ and the public parameter par.

$$X_i = g^{x_i}, \ Y_{1i} = g_1^{y_i}, \ Z_i = g^{z_i},$$

$$Z_{1i} = g_1^{z_i}, \ W_i = g^{w_i}$$

Further, the key generation unit 14 generates a re-encryption key generation key $rk_i = (X_{3i}, Y_{2i})$ using the private key $sk_i$ and the public parameter par (ST3).)

$$X_{3i} = g_3^{x_i}, \ Y_{2i} = g_2^{y_i}$$

Similarly, if the identification information of a decryption device 50 is assumed to be j, the key generation unit 14 randomly selects elements $x_j, y_j, z_j, w_j$ of $Z_p^*$ from $Z_p^*$ and sets a private key $sk_j = (x_j, y_j, z_j, w_j)$ of the decryption device 50. Then, the key generation unit 14 generates a public key $pk_j = (X_j, Y_{1j}, Z_j, Z_{1j}, W_j)$ of the decryption device 50 using the private key $sk_j$ and the public parameter par.

$$X_j = g^{x_j}, \ Y_{1j} = g_1^{y_j}, \ Z_j = g^{z_j},$$

$$Z_{1j} = g_1^{z_j}, \ W_j = g^{w_j}$$

Further, the key generation unit 14 generates a re-encryption key generation key $rk_i=(X_{3i},Y_{2i})$ using the private key $sk_i$ and the public parameter par (ST6).

$$X_{3j}=g_3{}^{xj}, \quad Y_{2j}=g_2{}^{yj}$$

(2) Encryption Processing

No one-time signature is used in the present embodiment and therefore, processing corresponding to step ST21 and step ST23 in the first embodiment is not performed.

An encryption parameter generation unit 23 of an encryption device 20 generates and sends out a random number $r \in Z_p^*$ to a ciphertext generation unit 24.

The ciphertext generation unit 24 generates encrypted data $C_{2X}, C_{2Y}, C_{2Z}, C_{2Z1}, C_{2F}, C_3, C_4$ below from a message $m \in G_T$ as plaintext data using the random number r, the public key $pk_i$ of the re-encryption key generator 30, the public parameter par, and a time parameter L (ST22).

$$C_{2X}=X_i^r, \; C_{2Y}=Y_{1i}^r, \; C_{2Z}=Z_i^r, \; C_{2Z1}=Z_{1i}^r,$$

$$C_{2F}=F_i(L)^r, \; C_3=e(g_4g_2,g)^r \cdot m,$$

$$C_4=(u^{H(L,C_{2X},C_{2Y},C_{2Z},C_{2Z1},C_{2F},C_3)} \cdot v)^r$$

The function $F_i(L)$ is defined as shown below.

$$F_i(L)=g^L \cdot W_i = g^{L+w_i} (L \in \mathbb{Z}_p^*)$$

After step ST22 is completed, the ciphertext generation unit 24 generates ciphertext data $C_i=(L,C_{2X},C_{2Y},C_{2Z},C_{2Z1},C_{2F},C_3,C_4)$ including the time parameter L and all the above encrypted data $C_{2X}$ to $C_4$ and writes the obtained ciphertext data into a temporary data storage unit 21.

A communication unit 22 transmits the ciphertext data $C_i$ in the temporary data storage unit 21 to a re-encryption device 40 under the control of a control unit 25 (ST24).

(3) Re-Encryption Key Generation Processing

Now, assume that the decryption device 50 (in the example of FIG. 8, for example, the user A) approves that ciphertext addressed to the re-encryption key generator 30 (in the example of FIG. 8, the group administrator) and generated by using L as the time parameter value is re-encrypted into ciphertext addressed to the decryption device 50 (in the example of FIG. 8, for example, the user A) (that is, the transfer of decryption right of the ciphertext to the user A). The decryption device 50 transmits the re-encryption key generation key $rk_j$ of the decryption device 50 to the re-encryption key generator 30. A communication unit 33 of the re-encryption key generator 30 acquires and writes the re-encryption key generation key $rk_j$ of the decryption device 50 into a temporary data storage unit 32 under the control of a control unit 35 (ST31).

A random number generation unit 36 generates and sends out three random numbers $\theta, \delta_x, \delta_y \in Z_p^*$ to a re-encryption key generation unit 34.

The re-encryption key generation unit 34 generates a re-encryption key $R_{ijL}$ as shown in the following formulas using the random numbers $\theta, \delta_x, \delta_y$, the private key $sk_i$ of the re-encryption key generator 30 in a private key storage unit 31, the re-encryption key generation key $rk_j$ of the decryption device 50 in the temporary data storage unit 32, the public parameter par, and the time parameter L (ST32).

$$R_{ijL} = (R_{ijL1}, R_{ijL2}, R_{ijL3}, R_{ijL4}, R_{ijL5})$$

$$R_{ijL1} = (X_{3j} \cdot g^\theta)^{1/x_i} \cdot g^{(L+w_i)\delta_x} = g^{\frac{\pi x_j+\theta}{x_i}+(L+w_i)\delta_x},$$

$$R_{ijL2} = (Y_{2j} \cdot g^\theta)^{1/y_i} \cdot g^{(L+w_i)\delta_y} = g^{\frac{\beta y_j+\theta}{y_i}+(L+w_i)\delta_y},$$

$$R_{ijL3} = (X_{3j} \cdot Y_{2j} \cdot g^\theta)^{1/z_i} = g^{\frac{\pi x_j+\beta y_j+\theta}{z_i}},$$

$$R_{ijL4} = g^{x_i \delta_x}, \; R_{ijL5} = g_1^{y_i \delta_y} = g^{\alpha y_i \delta_y}$$

In the above formulas, $g_1$ is rewritten and denoted by $g^\alpha$ and $g_2$ is rewritten and denoted by $g^\beta$.

(4) Re-Encryption Processing

A re-encryption processing unit 44 of the re-encryption device 40 verifies the ciphertext data $C_i$ in a temporary data storage unit 42 using the public parameter par, the time parameter L contained in the ciphertext data $C_i$ in the temporary data storage unit 42, and the public key $pk_i$ of the re-encryption key generator 30 based on the following verification formulas (ST41).

$$e(C_{2X}, u^{H(L,C_{2X},C_{2Y},C_{2Z},C_{2Z1},C_{2F},C_3)} \cdot v) = e(X_i, C_4),$$

$$e(C_{2Y}, u^{H(L,C_{2X},C_{2Y},C_{2Z},C_{2Z1},C_{2F},C_3)} \cdot v) = e(Y_{1i}, C_4),$$

$$e(C_{2Z}, u^{H(L,C_{2X},C_{2Y},C_{2Z},C_{2Z1},C_{2F},C_3)} \cdot v) = e(Z_i, C_4),$$

$$e(C_{2Z1}, u^{H(L,C_{2X},C_{2Y},C_{2Z},C_{2Z1},C_{2F},C_3)} \cdot v) = e(Z_{1i}, C_4),$$

$$e(C_{2F}, u^{H(L,C_{2X},C_{2Y},C_{2Z},C_{2Z1},C_{2F},C_3)} \cdot v) = e(F_i(L), C_4).$$

The verification is successful if the five verification formulas shown above all hold and fails if any one of the five formulas does not hold.

If the verification is successful (or the verification processing in step ST41 is skipped), a re-encryption parameter generation unit 45 generates and sends out four random numbers $s,t,k,h \in Z_p^*$ to the re-encryption processing unit 44.

The re-encryption processing unit 44 generates, as shown in the following formulas, re-encrypted data $C_{2X}', C_{2X}'', C_{2Y}', C_{2Y}'', C_{2Z}', C_{2Z}'', C_{2Z1}', C_{2Z1}'', C_{2F}', C_{2F}'', C_{5X}, C_{5Y}, C_{5Z}, C_{5FX}, C_{5FY}$ using these random numbers $s,t,k,h$, the ciphertext data $C_i$ stored in the temporary data storage unit 42, the re-encryption key $R_{ijL}$, the public key $pk_i$ of the re-encryption key generator 30, and the public parameter par (ST42).

$$C'_{2X} = X_i^s, \; C''_{2X} = C_{2X}^s = X_i^{rs}, \; C'_{2Y} = Y_{1i}^t, \; C''_{2Y} = C_{2Y}^t = Y_{1i}^{rt},$$

$$C'_{2Z} = Z_i^k, \; C''_{2Z} = C_{2Z}^k = Z_i^{rk}, \; C'_{2Z1} = Z_{1i}^k, \; C''_{2Z1} = C_{2Z1}^k = Z_{1i}^{rk},$$

$$C'_{2F} = F_i(L)^h, \; C''_{2F} = C_{2F}^h = F_i(L)^{rh},$$

$$C_{5X} = R_{ijL1}^{\frac{1}{s}}, \; C_{5Y} = R_{ijL2}^{\frac{1}{t}}, \; C_{5Z} = R_{ijL3}^{\frac{1}{k}}, \; C_{5Z} = R_{ijL3}^{\frac{1}{k}},$$

$$C_{5FX} = R_{ijL4}^{\frac{1}{h}}, \; C_{5FY} = R_{ijL5}^{\frac{1}{h}}$$

After step ST42 is completed, the re-encryption processing unit 44 generates re-encrypted data $C_j=(L,C_{2X}',C_{2X}'', C_{2Y}',C_{2Y}'',C_{2Z}',C_{2Z}'',C_{2Z1}',C_{2Z1}'',C_{2F}',C_{2F}'',C_{2X}, C_{2Y},C_{2Z}, C_{2Z1},C_{2F},C_3,C_4,C_{5X},C_{5Y},C_{5Z},C_{5FX},C_{5FY},i)$ by adding all the above re-encrypted data $C_{2X}'$ to $C_{5FY}$ and the identification information i of the re-encryption key generator 30 to the ciphertext data $C_i$ and writes the obtained ciphertext data into the temporary data storage unit 42.

A communication unit 43 transmits the re-encrypted data $C_j$ in the temporary data storage unit 42 to the decryption device 50 under the control of a control unit 46 (ST43).

(5) Decryption Processing

A decryption processing unit 54 of the decryption device 50 verifies the re-encrypted data $C_j$ in a temporary data storage unit 52 using the private key $sk_j$ of the local device 50 in a private key storage unit 51, the public parameter par in the temporary data storage unit 52, and the public key $pk_i$ of the re-encryption key generator 30 identified by the identification information i of the re-encryption key generator 30 contained in the re-encrypted data $C_j$ in the temporary data storage unit 52 based on the following verification formulas (ST51).

$$e(C''_{2X}, u^{H(L,C_{2X},C_{2Y},C_{2Z},C_{2Z1},C_{2F},C_3)} \cdot v) = e(C'_{2X}, C_4),$$

$$e(C''_{2Y}, u^{H(L,C_{2X},C_{2Y},C_{2Z},C_{2Z1},C_{2F},C_3)} \cdot v) = e(C'_{2Y}, C_4),$$

$$e(C''_{2Z}, u^{H(L,C_{2X},C_{2Y},C_{2Z},C_{2Z1},C_{2F},C_3)} \cdot v) = e(C'_{2Z}, C_4),$$

$$e(C''_{2Z1}, u^{H(L,C_{2X},C_{2Y},C_{2Z},C_{2Z1},C_{2F},C_3)} \cdot v) = e(C'_{2Z1}, C_4),$$

$$e(C''_{2F}, u^{H(L,C_{2X},C_{2Y},C_{2Z},C_{2Z1},C_{2F},C_3)} \cdot v) = e(C'_{2F}, C_4),$$

$$e(C_{5Z}, C'_{2Z}) \cdot e(C_{5FX}, C'_{2F}) = e(C_{5X}, C'_{2X}) \cdot e(g_2, g_3)^{y_j},$$

$$e(C_{5Z}, C'_{2Z1}) \cdot e(C_{5FY}, C'_{2F}) = e(C_{5Y}, C'_{2Y}) \cdot e(g, g_4)^{x_j},$$

$$e(C_{2X}, u^{H(L,C_{2X},C_{2Y},C_{2Z},C_{2Z1},C_{2F},C_3)} \cdot v) = e(X_i, C_4),$$

$$e(C_{2Y}, u^{H(L,C_{2X},C_{2Y},C_{2Z},C_{2Z1},C_{2F},C_3)} \cdot v) = e(Y_i, C_4),$$

$$e(C_{2Z}, u^{H(L,C_{2X},C_{2Y},C_{2Z},C_{2Z1},C_{2F},C_3)} \cdot v) = e(Z_i, C_4),$$

$$e(C_{2Z1}, u^{H(L,C_{2X},C_{2Y},C_{2Z},C_{2Z1},C_{2F},C_3)} \cdot v) = e(Z_{1i}, C_4),$$

$$e(C_{2F}, u^{H(L,C_{2X},C_{2Y},C_{2Z},C_{2Z1},C_{2F},C_3)} \cdot v) = e(F_i(L), C_4). \quad (e3)$$

Instead of the seventh verification formula in the formula (e3), the following verification formula may be used.

$$e(C_{5Z}, C'_{2Z1}) \cdot e(C_{5FY}, C'_{2F}) = e(C_{5Y}, C'_{2Y}) \cdot e(X_j, g_4).$$

In this case, the decryption processing unit 54 conducts verification using the public key $pk_j$ of the local device 50.

The verification is successful if the 12 verification formulas in the formula (e3) all hold and fails if any one of the 12 formulas does not hold.

If the verification is successful (or the verification processing in step ST51 is skipped), the decryption processing unit 54 decrypts the re-encrypted data $C_j$ as shown in the following formula using the private key $sk_j$ of the local device 50 in the private key storage unit 51 and the public parameter par in the temporary data storage unit 52 to obtain the message m (ST52).

$$m = C_3 \Big/ \left\{ \left( \frac{e(C_{5Z}, C''_{2Z}) \cdot e(C_{5FX}, C''_{2F})}{e(C_{5X}, C''_{2X})} \right)^{\frac{1}{y_j}} \cdot \left( \frac{e(C_{5Z}, C''_{2Z1}) \cdot e(C_{5FY}, C''_{2F})}{e(C_{5Y}, C''_{2Y})} \right)^{\frac{1}{x_j}} \right\}$$

That the decryption result of the above formula produces m can be checked by the following calculation.

In the following calculation, $g_1$ is rewritten and denoted by $g^\alpha$ and $g_2$ is rewritten and denoted by $g^\beta$.

$$C_3 \Big/ \left\{ \left( \frac{e(C_{5Z}, C''_{2Z}) \cdot e(C_{5FX}, C''_{2F})}{e(C_{5X}, C''_{2X})} \right)^{\frac{1}{y_j}} \cdot \left( \frac{e(C_{5Z}, C''_{2Z1}) \cdot e(C_{5FY}, C''_{2F})}{e(C_{5Y}, C''_{2Y})} \right)^{\frac{1}{x_j}} \right\}$$

$$= C_3 \Big/ \left\{ \left( \frac{e\left( g^{\frac{\pi x_j + \beta y_j + \theta}{z_j k}}, g^{z_i rk} \right) \cdot e\left( g^{\frac{x_i \delta_x}{h}}, g^{(L+w_i)rh} \right)}{e\left( g^{\frac{((\pi x_j + \theta)/x_j)+(L+w_i)\delta_x}{s}}, g^{x_i rs} \right)} \right)^{\frac{1}{y_j}} \cdot \right.$$

$$\left. \left( \frac{e\left( g^{\frac{\pi x_j + \beta y_j + \theta}{z_j k}}, g^{\alpha z_i rk} \right) \cdot e\left( g^{\frac{\alpha y_i \delta_y}{h}}, g^{(L+w_i)rh} \right)}{e\left( g^{\frac{((\beta y_j + \theta)/y_j)+(L+w_i)\delta_y}{t}}, g^{\alpha y_i rt} \right)} \right)^{\frac{1}{x_j}} \right\}$$

$$= C_3 \Big/ \left\{ \left( \frac{e(g^{\pi x_j + \beta y_j + \theta}, g^r) \cdot e(g^{x_i \delta_x}, g^{(L+w_i)r})}{e(g^{\pi x_j + \theta + (L+w_i)x_i \delta_x}, g^r)} \right)^{\frac{1}{y_j}} \cdot \right.$$

$$\left. \left( \frac{e(g^{\pi x_j + \beta y_j + \theta}, g^{\alpha r}) \cdot e(g^{\alpha y_i \delta_y}, g^{(L+w_i)r})}{e(g^{\beta y_j + \theta + (L+w_i)y_i \delta_y}, g^{\alpha r})} \right)^{\frac{1}{x_j}} \right\}$$

$$= m \cdot e(g_4 g_2, g)^r / (e(g, g)^{\beta r} \cdot e(g, g)^{\pi \alpha r}) = m.$$

According to the present embodiment, as described above, due to the configuration of generating the re-encryption key $R_{ijL}$ based on the random numbers $\theta$, $\delta_x$, $\delta_y$, the re-encryption key generation key $rk_j$, and the time parameter L, in addition to the effects of the ninth embodiment, whether to transfer the decryption right can be decided in each period so that finer access control can be exercised. Accordingly, even if the decryption right of ciphertext for the transfer source (in the example of FIG. 8, the group administrator) is once transferred to the transfer destination (in the example of FIG. 8, for example, the user A) in a certain period, it is possible not to grant the decryption right of the ciphertext for the transfer source to the relevant transfer destination, that is, the decryption right of the transfer destination (of the ciphertext for the relevant transfer source) can be invalidated in the next period and therefore, a file sharing system whose convenience is further improved can be provided.

Also according to the present embodiment, as described above, due to the configuration of omitting the one-time signature σ in the fourth embodiment, the data size of ciphertext data and re-encrypted data can be reduced when compared with the embodiment shown in the fourth embodiment. Also according to the present embodiment, the amount of computations needed for encryption processing and re-encryption processing can be reduced when compared with the embodiment shown in the fourth embodiment.

Twenty-First Modification

In the tenth embodiment, an example in which ciphertext data is generated by the encryption device 20, the ciphertext data is re-encrypted by the re-encryption device 40 to generate re-encrypted data, and the re-encrypted data is decrypted by the decryption device 50 is cited, but the tenth embodiment may be changed to a form in which the ciphertext data is decrypted without being re-encrypted. In this case, only the key setup processing, encryption processing, and decryption processing need to be performed. The key setup processing in the present modification is the same as the key setup processing in the tenth embodiment. Hereinafter, the encryption processing and the decryption processing in the present modification will be described.

The difference between the encryption processing in the present modification and the encryption processing in the tenth embodiment is only in the last step. To provide a description by making use of the above symbols, the identification information of the decryption device 50 is assumed to be i for the sake of convenience. In this case, the communication unit 22 of the encryption device 20 transmits the ciphertext data $C_i$ in the temporary data storage unit 21 to the decryption device 50 under the control of the control unit 25 (ST24').

The decryption device 50 verifies the ciphertext data $C_i$ generated by the encryption device 20 using the public parameter par and the private key $sk_i$ of the local device 50 based on the following verification formulas (ST51').

$$e(C_{2X}, u^{H(L,C2X,C2Y,C2Z,C2Z1,C2F,C3)} \cdot v) = e(g, C_4)^{x_i},$$

$$e(C_{2Y}, u^{H(L,C2X,C2Y,C2Z,C2Z1,C2F,C3)} \cdot v) = e(g_1, C_4)^{y_i},$$

$$e(C_{2Z}, u^{H(L,C2X,C2Y,C2Z,C2Z1,C2F,C3)} \cdot v) = e(g, C_4)^{z_i},$$

$$e(C_{2Z1}, u^{H(L,C2X,C2Y,C2Z,C2Z1,C2F,C3)} \cdot v) = e(g_1, C_4)^{z_i},$$

$$e(C_{2F}, u^{H(L,C2X,C2Y,C2Z,C2Z1,C2F,C3)} \cdot v) = e(g, C_4)^{L+w_i}.$$

Incidentally, the decryption device 50 may verify the ciphertext data $C_i$ generated by the encryption device 20 using the public parameter par and the public key $pk_i$ of the local device 50 in the same manner as in step ST41.

The verification is successful if the five verification formulas shown above all hold and fails if any one of the five formulas does not hold.

If the verification is successful (or the verification processing in step ST51' is skipped), the decryption device 50 decrypts the ciphertext data $C_i$ as shown in the following formula using the private key $sk_i$ of the local device 50 and the public parameter par to obtain the message m (ST52').

$$m = C_3 \Big/ e(g_4 g_2, C_{2X})^{\frac{1}{x_i}}$$

That the decryption result of the above formula produces m can be checked by the following calculation.

$$m \cdot e(g_4 g_2, g)^r \Big/ e(g_4 g_2, C_{2X})^{\frac{1}{x_i}}$$
$$= m \cdot e(g_4 g_2, g)^r \Big/ e(g_4 g_2, g^{x_i r})^{\frac{1}{x_i}}$$
$$= m \cdot e(g_4 g_2, g)^r / e(g_4 g_2, g)^r = m.$$

Eleventh Embodiment

In the present embodiment, an example of omitting a one-time signature in the fifth embodiment will be described. Hereinafter, key setup processing, encryption processing, re-encryption key generation processing, re-encryption processing, and decryption processing in the present embodiment will be described. Portions common to the aforementioned first embodiment may or may not be described by using the same reference signs.

(1) Key Setup Processing

First, a public parameter generation unit 13 of a key generator 10 generates a public parameter par={λ, p, $\mathbb{G}$, $\mathbb{G}_T$,g,$g_1$,u,v,H} based on a security parameter λ stored in a key parameter storage unit 11 in advance or acquires the parameter from outside (ST1). H is a hash function defined by the following formula.

$$H: \mathbb{G} \times \mathbb{G}_T \to \mathbb{Z}_p^*$$

If the identification information of a re-encryption key generator 30 is i, a key generation unit 14 randomly selects an element $x_i$ of $Z_p^*$ from $Z_p^*$ and sets a private key $sk_i = x_i$ of the re-encryption key generator 30. Then, the key generation unit 14 generates a public key $pk_i = X_i$ of the re-encryption key generator 30 using the private key $sk_i$ and the public parameter par.

$$X_i = g^{x_i}$$

Further, the key generation unit 14 generates a re-encryption key generation key $rk_i = X_{1i}$ using the private key $sk_i$ and the public parameter par (ST3).

$$X_{1i} = g_1^{x_i}$$

Similarly, if the identification information of a decryption device 50 is assumed to be j, the key generation unit 14 randomly selects an element $x_j$ of $Z_p^*$ from $Z_p^*$ and sets a private key $sk_j = x_j$ of the decryption device 50. Then, the key generation unit 14 generates a public key $pk_j = X_j$ of the decryption device 50 using the private key $sk_j$ and the public parameter par.

$$X_j = g^{x_j}$$

Further, the key generation unit 14 generates a re-encryption key generation key $rk_j = X_{1j}$ using the private key $sk_j$ and the public parameter par (ST6).

$$X_{1j} = g_1^{x_j}$$

(2) Encryption Processing

No one-time signature is used in the present embodiment and therefore, processing corresponding to step ST21 and step ST23 in the first embodiment is not performed.

An encryption parameter generation unit 23 of an encryption device 20 generates and sends out a random number $r \in Z_p^*$ to a ciphertext generation unit 24.

The ciphertext generation unit 24 generates encrypted data $C_2$, $C_3$, $C_4$ below from a message $m \in \mathbb{G}_T$ as plaintext data using the random number r, the public key $pk_i$ of the re-encryption key generator 30, and the public parameter par (ST22).

$$C_2 = X_i^r, \quad C_3 = e(g_1, g)^r \cdot m, \quad C_4 = (u^{H(C_2, C_3)} \cdot v)^r$$

After step ST22 is completed, the ciphertext generation unit 24 generates ciphertext data $C_i = (C_2, C_3, C_4)$ including all the above encrypted data $C_2$ to $C_4$ and writes the obtained ciphertext data into a temporary data storage unit 21.

A communication unit 22 transmits the ciphertext data $C_i$ in the temporary data storage unit 21 to a re-encryption device 40 under the control of a control unit 25 (ST24).

(3) Re-Encryption Key Generation Processing

Now, assume that the decryption device 50 (in the example of FIG. 8, for example, the user A) approves that ciphertext addressed to the re-encryption key generator 30 (in the example of FIG. 8, the group administrator) is re-encrypted into ciphertext addressed to the decryption device 50 (in the example of FIG. 8, for example, the user A) (that is, the transfer of decryption right of the ciphertext to the user A). The decryption device 50 transmits the re-encryption key generation key $rk_j$ of the decryption device 50 to the re-encryption key generator 30. A communication unit 33 of the re-encryption key generator 30 acquires and writes the re-encryption key generation key $rk_j$ of the decryption device 50 into a temporary data storage unit 32 under the control of a control unit 35 (ST31).

Because there is no need to generate a random number for the generation of a re-encryption key in the present embodiment, a random number generation unit 36 of the re-encryption key generator 30 is not needed.

A re-encryption key generation unit 34 generates a re-encryption key $R_{ij}$ as shown in the following formula using the private key $sk_i$ of the re-encryption key generator 30 in a private key storage unit 31, the re-encryption key generation key $rk_j$ of the decryption device 50 in the temporary data storage unit 32, and the public parameter par (ST32).

$$R_{ij} = X_{1j}^{1/x_i} = g_1^{\frac{x_j}{x_i}}$$

(4) Re-Encryption Processing

A re-encryption processing unit 44 of the re-encryption device 40 verifies the ciphertext data $C_i$ in a temporary data storage unit 42 using the public parameter par and the public key $pk_i$ of the re-encryption key generator 30 based on the following verification formula (ST41).

$$e(C_2, u^{H(C_2, C_3)} \cdot v) = e(X_i, C_4).$$

The verification is successful if the above verification formula holds and fails if the above verification formula does not hold.

If the verification is successful (or the verification processing in step ST41 is skipped), a re-encryption parameter generation unit 45 generates and sends out a random number $t \in Z_p^*$ to the re-encryption processing unit 44.

The re-encryption processing unit 44 generates, as shown in the following formulas, re-encrypted data $C_2'$, $C_2''$, $C_2'''$ using the random number t, the ciphertext data $C_i$ stored in the temporary data storage unit 42, the re-encryption key $R_{ij}$, the public key $pk_i$ of the re-encryption key generator 30, and the public parameter par (ST42).

$$C_2' = X_i^t, \; C_2'' = R_{ij}^{1/t} = g_1^{\frac{x_j}{tx_i}}, \; C_2''' = C_2^t = X_i^{rt}$$

After step ST42 is completed, the re-encryption processing unit 44 generates re-encrypted data $C_j=(C_2',C_2'',C_2''',C_2,C_3,C_4,i)$ by adding all the above re-encrypted data $C_2'$ to $C_2'''$ and the identification information i of the re-encryption key generator 30 to the ciphertext data $C_i$ and writes the obtained re-encrypted data $C_j$ into the temporary data storage unit 42.

A communication unit 43 transmits the re-encrypted data $C_j$ in the temporary data storage unit 42 to the decryption device 50 under the control of a control unit 46 (ST43).

(5) Decryption Processing

A decryption processing unit 54 of the decryption device 50 verifies the re-encrypted data $C_j$ in a temporary data storage unit 52 using the private key $sk_j$ of the local device 50 in a private key storage unit 51, the public parameter par in the temporary data storage unit 52, and the public key $pk_i$ of the re-encryption key generator 30 identified by the identification information i of the re-encryption key generator 30 contained in the re-encrypted data $C_j$ in the temporary data storage unit 52 based on the following verification formulas (ST51).

$$e(C_2', C_2'') = e(g, g_1)^{x_j},$$

$$e(C_2''', u^{H(C_2, C_3)} \cdot v) = e(C_2', C_4),$$

$$e(C_2, u^{H(C_2, C_3)} \cdot v) = e(X_i, C_4). \tag{f1}$$

Instead of the first verification formula in the formula (f1), the following verification formula may be used.

$$e(C_2', C_2'') = e(X_j, g_1) \tag{f2}$$

In this case, the decryption processing unit 54 conducts verification using the public key $pk_j$ of the local device 50.

The verification is successful if the three verification formulas in the formula (f1) all hold and fails if any one of the three formulas does not hold.

If the verification is successful (or the verification processing in step ST51 is skipped), the decryption processing unit 54 decrypts the re-encrypted data $C_j$ as shown in the following formula using the private key $sk_j$ of the local device 50 in the private key storage unit 51 and the public parameter par in the temporary data storage unit 52 to obtain the message m (ST52).

$$m = C_3 / e(C_2'', C_2''')^{1/x_j}$$

That the decryption result of the above formula produces m can be checked by the following calculation.

$$C_3 \Big/ e(C_2'', C_2''')^{1/x_j}$$

$$= C_3 \Big/ e\left(g_1^{\frac{x_j}{tx_i}}, g^{x_i rt}\right)^{1/x_j}$$

$$= m \cdot e(g_1, g)^r \Big/ e\left(g_1^{x_j}, g^r\right)^{1/x_j} = m.$$

According to the present embodiment, as described above, due to the configuration of generating the re-encryption key $R_{ij}$ based on the re-encryption key generation key $rk_j$, effects similar to those in the fifth embodiment can be obtained.

Also according to the present embodiment, as described above, due to the configuration of omitting the one-time signature σ in the fifth embodiment, the data size of ciphertext data and re-encrypted data can be reduced when compared with the embodiment shown in the fifth embodiment. Also according to the present embodiment, the amount of computations needed for encryption processing and re-encryption processing can be reduced when compared with the embodiment shown in the fifth embodiment.

Twenty-Second Modification

In the eleventh embodiment, an example in which ciphertext data is generated by the encryption device 20, the ciphertext data is re-encrypted by the re-encryption device 40 to generate re-encrypted data, and the re-encrypted data is decrypted by the decryption device 50 is cited, but the eleventh embodiment may be changed to a form in which the ciphertext data is decrypted without being re-encrypted. In this case, only the key setup processing, encryption processing, and decryption processing need to be performed. The key setup processing in the present modification is the same as the key setup processing in the eleventh embodiment. Hereinafter, the encryption processing and the decryption processing in the present modification will be described.

The difference between the encryption processing in the present modification and the encryption processing in the eleventh embodiment is only in the last step. To provide a description by making use of the above symbols, the identification information of the decryption device 50 is assumed to be i for the sake of convenience. In this case, the communication unit 22 of the encryption device 20 transmits the ciphertext data $C_i$ in the temporary data storage unit 21 to the decryption device 50 under the control of the control unit 25 (ST24').

The decryption device 50 verifies the ciphertext data $C_i$ generated by the encryption device 20 using the public parameter par and the private key $sk_i$ of the local device 50 based on the following verification formula (ST51').

$$e(C_2, u^{H(C_2,C_3)} \cdot v) = e(g, C_4)^{x_i} \quad (f3)$$

Incidentally, the decryption device 50 may verify the ciphertext data $C_i$ generated by the encryption device 20 using the public parameter par and the public key $pk_i$ of the local device 50 in the same manner as in step ST41.

The verification is successful if the verification formula in the formula (f3) holds and fails if the verification formula in the formula (f3) does not hold.

If the verification is successful (or the verification processing in step ST51' is skipped), the decryption device 50 decrypts the ciphertext data $C_i$ as shown in the following formula using the private key $sk_i$ of the local device 50 and the public parameter par to obtain the message m (ST52').

$$m = C_3/e(C_2, g_1)^{1/x_i}$$

That the decryption result of the above formula produces m can be checked by the following calculation.

$$C_3 \Big/ e(g_1, C_2)^{\frac{1}{x_i}}$$
$$= m \cdot e(g_1, g)^r \Big/ e(g_1, g^{x_i r})^{\frac{1}{x_i}}$$
$$= m \cdot e(g_1, g)^r / e(g_1, g)^r = m.$$

Twenty-Third Modification

In addition to the twenty-second modification, as will be described below, the eleventh embodiment may also be changed to a form in which the ciphertext data is decrypted without being re-encrypted. Also in this case, only the key setup processing, encryption processing, and decryption processing need to be performed. The key setup processing and the decryption processing in the present modification are the same as the key setup processing and the decryption processing in the eleventh embodiment respectively. Hereinafter, the encryption processing and the decryption processing in the present modification will be described. In the present modification, the identification information of the decryption device 50 is assumed to be j.

No one-time signature is used in the present embodiment either and therefore, processing corresponding to step ST21 and step ST23 in the first embodiment is not performed. The encryption parameter generation unit 23 of the encryption device 20 generates and sends out two random numbers $r, t \in Z_p^*$ to the ciphertext generation unit 24.

The ciphertext generation unit 24 generates encrypted data $C_2'$, $C_2''$, $C_2'''$, $C_2$, $C_3$, $C_4$ below from a message $m \in G_T$ as plaintext data using the random numbers r,t, the public key $pk_j$ of the decryption device 50, and the public parameter (ST22').

$$C_2' = X_j^t, \; C_2'' = g_1^{1/t}, \; C_2''' = X_j^{rt}, \; C_2 = X_j^r,$$

$$C_3 = e(g_1, g)^r \cdot m, \; C_4 = (u^{H(C_2,C_3)} \cdot v)^r$$

After step ST22' is completed, the ciphertext generation unit 24 generates ciphertext data $C_j = (C_2', C_2'', C_2''', C_2, C_3, C_4, j)$ including all the above encrypted data $C_2'$ to $C_4$ and the identification information j of the decryption device 50 and writes the obtained ciphertext data into the temporary data storage unit 21.

The communication unit 22 transmits the ciphertext data $C_j$ in the temporary data storage unit 21 to the decryption device 50 under the control of the control unit 25 (ST24').

The decryption processing unit 54 of the decryption device 50 verifies the re-encrypted data $C_j$ in the temporary data storage unit 52 using the private key $sk_j$ of the local device 50 in the private key storage unit 51 and the public parameter par in the temporary data storage unit 52 based on the following verification formulas (ST51').

$$e(C_2', C_2'') = e(g, g_1)^{x_j},$$

$$e(C_2''', u^{H(C_2,C_3)} \cdot v) = e(C_2', C_4),$$

$$e(C_2, u^{H(C_2,C_3)} \cdot v) = e(g, C_4)^{x_j}. \quad (f4)$$

Instead of the first verification formula in the formula (f4), the verification formula shown in the formula (f2) may be used. Also instead of the third verification formula in the formula (f4), the following verification formula may be used.

$$e(C_2, u^{H(C_2,C_3)} \cdot v) = e(X_j, C_4).$$

The verification is successful if the three verification formulas in the formula (f4) all hold and fails if any one of the three formulas does not hold.

If the verification is successful (or the verification processing in step ST51' is skipped), the decryption device 50 decrypts the ciphertext data $C_j$ as shown in the following formula using the private key $sk_j$ of the local device 50 and the public parameter par to obtain the message m (ST52').

$$m = C_3/e(C_2'', C_2''')^{1/x_j}$$

That the decryption result of the above formula produces m can be checked by the following calculation.

$$C_3 \Big/ e(C_2'', C_2''')^{1/x_j}$$
$$= C_3 \Big/ e(g_1^{1/t}, g^{x_j rt})^{1/x_j}$$
$$= m \cdot e(g_1, g)^r / e(g_1, g^r) = m.$$

Twelfth Embodiment

In the present embodiment, an example of updating a re-encryption key in the eleventh embodiment at certain intervals will be described. Hereinafter, key setup processing, encryption processing, re-encryption key generation processing, re-encryption processing, and decryption processing in the present embodiment will be described. Portions common to the aforementioned first embodiment or second embodiment may or may not be described by using the same reference signs.

(1) Key Setup Processing

A public parameter generation unit 13 of a key generator 10 generates a public parameter par in the same manner as in the eleventh embodiment or acquires the parameter from outside (ST1). H is a hash function defined by the following formula.

$$H: \mathbb{Z}_p^* \times \mathbb{G}^2 \times \mathbb{G}_T \to \mathbb{Z}_p^*$$

If the identification information of a re-encryption key generator 30 is i, a key generation unit 14 randomly selects elements $x_i$, $y_i$ of $Z_p^*$ from $Z_p^*$ and sets a private key $sk_i=(x_i,y_i)$ of the re-encryption key generator 30. Then, the key generation unit 14 generates a public key $pk_i=(X_i,Y_i)$ of the re-encryption key generator 30 using the private key $sk_i$ and the public parameter par.

$$X_i = g^{x_i}, \; Y_i = g^{y_i}$$

Further, the key generation unit 14 generates a re-encryption key generation key $rk_i = X_{1i}$ using the private key $sk_i$ and the public parameter par (ST3).

$$X_{1i} = g_1^{x_i}$$

Similarly, if the identification information of a decryption device 50 is assumed to be j, the key generation unit 14 randomly selects elements $x_j$, $y_j$ of $Z_p^*$ from $Z_p^*$ and sets a private key $sk_j=(x_j,y_j)$ of the decryption device 50. Then, the key generation unit 14 generates a public key $pk_j=(X_j,Y_j)$ of the decryption device 50 using the private key $sk_j$ and the public parameter par.

$$X_j = g^{x_j}, \; Y_j = g^{y_j}$$

Further, the key generation unit 14 generates a re-encryption key generation key $rk_j = X_{1j}$ using the private key $sk_j$ and the public parameter par (ST6).

$$X_{1j} = g_1^{x_j}$$

(2) Encryption Processing

No one-time signature is used in the present embodiment and therefore, processing corresponding to step ST21 and step ST23 in the first embodiment is not performed.

An encryption parameter generation unit 23 of an encryption device 20 generates and sends out a random number $s \in Z_p^*$ to a ciphertext generation unit 24.

The ciphertext generation unit 24 generates encrypted data $C_1, C_2, C_3, C_4$ below from a message $m \in G_T$ as plaintext data using the random number s, the public key $pk_i$ of the re-encryption key generator 30, the public parameter par, and a time parameter L (ST22).

$$C_1 = X_i^s, \; C_2 = F_i(L)^s, \; C_3 = e(g_1,g)^s \cdot m,$$

$$C_4 = (u^{H(L,C_1,C_2,C_3)} \cdot v)^s$$

The function $F_i(L)$ is defined as shown below.

$$F_i(L) = g^L \cdot Y_i = g^{L+y_i} (L \in \mathbb{Z}_p^*)$$

After step ST22 is completed, the ciphertext generation unit 24 generates ciphertext data $C_i = (L, C_1, C_2, C_3, C_4)$ including the time parameter L and all the above encrypted data $C_1$ to $C_4$ and writes the obtained ciphertext data into a temporary data storage unit 21.

A communication unit 22 transmits the ciphertext data $C_i$ in the temporary data storage unit 21 to a re-encryption device 40 under the control of a control unit 25 (ST24).

(3) Re-Encryption Key Generation Processing

Now, assume that the decryption device 50 (in the example of FIG. 8, for example, the user A) approves that ciphertext addressed to the re-encryption key generator 30 (in the example of FIG. 8, the group administrator) and generated by using L as the time parameter value is re-encrypted into ciphertext addressed to the decryption device 50 (in the example of FIG. 8, for example, the user A) (that is, the transfer of decryption right of the ciphertext to the user A). The decryption device 50 transmits the re-encryption key generation key $rk_j$ of the decryption device 50 to the re-encryption key generator 30. A communication unit 33 of the re-encryption key generator 30 acquires and writes the re-encryption key generation key $rk_j$ of the decryption device 50 into a temporary data storage unit 32 under the control of a control unit 35 (ST31).

A random number generation unit 36 generates and sends out a random number $r \in Z_p^*$ to a re-encryption key generation unit 34.

The re-encryption key generation unit 34 generates a re-encryption key $R_{ijL}$ as shown in the following formulas using the random number r, the private key $sk_i$ of the re-encryption key generator 30 in a private key storage unit 31, the re-encryption key generation key $rk_j$ of the decryption device 50 in the temporary data storage unit 32, the public parameter par, and the time parameter L (ST32).

$$R_{ijL} = (A_{ijL}, B_{ijL})$$

$$A_{ijL} = X_{1j}^{1/x_i} \cdot (g^{L+y_i})^r, \; B_{ijL} = g^{x_i r}$$

(4) Re-Encryption Processing

A re-encryption processing unit 44 of the re-encryption device 40 verifies the ciphertext data $C_i$ in a temporary data storage unit 42 using the public parameter par, the time parameter L contained in the ciphertext data $C_i$ in the temporary data storage unit 42, and the public key $pk_i$ of the re-encryption key generator 30 based on the following verification formulas (ST41).

$$e(X_i, C_4) = e(C_1, u^{H(L,C_1,C_2,C_3)} \cdot v)$$

$$e(X_i, C_2) = e(C_1, F_i(L)).$$

The verification is successful if both verification formulas shown above hold and fails if any one of the two formulas does not hold.

If the verification is successful (or the verification processing in step ST41 is skipped), a re-encryption parameter generation unit 45 generates and sends out two random numbers $t_1, t_2 \in Z_p^*$ to the re-encryption processing unit 44.

The re-encryption processing unit 44 generates, as shown in the following formulas, re-encrypted data $C_1', C_1'', C_1'''$, $C_2', C_2'', C_2'''$ using the random numbers $t_1$, $t_2$, the ciphertext data $C_1$ stored in the temporary data storage unit 42, the re-encryption key $R_{ijL}$, the public key $pk_i$ of the re-encryption key generator 30, and the public parameter par (ST42).

$$C_1' = X_i^{t_1}, \; C_1'' = (A_{ijL})^{1/t_1}, \; C_1''' = C_1^{t_1} = X_i^{s t_1},$$

$$C_2' = F_i(L)^{t_2}, \; C_2'' = B_{ijL}^{1/t_2}, \; C_2''' = C_2^{t_2} = F_i(L)^{s t_2}$$

After step ST42 is completed, the re-encryption processing unit 44 generates re-encrypted data $C_j = (L, C_1', C_1'', C_1''', C_2', C_2'', C_2''', C_1, C_2, C_3, C_4, i)$ by adding all the above re-encrypted data $C_1'$ to $C_2'''$ and the identification information i of the re-encryption key generator 30 to the ciphertext data $C_i$ and writes the obtained ciphertext data into the temporary data storage unit 42.

A communication unit 43 transmits the re-encrypted data $C_j$ in the temporary data storage unit 42 to the decryption device 50 under the control of a control unit 46 (ST43).

(5) Decryption Processing

A decryption processing unit 54 of the decryption device 50 verifies the re-encrypted data $C_j$ in a temporary data storage unit 52 using the private key $sk_j$ of the local device 50 in a private key storage unit 51, the public parameter par in the temporary data storage unit 52, and the public key $pk_i$ of the re-encryption key generator 30 identified by the identification information i of the re-encryption key generator 30 contained in the re-encrypted data $C_j$ in the temporary data storage unit 52 based on the following verification formulas (ST51).

$$e(C'''_1, u^{H(L,C_1C_2,C_3)} \cdot v) = e(C'_1, C_4),$$

$$e(C'''_2, u^{H(L,C_1C_2,C_3)} \cdot v) = e(C'_2, C_4),$$

$$e(C'_1, C''_1) = e(g, g_1)^{xj} \cdot e(C'_2, C''_2),$$

$$e(X_i, C_4) = e(C_1, u^{H(L,C_1C_2,C_3)} \cdot v)$$

$$e(X_i, C_2) = e(C_1, F_i(L))). \tag{f5}$$

Instead of the third verification formula in the formula (f5), the following verification formula may be used.

$$e(C'_1, C''_1) = e(X_j, g_1) \cdot e(C'_2, C''_2) \tag{f6}$$

In this case, the decryption processing unit 54 conducts verification using the public key $pk_j$ of the local device 50.

The verification is successful if the five verification formulas in the formula (f5) all hold and fails if any one of the five formulas does not hold.

If the verification is successful (or the verification processing in step ST51 is skipped), the decryption processing unit 54 decrypts the re-encrypted data $C_j$ as shown in the following formula using the private key $sk_j$ of the local device 50 in the private key storage unit 51 and the public parameter par in the temporary data storage unit 52 to obtain the message m (ST52).

$$m = C_3 \cdot (e(C''_2, C'''_2)/e(C''_1, C'''_1))^{1/xj}.$$

That the decryption result of the above formula produces m can be checked by the following calculation.

$$C_3 \cdot \left\{ e(g^{x_i r_j t_2}, F_i(L)^{s t_2}) \Big/ e\left(\left(g_1^{x_j/x_i} \cdot F_i(L)^r\right)^{1/t_1}, g^{s x_i t_1}\right) \right\}^{1/x_j}$$

$$= C_3 \cdot \left\{ e(g^{x_i r}, F_i(L)^s) \Big/ e\left(g_1^{x_j/x_i} \cdot F_i(L)^r, g^{s x_i}\right) \right\}^{1/x_j}$$

$$= C_3 \cdot \left\{ e(g^{x_i r}, F_i(L)^s) \Big/ e\left(g_1^{x_j} \cdot F_i(L)^{x_i r}, g^s\right) \right\}^{1/x_j}$$

$$= m \cdot e(g_1, g)^s \cdot \left\{ 1 \Big/ e\left(g_1^{x_j}, g^s\right) \right\}^{1/x_j} = m.$$

According to the present embodiment, as described above, due to the configuration of generating the re-encryption key $R_{ijL}$ based on the random number r, the re-encryption key generation key $rk_j$, and the time parameter L, in addition to the effects of the eleventh embodiment, whether to transfer the decryption right can be decided in each period so that finer access control can be exercised. Accordingly, even if the decryption right of ciphertext for the transfer source (in the example of FIG. 8, the group administrator) is once transferred to the transfer destination (in the example of FIG. 8, for example, the user A) in a certain period, it is possible not to grant the decryption right of the ciphertext for the transfer source to the relevant transfer destination, that is, the decryption right of the transfer destination (of the ciphertext for the relevant transfer source) can be invalidated in the next period and therefore, a file sharing system whose convenience is further improved can be provided.

Also according to the present embodiment, as described above, due to the configuration of omitting the one-time signature σ in the sixth embodiment, the data size of ciphertext data and re-encrypted data can be reduced when compared with the embodiment shown in the sixth embodiment. Also according to the present embodiment, the amount of computations needed for encryption processing and re-encryption processing can be reduced when compared with the embodiment shown in the sixth embodiment.

Twenty-Fourth Modification

In the twelfth embodiment, an example in which ciphertext data is generated by the encryption device 20, the ciphertext data is re-encrypted by the re-encryption device 40 to generate re-encrypted data, and the re-encrypted data is decrypted by the decryption device 50 is cited, but the twelfth embodiment may be changed to a form in which the ciphertext data is decrypted without being re-encrypted. In this case, only the key setup processing, encryption processing, and decryption processing need to be performed. The key setup processing in the present modification is the same as the key setup processing in the twelfth embodiment. Hereinafter, the encryption processing and the decryption processing in the present modification will be described.

The difference between the encryption processing in the present modification and the encryption processing in the twelfth embodiment is in the last step only. To provide a description by making use of the above symbols, the identification information of the decryption device 50 is assumed to be i for the sake of convenience. In this case, the communication unit 22 of the encryption device 20 transmits the ciphertext data $C_i$ in the temporary data storage unit 21 to the decryption device 50 under the control of the control unit 25 (ST24').

The decryption device 50 verifies the ciphertext data $C_i$ generated by the encryption device 20 using the public parameter par and the private key $sk_i$ of the local device 50 based on the following verification formula (ST51').

$$e(g, C_4)^{x_i} = e(C_1, u^{H(L,C_1,C_2,C_3)} \cdot v)$$

$$e(g, C_2)^{x_i} = e(C_1, g)^{L+y_i}. \tag{f7}$$

Incidentally, the decryption device 50 may verify the ciphertext data $C_i$ generated by the encryption device 20 using the public parameter par and the public key $pk_i$ of the local device 50 in the same manner as in step ST41.

The verification is successful if both verification formulas in the formula (f7) hold and fails if any one of the two formulas does not hold.

If the verification is successful (or the verification processing in step ST51' is skipped), the decryption device 50 decrypts the ciphertext data $C_i$ as shown in the following formula using the private key $sk_i$ of the local device 50 and the public parameter par to obtain the message m (ST52').

$$m = C_3 \Big/ e(C_1, g_1)^{\frac{1}{x_i}}$$

That the decryption result of the above formula produces m can be checked by the following calculation.

$$C_3 \Big/ e(C_1, g_1)^{\frac{1}{x_i}}$$

$$= m \cdot e(g_1, g)^s \Big/ e(g^{x_i s}, g_1)^{\frac{1}{x_i}}$$

$$= m \cdot e(g_1, g)^s / e(g, g_1)^s = m.$$

Twenty-Fifth Modification

In addition to the twenty-fourth modification, as will be described below, the twelfth embodiment may also be changed to a form in which the ciphertext data is decrypted without being re-encrypted. Also in this case, only the key setup processing, encryption processing, and decryption processing need to be performed. The key setup processing and the decryption processing in the present modification are the same as the key setup processing and the decryption processing in the twelfth embodiment respectively. Hereinafter, the encryption processing and the decryption processing in the present modification will be described. In the present modification, the identification information of the decryption device 50 is assumed to be j.

No one-time signature is used in the present embodiment either and therefore, processing corresponding to step ST21 and step ST23 in the first embodiment is not performed. The encryption parameter generation unit 23 of the encryption device 20 generates and sends out two random numbers $t_1, t_2 \in Z_p^*$ to the ciphertext generation unit 24.

The ciphertext generation unit 24 generates encrypted data $C_1', C_1'', C_1''', C_2', C_2'', C_2''', C_1, C_2, C_3, C_4$ below from a message $m \in G_T$ as plaintext data using the random numbers $t_1, t_2$, the public key $pk_j$ of the decryption device 50, the public parameter, and a time parameter L (ST22').

$$C_1' = X_j^{t_1},\ C_1'' = (F_j(L) \cdot g_1)^{1/t_1},\ C_1''' = X_j^{st_1},$$

$$C_2' = F_j(L)^{t_2},\ C_2'' = X_j^{1/t_2},\ C_2''' = F_j(L)^{st_2},$$

$$C_1 = X_j^s,\ C_2 = F_j(L)^s,\ C_3 = e(g_1, g)^s \cdot m,$$

$$C_4 = (u^{H(L, C_1, C_2, C_3)} \cdot v)^s$$

After step ST22' is completed, the ciphertext generation unit 24 generates ciphertext data $C_j = (L, C_1', C_1'', C_1''', C_2', C_2'', C_2''', C_1, C_2, C_3, C_4, j)$ including the time parameter L, all the above encrypted data $C_1'$ to $C_4$, and the identification information j of the decryption device 50 and writes the obtained ciphertext data into the temporary data storage unit 21.

The communication unit 22 transmits the ciphertext data $C_j$ in the temporary data storage unit 21 to the decryption device 50 under the control of the control unit 25 (ST24').

The decryption processing unit 54 of the decryption device 50 verifies the re-encrypted data $C_j$ in the temporary data storage unit 52 using the private key $sk_j$ of the local device 50 in the private key storage unit 51 and the public parameter par in the temporary data storage unit 52 based on the following verification formulas (ST51').

$$e(C_1''', u^{H(L, C_1, C_2, C_3)} \cdot v) = e(C_1', C_4),$$

$$e(C_2''', u^{H(L, C_1, C_2, C_3)} \cdot v) = e(C_2', C_4),$$

$$e(C_1', C_1'') = e(g, g_1)^{x_j} \cdot e(C_2', C_2''),$$

$$e(g, C_4)^{x_j} = e(C_1, u^{H(L, C_1, C_2, C_3)} \cdot v),$$

$$e(g, C_2)^{x_j} = e(C_1, g)^{L+y_j}. \tag{f8}$$

Instead of the third verification formula in the formula (f8), the verification formula shown in the formula (f6) may be used. Also instead of the fourth and fifth verification formulas in the formula (f8), the following verification formulas may be used.

$$e(X_j, C_4) = e(C_1, u^{H(L, C_1, C_2, C_3)} \cdot v)$$

$$e(X_j, C_2) = e(C_1, F_j(L)).$$

The verification is successful if the five verification formulas in the formula (f8) all hold and fails if any one of the five formulas does not hold.

If the verification is successful (or the verification processing in step ST51' is skipped), the decryption processing unit 54 decrypts the re-encrypted data $C_j$ as shown in the following formula using the private key $sk_j$ of the local device 50 in the private key storage unit 51 and the public parameter par in the temporary data storage unit 52 to obtain the message m (ST52').

$$m = C_3 \cdot e(C_2'', C_2''') / e(C_1'', C_1''')^{1/x_j}.$$

That the decryption result of the above formula produces m can be checked by the following calculation.

$$C_3 \cdot \{e(C_2'', C_2''') / e(C_1'', C_1''')\}^{\frac{1}{x_j}}$$

$$= C_3 \cdot \left\{ e(g^{x_j/t_2}, F_j(L)^{st_2}) / e\left((F_j(L) \cdot g_1)^{\frac{1}{t_1}}, g^{sx_j t_1}\right) \right\}^{1/x_j}$$

$$= C_3 \cdot \{e(g^{x_j}, F_j(L)^s) / e(F_j(L) \cdot g_1, g^{sx_j})\}^{1/x_j}$$

$$= m \cdot e(g_1, g)^s \cdot \{1 / e(g_1, g^{sx_j})\}^{1/x_j} = m.$$

According to at least one of the embodiments described above, due to the configuration of generating a re-encryption key based on a re-encryption key generation key, safe file sharing can be realized. For example, if the transfer destination (in the example of FIG. 8, for example, the user A) does not notify the transfer source (in the example of FIG. 8, the group administrator) of the re-encryption key generation key, a re-encryption key cannot be generated and therefore, re-encryption without approval of the transfer destination (that is, the transfer of decryption right of ciphertext to the relevant transfer destination) can be prevented.

Scenes of using each of the above embodiments will be described below.

The following three methods (1) to (3) can be cited in a file sharing system in which a user uploads a file to a server and the file is shared among a plurality of users as a method of maintaining confidentiality of file in the server.

(1) Individual key scheme in which a file is encrypted by an individual encryption key for each user (2) Shared key scheme in which a file is encrypted by an encryption key shared by each user (3) Re-encryption scheme in which a file is encrypted using a proxy re-encryption scheme In the above (1) to (3) schemes, the user who uploads a file to the server is assumed to be the user A and the user A shares the file with the user B and the user C.

In the individual key scheme in (1), each user has a set of a private key and a public key that differ from user to user. The user A encrypts a file by the public key of the user B (as an individual encryption key for the user B) and uploads the encrypted file to the server. Similarly, the user A encrypts the file by the public key of the user C (as an individual encryption key for the user C) and uploads the encrypted file to the server. That is, the user A individually encrypts the file for each of the users who share the file.

In the shared key scheme in (2), each user shares a set of a private key and a public key common to each user. The user A encrypts a file by the public key (as an encryption key common to each user) and uploads the encrypted file to the server. Each user shares the same private key.

In the proxy re-encryption scheme in (3), like the individual key scheme in (1), each user has a set of a private key and a public key that differ from user to user. In contrast to the individual key scheme in (1), however, the user A only needs to encrypt a file by the public key (hereinafter, called a group public key) of an entity (hereinafter, called the group administrator) that manages a group of users. The server uses the re-encryption key to re-encrypt the encrypted file (uploaded by the user A) into an encrypted file that can be decrypted only by each user. Details of the proxy re-encryption scheme will be described later.

In the individual key scheme in (1), if the file should newly be shared also by a user D, a problem arises that it is necessary for the user A to encrypt the file by the public key of the user D (as an individual encryption key of the user D) and upload the encrypted file to the server. Therefore, the method in (1) complicates the processing to add new users when the number of new users or the number of shared file is large, making the method unsuitable for a file sharing system.

In the shared key scheme in (2), a problem arises that when a certain user (who has been allowed to share files till a certain point in time) should be prevented from being able to share files (the relevant user should be excluded from the file sharing system) from that point in time, a mechanism that updates the private key and public key common to each user is separately needed or if the private key common to each user should be leaked, all encrypted files could be decrypted (by anyone who has acquired the leaked key). Therefore, the shared key scheme in (2) is unsuitable for a file sharing system.

In the proxy re-encryption scheme in (3), on the other hand, the server uses the re-encryption key to re-encrypt one piece of ciphertext into ciphertext that can be decrypted only by each user and thus, the above problems can be solved by adopting a configuration in which the user is not notified of the re-encryption key. Therefore, the proxy re-encryption scheme in (3) is suitable for a file sharing system. The proxy re-encryption scheme described above presents no particular problem, but if a problem should be brought up, a server is enabled to create re-encrypted text without permission of each user. Therefore, from the viewpoint of realizing safe file sharing, there is room for improvements of the proxy re-encryption scheme and the invention according to the present embodiment can realize safe file sharing.

Next, thirteenth and fourteenth embodiments using public information for re-encryption key generation will be described.

Thirteenth Embodiment

The basic model of the proxy re-encryption scheme according to the thirteenth and fourteenth embodiments includes, like the above case, five functions. Similarly, depending on the implementation method of re-encryption, a model that differs in input into the functions and a model including other functions or keys than the above are also considered.

For example, a model, like the re-encryption scheme shown in the present embodiment, in which the public key is divided into a public key for encryption and public information for generating a re-encryption key can be considered, but in conventional technology, a model in which the division into the public key for encryption and public information for generating a re-encryption key is not implemented also exists.

Also, similarly to that described above, a model known as a non-interactive model and a model into which, instead of a private key skA of the user A, a re-encryption key rkA→B addressed to the user B and a private key skC of the user C are input are also considered.

Also, similarly to that described above, a model known as a unidirectional model and a model called a bidirectional model are known.

Figure 7:
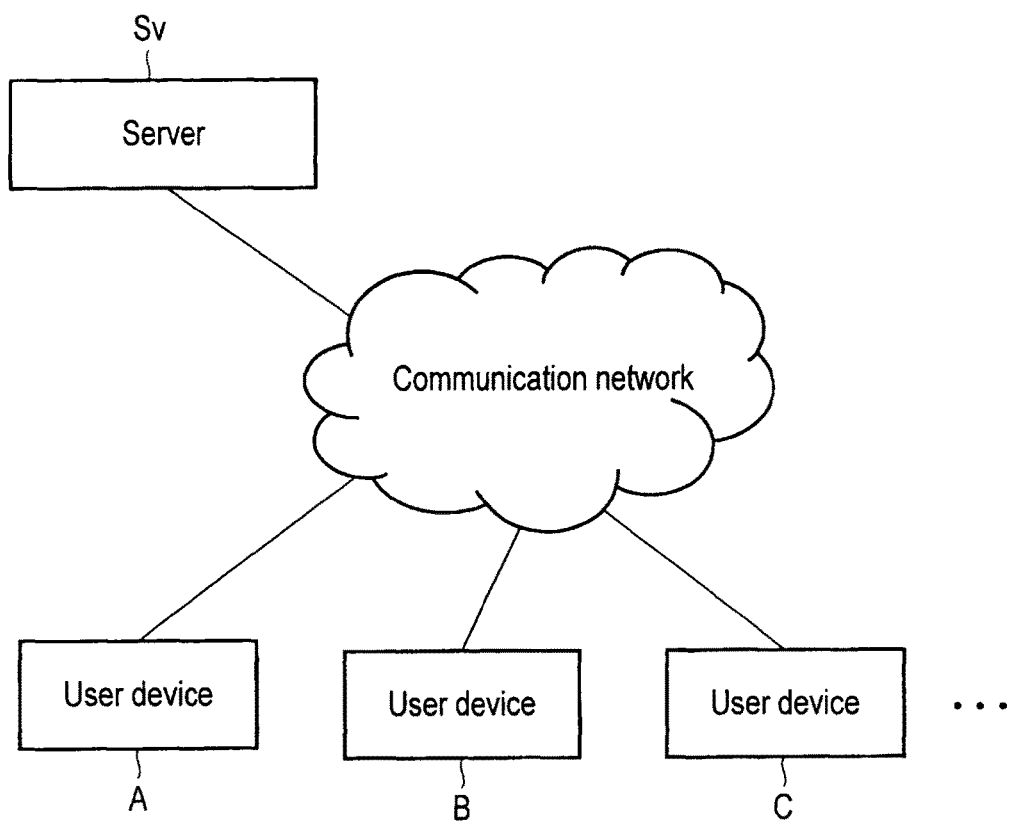
FIG. 7 is a diagram illustrating the configuration of a file sharing system according to the embodiment.
Figure 18:
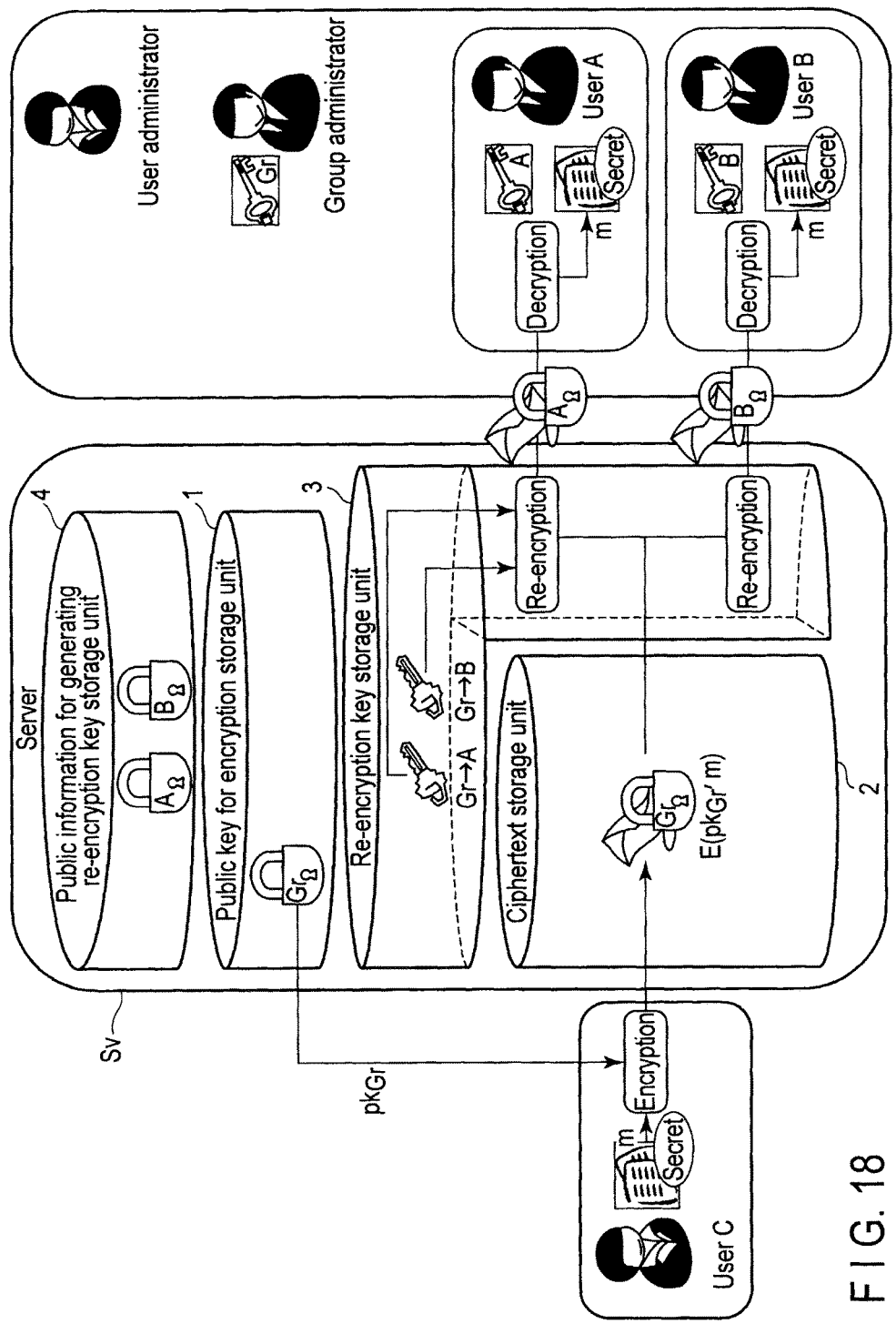
FIG. 18 is a schematic diagram illustrating a file sharing system in the embodiment.

Next, the configuration and effects of file sharing systems according to the thirteenth and fourteenth embodiments are similar to the configuration and effects of the file sharing system described using FIGS. 7 and 8. In the thirteenth and fourteenth embodiments, however, instead of FIG. 8, FIG. 18 is used because public information for generating a re-encryption key is used.

FIG. 12 is a schematic diagram showing the configuration of a re-encryption system according to the thirteenth embodiment. (The correspondence between FIGS. 12 and 18 will be described later.) The re-encryption system includes a key generator 10, an encryption device 20, a re-encryption key generator 30, a re-encryption device 40, and a decryption device 50. The key generator 10 generates various parameters of the re-encryption system and also a public key for encryption, public information for generating a re-encryption key, and a private key for each of the devices 40, 50.

The encryption device 20 transmits ciphertext data obtained by encrypting plaintext data using a public key for encryption corresponding to a private key of the re-encryption key generator 30 to the re-encryption device 40.

The re-encryption key generator 30 generates a re-encryption key using the private key of the re-encryption key generator 30, the public information for generating a re-encryption key of the decryption device 50, and a random number.

The re-encryption device 40 transmits, to the decryption device 50, re-encrypted data obtained by re-encrypting the ciphertext data received from the encryption device 20 by the re-encryption key without decrypting the ciphertext data.

The decryption device 50 performs verification processing of the re-encrypted data using the public key for encryption of the re-encryption key generator 30 and also performs decryption processing of the re-encrypted data using the private key corresponding to the public key for encryption of the local device 50 to obtain plaintext data. While a plurality of units of the re-encryption key generator 30, the re-encryption device 40, or the decryption device 50 may be provided, here a case in which one unit of each device is provided is taken as an example.

The correspondence between FIGS. 12 and 18 will be described. Each of the devices 10 to 50 is held by an entity that performs the relevant processing. When the user generates each of a public key for encryption, public information for generating a re-encryption key, and a private key of the user, the relevant user holds the key generator 10.

If, for example, the user administrator or the group administrator generates each of a public key for encryption, public information for generating a re-encryption key, and a private key of the user, the user administrator or the group administrator holds the key generator 10. The user holds the encryption device 20 or the decryption device 50 or both. The group administrator holds the re-encryption key generator 30.

If, for example, the user administrator or the server Sv generates a re-encryption key, the user administrator or the server Sv holds the re-encryption key generator 30. The server Sv holds the re-encryption device 40. In the file sharing system illustrated in FIG. 18, the server Sv holds a public key storage unit 1, a ciphertext storage unit 2, a re-encryption key storage unit 3, and a public information for generating re-encryption key storage unit 4 and the user C who performs encryption acquires a public key for encryption used for encryption from the public key storage unit 1. However, the present embodiment is not limited to such an example and the user C may acquire, as will be described later, a public key for encryption used for encryption from the key generator 10 (that has generated the public key for encryption used for encryption). The server Sv stores ciphertext E (pkGr,m) generated by the user C in the ciphertext storage unit 2. The ciphertext storage unit 2 may be included in the re-encryption device 40 or an outside storage device not included in the re-encryption device 40.

Which entity holds which device is not limited to the above example and various variations can be considered. The user administrator or the group administrator may or may not serve also as a user. Each user device used by each user may be called a first user device, a second user device, . . . . Similarly, the public key for encryption, the public information for generating a re-encryption key, and the private key generation key of each user device may be called the first public key for encryption, the first public information for generating a re-encryption key, and the first private key of the first user device, the second public key for encryption, the second public information for generating a re-encryption key, and the second private key of the second user device, . . . .

Subsequently, the configuration of each of the devices 10 to 50 will concretely be described.

The key generator 10 includes a key generation parameter storage unit 11, a temporary data storage unit 12, a public parameter generation unit 13, a key generation unit 14, a communication unit 15, and a control unit 16.

The key generation parameter storage unit 11 is a storage device that stores key generation parameters.

The temporary data storage unit 12 is a storage device that stores temporary data such as data being processed by each of the generation units 13, 14 and processing results.

The public parameter generation unit 13 generates a public parameter for key generation.

The key generation unit 14 generates a public key for encryption, public information for generating a re-encryption key, and a private key addressed to a user.

The communication unit 15 is a communication interface to communicate between the key generator 10 and the other devices 20, 30, 40, 50 and has, for example, each of the following functions (f15-1), (f15-2):

(f15-1) Function to transmit the public key for encryption, public information for generating a re-encryption key, and private key of each of the devices 30, 50 in the temporary data storage unit 12 to each of the relevant devices 30, 50 under the control of the control unit 16.

(f15-2) Function to transmit the public key for encryption of the re-encryption key generator 30 in the temporary data storage unit 12 to the encryption device 20 under the control of the control unit 16.

In the description that follows, the description that transmission/reception goes through the communication unit 15 may be omitted to avoid a redundant description during transmission/reception. This also applies to each communication unit of the other devices 20, 30, 40, 50 than the key generator 10.

Figure 13:
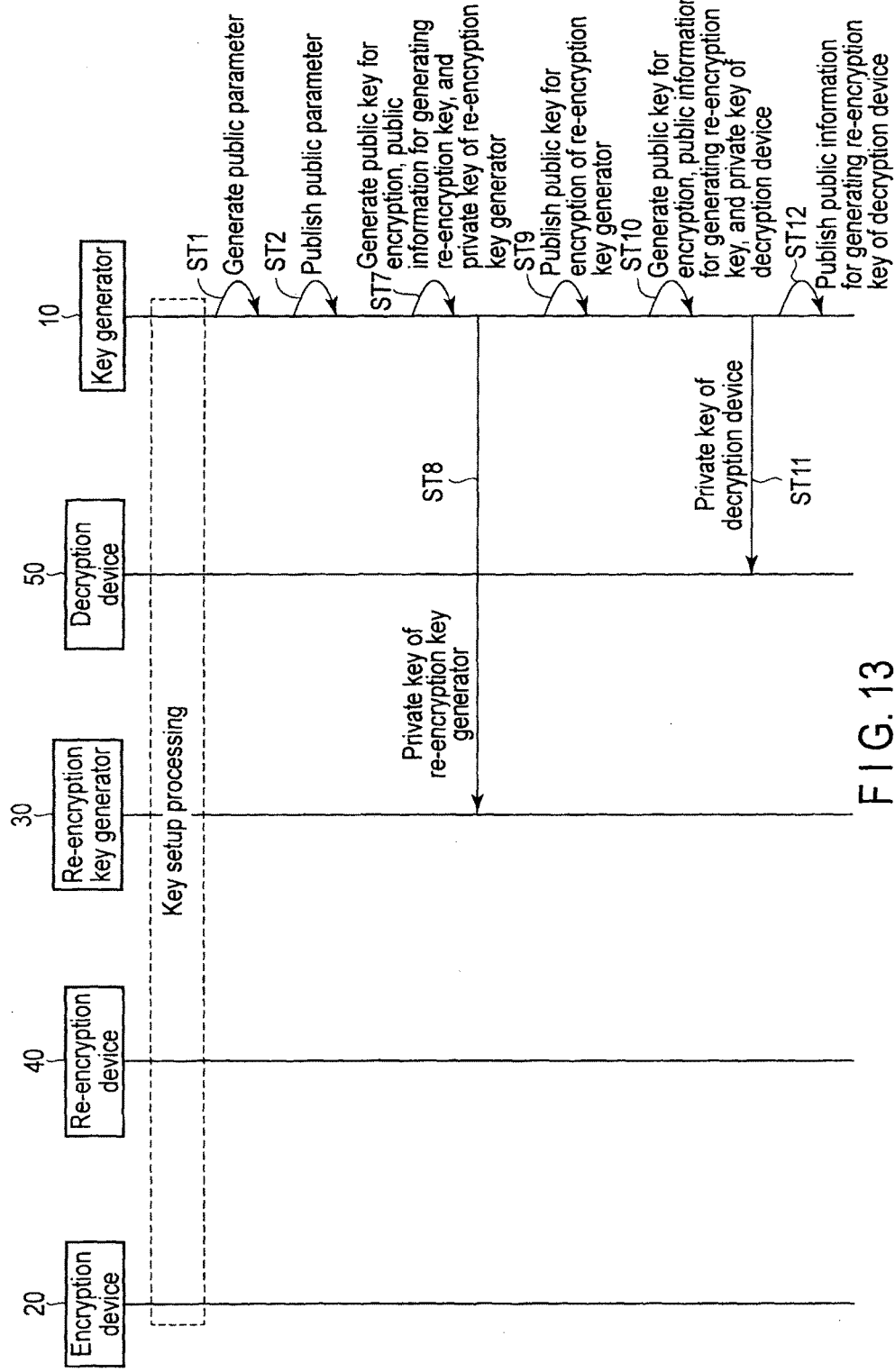
FIG. 13 is a sequence diagram illustrating the operation of key setup processing in the embodiment.

The control unit 16 has a function to control each of the units 11 to 15 of the key generator 10 such that each unit operates as shown in FIG. 13.

The encryption device 20 includes a temporary data storage unit 21, a communication unit 22, an encrypted data generation unit 23, a ciphertext generation unit 24, and a control unit 25.

The temporary data storage unit 21 is a storage device that stores a public key for encryption of the re-encryption key generator 30 received from the key generator 10 and transient data (hereinafter, written as "temporary data") such as data being processed by each of the generation devices 23, 24 and processing results.

The communication unit 22 is a communication interface to communicate between the encryption device 20 and the other devices 10, 30, 40, 50 and has, for example, each of the following functions (f22-1), (f22-2):

(f22-1) Function to acquire the public key for encryption of the re-encryption key generator 30 published to the key generator 10 and to write the public key for encryption into the temporary data storage unit 21.

(f22-2) Function to transmit the ciphertext data in the temporary data storage unit 21 to the re-encryption device 40 under the control of the control unit 25.

The encryption parameter generation unit 23 has a function to generate an encryption parameter.

The ciphertext generation unit 24 has, for example, each of the following functions (f24-1), (f24-2):

(f24-1) Function to generate ciphertext data by encrypting plaintext data using the public key for encryption (first public key of the first user device) of the re-encryption key generator 30 read from the temporary data storage unit 21.

(f24-2) Function to write the obtained ciphertext data into the temporary data storage unit 21.

The control unit 25 has a function to control each of the units 21 to 24 such that each unit operates as shown in FIG. 14.

The re-encryption key generator 30 includes a private key storage unit 31, a temporary data storage unit 32, a communication unit 33, a re-encryption key generation unit 34, a control unit 35, and a random number generation unit 36.

The private key storage unit 31 is a storage device that stores a private key of the re-encryption key generator 30 received from the key generator 10.

The temporary data storage unit 32 is a storage device that stores public information for generating a re-encryption key of the decryption device 50 received from the key generator 10 and temporary data such as data being processed by the re-encryption device 34 and processing results.

The communication unit 33 is a communication interface to communicate between the re-encryption key generator 30 and the other devices 10, 20, 40, 50 and has, for example, a function to transmit the re-encryption key in the temporary data storage unit 32 to the re-encryption device 40 under the control of the control unit 35.

The re-encryption key generation unit 34 has, for example, each of the following functions (f34-1), (f34-2):

(f34-1) Function to generate a re-encryption key based on the private key of the re-encryption key generator 30 read from the private key storage unit 31 (first private key of the first user device), the public information for generating a re-encryption key read from the decryption device 50 read from the temporary data storage unit 32 (second public information for generating a re-encryption key of the second user device), and a random number generated by the random number generation unit 36 (in this function, a parameter, more specifically, a random number for encryption is not needed).

The function (f34-1) to generate a re-encryption key may generate a re-encryption key based on the first private key, second public information for generating a re-encryption key, and random number independently of ciphertext data before re-encryption. The public key for encryption of the re-encryption key generator 30 may be generated based on the first private key and a plurality of system fixed values. The second public information for generating a re-encryption key may be generated based on the second private key and a plurality of system fixed values.

(f34-2) Function to write the re-encryption key into the temporary data storage unit 32.

The control unit 35 has a function to control each of the units 31 to 34, 36 such that each unit operates as shown in FIG. 15.

The random number generation unit 36 has a function to generate and send out a random number to the re-encryption key generation unit 34.

The re-encryption device 40 includes a re-encryption key storage unit 41, a temporary data storage unit 42, a communication unit 43, a re-encryption processing unit 44, a re-encryption parameter generation unit 45, and a control unit 46.

The re-encryption key storage unit 41 is a storage unit that stores the re-encryption key received from the re-encryption key generator 30.

The temporary data storage unit 42 is a storage device that stores temporary data such as data being processed by the re-encryption processing unit 44 and processing results.

The communication unit 43 is a communication interface to communicate between the re-encryption device 40 and the other devices 10, 20, 30, 50 and has, for example, each of the following functions (f43-1), (f43-2):

(f43-1) Function to send out ciphertext data received from the encryption device 20 to the re-encryption processing unit 44.

(f43-2) Function to transmit the re-encrypted data in the temporary data storage unit 42 to the decryption device 50 under the control of the control unit 46.

The re-encryption processing unit 44 has, for example, each of the following functions (f44-1), (f44-2):

(f44-1) Function to obtain re-encrypted data by, when ciphertext data is received from the encryption device 20, re-encrypting the ciphertext data using the re-encryption key read from the re-encryption key storage unit 41 without decrypting the ciphertext data.

(f44-2) Function to write the obtained re-encrypted data into the temporary data storage unit 42.

The control unit 46 has a function to control each of the units 41 to 45 such that each unit performs an operation (not shown) to deliver a re-encrypted text verification program and operates as shown in FIG. 16.

The decryption device 50 includes a private key storage unit 51, a temporary data storage unit 52, a communication unit 53, a decryption processing unit 54, and a control unit 56.

The private key storage unit 51 is a storage device that stores a private key of the decryption device 50 received from the key generator 10.

The temporary data storage unit 52 is a storage device that stores a public key for encryption/public information for generating a re-encryption key of the decryption device 50 received from the key generator 10 and a public key for encryption of the re-encryption key generator 30 and also temporary data such as data being processed by the decryption processing unit 54 and processing results.

The communication unit 53 is a communication interface to communicate between the decryption device 50 and the other devices 10, 20, 30, 40 and has, for example, each of the following functions (f53-1) to (f53-3):

(f53-1) Function to write a private key of the decryption device 50 received from the key generator 10 into the private key storage unit 51.

(f53-2) Function to write a public key for encryption/public information for generating a re-encryption key of the decryption device 50 received from the key generator 10 and a public key for encryption of the re-encryption key generator 30 into the temporary data storage unit 52.

(f53-3) Function to send out re-encrypted data received from the re-encryption device 40 to the decryption processing unit 54.

The decryption processing unit 54 has, for example, each of the following functions (f54-1) to (f54-3):

(f54-1) Function to obtain plaintext data by, when re-encrypted data is received from the re-encryption device 40, performing decryption processing on the re-encrypted data based on the private key of the decryption device 50 read from the private key storage unit 51 (second private key of the second user device).

(f54-2) Function to write the obtained plaintext data into the temporary data storage unit 52.

Figure 17:
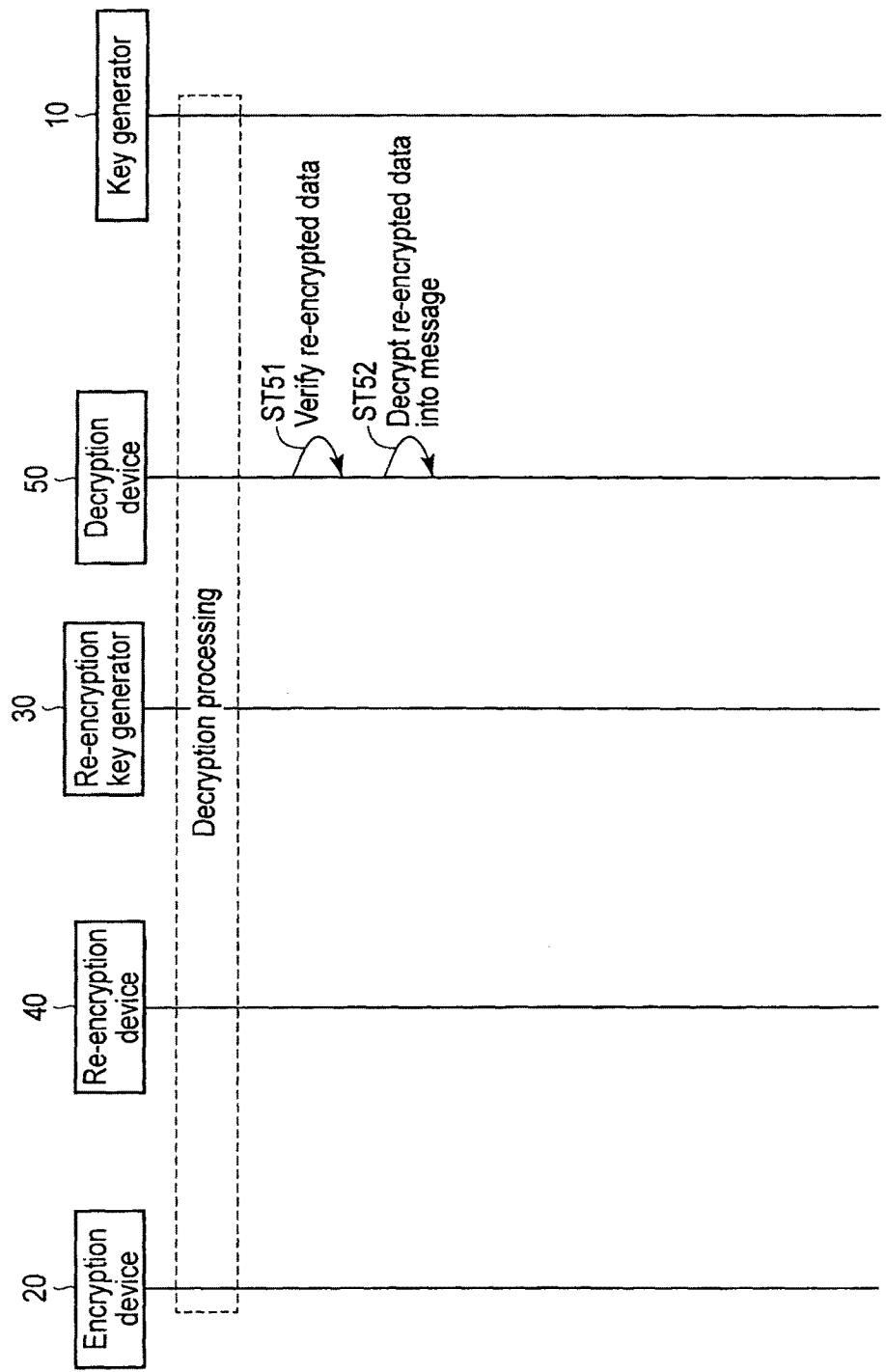
FIG. 17 is a sequence diagram illustrating the operation of decryption processing in the embodiment.

The control unit 56 has a function to control each of the units 51 to 54 such that each unit operates as shown in FIG. 17.

Next, the operation of the re-encryption system configured as described above will be described using the sequence diagrams of FIGS. 13 to 17.

The following operation takes a case in which processing is performed in a procedure of (1) key setup processing, (2) encryption processing, (3) re-encryption key generation processing, (4) re-encryption processing, and (5) decryption processing as an example. However, in the following operation, processing is not necessarily performed following the above procedure. For example, processing of re-encryption key generation may be performed before the encryption processing. Also, ciphertext data may be decrypted without the re-encryption processing being performed.

(1) The key setup processing is performed by the key generator 10 as shown in FIG. 13 and each of steps ST1 to ST12 below.

First, the public parameter generation unit 13 of the key generator 10 generates a public parameter $(p,\lambda,G,G_T,g,g_1, g_2,g_3,g_4,u,v,\text{Sig }(\hat{G},\hat{S},\hat{V}))$ or acquires the public parameter from outside (ST1).

More specifically, the public parameter generation unit 13 generates bilinear map groups $(G \rightarrow G_T)$ satisfying the order $p>2\lambda$, elements $g,g_1,g_2,g_3,g_4,u,v$ of $G$, and a one-time signature algorithm Sig $(\hat{G},\hat{S},\hat{V})$ satisfying strong unforgeability based on a security parameter $\lambda$ stored in the key parameter storage unit 11 in advance.

$Z_p^*$ is a set $(=(Z/pZ)^*)$ of integers mutually prime to $Z_p$ and $p$ and may also be called a multiplicative group $Z_p^*$ for the prime number $p$. $Z_p$ is a set $(=(Z/pZ))$ of integers equal to 0 or greater and less than $p$. The "element" is a term having a mathematical meaning, is also called a constituent, and refers to, in a set constituted of a plurality of "things", individual things constituting the set.

More specifically, the public parameter generation unit 13 selects bilinear map groups $(G \rightarrow G_T)$ satisfying the order $p>2\lambda$ based on the security parameter $\lambda$ stored in the key generation parameter storage unit 11 in advance. In this case, p is an integer. p may be a prime number or a composite number. The public parameter generation unit 13 randomly selects elements $g$, $g_1$, $g_2$, $u$, $v$ of $G$ from $G$. The public parameter generation unit 13 randomly selects $\xi$ from $Z_p^*$ and calculates $g_3=g^\xi$ and $g_4=g_1^\xi$. $Z_p^*$ is a set $(=(Z/pZ)^*)$ of integers mutually prime to $Z_p$ and p and may also be called a multiplicative group $Z_p^*$ for p. $Z_p$ is a set $(=(Z/pZ))$ of integers equal to 0 or greater and less than p. $g_3$ is a value based on a random number $\xi$ and a system fixed value g. $g_4$ is a value based on the random number $\xi$ and a system fixed value $g_1$.

$\hat{G}$ in the one-time signature algorithm $Sig(\hat{G},\hat{S},\hat{V})$ (hereinafter, $Sig(\hat{G},\hat{S},\hat{V})$ is also called Sig) means a function to generate a one-time key pair (ssk, svk), $\hat{S}$ means a function to generate a signature $\sigma$ for a message M, and $\hat{V}$ means a function to validate the signature $\sigma$.

For more information about the one-time signature, see A. Menezes, P. van Oorschot, S. Vanstone, "Handbook of Applied Cryptography", CRC Press, (1996) pp. 462-471, (1996).

The bilinear map (denoted by e) is a map yielding $e:G \times G \to G_T$ and satisfies the following three properties:

1. $e(ga,hb)=e(g,h)ab$ holds for any $(g,h) \in G \times G$ and $a,b \in Z$, where Z is a set of integers.
2. $e(g,h)$ is computable for any $(g,h) \in G \times G$.
3. $e(g,h) \neq 1_{G_T}$ always holds if $g,h \neq 1_G$, where $1_G$ is the unit element of G and $1G_T$ is the unit element of $G_T$.

The bilinear map group (denoted by G, $G_T$) is a group of the prime number order p for which a bilinear map $e:G \times G \to G_T$ exists. The above definition also means that if $g_1=g^\alpha$ and $g_2=g^\beta$ for elements g, $g_1$, $g_2$ of G, the following equation holds ($\alpha$ and $\beta$ are the exponents relating to elements g, $g_1$, $g_2$ of G).

$$e(g_1,g_2,g)=e(g,g_1,g_2)=e(g,g^\alpha \cdot g^\beta)=e(g,g^{\alpha+\beta})=e(g,g)\alpha+\beta=e(g,g)\alpha \cdot e(g,g)\beta$$

Incidentally, a plurality of elements g, $g_1$, $g_2$ of G is a plurality of preset system fixed values. The plurality of system fixed values is not limited to three elements of the bilinear map group G and a plurality of elements such as two or four or more elements of G can also be used when appropriate. The term of "system fixed value" may be changed to a "fixed value", an "element", or a "system parameter". The plurality of system fixed values are a plurality of elements of a bilinear map group as a group of prime number orders for which a bilinear map exists.

In this specification, the notation assuming that both G and $G_T$ are multiplicative groups is adopted, but the embodiments are not limited to such a notation and each of G, $G_T$ can be represented by a notation assuming that each is an additive group. That is, for example, G may be represented as an additive group and $G_T$ as a multiplicative group. As the bilinear map, a map that yields $e:G_1 \times G_2 \to G_T$ for bilinear map groups $G_1$, $G_2$, $G_T$ ($G_1$ and $G_2$ are different groups) may also be used. In this case, each element of G in each piece of processing described later may be rewritten to an element of $G_1$ or an element of $G_2$ when appropriate. The above also apply to other embodiments.

Subsequently, the public parameter generation unit 13 writes the generated public parameter par into the temporary data storage unit 12. The key generator 10 publishes the public parameters p,$\lambda$,G,$G_T$,g,$g_1$,$g_2$,$g_3$,$g_4$,u,v,Sig) in the temporary data storage unit 12 (ST2). If a public parameter is published before step ST1 is executed, step ST1 and step ST2 may be skipped by writing the public parameter into the temporary data storage unit 12.

If the identification information of the re-encryption key generator 30 is i, the key generation unit 14 generates a private key $x_i$, $y_i$, $z_i \in Z_p^*$ of the re-encryption key generator 30 and generates a public key for encryption of the re-encryption key generator 30 using the private key $sk_i=(x_i, y_i, z_i)$ (ST7).

$pk_i=(X_i,Y_i,Y_{1i},Z_i,Z_{1i})$ $X_i=g^{xi}, Y_i=g^{yi}, Y_{1i}=g^{yi}, Z_i=g^{zi}, Z_{1i}=g_1^{zi}$

If a twenty-seventh modification described later is not made, data Yi may be omitted. That is, the public key $pk_i$ only needs to include data $X_i$, $Y_{1i}$, $Z_i$, $Z_{1i}$.

Also, the key generation unit 14 generates public information $pi_i=(X_{3i},Y_{2i})$ for generating a re-encryption key of the re-encryption key generator 30 using the private key $sk_i=(x_i,y_i,z_i)$ (ST7'). Here, $X_{3i}=g_3^{xi}, Y_{2i}=g_2^{yi}$.

Subsequently, the key generation unit 14 writes the generated public key for encryption, public information for generating a re-encryption key, and private key into the temporary data storage unit 12. The communication unit 15 transmits the private key $sk_i$ in the temporary data storage unit 12 to the re-encryption key generator 30 under the control of the control unit 16 (ST8). The key generator 10 publishes the public key for encryption $pk_i$ of the re-encryption key generator 30 in the temporary data storage unit 12 (ST9).

Similarly, if the identification information of the decryption device 50 is j, the key generation unit 14 generates a private key $sk_j=(x_j,y_j,z_j)$ of the decryption device 50 and generates a public key for encryption of the decryption device 50 using the private key $sk_j$ (ST10).

$pk_j=(X_j,Y_j,Y_{1j},Z_j,Z_{1j})$

Here, $X_j=g^{xj}, Y_j=g^{yj}, Y_{1j}=g_1^{yj}, Z_j=g^{zj}, Z_{1j}=g_1^{zj}$.

Similarly as described above, if the twenty-seventh modification described later is not made, data Yj may be omitted. That is, the public key $pk_j$ only needs to include data $X_j$, $Y_{1j}$, $Z_j$, $Z_{1j}$.

Also, the key generation unit 14 generates public information for generating a re-encryption key of the decryption device 50 using the private key $sk_j$ (ST10').

$pi_j=(X_{3j},Y_{2j})$ $X_{3j}=g_3^{xj}, X_{2j}=g_2^{xj}$

Subsequently, the key generation unit 14 writes the generated public key for encryption, public information for generating a re-encryption key, and private key into the temporary data storage unit 12. The communication unit 15 transmits the private key $sk_j$ in the temporary data storage unit 12 to the decryption device 50 under the control of the control unit 16 (ST11). The key generator 10 publishes the public information for generating a re-encryption key pij of the decryption device 50 in the temporary data storage unit 12 (ST12). If desired, regarding the private key skh, the public key for encryption $pk_h$, and the public information for generating a re-encryption key $pi_h$, the public key for encryption $pk_h$ of the encryption device 20, the private key $sk_h$ may be transmitted to the encryption device 20 to publish the public key for encryption $pk_h$ and the public information for generating a re-encryption key $pi_h$ in accordance with purposes by performing processing similar to each of steps ST10 to ST12.

With the above processing, the key setup processing is completed. Hereinafter, each of the devices 20, 30, 40, 50 can acquire and use the public parameter or public key published in steps ST2, ST6, ST9, ST12 when appropriate.

(2) The encryption processing is performed by the encryption device 20 as shown in FIG. 14 and each of steps ST21 to ST24 below.

The encryption parameter generation unit 23 of the encryption device 20 generates a key pair (ssk,svk)=Ĝ(λ) of a signature key ssk and a verification key svk in a one-time signature using the security parameter λ and a key pair generation function Ĝ in the public parameter par (ST21) and sets the verification key svk to encrypted data $C_1$ ($C_1$=svk).

The encryption parameter generation unit 23 also generates and sends out a random number $r \in Z_p^*$ to the ciphertext generation unit 24.

The ciphertext generation unit 24 generates encrypted data $C_{2X}$, $C_{2Y}$, $C_{2Z}$, $C_{2Z1}$, $C_3$, $C_4$ below from a message $m \in G_T$ as plaintext data using the random number r and the public key for encryption $pk_i$ of the re-encryption key generator 30 (ST22).

$$C_{2X}=X_i^r, C_{2Y}=Y_{1i}^r, C_{2Z}=Z_i^r, C_{2Z1}=Z_{1i}^r,$$

$$C_3=e(g_2 g_4,g)^r \cdot m, C_4=(u^{svk} \cdot v)^r$$

After step ST22 is completed, the ciphertext generation unit 24 generates a one-time signature σ as shown in the following formula for the encrypted data $C_3$, $C_4$ based on the signature generation function Ŝ in the public parameter and the signature key ssk generated in step ST21 (ST23).

$$\sigma = \hat{S}(ssk,(C_3,C_4))$$

Thereafter, the ciphertext generation unit 24 generates ciphertext data $C_i=(C_1,C_{2X},C_{2Y},C_{2Z},C_{2Z1},C_3,C_4,\sigma)$ including all the above encrypted data $C_1$ to $C_4$ and the one-time signature σ and writes the obtained ciphertext data into the temporary data storage unit 21. If the verification is omitted, the ciphertext data $C_i=(C_1,C_{2X},C_{2Y},C_{2Z},C_{2Z1},C_3,C_4,\sigma)$ may be set as $C_i=(C_{2X},C_{2Y},C_{2Z},C_{2Z1},C_3)$ by omitting verification data ($C_1,C_4,\sigma$) that is not used for decryption. In this case, processing to generate the verification data ($C_1,C_4,\sigma$) is also omitted.

In any case, the communication unit 22 transmits the ciphertext data $C_i$ in the temporary data storage unit 21 to the re-encryption device 40 under the control of the control unit 25 (ST24).

With the above processing, the encryption processing is completed.

In the present embodiment, as described above (also, as will be described later), verification may be omitted or generation of verification data may be omitted and this also applies to an embodiment and modifications described later.

(3) The re-encryption key generation processing is performed by the re-encryption key generator 30 as shown in FIG. 15 and each of steps ST31 to ST33 below.

That is, the communication unit 33 of the re-encryption key generator 30 acquires and writes the public information for generating a re-encryption key $pi_j$ of the decryption device 50 published by the key generation unit 10 into the temporary data storage unit 32 under the control of the control unit 35 (ST31). In step ST5 described above, the communication unit 33 has received the private key $sk_i$ of the re-encryption key generator 30 from the key generator 10 and written the private key into the private key storage unit 31.

The random number generation unit 36 generates and sends out a random number $\gamma \in Z_p^*$ to the re-encryption key generation unit 34.

The re-encryption key generation unit 34 generates a re-encryption key $R_{ij}$ as shown in the following formulas based on the random number γ, the private key $sk_i$ of the re-encryption key generator 30 in the private key storage unit 31, and the public information for generating a re-encryption key $pi_j$ of the decryption device 50 in the temporary data storage unit 32 (ST32).

$$R_{ij} = (R_{ij1}, R_{ij2}, R_{ij3})$$

$$R_{ij1} = (X_{3j} \cdot g^\gamma)^{\frac{1}{x_i}} = g^{\frac{\xi x_j + \gamma}{x_i}},$$

$$R_{ij2} = (Y_{2j} \cdot g^\gamma)^{\frac{1}{y_i}} = g^{\frac{\beta y_j + \gamma}{y_i}},$$

$$R_{ij3} = (X_{3j} \cdot Y_{2j} \cdot g^\gamma)^{\frac{1}{z_i}} = g^{\frac{\xi x_j + \beta y_j + \gamma}{z_i}}$$

In the above formula, $g_1$ is rewritten and denoted by $g^\alpha$, $g_2$ is rewritten and denoted by $g^\beta$, $g_3$ is rewritten and denoted by $g^\xi$, and $g_4$ is rewritten and denoted by $g^{\alpha\xi}$.

Thereafter, the re-encryption key generation unit 34 writes the generated re-encryption key $R_{ij}$ into the temporary data storage unit 32. The communication unit 33 transmits the re-encryption key $R_{ij}$ in the temporary data storage unit 32 to the re-encryption device 40 under the control of a control unit 35 (ST33).

With the above processing, the re-encryption key generation processing is completed.

(4) The re-encryption processing is performed by the re-encryption device 40 as shown in FIG. 16 and each of steps ST41 to ST43 below.

The communication unit 43 of the re-encryption device 40 writes the ciphertext data $C_i$ transmitted in step ST24 and the re-encryption key $R_{ij}$ transmitted in step ST33 into the temporary data storage unit 42.

The re-encryption processing unit 44 verifies the ciphertext data $C_i$ in the temporary data storage unit 42 using the public parameter and the following verification formula (ST41).

$$e(C_{2X},u^{C_1} \cdot v)=e(X_i,C_4),$$

$$e(C_{2Y},u^{C_1} \cdot v)=e(Y_{1i},C_4),$$

$$e(C_{2Z},u^{C_1} \cdot v)=e(Z_i,C_4),$$

$$e(C_{2Z1},u^{C_1} \cdot v)=e(Z_{1i},C_4),$$

$$\hat{V}(C_1,\sigma,(C_3,C_4))=1.$$

The verification is successful if the five verification formulas shown above all hold and fails if any one of the five formulas does not hold.

If the verification is successful, the re-encryption parameter generation unit 45 generates and sends out three random numbers $s,t,k \in Z_p^*$ to the re-encryption processing unit 44.

The re-encryption processing unit 44 generates, as shown in the following formulas, re-encrypted data $C_{2X}'$, $C_{2X}''$, $C_{2Y}'$, $C_{2Y}''$, $C_{2Z}'$, $C_{2Z}''$, $C_{2Z1}'$, $C_{2Z1}''$, $C_{5X}$, $C_{5Y}$, $C_{5Z}$ using these random numbers s,t,k, the ciphertext data $C_i$ in the temporary data storage unit 42, and the re-encryption key $R_{ij}$ in the temporary data storage unit 42 (ST42).

$$C_{2X}' = X_i^s, C_{2X}'' = C_{2X}^s = X_i^{rs}, C_{2Y}' = Y_{1i}^t, C_{2Y}'' = C_{2Y}^t = Y_{1i}^{rt},$$

$$C_{2Z}' = Z_i^k, C_{2Z}'' = C_{2Z}^k = Z_i^{rk}, C_{2Z1}' = Z_{1i}^k, C_{2Z1}'' = C_{2Z1}^k = Z_{1i}^{rk},$$

-continued $$C_{5X} = R_{ij1}^{\frac{1}{s}}, C_{5Y} = R_{ij2}^{\frac{1}{t}}, C_{5Z} = R_{ij3}^{\frac{1}{k}}$$

After step ST42 is completed, the re-encryption processing unit 44 generates re-encrypted data $C_j=(C_1,C_{2X}',C_{2X}'',C_{2Y}',C_{2Y}'', C_{2Z}',C_{2Z}'', C_{2Z1}',C_{2Z1}'',C_{5X}, C_{5Y},C_{5Z},C_3,C_4,\sigma)$ by replacing the encrypted data $C_{2X}, C_{2Y}, C_{2Z}, C_{2Z1}$ in the ciphertext data $C_i$ by all the above encrypted data/re-encrypted data $C_{2X}'$ to $C_{5Z}$ and writes the obtained re-encrypted data $C_j$ into the temporary data storage unit 42. If the verification is omitted, the re-encrypted data $C_j=(C_1,C_{2X}',C_{2X}'', C_{2Y}',C_{2Y}'', C_{2Z}',C_{2Z}'', C_{2Z1}',C_{2Z1}'',C_{5X}, C_{5Y},C_{5Z},C_3,C_4,\sigma)$ may be set as $C_j=(C_{2X}'',C_{2Y}'',C_{2Z}'',C_{2Z1}'',C_{5X},C_{5Y},C_{5Z},C_3)$ by omitting verification data $(C_1,C_{2X}',C_{2Y}',C_{2Z}',C_{2Z1}',C_4,\sigma)$ that is not used for decryption. In this case, processing to generate the verification data $(C_{2X}',C_{2Y}',C_{2Z}',C_{2Z1}')$ is also omitted.

In any case, the communication unit 43 transmits the re-encrypted data $C_j$ in the temporary data storage unit 42 to the decryption device 50 under the control of the control unit 46 (ST43).

With the above processing, the re-encryption processing is completed.

(5) The decryption processing is performed by the decryption device 50 as shown in FIG. 17 and each of steps ST51 and ST52 below.

That is, the communication unit 53 of the decryption device 50 receives the re-encrypted data $C_j$ transmitted in step ST43 and writes the re-encrypted data $C_j$ into the temporary data storage unit 52.

The decryption processing unit 54 verifies the re-encrypted data $C_j$ in the temporary data storage unit 52 using the public parameter, the public key for encryption $pk_j$ of the local device 50, and the following verification formulas (ST51).

$$e(C''_{2X}, u^{C_1} \cdot v) = e(C'_{2X}, C_4),$$

$$e(C''_{2Y}, u^{C_1} \cdot v) = e(C'_{2Y}, C_4),$$

$$e(C''_{2Z}, u^{C_1} \cdot v) = e(C'_{2Z}, C_4),$$

$$e(C''_{2Z1}, u^{C_1} \cdot v) = e(C'_{2Z1}, C_4),$$

$$e(C_{5Z}, C'_{2Z}) = e(C_{5X}, C'_{2X}) \cdot e(Y_j, g_2),$$

$$e(C_{5Z}, C'_{2Z1}) = e(C_{5Y}, C'_{2Y}) \cdot e(X_j, g_4),$$

$$\hat{V}(C_1, \sigma, (C_3, C_4)) = 1.$$

The verification is successful if the seven verification formulas shown above all hold and fails if any one of the seven formulas does not hold.

If the verification is successful, the decryption processing unit 54 decrypts the re-encrypted data $C_j$ as shown in the following formula using the private key $sk_j$ of the local device to obtain the message m (ST52).

$$m = C_3 \Big/ \left\{ \left( \frac{e(C_{5Z}, C''_{2Z})}{e(C_{5X}, C''_{2X})} \right)^{\frac{1}{y_j}} \cdot \left( \frac{e(C_{5Z}, C''_{2Z1})}{e(C_{5Y}, C''_{2Y})} \right)^{\frac{1}{x_j}} \right\}$$

That the decryption result of the above formula produces m can be checked by the following calculation. In the following calculation, $g_1$ is rewritten and denoted by $g^\alpha$, $g_2$ is rewritten and denoted by $g^\beta$, $g_3$ is rewritten and denoted by $g^\xi$ and $g_4$ is rewritten and denoted by $g^{\alpha\xi}$.

$$C_3 \Big/ \left\{ \left( \frac{e(C_{5Z} \cdot C''_{2Z})}{e(C_{5X}, C''_{2X})} \right)^{\frac{1}{y_j}} \cdot \left( \frac{e(C_{5Z}, C''_{2Z1})}{e(C_{5Y}, C''_{2Y})} \right)^{\frac{1}{x_j}} \right\}$$

$$= C_3 \Big/ \left\{ \left( \frac{e\left(g^{\frac{\xi x_j + \beta y_j + \gamma}{z_j k}}, g^{z_j rk}\right)}{e\left(g^{\frac{\xi x_j + \gamma}{x_j s}}, g^{x_j rs}\right)} \right)^{\frac{1}{y_j}} \cdot \left( \frac{e\left(g^{\frac{\xi x_j + \beta y_j + \gamma}{z_j k}}, g^{\alpha z_j rk}\right)}{e\left(g^{\frac{\xi y_j + \gamma}{y_j t}}, g^{\alpha y_j rt}\right)} \right)^{\frac{1}{x_j}} \right\}$$

$$= m \cdot e(g_2 g_4, g)^r / (e(g, g)^{\beta r} \cdot e(g, g)^{\alpha \xi r}) = m$$

Incidentally, the decryption processing unit 54 may perform the decryption processing in step ST52 by omitting the verification processing in step ST51. Also, when no verification data is contained in the re-encrypted data $C_j$, the decryption processing unit 54 performs the decryption processing in step ST52 by omitting the verification processing in step ST51. The above m may be a key, instead of a message itself. For example, a shared key in shared key cryptography may be set as m=key to replace m with key. In this case, ciphertext obtained by encrypting a message using the shared key may be added to the ciphertext data or re-encrypted data. The above also apply to the embodiment and modifications described later.

In the present embodiment, the order of processing may be changed when appropriate. For example, the order of the decryption processing and the ciphertext verification processing may be changed. Similarly, because a parameter (more specifically, a random number) for performing encryption processing is not needed in the re-encryption key generation processing, the order of the re-encryption key generation processing may be changed to before the encryption processing.

According to the present embodiment, as described above, due to the configuration of generating the re-encryption key $R_{ij}$ based on the random number γ, even if a server and a user collude with each other, the decryption right can be prevented from being re-transferred without permission of the transfer source. Accordingly, there is no need to demand extreme reliability from the server and a file sharing system the user can safely use can be provided.

To complement the above description, there has been a problem that, if the server operator, the user B, and the user E collude, a third party can calculate a normal re-encryption key ($rk_{A \to E}$) to re-encrypt ciphertext for the user A into ciphertext for the user E by using a re-encryption key ($rk_{A \to B}$) to re-encrypt the ciphertext for the user A into ciphertext for the user B, a private key ($sk_B$) of the user B, and a private key ($sk_E$) of the user E without permission of the user A as the transfer source.

According to the present embodiment, however, due to the configuration of generating the re-encryption key $R_{ij}$ based on the random number γ, even if the server operator, the user B, and the user E collude, the decryption right can be prevented from being re-transferred without permission of the transfer source.

Also, due to the configuration of generating a re-encryption key using public information for generating a re-encryption key of the original transfer destination, no re-encryption key can be generated without the public information for generating a re-encryption key being provided by the transfer destination. Therefore, a re-encryption key can be generated with the permission of the original transfer destination.

Twenty-Sixth Modification

In the thirteenth embodiment, an example in which ciphertext data is generated by the encryption device 20, the ciphertext data is re-encrypted by the re-encryption device 40 to generate re-encrypted data, and the re-encrypted data is decrypted by the decryption device 50 is cited. However, the thirteenth embodiment may be changed to a form in which the ciphertext data is decrypted without being re-encrypted. In this case, only the key setup processing, encryption processing, and decryption processing need to be performed. The key setup processing in the present modification is the same as the key setup processing in the thirteenth embodiment. Hereinafter, the encryption processing and the decryption processing in the present modification will be described.

The difference between the encryption processing in the present modification and the encryption processing in the thirteenth embodiment is only in the last step. To provide a description by making use of the above symbols, the identification information of the decryption device 50 is assumed to be i for the sake of convenience. In this case, the communication unit 22 of the encryption device 20 transmits the ciphertext data $C_i$ in the temporary data storage unit 21 to the decryption device 50 under the control of the control unit 25 (ST24').

The decryption device 50 verifies the ciphertext data $C_i$ generated by the encryption device 20 in the same manner as in step ST41. If the verification is successful, the decryption device 50 decrypts the ciphertext data $C_i$ as shown in the following formula using the private key $sk_i$ to obtain the message m.

$$m = C_3 \Big/ e(g_2 g_4, C_{2X})^{\frac{1}{x_i}}$$

That the decryption result of the above formula produces m can be checked by the following calculation.

$$m \cdot e(g_2 g_4, g)^r \Big/ e(g_2 g_4, C_{2X})^{\frac{1}{x_i}}$$
$$= m \cdot e(g_2 g_4, g)^r \Big/ e(g_2 g_4, g^{x_i r})^{\frac{1}{x_i}}$$
$$= m \cdot e(g_2 g_4, g)^r / e(g_2 g_4, g)^r = m$$

Twenty-Seventh Modification

In addition to the twenty-sixth modification, as will be described below, the thirteenth embodiment may also be changed to a form in which the ciphertext data is decrypted without being re-encrypted. Also in this case, only the key setup processing, encryption processing, and decryption processing need to be performed. The key setup processing and the decryption processing in the present modification are the same as the key setup processing and the decryption processing in the thirteenth embodiment respectively. Hereinafter, the encryption processing and the decryption processing in the present modification will be described. In the present modification, the identification information of the decryption device 50 is assumed to be j.

The encryption parameter generation unit 23 of the encryption device 20 generates (ssk, svk) in the same manner as in step ST21 (ST21') and sets the verification key svk to the encrypted data $C_1$ ($C_1$=svk).

The encryption parameter generation unit 23 also generates and sends out five random numbers r,s,t,k,γ∈*$_p$ to the ciphertext generation unit 24.

The ciphertext generation unit 24 generates encrypted data $C_{2X}{}'$, $C_{2X}{}''$, $C_{2Y}{}'$, $C_{2Y}{}''$, $C_{2Z}{}'$, $C_{2Z}{}''$, $C_{2Z1}{}'$, $C_{2Z1}{}''$, $C_{5X}$, $C_{5Y}$, $C_{5Z}$, $C_3$, $C_4$ below from a message m∈$G_T$ as plaintext data using the random numbers r,s,t,k,γ and the public key for encryption $pk_j$ of the decryption device 50 (ST22').

$$C_{2X}' = Y_j^s, C_{2X}'' = Y_j^{rs}, C_{2Y}' = X_j^t, C_{2Y}'' = X_j^{rt},$$
$$C_{2Z}' = Y_j^k, C_{2Z}'' = Y_j^{rk}, C_{2Z1}' = X_j^k, C_{2Z1}'' = X_j^{rk},$$
$$C_3 = e(g_2 g_4, g)^r \cdot m, C_4 = (u^{svk} \cdot v)^r,$$
$$C_{5X} = (g_4 \cdot g^\gamma)^{\frac{1}{s}}, C_{5Y} = (g_2 \cdot g^\gamma)^{\frac{1}{t}}, C_{5Z} = (g_4 \cdot g_2 \cdot g^\gamma)^{\frac{1}{k}}$$

After step ST22' is completed, the ciphertext generation unit 24 generates a one-time signature σ in the same manner as in step ST23.

Thereafter, the ciphertext generation unit 24 generates ciphertext data $C_j$=($C_1$,$C_{2X}{}'$,$C_{2X}{}''$,$C_{2Y}{}'$,$C_{2Y}{}''$,$C_{2Z}{}'$,$C_{2Z}{}''$,$C_{2Z1}{}'$,$C_{2Z1}{}''$,$C_{5X}$,$C_{5Y}$,$C_{5Z}$,$C_3$,$C_4$,σ) including all the above encrypted data $C_1$ to $C_4$ and the one-time signature σ and writes the obtained ciphertext data into the temporary data storage unit 21.

The communication unit 22 transmits the ciphertext data $C_j$ in the temporary data storage unit 21 to the decryption device 50 under the control of the control unit 25.

The decryption device 50 verifies the ciphertext data $C_j$ generated by the encryption device 20 in the same manner as in step ST51. If the verification is successful, the decryption device 50 decrypts the ciphertext data $C_j$ as shown in the following formula using the private key $sk_j$ to obtain the message m.

$$m = C_3 \Big/ \left\{ \left( \frac{e(C_{5Z}, C_{2Z}'')}{e(C_{5Z}, C_{2X}')} \right)^{\frac{1}{y_j}} \cdot \left( \frac{e(C_{5Z}, C_{2Z1}'')}{e(C_{5Y}, C_{2Y}')} \right)^{\frac{1}{x_j}} \right\}$$

That the decryption result of the above formula produces m can be checked by the following calculation. In the following calculation, $g_1$ is rewritten and denoted by $g^\alpha$, $g_2$ is rewritten and denoted by $g^\beta$, $g_3$ is rewritten and denoted by $g^\xi$ and $g_4$ is rewritten and denoted by $g^{\alpha\xi}$.

$$C_3 \Big/ \left\{ \left( \frac{e(C_{5Z}, C_{2Z}'')}{e(C_{5Z}, C_{2X}')} \right)^{\frac{1}{y_j}} \cdot \left( \frac{e(C_{5Z}, C_{2Z1}'')}{e(C_{5Y}, C_{2Y}')} \right)^{\frac{1}{x_j}} \right\}$$
$$= C_3 \Big/ \left\{ \left( \frac{e(g^{\frac{\alpha\xi+\beta+\gamma}{k}}, g^{y_j rk})}{e(g^{\frac{\alpha\xi+\gamma}{s}}, g^{y_j rs})} \right)^{\frac{1}{y_j}} \cdot \left( \frac{e(g^{\frac{\alpha\xi+\beta+\gamma}{k}}, g^{x_j rk})}{e(g^{\frac{\alpha\xi+\beta+\gamma}{t}}, g^{x_j rt})} \right)^{\frac{1}{x_j}} \right\}$$
$$= C_3 \Big/ \left\{ \left( \frac{e(g^{(\alpha\xi+\beta+\gamma)y_j r}, g)}{e(g^{(\alpha\xi+\gamma)y_j r}, g)} \right)^{\frac{1}{y_j}} \cdot \left( \frac{e(g^{(\alpha\xi+\beta+\gamma)x_j r}, g)}{e(g^{(\beta+\gamma)x_j r}, g)} \right)^{\frac{1}{x_j}} \right\}$$
$$= m \cdot e(g_2 g_4, g)^r / (e(g, g)^{\beta r} \cdot e(g, g)^{\alpha\xi r}) = m$$

Twenty-Eighth Modification

In the thirteenth embodiment, an example in which the public parameter includes five elements g, $g_1$, $g_2$, $g_3$, $g_4$ of system fixed values has been described, but the embodiment is not limited to such an example and the elements $g_2$, $g_3$, $g_4$ may not be generated and included in the public parameter. In this case, $g_2$, $g_3$, and $g_4$ may be replaced by g in the thirteenth embodiment by setting $g_2=g$, $g_3=g$, and $g_4=g$. This also applies to the embodiments and modifications described later.

Twenty-Ninth Modification

In the thirteenth embodiment, an example in which the public parameter includes five elements g, $g_1$, $g_2$, $g_3$, $g_4$ of system fixed values has been described, but the embodiment is not limited to such an example and six or more elements of system fixed values may be included. If, for example, six elements g, $g_1$, $g_2$, $g_3$, $g_4$, $g_5$ are included in the public parameter, $g_2$ may be replaced by $g_2g_5$ in the thirteenth embodiment by setting $g_2=g_2g_5$.

Also if, for example, seven elements g, $g_1$, $g_2$, $g_3$, $g_4$, $g_5$, $g_6$ are included in the public parameter, $g_1$ may be replaced by $g_1g_5$, $g_2$ may be replaced by $g_2g_6$, and $g_4$ may be replaced by $g_4g_5$ in the thirteenth embodiment by setting $g_1=g_1g_5$, $g_2=g_2g_6$, and $g_4=g_4g_5$. This also applies to the embodiment and modifications described later.

Fourteenth Embodiment

In the present embodiment, an example of updating a re-encryption key at certain intervals will be described. A time parameter L is used as a parameter representing a period. The time parameter is used in, of key setup processing, encryption processing, re-encryption key generation processing, re-encryption processing, and decryption processing, the encryption processing, the re-encryption key generation processing, and the re-encryption processing. The time parameter is used such that if, for example, encryption processing is performed in a certain period $t_1$, the encryption processing described later is performed by setting $L=t_1$ and if encryption processing is performed in the next period $t_2$, the encryption processing described later is performed by setting $L=t_2$. Hereinafter, key setup processing, encryption processing, re-encryption key generation processing, re-encryption processing, and decryption processing in the present embodiment will be described. Portions common to the aforementioned thirteenth embodiment may or may not be described by using the same reference signs.

(1) Key Setup Processing

The public parameter is the same as that in the thirteenth embodiment. If the identification information of a re-encryption key generator 30 is i, a key generation unit 14 generates a private key $x_i$, $y_i$, $z_i$, $w_i \in Z_p^*$ of the re-encryption key generator 30 and generates a public key for encryption of the re-encryption key generator 30 using the private key $sk_i=(x_i,y_i,z_i,w_i)$ (ST7).

$$pk_i=(X_i,Y_i,Y_{1i},Z_i,Z_{1i},W_i)$$

$$X_i=g^{x_i}, Y_i=g^{y_i}, Y_{1i}=g_1^{y_i}, Z_i=g^{z_i}, Z_{1i}=g_1^{z_i}, W_i=g^{w_i}$$

Also, the key generation unit 14 generates public information for generating a re-encryption key of the re-encryption key generator 30 using the private key $sk_i$ (ST7').

$$pi_i=(X_{3i},Y_{2i})$$

$$X_{3i}=g_3^{x_i}, Y_{2i}=g_2^{y_i}$$

Similarly, if the identification information of a decryption device 50 is j, the key generation unit 14 generates a private key $sk_j=(x_j,y_j,z_j,w_j)$ of the decryption device 50 and generates a public key for encryption of the decryption device 50 using the private key $sk_j$ (ST10).

$$pk_j=(X_j,Y_j,Y_{1j},Z_j,Z_{1j},W_j)$$

$$X_j=g^{x_j}, Y_j=g^{y_j}, Y_{1j}=g_1^{y_j}, Z_j=g^{z_j}, Z_{1j}=g_1^{z_j}, W_j=g^{w_j}$$

Also, the key generation unit 14 generates public information for generating a re-encryption key of the decryption device 50 using the private key $sk_j$ (ST10').

$$pi_j=(X_{3j},Y_{2j})$$

$$X_{3j}=g_3^{x_j}, Y_{2j}=g_2^{y_j}$$

(2) Encryption Processing

Like in the thirteenth embodiment, an encryption parameter generation unit 23 of an encryption device 20 generates (ssk, svk) (ST21') and sets the verification key svk to the encrypted data $C_1$ ($C_1$=svk).

The encryption parameter generation unit 23 also generates and sends out a random number $r \in Z_p^*$ to a ciphertext generation unit 24.

The ciphertext generation unit 24 generates encrypted data $C_{2X}$, $C_{2Y}$, $C_{2Z}$, $C_{2Z1}$, $C_{2F}$, $C_3$, $C_4$ below from a message $m \in G_T$ as plaintext data using the random number r, the public key for encryption $pk_i$ of the re-encryption key generator 30, and the time parameter L (ST22).

$$C_{2X}=X_i^r, C_{2Y}=Y_{1i}^r, C_{2Z}=Z_i^r, C_{2Z1}=Z_{1i}^r,$$

$$C_{2F}=F_i(L)^r, C_3=e(g_2g_4,g)^r \cdot m, C_4=(u^{svk} \cdot v)^r$$

The function $F_i(L)$ is defined as shown below.

$$F_i(L)=g^L \cdot W_i = g^{L+w_i} (L \in \mathbb{Z})$$

After step ST22 is completed, the ciphertext generation unit 24 generates a one-time signature σ as shown in the following formula for the time parameter L and the encrypted data $C_3$, $C_4$ based on the signature generation function Ŝ in the public parameter and the signature key ssk generated in step ST21 (ST23).

$$\sigma = \hat{S}(ssk,(L,C_3,C_4))$$

Thereafter, the ciphertext generation unit 24 generates ciphertext data $C_i=(L,C_1,C_{2X},C_{2Y},C_{2Z},C_{2Z1},C_{2F},C_3,C_4,\sigma)$ including the time parameter L, all the above encrypted data $C_1$ to $C_4$, and the one-time signature σ and writes the obtained ciphertext data into a temporary data storage unit 21.

(3) Re-Encryption Key Generation Processing

A random number generation unit 36 generates and sends out three random numbers γ, $\delta_x$, $\delta_y \in Z_p^*$ to a re-encryption key generation unit 34.

The re-encryption key generation unit 34 generates a re-encryption key $R_{ijL}$ as shown in the following formulas using the random numbers γ, $\delta_x$, $\delta_y$, the private key $sk_i$ of the re-encryption key generator 30 in a private key storage unit 31, the public information for generating a re-encryption key $pi_j$ of the decryption device 50 in a temporary data storage unit 32, and the time parameter L (ST32).

$$R_{ijL} = (R_{ijL1}, R_{ijL2}, R_{ijL3}, R_{ijL4}, R_{ijL5})$$

$$R_{ijL1} = (X_{3j} \cdot g^\gamma)^{\frac{1}{x_i}} \cdot F_i(L)^{\delta_x} = g^{\frac{\xi x_j+\gamma}{x_i}+(L+w_i)\delta_x}$$

$$R_{ijL2} = (Y_{2j} \cdot g^\gamma)^{\frac{1}{y_i}} \cdot F_i(L)^{\delta_y} = g^{\frac{\beta y_j+\gamma}{y_i}+(L+w_i)\delta_y}$$

-continued $$R_{ijL3} = (X_{3j} \cdot Y_{2j} \cdot g^\gamma)^{\frac{1}{z_i}} = g^{\frac{\xi x_j + \beta y_j + \gamma}{z_i}}$$

$$R_{ijL4} = (g^{x_i})^{\delta_x} = g^{x_i \delta_x}$$

$$R_{ijL5} = (g_1^{y_i})^{\delta_y} = g^{\alpha y_i \delta_y}$$

In the above formula, $g_1$ is rewritten and denoted by $g^\alpha$, $g_2$ is rewritten and denoted by $g^\beta$, $g_3$ is rewritten and denoted by $g^\xi$, and $g_4$ is rewritten and denoted by $g^{\alpha\xi}$.

(4) Re-Encryption Processing

A re-encryption processing unit 44 verifies the ciphertext data $C_i$ in a temporary data storage unit 42 using the public parameter, the time parameter L, and the following verification formula (ST41).

$$e(C_{2X}, u^{C1} \cdot v) = e(X_i, C_4),$$

$$e(C_{2Y}, u^{C1} \cdot v) = e(Y_{1i}, C_4),$$

$$e(C_{2Z}, u^{C1} \cdot v) = e(Z_i, C_4),$$

$$e(C_{2Z1}, u^{C1} \cdot v) = e(Z_{1i}, C_4),$$

$$e(C_{2F}, u^{C1} \cdot v) = e(F_i(L), C_4),$$

$$\hat{V}(C_1, \sigma, (L, C_3, C_4)) = 1.$$

The verification is successful if the six verification formulas shown above all hold and fails if any one of the six formulas does not hold.

If the verification is successful, a re-encryption parameter generation unit 45 generates and sends out four random numbers s,t,k,h∈$Z_p^*$ to the re-encryption processing unit 44.

The re-encryption processing unit 44 generates, as shown in the following formulas, re-encrypted data $C_{2X}'$, $C_{2X}''$, $C_{2Y}'$, $C_{2Y}''$, $C_{2Z}'$, $C_{2Z}''$, $C_{2Z1}'$, $C_{2Z1}''$, $C_{2F}'$, $C_{2F}''$, $C_{5X}$, $C_{5Y}$, $C_{5Z}$, $C_{5FX}$, $C_{5FY}$ using these random numbers s,t,k,h, the ciphertext data $C_i$ in the temporary data storage unit 42, the re-encryption key $R_{ijL}$ in the temporary data storage unit 42, and the time parameter L (ST42).

$$C_{2X}' = X_i^s, \ C_{2X}'' = C_{2X}^s = X_i^{rs}, \ C_{2Y}' = Y_{1i}^t, \ C_{2Y}'' = C_{2Y}^t = Y_{1i}^{rt},$$

$$C_{2Z}' = Z_i^k, \ C_{2Z}'' = C_{2Z}^k = Z_i^{rk}, \ C_{2Z1}' = Z_{1i}^k, \ C_{2Z1}'' = C_{2Z1}^k = Z_{1i}^{rk},$$

$$C_{2F}' = F_i(L)^h, \ C_{2F}'' = C_{2F}^h = F_i(L)^{rh},$$

$$C_{5X} = R_{ijL1}^{\frac{1}{s}}, \ C_{5Y} = R_{ijL2}^{\frac{1}{t}}, \ C_{5Z} = R_{ijL3}^{\frac{1}{k}},$$

$$C_{5FX} = R_{ijL4}^{\frac{h}{s}}, \ C_{5FY} = R_{ijL5}^{\frac{h}{t}}$$

After step ST42 is completed, the re-encryption processing unit 44 generates re-encrypted data $C_j = (C_1, C_{2X}', C_{2X}'', C_{2Y}', C_{2Y}'', C_{2Z}', C_{2Z}'', C_{2Z1}', C_{2Z1}'', C_{2F}', C_{2F}'', C_{5X}, C_{5Y}, C_{5Z}, C_{5FX}, C_{5FY}, C_3, C_4, \sigma)$ by replacing the encrypted data $C_{2X}$, $C_{2Y}$, $C_{2Z}$, $C_{2Z1}$, $C_{2F}$ in the ciphertext data $C_i$ by all the above encrypted data/re-encrypted data $C_{2X}'$ to $C_{5FY}$ and writes the obtained ciphertext data into the temporary data storage unit 42.

(5) Decryption Processing

A decryption processing unit 54 verifies the re-encrypted data $C_j$ in a temporary data storage unit 52 using the public parameter, the public key for encryption $pk_j$ of the local device 50, and the following verification formulas (ST51).

$$e(C''_{2X}, u^{C1} \cdot v) = e(C'_{2X}, C_4)$$

$$e(C''_{2Y}, u^{C1} \cdot v) = e(C'_{2Y}, C_4)$$

$$e(C''_{2Z}, u^{C1} \cdot v) = e(C'_{2Z}, C_4)$$

$$e(C''_{2Z1}, u^{C1} \cdot v) = e(C'_{2Z1}, C_4)$$

$$e(C''_{2F}, u^{C1} \cdot v) = e(C'_{2F}, C_4)$$

$$e(C_{5Z}, C'_{2Z}) \cdot e(C_{5FX}, C'_{2F}) = e(C_{5X}, C'_{2X}) \cdot e(Y_j, g_2)$$

$$e(C_{5Z}, C'_{2Z1}) \cdot e(C_{5FY}, C'_{2F}) = e(C_{5Y}, C'_{2Y}) \cdot e(Y_j, g_4)$$

$$\hat{V}(C_1, \sigma, (C_3, C_4)) = 1.$$

The verification is successful if the eight verification formulas shown above all hold and fails if any one of the eight formulas does not hold.

If the verification is successful, the decryption processing unit 54 decrypts the re-encrypted data $C_j$ as shown in the following formula using the private key $sk_j$ of the local device to obtain the message m (ST52).

$$m = C_3 \Big/ \left\{ \left( \frac{e(C_{5Z}, C''_{2Z}) \cdot e(C_{5FX}, C''_{2F})}{e(C_{5X}, C''_{2X})} \right)^{\frac{1}{y_j}} \cdot \left( \frac{e(C_{5Z}, C''_{2Z1}) \cdot e(C_{5FY}, C''_{2F})}{e(C_{5Y}, C''_{2Y})} \right)^{\frac{1}{x_j}} \right\}$$

That the decryption result of the above formula produces m can be checked by the following calculation. In the following calculation, $g_1$ is rewritten and denoted by $g^\alpha$, $g_2$ is rewritten and denoted by $g^\beta$, $g_3$ is rewritten and denoted by $g^\xi$, and $g_4$ is rewritten and denoted by $g^{\alpha\xi}$.

$$C_3 \Big/ \left\{ \left( \frac{e(C_{5Z}, C''_{2X}) \cdot e(C_{5FX}, C''_{2F})}{e(C_{5X}, C''_{2X})} \right)^{\frac{1}{y_j}} \cdot \left( \frac{e(C_{5Z}, C''_{2Z1}) \cdot E(C_{5FY}, C''_{2F})}{e(C_{5Y}, C''_{2Y})} \right)^{\frac{1}{x_j}} \right\}$$

$$= C_3 \Big/ \left\{ \left( \frac{e\left(g^{\frac{\xi x_j + \beta y_j + \gamma}{z_j k}}, g^{z_i rk}\right) \cdot e\left(g^{\frac{x_i \delta_x}{h}}, g^{(L+w_i)rh}\right)}{e\left(g^{\left(\frac{\xi x_j + \gamma}{x_i} + (L+w_i)\delta_x\right)\frac{1}{s}}, g^{x_i rs}\right)} \right)^{\frac{1}{y_j}} \cdot \right.$$

$$\left. \left( \frac{e\left(g^{\frac{\xi x_j + \beta y_j + \gamma}{z_j k}}, g^{\alpha z_i rk}\right) \cdot e\left(g^{\frac{\alpha y_i \delta_y}{h}}, g^{(L+w_i)rh}\right)}{e\left(g^{\left(\frac{\beta y_j + \gamma}{y_i} + (L+w_i)\delta_y\right)\frac{1}{t}}, g^{\alpha y_i rt}\right)} \right)^{\frac{1}{x_j}} \right\}$$

$$= C_3 \Big/ \left\{ \left( \frac{e\left(g^{(\xi x_j + \beta y_j + \gamma)r}, g\right) \cdot e\left(g^{x_i \delta_x(L+w_i)r}, g\right)}{e\left(g^{(\xi x_j + \gamma)r + (L+w_i)\delta_x x_i r}, g\right)} \right)^{\frac{1}{y_j}} \cdot \right.$$

$$\left. \left( \frac{e\left(g^{(\xi x_j + \beta y_j + \gamma)\alpha r}, g\right) \cdot e\left(g^{\alpha y_i \delta_y(L+w_i)r}, g\right)}{e\left(g^{(\beta y_j + \gamma)\alpha r + (L+w_i)\delta_y y_i \alpha r}, g\right)} \right)^{\frac{1}{x_j}} \right\}$$

$$= m \cdot e(g_2 g_4, g)^r / (e(g, g)^{\beta r} \cdot e(g, g)^{\alpha\xi r}) = m$$

In the present embodiment, the order of processing may be changed when appropriate. For example, the order of the decryption processing and the ciphertext verification processing may be changed. Similarly, the order of the re-encryption key generation processing may be changed to before the encryption processing.

According to the present embodiment, as described above, due to the configuration of generating the re-encryption key $R_{ijL}$ based on the random numbers $\gamma, \delta_x, \delta_y$ and the time parameter L, in addition to the effects of the thirteenth embodiment, whether to transfer the decryption right can be decided in each period so that finer access control can be exercised. Accordingly, even if the decryption right of ciphertext for the user A is once transferred to the user B in a certain period, it is possible not to grant the decryption right of the ciphertext for the user A to the user B, that is, the decryption right of the user B (to the ciphertext for the user A) can be invalidated in the next period and therefore, a file sharing system whose convenience is further improved can be provided.

Thirtieth Modification

In the fourteenth embodiment, an example in which ciphertext data is generated by the encryption device 20, the ciphertext data is re-encrypted by the re-encryption device 40 to generate re-encrypted data, and the re-encrypted data is decrypted by the decryption device 50 is cited, but the eleventh embodiment may be changed to a form in which the ciphertext data is decrypted without being re-encrypted. In this case, only the key setup processing, encryption processing, and decryption processing need to be performed. The key setup processing in the present modification is the same as the key setup processing in the fourteenth embodiment. Hereinafter, the encryption processing and the decryption processing in the present modification will be described.

The difference between the encryption processing in the present modification and the encryption processing in the fourteenth embodiment is only in the last step. To provide a description by making use of the above symbols, the identification information of the decryption device 50 is assumed to be i for the sake of convenience. In this case, the communication unit 22 of the encryption device 20 transmits the ciphertext data $C_i$ in the temporary data storage unit 21 to the decryption device 50 under the control of the control unit 25 (ST24').

The decryption device 50 verifies the ciphertext data $C_i$ generated by the encryption device 20 in the same manner as in step ST41. If the verification is successful, the decryption device 50 decrypts the ciphertext data $C_i$ as shown in the following formula using the private key $sk_i$ to obtain the message m.

$$m = C_3 \Big/ e(g_2 g_4, C_{2X})^{\frac{1}{x_i}}$$

That the decryption result of the above formula produces m can be checked by the following calculation.

$$m \cdot e(g_2 g_4, g)^r \Big/ e(g_2 g_4, C_{2X})^{\frac{1}{x_i}}$$
$$= m \cdot e(g_2 g_4, g)^r \Big/ e(g_2 g_4, g^{x_i r})^{\frac{1}{x_i}}$$
$$= m \cdot e(g_2 g_4, g)^r e(g_2 g_4, g)^r = m$$

Thirty-First Modification

In addition to the thirtieth modification, as will be described below, the fourteenth embodiment may also be changed to a form in which the ciphertext data is decrypted without being re-encrypted. Also in this case, only the key setup processing, encryption processing, and decryption processing need to be performed. The key setup processing and the decryption processing in the present modification are the same as the key setup processing and the decryption processing in the fourteenth embodiment respectively. Hereinafter, the encryption processing and the decryption processing in the present modification will be described. In the present modification, the identification information of the decryption device 50 is assumed to be j.

The encryption parameter generation unit 23 of the encryption device 20 generates (ssk, svk) in the same manner as in step ST21 (ST21') and sets the verification key svk to the encrypted data $C_1$ ($C_1$=svk).

The encryption parameter generation unit 23 also generates and sends out eight random numbers r,s,t,k,h,γ,$\delta_x$, $\delta_y \in Z_p^*$ to the ciphertext generation unit 24.

The ciphertext generation unit 24 generates encrypted data $C_{2X}'$, $C_{2X}''$, $C_{2Y}'$, $C_{2Y}''$, $C_{2Z}'$, $C_{2Z}''$, $C_{2Z1}'$, $C_{2Z1}''$, $C_{2F}'$, $C_{2F}''$, $C_{5X}$, $C_{5Y}$, $C_{5Z}$, $C_{5FX}$, $C_{5FY}$, $C_3$, $C_4$ below from a message m∈$G_T$ as plaintext data using the random numbers r,s,t,k,h,γ,$\delta_x$,$\delta_y$, the public key $pk_j$ of the decryption device 50, and the time parameter L (ST22').

$$C_{2X}' = Y_j^s,\ C_{2X}'' = Y_j^{rs},\ C_{2Y}' = X_j^t,\ C_{2Y}'' = X_j^{rt},$$

$$C_{2Z}' = Y_j^k,\ C_{2Z}'' = Y_j^{rk},\ C_{2Z1}' = X_j^k,\ C_{2Z1}'' = X_j^{rk},$$

$$C_{2F}' = F_j(L)^h,\ C_{2F}'' = F_j(L)^{rh},$$

$$C_3 = e(g_2 g_4, g)^r \cdot m,\ C_4 = (u^{svk} \cdot v)^r,$$

$$C_{5X} = (g_4 \cdot g^\gamma \cdot F_j(L)^{\delta_y})^{\frac{1}{s}} = g^{\frac{\alpha\xi + \gamma + (L+w_j)\delta_y}{s}},$$

$$C_{5Y} = (g_2 \cdot g^\gamma \cdot F_j(L)^{\delta_x})^{\frac{1}{t}} = g^{\frac{\beta + \gamma + (L+w_j)\delta_x}{t}},$$

$$C_{5Z} = (g_4 \cdot g_2 \cdot g^\gamma)^{\frac{1}{k}} = g^{\frac{\alpha\xi + \beta + \gamma}{k}},$$

$$C_{5FX} = Y_j^{\frac{\delta_y}{h}},\ C_{5FY} = X_j^{\frac{\delta_x}{h}}$$

After step ST22' is completed, the ciphertext generation unit 24 generates a one-time signature σ in the same manner as in step ST23.

Thereafter, the ciphertext generation unit 24 generates ciphertext data $C_j$=(L,$C_{2X}'$,$C_{2X}''$, $C_{2Y}'$,$C_{2Y}''$, $C_{2Z}'$,$C_{2Z}''$, $C_{2Z1}'$, $C_{2Z1}''$, $C_{2F}'$,$C_{2F}''$,$C_{5X}$, $C_{5Y}$,$C_{5Z}$,$C_{5FX}$,$C_{5FY}$,$C_3$,$C_4$,σ) including the time parameter L, all the above encrypted data $C_1$ to $C_4$, and the one-time signature σ and writes the obtained ciphertext data into the temporary data storage unit 21.

The communication unit 22 transmits the ciphertext data $C_j$ in the temporary data storage unit 21 to the decryption device 50 under the control of the control unit 25.

The decryption device 50 verifies the ciphertext data $C_j$ generated by the encryption device 20 in the same manner as in step ST51. If the verification is successful, the decryption device 50 decrypts the ciphertext data $C_j$ as shown in the following formula using the private key $sk_i$ to obtain the message m.

$$m = C_3 \Big/ \left\{ \left( \frac{e(C_{5Z}, C_{2Z}'') \cdot e(C_{5FX}, C_{2F}'')}{e(C_{5X}, C_{2X}'')} \right)^{\frac{1}{y_j}} \cdot \left( \frac{e(C_{5Z}, C_{2Z1}'') \cdot e(C_{5FY}, C_{2F}'')}{e(C_{5Y}, C_{2Y}'')} \right)^{\frac{1}{x_j}} \right\}$$

That the decryption result of the above formula produces m can be checked by the following calculation. In the following calculation, $g_1$ is rewritten and denoted by $g^\alpha$, $g_2$ is rewritten and denoted by $g^\beta$, $g_3$ is rewritten and denoted by $g^\xi$ and $g_4$ is rewritten and denoted by $g^{\alpha\xi}$.

$$C_3 \bigg/ \left\{ \left( \frac{e(C_{5Z}, C''_{2Z}) \cdot e(F_{5FX}, C''_{2F})}{e(C_{5X}, C''_{2X})} \right)^{\frac{1}{y_j}} \cdot \right.$$
$$\left. \left( \frac{e(C_{5Z}, C''_{2Z1}) \cdot e(C_{5FY}, C''_{2F})}{e(C_{5Y}, C''_{2Y})} \right)^{\frac{1}{x_j}} \right\}$$

$$= C_3 \bigg/ \left\{ \left( \frac{e\left(g^{\frac{\alpha\xi+\beta+\gamma}{k}}, g^{y_j rk}\right) \cdot e\left(g^{\frac{y_j \delta_y}{h}}, g^{(L+w_j)rh}\right)}{e\left(g^{\frac{\alpha\xi+\gamma+(L+w_j)\delta_y}{s}}, g^{y_j rs}\right)} \right)^{\frac{1}{y_j}} \right\}.$$

$$\left( \frac{e\left(g^{(\alpha\xi+\beta+\gamma)r y_j}, g\right) \cdot e\left(g^{\frac{x_j \delta_x}{h}}, g^{(L+w_j)rh}\right)}{e\left(g^{\frac{\beta+\gamma+(L+w_j)\delta_x}{t}}, g^{x_j rt}\right)} \right)^{\frac{1}{x_j}}$$

$$= C_3 \bigg/ \left\{ \left( \frac{e\left(g^{(\alpha\xi+\beta+\gamma)r y_j}, g\right) \cdot e\left(g^{y_j \delta_y (L+w_j)r}, g\right)}{e\left(g^{(\alpha\xi+\gamma)y_j r+(L+w_j)\delta_y y_j r}, g\right)} \right)^{\frac{1}{y_j}} \cdot \right.$$

$$\left. \left( \frac{e(g^{(\alpha\xi+\beta+\gamma)x_j r}, g) \cdot e(g^{x_j \delta_x (L+w_j)r}, g)}{e(g^{(\beta+\gamma)x_j r+(L+w_j)\delta_x x_j r}, g)} \right)^{\frac{1}{x_j}} \right\}$$

$$= m \cdot e(g_2 g_4, g)^r / (e(g, g)^{\beta r} \cdot (g, g)^{\alpha \xi r}) = m$$

According to at least one of the thirteenth and fourteenth embodiments described above, due to the configuration of generating a re-encryption key based on a random number, even if a server and a user collude with each other, the decryption right can be prevented from being re-transferred without permission of the transfer source.

Also, due to the configuration of generating a re-encryption key using public information for generating a re-encryption key of the original transfer destination, no re-encryption key can be generated without the public information for generating a re-encryption key being provided by the transfer destination. Therefore, a re-encryption key can be generated with the permission of the original transfer destination.

The method described in the embodiment can also be stored in a storage medium such as a magnetic disk (Floppy™ disk, hard disk, or the like), an optical disk (CD-ROM, DVD, or the like), a magneto-optical disk (MO), or a semiconductor memory as a program which can be executed by a computer and distributed.

As the storage medium, any configuration which is a computer-readable storage medium in which a program can be stored may be used regardless of a storage format.

An OS (operating system) which operates on a computer on the basis of an instruction of a program installed from the storage medium in the computer, database management software, and MW (middleware) such as network software may execute a part of the processes to realize the embodiment.

Furthermore, the storage medium according to the present invention includes not only a medium independent of a computer but also a storage medium in which a program transmitted through a LAN, the Internet, or the like is downloaded and stored or temporarily stored.

The number of storage media is not limited to one. A case in which the process in the embodiment is executed from a plurality of media is included in the storage medium according to the present invention. Any medium configuration may be used.

A computer according to the present invention is to execute the processes in the embodiments on the basis of the program stored in a storage medium. The computer may have any configuration such as one apparatus constituted by a personal computer or a system in which a plurality of apparatuses are connected by a network.

A computer in each embodiment includes not only a personal computer but also an arithmetic processing apparatus, a microcomputer, or the like included in an information processing apparatus. The computer is a generic name of an apparatus and a device which can realize the functions of the present invention by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A re-encryption key generator device that generates a re-encryption key to re-encrypt, without decryption, ciphertext data as re-encrypted data, the re-encrypted data can be decrypted using a second private key of a second user device, and the ciphertext data being plaintext data encrypted using a first public key of a first user device, the re-encryption key generator device comprising:
   a first storage configured to store a first private key corresponding to the first public key, the first private key being securely obtained from the first user device, and the first public key being different from a first re-encryption key generation key of the first user device;
   a second storage configured to store a second re-encryption key generation key generated by the second user device, the second re-encryption key generation key being different from a second public key corresponding to the second private key, wherein the second private key decrypts plaintext data that has been encrypted using the second public key;
   communication circuitry configured to
      communicate, via a communication network, with
         a key generator device, which generates a public parameter and a public key and a private key, each corresponding to the re-encryption key generator device, and publishes the public key of re-encryption key generator device, and the public parameter and the second re-encryption key generation key, wherein the first and second re-encryption key generation keys are respectively different from each of the public and private keys of the re-encryption key generator device, and
         the first user device, which encrypts the plaintext data using the public parameter and one of the second public key and the public key of the re-encryption key generator device, and
      communicate the re-encryption key to re-encryption circuitry, which is configured to re-encrypt, without decryption, the ciphertext data as the re-encrypted data, and verify the ciphertext data using a plurality of fixed system values; and processing circuitry configured to generate the re-encryption key using the first private key and the second re-encryption key generation key, wherein the first public key is generated based on the first private key and the plurality of system fixed values, the second public key is generated based on the second private key and the plurality of system fixed values, and the second re-encryption key generation key is generated using the second private key, a random number, and the plurality of system fixed values, the second re-encryption key generation key being different from the second public key, and the second re-encryption key generation key is communicated to the re-encryption key generator device when re-encryption of the ciphertext data as re-encrypted data is authorized by the second user device.

2. The re-encryption key generator device according to claim 1, wherein when the first private key is represented by $sk_i=(x_i,y_i,z_i)$, the second private key is represented by $sk_j=(x_j,y_j,z_j)$, the plurality of system fixed values are represented by g, $g_1$, and $g_2$ (where g, $g_1$, $g_2 \in G$ when bilinear map groups as groups of an order p for which a bilinear map $e:G \times G \to G_T$ exists are represented by G, $G_T$), and the first public key is represented by $pk_i$, the first public key $pk_i$ contains data $X_i$, $Y_i$, $Z_i$, $Z_{1i}$ (where $X_i=g^{x_i}$, $Y_{1i}=g_1^{y_i}$, $Z_i=g^{z_i}$, $Z_{1i}=g_1^{z_i}$), when the second public key is represented by $pk_j$, the second public key $pk_j$ contains data $X_j$, $Y_{1j}$, $Z_j$, $Z_{1j}$ (where $X_j=g^{x_j}$, $Y_{1j}=g_1^{y_j}$, $Z_j=g^{z_j}$, $Z_{1j}=g_1^{z_j}$), when the random number related to the second re-encryption key generation key is represented by $\pi$, a value based on the random number $\pi$ and the system fixed value g is represented by $g_3$, the value based on the random number $\pi$ and the system fixed value $g_1$ is represented by $g_4$, the value based on the random number $\pi$ and the system fixed value $g_2$ is represented by $g_5$ (where $g_3=g^\pi$, $g_4=g_1^\pi$, and $g_5=g_2^\pi$), and the second re-encryption key generation key is represented by $rk_j$, $rk_j=(X_{3j},Y_{5j})$ holds (where $X_{3j}=g_3^{x_j}$, $Y_{5j}=g_5^{y_j}$), when the plaintext data is represented by m (where $m \in G_T$), the random number related to the ciphertext data is represented by r, and the ciphertext data is represented by $C_i$ (where the bilinear map $e:G \times G \to G_T$ is represented by $e(,)$), the ciphertext data $C_i$ contains data $C_{2X}$, $C_{2Y}$, $C_{2Z}$, $C_{2Z1}$, $C_3$ (where $C_{2X}=X_i^r$, $C_{2Y}=Y_{1i}^r$, $C_{2Z}=Z_i^r$, $C_{2Z1}=Z_{1i}^r$, $C_3=e(g_4g_5,g)^r \cdot m$), when the random number related to the re-encryption key is represented by $\theta$, an exponent related to the system fixed values g, $g_2$ is represented by $\beta$ (where $g_2=g^\beta$), and the re-encryption key is represented by $R_{ij}$, $R_{ij}=(R_{ij1},R_{ij2},R_{ij3})$ holds (where $$R_{ij1} = (X_{3j} \cdot g_3^\theta)^{1/x_i} = g^{\frac{\pi(x_j+\theta)}{x_i}},$$

$$R_{ij2} = (Y_{5j} \cdot g_3^\theta)^{1/y_i} = g^{\frac{\pi(\beta y_j+\theta)}{y_i}},$$

$$R_{ij3} = (X_{3j} \cdot Y_{5j} \cdot g_3^\theta)^{1/z_i} = g^{\frac{\pi(x_j+\beta y_j+\theta)}{z_i}}),$$

when the re-encrypted data is represented by $C_j$ (where three random numbers are represented by s, t, k), the re-encrypted data $C_j$ includes data $C_{2X}''$, $C_{2Y}''$, $C_{2Z}''$, $C_{2Z1}''$, $C_{5X}$, $C_{5Y}$, $C_{5Z}$, $C_3$ (where $$C_{2X}'' = C_{2X}^s = X_i^{rs}, \; C_{2Y}'' = C_{2Y}^t = Y_{1i}^{rt},$$

$$C_{2Z}'' = C_{2Z}^k = Z_i^{rk}, \; C_{2Z1}'' = C_{2Z1}^k = Z_{1i}^{rk},$$

$$C_{5X} = R_{ij1}^{\frac{1}{s}}, \; C_{5Y} = R_{ij2}^{\frac{1}{t}}, \; C_{5Z} = R_{ij3}^{\frac{1}{k}}),$$

and the plaintext data m, the re-encrypted data $C_j$, and the second private key $sk_j$ are related by $$m = C_3 \Big/ \left\{ \left(\frac{e(C_{5Z},C_{2Z}'')}{e(C_{5X},C_{2X}'')}\right)^{\frac{1}{y_j}} \cdot \left(\frac{e(C_{5Z},C_{2Z1}'')}{e(C_{5Y},C_{2Y}'')}\right)^{\frac{1}{x_j}} \right\}.$$

3. The re-encryption key generator device according to claim 1, wherein when the first private key is represented by $sk_i=(x_i,y_i,z_i,w_i)$, the second private key is represented by $sk_j=(x_j,y_j,z_j,w_j)$, the plurality of system fixed values are represented by g, $g_1$, and $g_2$ (where g, $g_1$, $g_2 \in G$ when bilinear map groups as groups of an order p for which a bilinear map $e:G \times G \to G_T$ exists are represented by G, $G_T$), and the first public key is represented by $pk_i$, the first public key $pk_i$ contains data $X_i$, $Y_{1i}$, $Z_i$, $Z_{1i}$, $W_i$ (where $X_i=g^{x_i}$, $Y_{1i}=g_1^{y_i}$, $Z_i=g^{z_i}$, $Z_{1i}=g_1^{z_i}$, $W_i=g^{w_i}$), when the second public key is represented by $pk_j$, the second public key $pk_j$ contains data $X_j$, $Y_{1j}$, $Z_j$, $Z_{1j}$, $W_j$ (where $X_j=g^{x_j}$, $Y_{1j}=g_1^{y_j}$, $Z_j=g^{z_j}$, $Z_{1j}=g_1^{z_j}$, $W_j=g^{w_j}$), when a random number related to the second re-encryption key generation key is represented by $\pi$, a value based on the random number $\pi$ and the system fixed value g is represented by $g_3$, the value based on the random number $\pi$ and the system fixed value $g_1$ is represented by $g_4$, the value based on the random number $\pi$ and the system fixed value $g_2$ is represented by $g_5$ (where $g_3=g^\pi$, $g_4=g_1^\pi$, and $g_5=g_2^\pi$), and the second re-encryption key generation key is represented by $rk_j$, $rk_j=(X_{3j},Y_{5j})$ holds (where $X_{3j}=g_3^{x_j}$, $Y_{5j}=g_5^{y_j}$), when the plaintext data is represented by m (where $m \in G_T$), the random number related to the ciphertext data is represented by r, a multiplicative group for the order p is represented by $Z_p^*$, a time parameter showing a period of updating the re-encryption key is represented by L, and the ciphertext data is represented by $C_i$ (where the bilinear map $e:G \times G \to G_T$ is represented by $e(,)$), the ciphertext data $C_i$ contains $C_{2X}$, $C_{2Y}$, $C_{2Z}$, $C_{2Z1}$, $C_{2F}$, $C_3$ (where $C_{2X}=X_i^r$, $C_{2Y}=Y_{1i}^r$, $C_{2Z}=Z_i^r$, $C_{2Z1}=Z_{1i}^r$, $C_{2F}=F_i(L)^r$, $C_3=e(g_4g_5,g)^r \cdot m$, $F_i(L)=g^L \cdot W_i=g^{L+w_i}$ ($J=L \in \varsigma_p^*$)), when three random numbers related to the re-encryption key are represented by $\theta$, $\delta_x$, $\delta_y$, an exponent related to the system fixed values g, $g_1$ is represented by $\alpha$, the exponent related to the system fixed values g, $g_2$ is represented by $\beta$ (where $g_1=g^\alpha$ and $g_2=g^\beta$), and the re-encryption key is represented by $R_{ijL}$, $R_{ijL}=(R_{ijL1},R_{ijL2},R_{ijL3},R_{ijL4},R_{ijL5})$ holds (where $$R_{ijL1} = (X_{3j} \cdot g_3^\theta)^{\frac{1}{x_i}} \cdot g^{(L+w_i)\delta_x} = g^{\frac{\pi(x_j+\theta)}{x_i}+(L+w_i)\delta_x},$$

-continued $$R_{ijL2} = (Y_{5j} \cdot g_3^\theta)^{\frac{1}{y_i}} \cdot g^{(L+w_i)\delta_y} = g^{\frac{\pi(\beta y_j + \theta)}{y_i} + (L+w_i)\delta_y},$$

$$R_{ijL3} = (X_{3j} \cdot Y_{5j} \cdot g_3^\theta)^{\frac{1}{z_i}} = g^{\frac{\pi(x_j + \beta y_j + \theta)}{z_i}},$$

$$R_{ijL4} = g^{x_i \delta_x}, R_{ijL5} = g^{y_i \delta_y} = g^{\alpha y_i \delta_y}),$$

when the re-encrypted data is represented by $C_j$ (where four random numbers are represented by s,t,k,h), the re-encrypted data $C_j$ contains data $C_{2X}''$, $C_{2Y}''$, $C_{2Z}''$, $C_{2Z1}''$, $C_{2F}''$, $C_{5X}$, $C_{5Y}$, $C_{5Z}$, $C_{5FX}$, $C_{5FY}$, $C_3$ (where $$C_{2X}'' = C_{2X}^s = X_i^{rs}, C_{2Y}'' = C_{2Y}^t = Y_{1i}^{rt},$$

$$C_{2Z}'' = C_{2Z}^k = Z_i^{rk}, C_{2Z1}'' = C_{2Z1}^k = Z_{1i}^{rk},$$

$$C_{2F}'' = C_{2F}^h = F_i(L)^{rh},$$

$$C_{5X} = R_{ijL1}^{\frac{1}{s}}, C_{5Y} = R_{ijL2}^{\frac{1}{t}}, C_{5Z} = R_{ijL3}^{\frac{1}{k}},$$

$$C_{5FX} = R_{ijL4}^{\frac{1}{h}}, C_{5FY} = R_{ijL5}^{\frac{1}{h}}$$

and the plaintext data m, the re-encrypted data $C_j$, and the second private key $sk_j$ are related by $$m = C_3 \bigg/ \left\{ \left( \frac{e(C_{5Z}, C_{2Z}'') \cdot e(C_{5X}, C_{2F}'')}{e(C_{5X}, C_{2X}'')} \right)^{\frac{1}{y_j}} \cdot \left( \frac{e(C_{5Z}, C_{2Z1}'') \cdot e(C_{5FY}, C_{2F}'')}{e(C_{5Y}, C_{2Y}'')} \right)^{\frac{1}{x_j}} \right\}.$$

4. A program that when executed by a processor of a re-encryption key generator device causes the re-encryption key generator device to generate and then store in a non-transitory computer-readable storage medium a re-encryption key to re-encrypt, without decryption, ciphertext data as re-encrypted data, the re-encrypted data can be decrypted using a second private key of a second user device, and the ciphertext data being plaintext data encrypted using a first public key of a first user device, the program comprising:
a first program code causing the processor to perform processing to write a first private key corresponding to the first public key into a first storage of the re-encryption key generator device, the first private key being securely obtained from the first user device, and the first public key being different from a first re-encryption key generation key of the first user device;
a second program code causing the processor to perform the processing to write a second re-encryption key generation key generated by the second user device, the second re-encryption key generation key being different from a second public key corresponding to the second private key into a second storage of the re-encryption key generator device, wherein the second private key decrypts plaintext data that has been encrypted using the second public key;
a third program code causing the processor to perform processing to
communicate, via a communication network, with
a key generator device, which generates a public parameter and a public key and a private key, each corresponding to the re-encryption key generator device, and publishes the public key of re-encryption key generator device, and the public parameter and the second re-encryption key generation key, wherein the first and second re-encryption key generation keys are respectively different from each of the public and private keys of the re-encryption key generator device, and
the first user device, which encrypts the plaintext data using the public parameter and one of the second public key and the public key of the re-encryption key generator device, and
communicate the re-encryption key to a re-encryption processor, which is programmed to perform processing to re-encrypt, without decryption, the ciphertext data as the re-encrypted data, and is programmed to verify the ciphertext data using a plurality of fixed system values; and
a fourth program code causing the processor to perform processing to generate the re-encryption key using the first private key and the second re-encryption key generation key, wherein
the first public key is generated based on the first private key and the plurality of system fixed values,
the second public key is generated based on the second private key and the plurality of system fixed values, and
the second re-encryption key generation key is generated using the second private key, a random number, and the plurality of system fixed values, the second re-encryption key generation key being different from the second public key, and the second re-encryption key generation key is communicated to the re-encryption key generator device when re-encryption of the ciphertext data as re-encrypted data is authorized by the second user device.

5. The program according to claim 4, wherein
when the first private key is represented by $sk_i=(x_i,y_i,z_i)$, the second private key is represented by $sk_j=(x_j,y_j,z_j)$, the plurality of system fixed values are represented by g, $g_1$, and $g_2$ (where g, $g_1$, $g_2 \in G$ when bilinear map groups as groups of an order p for which a bilinear map e:G×G→$G_T$ exists are represented by G, $G_T$), and the first public key is represented by $pk_i$, the first public key $pk_i$ contains data $X_i$, $Y_{1i}$, $Z_i$, $Z_{1i}$ (where $X_i=g^{X_i}$, $Y_{1i}=g_1^{Y_i}$, $Z_i=g^{Z_i}$, $Z_{1i}=g_1^{Z_i}$),
when the second public key is represented by $pk_j$, the second public key $pk_j$ contains data $X_j$, $Y_{1j}$, $Z_j$, $Z_{1j}$ (where $X_j=g^{X_j}$, $Y_{1j}=g_1^{Y_j}$, $Z_j=g^{Z_j}$, $Z_{1j}=g_1^{Z_j}$),
when the random number related to the second re-encryption key generation key is represented by π, a value based on the random number π and the system fixed value g is represented by $g_3$, the value based on the random number π and the system fixed value $g_1$ is represented by $g_4$, the value based on the random number π and the system fixed value $g_2$ is represented by $g_5$ (where $g_3=g^\pi$, $g_4=g_1^\pi$, and $g_5=g_2^\pi$), and the second re-encryption key generation key is represented by $rk_j$, $rk_j=(X_{3j},Y_{5j})$ holds (where $X_{3j}=g_3^{X_j}$, $Y_{5j}=g_5^{Y_j}$),
when the plaintext data is represented by m (where m∈$G_T$), the random number related to the ciphertext data is represented by r, and the ciphertext data is represented by $C_i$ (where the bilinear map e:G×G→$G_T$ is represented by e(,)), the ciphertext data $C_i$ contains data $C_{2X}$, $C_{2Y}$, $C_{2Z}$, $C_{2Z1}$, $C_3$ (where $C_{2X}=X_i^r$, $C_{2Y}=Y_{1i}^r$, $C_{2Z}=Z_i^r$, $C_{2Z1}=Z_{1i}^r$, $C_3=e(g_4g_5,g)^r \cdot m$),
when the random number related to the re-encryption key is represented by θ, an exponent related to the system fixed values $g$, $g_2$ is represented by $\beta$ (where $g_2=g^\beta$), and the re-encryption key is represented by $R_{ij}$, $$R_{ij}=(R_{ij1},R_{ij2},R_{ij3})$$

holds (where $$R_{ij1} = (X_{3j} \cdot g_3^\theta)^{1/x_i} = g^{\frac{\pi(x_j+\theta)}{x_i}},$$

$$R_{ij2} = (Y_{5j} \cdot g_3^\theta)^{1/y_i} = g^{\frac{\pi(\beta y_j+\theta)}{y_i}},$$

$$R_{ij3} = (X_{3j} \cdot Y_{5j} \cdot g_3^\theta)^{1/z_i} = g^{\frac{\pi(x_j+\beta y_j+\theta)}{z_i}}\Big),$$

when the re-encrypted data is represented by $C_j$ (where three random numbers are represented by s, t, k), the re-encrypted data $C_j$ includes data $C_{2X}''$, $C_{2Y}''$, $C_{2Z}''$, $C_{2Z1}''$, $C_{5X}$, $C_{5Y}$, $C_{5Z}$, $C_3$ (where $$C_{2X}'' = C_{2X}^s = X_i^{rs},\ C_{2Y}'' = C_{2Y}^t = Y_{1i}^{rt},$$

$$C_{2Z}'' = C_{2Z}^k = Z_i^{rk},\ C_{2Z1}'' = C_{2Z1}^k = Z_{1i}^{rk},$$

$$C_{5X} = R_{ij1}^{\frac{1}{s}},\ C_{5Y} = R_{ij2}^{\frac{1}{t}},\ C_{5Z} = R_{ij3}^{\frac{1}{k}}\Big),$$

and
the plaintext data m, the re-encrypted data $C_j$, and the second private key $sk_j$ are related by $$m = C_3 \Big/ \left\{ \left(\frac{e(C_{5Z},C_{2Z}'')}{e(C_{5X},C_{2X}'')}\right)^{\frac{1}{y_j}} \cdot \left(\frac{e(C_{5Z},C_{2Z1}'')}{e(C_{5Y},C_{2Y}'')}\right)^{\frac{1}{x_j}} \right\}.$$

6. The program according to claim 4, wherein
when the first private key is represented by $sk_i=(x_i,y_i,z_i,w_i)$, the second private key is represented by $sk_j=(x_j,y_j,z_j,w_j)$, the plurality of system fixed values is represented by $g$, $g_1$, and $g_2$ (where $g, g_1, g_2 \in G$ when bilinear map groups as groups of an order p for which a bilinear map $e:G\times G\to G_T$ exists are represented by $G$, $G_T$), and the first public key is represented by $pk_i$, the first public key $pk_i$ contains data $X_i, Y_{1i}, Z_i, Z_{1i}, W_i$ (where $X_i=g^{X_i}$, $Y_{1i}=g_1^{Y_i}$, $Z_i=g^{Z_i}$, $Z_{1i}=g_1^{Z_i}$, $W_i=g^{W_i}$),
when the second public key is represented by $pk_j$, the second public key $pk_j$ contains data $X_j, Y_{1j}, Z_j, Z_{1j}, W_j$ (where $X_j=g^{X_j}$, $Y_{1j}=g_1^{Y_j}$, $Z_j=g^{Z_j}$, $Z_{1j}=g_1^{Z_j}$, $W_j=g_1^{W_j}$),
when the random number related to the second re-encryption key generation key is represented by $\pi$, a value based on the random number $\pi$ and the system fixed value $g$ is represented by $g_3$, the value based on the random number $\pi$ and the system fixed value $g_1$ is represented by $g_4$, the value based on the random number $\pi$ and the system fixed value $g_2$ is represented by $g_5$ (where $g_3=g^\pi$, $g_4=g_1^\pi$, and $g_5=g_2^\pi$), and the second re-encryption key generation key is represented by $rk_j$, $rk_j=(X_{3j},Y_{5j})$ holds (where $X_{3j}=g_3^{X_j}$, $Y_{5j}=g_5^{Y_j}$),
when the plaintext data is represented by m (where $m \in G_T$), the random number related to the ciphertext data is represented by r, a multiplicative group for the order p is represented by $Z_p^*$, a time parameter showing a period of updating the re-encryption key is represented by L, and the ciphertext data is represented by $C_i$ (where the bilinear map $e:G\times G\to G_T$ is represented by $e(,)$), the ciphertext data $C_i$ contains $C_{2X}, C_{2Y},$ $C_{2Z}, C_{2Z1}, C_{2F}, C_3$ (where $C_{2X}=X_i^r$, $C_{2Y}=Y_{1i}^r$, $C_{2Z}=Z_i^r$, $C_{2Z1}=Z_{1i}^r$, $C_{2F}=F_i(L)^r$, $C_3=e(g_4 g_5,g)^r \cdot m$, $F_i(L)=g^L \cdot W_i=g^{L+w_i}$ ($J=L \in \not{c}_p^*$)), when three random numbers related to the re-encryption key are represented by $\theta, \delta_x, \delta_y$, an exponent related to the system fixed values $g$, $g_1$ is represented by $\alpha$, the exponent related to the system fixed values $g$, $g_2$ is represented by $\beta$ (where $g_1=g^\alpha$ and $g_2=g^\beta$), and the re-encryption key is represented by $R_{ijL}$, $R_{ijL}=(R_{ijL1}, R_{ijL2}, R_{ijL3}, R_{ijL4}, R_{ijL5})$
holds $$\Big(\text{where } R_{ijL1} = (X_{3j} \cdot g_3^\theta)^{\frac{1}{x_i}} \cdot g^{(L+w_i)\delta_x} = g^{\frac{\pi(x_j+\theta)}{x_i}+(L+w_i)\delta_x},$$

$$R_{ijL2} = (Y_{5j} \cdot g_3^\theta)^{\frac{1}{y_i}} \cdot g^{(L+w_i)\delta_y} = g^{\frac{\pi(\beta y_j+\theta)}{y_i}+(L+w_i)\delta_y},$$

$$R_{ijL3} = (X_{3j} \cdot Y_{5j} \cdot g_3^\theta)^{\frac{1}{z_i}} = g^{\frac{\pi(x_j+\beta y_j+\theta)}{z_i}},$$

$$R_{ijL4} = g^{x_i \delta_x},\ R_{ijL5} = g_1^{y_i \delta_y} = g^{\alpha y_i \delta_y}\Big),$$

when the re-encrypted data is represented by $C_j$ (where four random numbers are represented by s,t,k,h), the re-encrypted data $C_j$ contains data $C_{2X}'', C_{2Y}'', C_{2Z}'',$ $C_{2Z1}'', C_{2F}'', C_{5X}, C_{5Y}, C_{5Z}, C_{5FX}, C_{5FY}, C_3$ (where $$C_{2X}'' = C_{2X}^s = X_i^{rs},\ C_{2Y}'' = C_{2Y}^t = Y_{1i}^{rt},\ C_{2Z}'' = C_{2Z}^k = Z_i^{rk},$$

$$C_{2Z1}'' = C_{2Z1}^k = Z_{1i}^{rk},\ C_{2F}'' = C_{2F}^h = F_i(L)^{rh},$$

$$C_{5X} = R_{ijL1}^{\frac{1}{s}},\ C_{5Y} = R_{ijL2}^{\frac{1}{t}},\ C_{5Z} = R_{ijL3}^{\frac{1}{k}}$$

$$C_{5FX} = R_{ijL4}^{\frac{h}{s}},\ C_{5FY} = R_{ijL5}^{\frac{h}{t}}\Big),$$

and
the plaintext data m, the re-encrypted data $C_j$, and the second private key $sk_j$ are related by $$m = C_e \Big/ \left\{ \left(\frac{e(C_{5Z},C_{2Z}'') \cdot e(C_{5FX},C_{2F}'')}{e(C_{5X},C_{2X}'')}\right)^{\frac{1}{y_j}} \cdot \left(\frac{e(C_{5Z},C_{2Z1}'')e(C_{5FY},C_{2F}'')}{e(C_{5Y},C_{2Y}'')}\right)^{\frac{1}{x_j}} \right\}.$$

7. A re-encryption key generator device that generates a re-encryption key to re-encrypt, without decryption, ciphertext data as re-encrypted data, the re-encrypted data can be decrypted using a second private key of a second user device, and the ciphertext data being plaintext data that is encrypted using a public key for encryption of a first user device, the re-encryption key generator device comprising:

a first storage configured to store a first private key corresponding to the public key for encryption, the first private key being securely obtained from the first device;

a second storage configured to store public information for generating a re-encryption key corresponding to the second private key;

processing circuitry configured to
  generate a first random number; and
  generate the re-encryption key using the first private key, the public information for generating a re-encryption key, and the first random number; and
communication circuitry configured to
  communicate, via a communication network, with
    a key generator device, which generates a public parameter and a public key and a private key, each corresponding to the re-encryption key generator device, and publishes the public key of re-encryption key generator device, and the public parameter and the second re-encryption key generation key, wherein the first and second re-encryption key generation keys are respectively different from each of the public and private keys of the re-encryption key generator device, and
    the first user device, which encrypts the plaintext data using the public parameter and one of the second public key and the public key of the re-encryption key generator device, and
  communicate the re-encryption key to re-encryption circuitry, which is configured to re-encrypt, without decryption, the ciphertext data as the re-encrypted data, and verify the ciphertext data using a plurality of fixed system values, wherein
the public key for encryption is generated based on the first private key and the plurality of system fixed values, and
the public information for generating a re-encryption key is generated using the second private key and values based on exponents and the plurality of system fixed values.

8. The re-encryption key generator device according to claim 7, wherein when the first private key is represented by $sk_i=(x_i,y_i,z_i)$, the second private key is represented by $sk_j=(x_j,y_j,z_j)$, the first random number is represented by $\gamma$, the plurality of system fixed values are represented by $g, g_1, g_2, g_3, g_4$ (where $g,g_1,g_2,g_3,g_4 \in G$ when bilinear map groups as groups of an order p for which a bilinear map $e:G \times G \to G_T$ exists are represented by $G, G_T$), the exponents related to the system fixed values are represented by $\alpha, \beta, \xi$ (where $g_1=g^\alpha$, $g_2=g^\beta$, $g_3=g^\xi$, and $g_4=g^{\alpha\xi}$), and the re-encryption key is represented by $R_{ij}$, $R_{ij}=(R_{ij1},R_{ij2},R_{ij3})$ holds (where $$R_{ij1} = g^{\frac{\xi x_j + \gamma}{x_i}}, R_{ij2} = g^{\frac{\beta y_j + \gamma}{y_i}}, R_{ij3} = g^{\frac{\xi x_j + \beta y_j + \gamma}{z_i}}),$$

when the public key for encryption of the first user device is represented by $pk_i$, $pk_i=(X_i,Y_{1i},Z_i,Z_{1i})$ holds (where $X_i=g^{x_i}$, $Y_{1i}=g_1^{y_i}$, $Z_i=g^{z_i}$, $Z_{1i}=g_1^{z_i}$),
when the public information for generating a re-encryption key corresponding to the first private key is represented by $pi_i$, $pi_i=(X_{3i},Y_{2i})$ holds (where $X_{3i}=g_3^{x_i}$, $Y_{2i}=g_2^{y_i}$),
when the public key for encryption of the second user device is represented by $pk_j$, $pk_j=(X_j,Y_{1j},Z_j,Z_{1j})$ holds (where $X_j=g^{x_j}$, $Y_{1j}=g_1^{y_j}$, $Z_j=g^{z_j}$, $Z_{1j}=g_1^{z_j}$),
when the public information for generating a re-encryption key corresponding to the second private key is represented by $pi_j$, $pi_j=(X_{3j},Y_{2j})$ holds (where $X_{3j}=g_3^{x_j}$, $Y_{2j}=g_2^{y_j}$),
when the plaintext data is represented by m (where $m \in G_T$), a second random number is represented by r, and the ciphertext data is represented by $C_i$ (where the bilinear map $e:G \times G \to G_T$ is represented by $e(g,h)$ (where $g, h \in G$)), $C_i=(C_{2X},C_{2Y},C_{2Z},C_{2Z1},C_3)$ holds (where $C_{2X}=X_i^r$, $C_{2Y}=Y_{1i}^r$, $C_{2Z}=Z_i^r$, $C_{2Z1}=Z_{1i}^r$, $C_3=e(g_2g_4,g)^r \cdot m$),
when the re-encrypted data is represented by $C_j$ (where third to fifth random numbers are represented by s,t,k), $C_j=(C_{2X}'',C_{2Y}'',C_{2Z}'',C_{2Z1}'',C_{5X},C_{5Y},C_{5Z},C_3)$ holds (where $$C_{2X}'' = C_{2X}^s = X_i^{rs}, C_{2Y}'' = C_{2Y}^t = Y_{1i}^{rt},$$

$$C_{2Z}'' = C_{2Z}^k = Z_i^{rk}, C_{2Z1}'' = C_{2Z1}^k = Z_{1i}^{rk},$$

$$C_{5X} = R_{ij1}^{\frac{1}{s}}, C_{5Y} = R_{ij2}^{\frac{1}{t}}, C_{5Z} = R_{ij3}^{\frac{1}{k}}),$$

and
the plaintext data m, the re-encrypted data $C_j$, and the second private key $sk_j$ are related by $$m = C_e \Big/ \left\{ \left( \frac{e(C_{5Z}, C_{2Z}'')}{e(C_{5X}, C_{2X}'')} \right)^{\frac{1}{y_j}} \cdot \left( \frac{e(C_{5Z}, C_{2Z1}'')}{e(C_{5Y}, C_{2Y}'')} \right)^{\frac{1}{x_j}} \right\}.$$

9. A program that when executed by a processor of a re-encryption key generator device causes the re-encryption key generator device to generate and then store in a non-transitory computer-readable storage medium a re-encryption key to re-encrypt, without decryption, ciphertext data as re-encrypted data, the re-encrypted data can be decrypted using a second private key of a second user device, the ciphertext data being plaintext data encrypted using a public key for encryption of a first user device, the program comprising:
  a first program code causing the processor to perform processing to write a first private key corresponding to the public key for encryption into a first storage of the re-encryption key generator device, the first private key being securely obtained from the first device;
  a second program code causing the processor to perform the processing to write public information for generating the re-encryption key corresponding to the second private key into a second storage of the re-encryption key generator device;
  a third program code causing the processor to perform processing to generate a first random number; and
  a fourth program code causing the processor to perform processing to communicate, via a communication network, with
- a key generator device, which generates a public parameter and a public key and a private key, each corresponding to the re-encryption key generator device, and publishes the public key of re-encryption key generator device, and the public parameter and the second re-encryption key generation key, wherein the first and second re-encryption key generation keys are respectively different from each of the public and private keys of the re-encryption key generator device, and
- the first user device, which encrypts the plaintext data using the public parameter and one of the second public key and the public key of the re-encryption key generator device, and communicate the re-encryption key to a re-encryption processor, which is programmed to perform processing to re-encrypt, without decryption, the ciphertext data as the re-encrypted data, and is programmed to verify the ciphertext data using the plurality of fixed system values; and a fifth program code causing the processor to perform processing to generate the re-encryption key, the re-encryption key being a calculated using the first private key, the public information for generating a re-encryption key, and the first random number, wherein the public key for encryption is generated based on the first private key and the plurality of system fixed values, and the public information for generating a re-encryption key is generated using the second private key and values based on exponents and the plurality of system fixed values.

* * * * *